United States Patent
Sharma et al.

(10) Patent No.: US 7,546,125 B2
(45) Date of Patent: Jun. 9, 2009

(54) ENHANCING USER EXPERIENCE DURING HANDOFFS IN WIRELESS COMMUNICATION

(75) Inventors: Vikas Sharma, San Ramon, CA (US);
Snehal Karia, Fremont, CA (US);
Derek Wang, Sunnyvale, CA (US);
Srinivasa Athuluru, San Francisco, CA (US); Marc Solsona-Palomar, San Jose, MA (US); Josh Marder, Bellingham, MA (US)

(73) Assignee: DiVitas Networks, Inc., Mountain View, CA (US)

( * ) Notice: Subject to any disclaimer, the term of this patent is extended or adjusted under 35 U.S.C. 154(b) by 270 days.

(21) Appl. No.: 11/537,985

(22) Filed: Oct. 2, 2006

(65) Prior Publication Data
US 2007/0207804 A1 Sep. 6, 2007

Related U.S. Application Data

(60) Provisional application No. 60/723,410, filed on Oct. 3, 2005, provisional application No. 60/804,806, filed on Jun. 14, 2006.

(51) Int. Cl.
*H04W 36/00* (2009.01)
*H04M 1/00* (2006.01)
*H04W 4/00* (2009.01)

(52) U.S. Cl. .................. 455/436; 455/437; 455/442; 455/550.1; 455/556.2; 455/561; 370/331

(58) Field of Classification Search ................ 455/421, 455/422.1, 432.1–432.3, 435.1–435.3, 436–451, 455/452.1–452.2, 453, FOR. 207, 67.11, 455/517, 524–525, 550.1, 556.2, 561; 370/328–334, 370/338, 341, 310.2, 349–350; 380/272
See application file for complete search history.

(56) References Cited

U.S. PATENT DOCUMENTS 5,260,783 A 11/1993 Dixit (Continued)

FOREIGN PATENT DOCUMENTS

WO  WO 01/33787  5/2001

(Continued)

OTHER PUBLICATIONS

"International Search Report", Issue in PCT Application No. PCT/US2006/38912; Mailing Date.: Feb. 12, 2008.

(Continued)

*Primary Examiner*—Meless N Zewdu
(74) *Attorney, Agent, or Firm*—IP Strategy Group, P.C.

(57) ABSTRACT

A method for performing a handoff for a mobile device from a first radio station to a second radio station. The method includes buffering a first media data set that is received through the first radio station. The method also includes cross-correlating a tail portion of the first media data set and a head portion of a second media data set to generate a cross-correlated media data set, if the second media data set is received through the second radio station. The method further includes synthesizing, using a modeled portion of the first media data set, a synthesized media data set, if no media data is received through the second radio station within a threshold. The method further includes extending the first media data set to generate an extended media data set, if no media data is received through the second radio station at the threshold.

21 Claims, 61 Drawing Sheets

U.S. PATENT DOCUMENTS

| | | | |
|---|---|---|---|
| 5,440,624 A | | 8/1995 | Schoof, II |
| 5,974,300 A | * | 10/1999 | LaPorta et al. ............. 340/7.23 |
| 6,010,456 A | | 1/2000 | Rhyne |
| 6,073,175 A | | 6/2000 | Tavs et al. |
| 6,259,920 B1 | | 7/2001 | Kusaki et al. |
| 6,288,739 B1 | | 9/2001 | Hales et al. |
| 6,388,584 B1 | | 5/2002 | Dorward et al. |
| 6,412,015 B1 | | 6/2002 | Navare et al. |
| 6,597,787 B1 | | 7/2003 | Lindgren et al. |
| 6,622,175 B1 | | 9/2003 | Piller |
| 6,650,640 B1 | | 11/2003 | Muller et al. |
| 6,760,303 B1 | * | 7/2004 | Brouwer ..................... 370/229 |
| 6,769,123 B1 | | 7/2004 | Chan |
| 6,801,948 B2 | | 10/2004 | Clark et al. |
| 6,822,943 B1 | | 11/2004 | Mantin |
| 6,907,501 B2 | * | 6/2005 | Tariq et al. .................. 711/118 |
| 6,909,702 B2 | | 6/2005 | Leung et al. |
| 6,970,943 B1 | | 11/2005 | Subramanian et al. |
| 6,993,360 B2 | | 1/2006 | Plahte et al. |
| 7,039,027 B2 | * | 5/2006 | Bridgelall ................... 370/329 |
| 7,133,669 B2 | | 11/2006 | Nair et al. |
| 2001/0046215 A1 | | 11/2001 | Kim |
| 2002/0067706 A1 | | 6/2002 | Bautz et al. |
| 2002/0076025 A1 | | 6/2002 | Liversidge et al. |
| 2002/0085516 A1 | | 7/2002 | Bridgelall et al. |
| 2002/0131583 A1 | | 9/2002 | Lu |
| 2003/0005112 A1 | | 1/2003 | Krautkremer |
| 2003/0081741 A1 | | 5/2003 | Anne et al. |
| 2003/0087629 A1 | | 5/2003 | Juitt et al. |
| 2003/0119548 A1 | | 6/2003 | Mohammed |
| 2003/0177384 A1 | | 9/2003 | Jones et al. |
| 2004/0001446 A1 | | 1/2004 | Bhatia et al. |
| 2004/0001579 A1 | | 1/2004 | Feinberg et al. |
| 2004/0054787 A1 | | 3/2004 | Kjellberg et al. |
| 2004/0157585 A1 | | 8/2004 | Sashihara |
| 2004/0165530 A1 | * | 8/2004 | Bedekar et al. ............. 370/235 |
| 2004/0218575 A1 | | 11/2004 | Ibe et al. |
| 2004/0260837 A2 | | 12/2004 | Sjollema et al. |
| 2004/0268148 A1 | | 12/2004 | Karjala et al. |
| 2005/0083886 A1 | | 4/2005 | Ikeda |
| 2005/0094618 A1 | | 5/2005 | Colban et al. |
| 2005/0113077 A1 | | 5/2005 | Bushnell et al. |
| 2005/0119001 A1 | * | 6/2005 | Watanabe ................... 455/436 |
| 2005/0138176 A1 | | 6/2005 | Singh et al. |
| 2005/0138528 A1 | | 6/2005 | Ameigeiras et al. |
| 2005/0159157 A1 | * | 7/2005 | Bajko ....................... 455/435.1 |
| 2005/0265284 A1 | | 12/2005 | Hsu et al. |
| 2006/0036747 A1 | | 2/2006 | Galvin, Jr. et al. |
| 2007/0014259 A1 | | 1/2007 | Fajardo et al. |
| 2007/0091848 A1 | | 4/2007 | Karia et al. |
| 2007/0091907 A1 | | 4/2007 | Seshadri et al. |
| 2007/0094374 A1 | | 4/2007 | Karia et al. |
| 2007/0121580 A1 | | 5/2007 | Forte et al. |

FOREIGN PATENT DOCUMENTS

| | | | |
|---|---|---|---|
| WO | WO-03/065682 A1 | 8/2003 | |
| WO | WO-2005/076649 A1 | 8/2005 | |

OTHER PUBLICATIONS

"Written Opinion", Issue in PCT Application No. PCT/US2006/38912; Mailing Date.: Feb. 12, 2008.
Reynolds, "Enabling Secure IP Telephony in Enterprise Networks", http://www.asociacion-aecsi.es/doc/Network/Enabling_Secure_IP_Telephony_in_Enterprise_Networks.pdf,(2001).
"International Search Report", Issue in PCT Application No. PCT/US2007/071180; Mailing Date.: Mar. 25, 2008.
"Written Opinion", Issue in PCT Application No. PCT/US2007/071180; Mailing Date.: Mar. 25, 2008.
"International Search Report", Issue in PCT Application No. PCT/US2006/38869; Mailing Date.: Mar. 24, 2008.
"Written Opinion", Issue in PCT Application No. PCT/US2006/38869; Mailing Date.: Mar. 24, 2008.
"Written Opinion", Issue in PCT Application No. PCT/US2007/071181; Mailing Date.: Mar. 26, 2006.
"International Search Report", Issue in PCT Application No. PCT/US2007/071181; Mailing Date.: Mar. 26, 2008.
"International Preliminary Report on Patentability", Issued in PCT Application No. PCT/US2006/38912; Mailing Date: May 29, 2008.
"Written Opinion", Issue in PCT Application No. PCT/US2006/39115; Mailing Date: Jun. 16, 2008.
"International Search Report", Issue in PCT Application No. PCT/US2006/39115; Mailing Date: Jun. 16, 2008.
"International Preliminary Report on Patentability", Issued in PCT Application No. PCT/US2006/38911 Mailing Date: May 29, 2008.
"International Search Report", Issued in PCT Application No. PCT/US2007/071184; Mailing Date: May 29, 2008.
"Written Opinion", Issued in PCT Application No. PCT/US2007/071184; Mailing Date: May 19, 2008.
"Written Opinion", Issued in PCT Application No. PCT/US2007/071186; Mailing Date: May 16, 2008.
"International Search Report", Issued in PCT Application No. PCT/US2007/071186; Mailing Date: May 16, 2008.
"International Preliminary Report on Patentability", Issued in PCT Application No. PCT/US2006/38869; Mailing Date: May 28, 2008.
U.S. Appl. No. 11/538,034, filed Oct. 2, 2006; Inventors: Palakkal, et al.
U.S. Appl. No. 11/538,037, filed Oct. 2, 2006; Inventors: Mittal, et al.
U.S. Appl. No. 11/755,710, filed May 30, 2007; Inventors: Wang.
U.S. Appl. No. 11/755,727, filed May 30, 2007; Inventors: Wang.
U.S. Appl. No. 11/755,702, filed May 30, 2007; Inventors: Prasad.
U.S. Appl. No. 11/755,704, filed May 30, 2007; Inventors: Mittal.
U.S. Appl. No. 11/748,041, filed May 14, 2007; Inventors: Karia.
International Search Report, mailed Aug. 1, 2007, for International Application No. PCT/US 06/38911; Filed on Oct. 3, 2006; Applicant: Lam Research Corporation.
Written Opinion, mailed Aug. 1, 2007, for International Application No. PCT/US 06/38911; Filed on Oct. 3, 2006; Applicant: Lam Research Corporation.
International Search Report, mailed Sep. 24, 2007, for International Application No. PCT/US 06/38870; Filed on Oct. 3, 2006; Applicant: Lam Research Corporation.
Written Opinion, mailed Sep. 24, 2007, for International Application No. PCT/US 06/38870; Filed on Oct. 3, 2006; Applicant: Lam Research Corporation.
International Search Report, mailed Aug. 2, 2007, for International Application No. PCT/US 06/38872; Filed on Oct. 3, 2006; Applicant: Lam Research Corporation.
Written Opinion, mailed Aug. 2, 2007, for International Application No. PCT/US 06/38872; Filed on Oct. 3, 2006; Applicant: Lam Research Corporation.
Shoen, John et al., "PCTEL Receives Critical Roaming Patent", Nov. 15, 2006, http://investor.pctel.com/ReleaseDetail.cfm?ReleaseID=218834.
Karia, Snehal et al., "Enterprise-Managed Wireless Communication", U.S. Appl. No. 11/538,042, filed Oct. 2, 2006.
Palakkal, Rajesh et al., "Rendezvous Calling Systems and Methods Therefor", U.S. Appl. No. 11/538,034, filed Oct. 2, 2006.
Mittal, Ajay et al., "Call Routing Via Recipient Authentication", U.S. Appl. No. 11/538,037, filed Oct. 2, 2006.
Karia, Snehal, "Reducing Data Loss During Handoffs In Wireless Communication", U.S. Appl. No. 11/537,980, filed Oct. 2, 2006.
Forte, Paolo, "Classification For Media Stream Packets In A Media Gateway", U.S. Appl. No. 11/537,990, filed Oct. 2, 2006.
Seshadri, Varad et al., "Secured Media Communication Across Enterprise Gateway", U.S. Appl. No. 11/537,994, filed Oct. 2, 2006.
Business Wire, "FirstHand Technologies Granted Patent for Multi-Protocol Data Communication System Supporting Wireless Telephony, Content Delivery", Nov. 28, 2006, http://www.tmcnet.com/usubmit/2006/11/28/2116925.htm.
"International Preliminary Report on Patentability", Issued in PCT Application No. PCT/US07/71180; Mailing Date: Oct. 24, 2008.

"International Preliminary Report on Patentability", Issued in PCT Application No. PCT/US07/71184; Mailing Date: Nov. 4, 2008.

"International Preliminary Report on Patentability", Issued in PCT Application No. PCT/US07/71186; Mailing Date: Nov. 4, 2008.

"International Search Report", Issued in PCT Application No. PCT/US06/39101; Mailing Date: Jul. 17, 2008.

"Written Opinion", Issued in PCT Application No. PCT/US06/39101; Mailing Date: Jul. 17, 2008.

"International Search Report", Issued in PCT Application No. PCT/US2008/006184; Mailing Date: Sep. 29, 2008.

"Written Opinion", Issued in PCT Application No. PCT/US2008/006184; Mailing Date: Sep. 29, 2008.

"International Preliminary Report on Patentability", Issued in PCT Application No. PCT/US06/38870; Mailing Date: Feb. 22, 2008.

"International Preliminary Report on Patentability", Issued in PCT Application No. PCT/US07/71181; Mailing Date: Dec. 8, 2008.

* cited by examiner

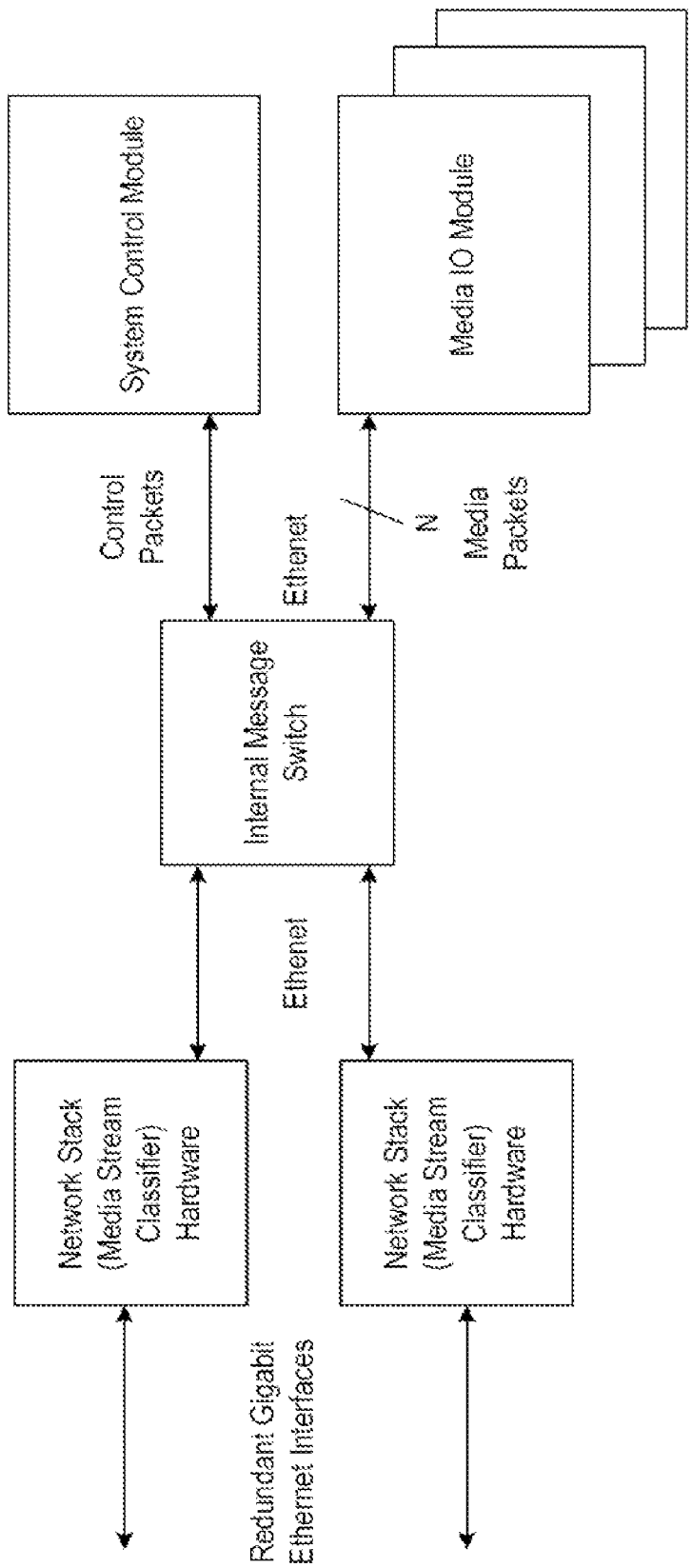
FIGURE 6A (SYSTEM BLOCK DIAGRAM)

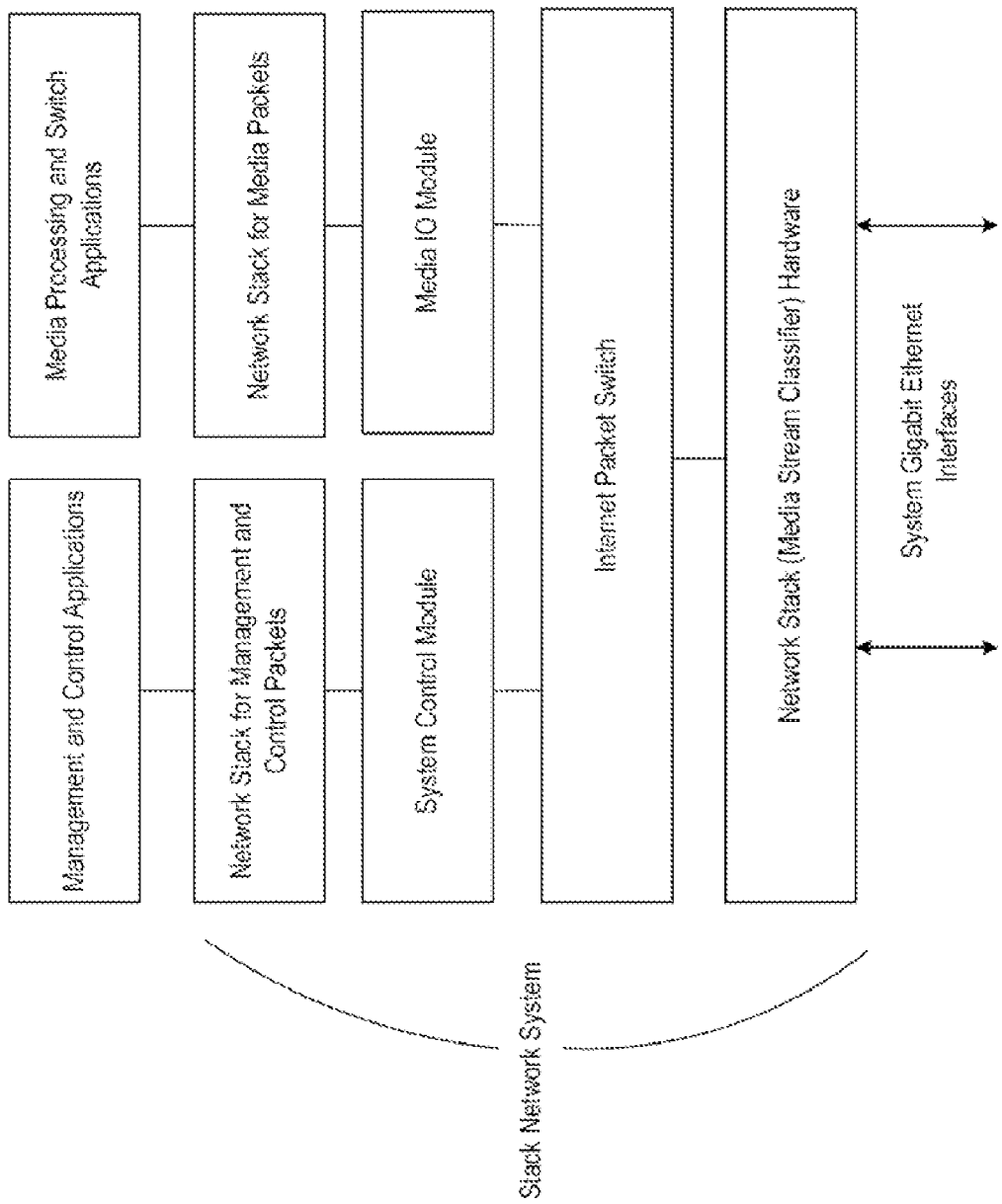
FIGURE 6B (SYSTEM NETWORK STACK)

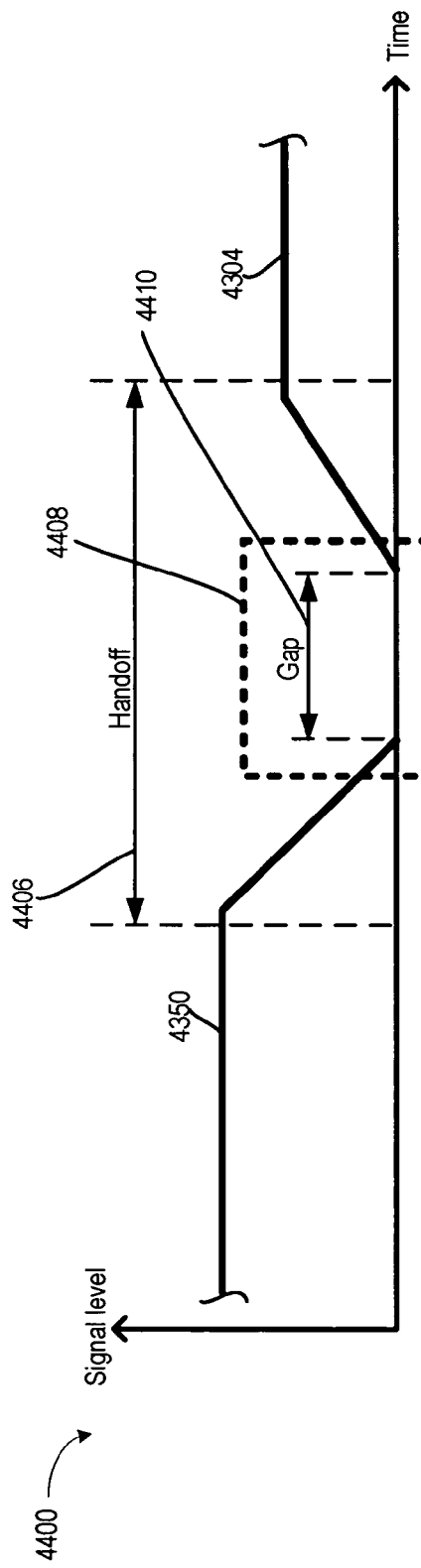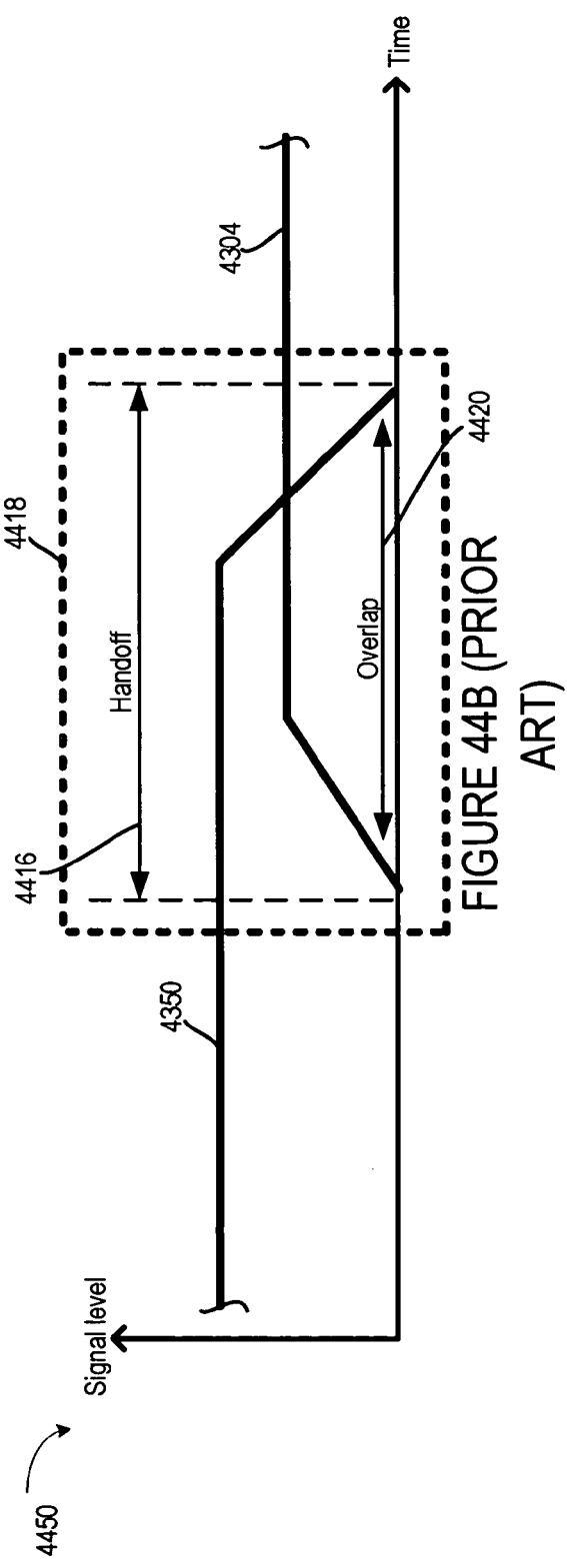

ENHANCING USER EXPERIENCE DURING HANDOFFS IN WIRELESS COMMUNICATION

RELATED APPLICATIONS

This application is related to and claims priority under 35 U.S.C. §119(e) to a commonly assigned provisional patent application entitled "Advanced Mobile Communication Platform Apparatus and Method," by Caron et al., Application Ser. No. 60/723,410 filed on Oct. 3, 2005; a commonly assigned patent application entitled "Enterprise-Managed Wireless Communication," by Karia et al., application Ser. No. 11/538,042 filed on Oct. 2, 2006; and a commonly assigned provisional patent application entitled "Advanced Mobile Communication Platform Apparatus and Method," by Kalkunete et al., Application Ser. No. 60/804,806 filed on Jun. 14, 2006, all of which are incorporated herein by reference.

BACKGROUND OF THE INVENTION

Conventional mobile communication platforms include cellular communications, for example, Global Systems for Mobile (GSM) communications. Other conventional platforms that support limited mobility include Wi-Fi, which is based on IEEE 802.11 standards. These are both well known and established platforms.

Next generation platforms are designed to permit mobile users to move between cellular and Wi-Fi networks and include an Unlicensed Mobile Access (UMA) standard that provides a switch controller for carriers to permit users to transcend between cellular and Wi-Fi networks and vice-versa. However, the UMA standard has disadvantages including that the carrier controls the calls and decides if and when to switch users between networks.

What is needed is an advanced mobile communication platform that provides enterprise level communication and control over users and the networks that they choose to select based on enterprise driven criteria rather than carrier driven criteria.

SUMMARY

The invention relates, in an embodiment, to a method for performing a handoff for a mobile device from a first radio station to a second radio station. The method includes buffering a first media data set that is received through the first radio station. The method also includes cross-correlating a tail portion of the first media data set and a head portion of a second media data set to generate a cross-correlated media data set, if the second media data set is received through the second radio station. The method further includes outputting the correlated media data set if the correlated media data set is generated. The method also includes synthesizing, using a modeled portion of the first media data set, a synthesized media data set, if no media data is received through the second radio station within a threshold. The threshold includes at least one of a time threshold and a data amount threshold. The method further includes outputting the synthesized media data set if the synthesized media data set is synthesized. The method also includes extending at least a portion of the first media data set to generate an extended media data set, if no media data is received through the second radio station at the threshold. The method further includes outputting the extended media data set if the extended media data set is generated.

In one or more embodiments, the invention relates to a system for performing a handoff for a mobile device from a first radio station to a second radio station. The system includes a buffer configured to buffer a first media data set that is received through the first radio station. The system also includes a cross-correlation module configured to perform cross-correlation of a tail portion of the first media data set and a head portion of a second media data set to generate a cross-correlated media data set, if the second media data set is received through the second radio station. The system further includes a synthesizer module configured to synthesize, using a modeled portion of the first media data set, a synthesized media data set if no media data is received through the second radio station within a threshold. The threshold includes at least one of a time threshold and a data amount threshold. The system further includes an extension module configured to extend at least a portion of the first media data to generate an extended media data set if no media data is received through the second radio station at the threshold.

These and other features of the present invention will be described in more detail below in the detailed description of the invention and in conjunction with the following figures.

BRIEF DESCRIPTION OF THE DRAWINGS

The invention is described with reference to the following figures.

FIG. 6A depicts a system block diagram purposes of describing a network stack according to an embodiment of the invention.

FIG. 6B depicts a system network stack according to an embodiment of the invention.

FIG. 44A illustrates an example prior art handoff scenario in which a gap may exist in the media data streams that are being sent by two networks.

FIG. 44B illustrates an example prior art handoff scenario in which an overlap may exist between the media data streams that are being sent by two networks.

TABLE OF CONTENTS

A. Architecture
B. Enhancing User Experience in Media Handoffs
C. Automatically Setup of Point-to-Point and Point-to-Multipoint Multi-Media Conference Calls with Administrator and User Controlled Rules and Preferences (Rendezvous Calling)
D. Call Routing Via Recipient Authentication
E. Reducing Data Loss in Media Handoffs
F. Selecting Network Stack Functions in Hardware for a Media Stream Processing Distributed System
G. Secure Media Communication Across Enterprise Gateway (NAT/Firewall)
H. Conclusion

DETAILED DESCRIPTION

The invention is described with reference to specific apparatus and embodiments. Those skilled in the art will recognize that the description is for illustration and to provide the best mode of practicing the invention. For example, while references are made to certain communication protocols, others are anticipated by the invention. For instance, while Wi-Fi (IEEE 802.11) is described as a protocol for wireless communication, other protocols may be implemented in the invention. References made herein to the mobility client, client device, and mobile equipment (ME) are equivalent.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

A. Architecture

Figure 1:
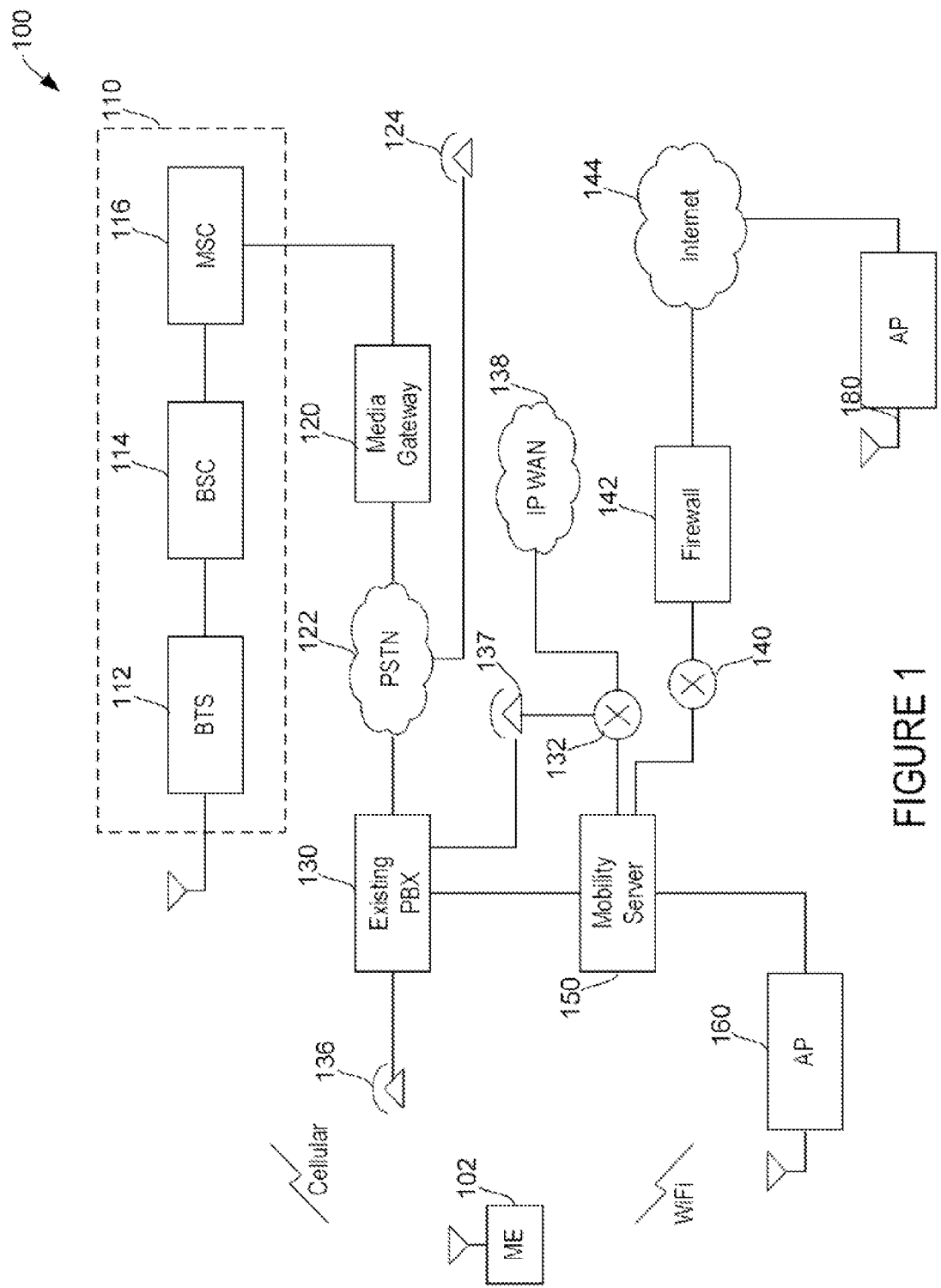
FIG. 1 depicts a system network according to an embodiment of the invention.

FIG. 1 depicts a system network 100 according to an embodiment of the invention. Mobile equipment (ME) 102 is provided that communicates with the network in a number of possible ways. ME 102 can communicate with a cellular network 110 that includes a Base Transceiver Station (BTS) 112, a BTS Switching Center (BSC) 114 and Mobile Switching Center (MSC) 116. The MSC is coupled to a Media Gateway 120 that is coupled to a public switched telephone network (PSTN) 122. Other conventional public and private telephones 124 are also coupled to the PSTN. A PBX 130 is coupled to the PSTN and serves an enterprise for purposes of making and receiving calls, for example, via telephone 136. Mobility server 150 is coupled to the PBX as well as other networks. For example, mobility server 150 is coupled via router 132 to an Internet Protocol Wide Area Network (WAN) 138. The mobility server 150 is also coupled via router 140 and firewall 142 to the Internet 144. The mobility server is also coupled to a local area network (LAN) with wireless access point 160. One access point is depicted while the invention anticipates multiple access points as well. The access point 160 permits a user with ME 102 to wander in the enterprise and stay connected to the PSTN through the mobility server 150 and PBX 130. If the user wanders beyond the boundary of the LAN, the user will be connected to an alternate network (e.g. the cellular network) as described below in detail. Also depicted is an access point 180 that is coupled to the internet for access under certain conditions as described herein.

Figure 2A:
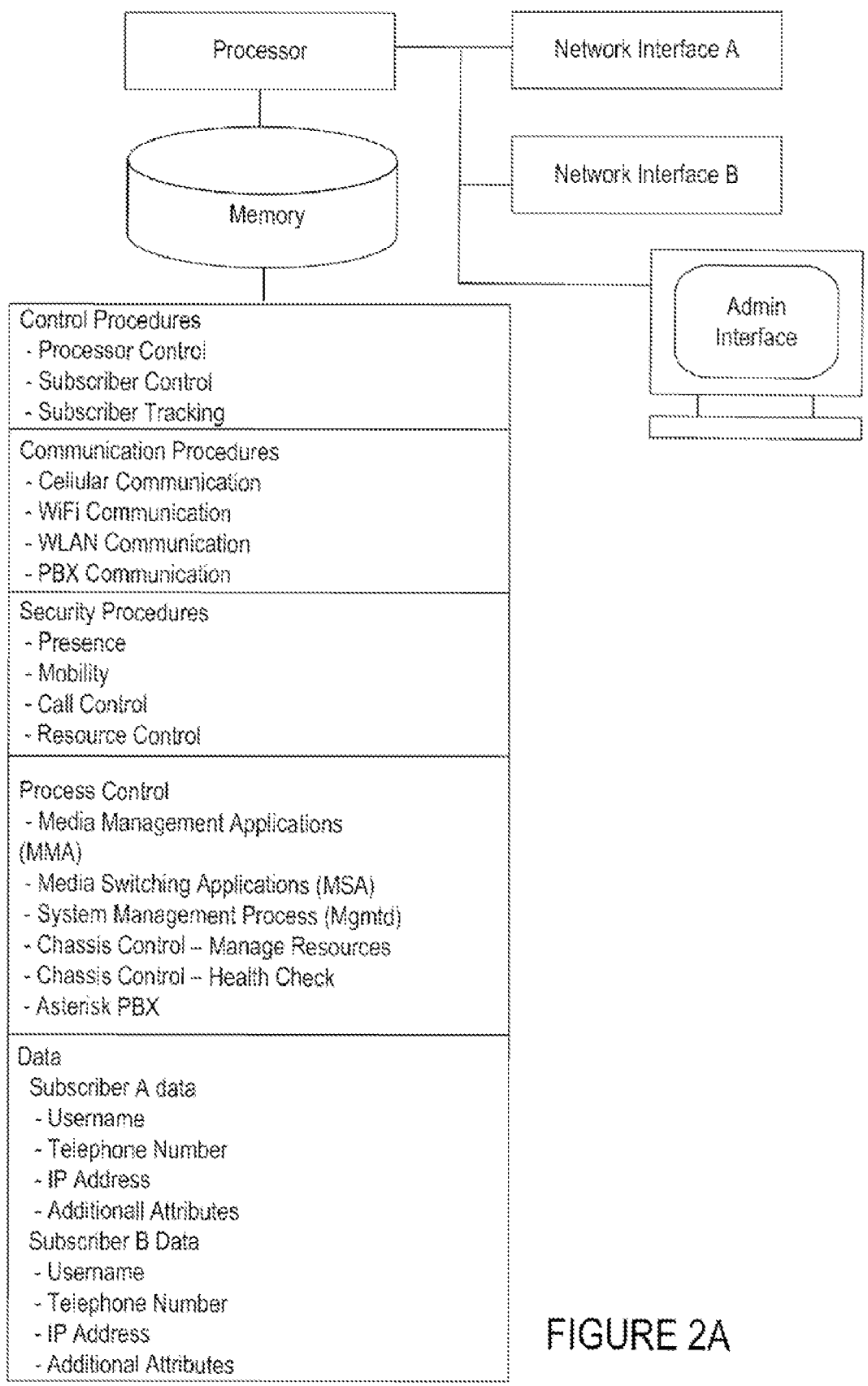
FIGS. 2A-C depict a mobility server according to an embodiment of the invention.
Figure 2B:
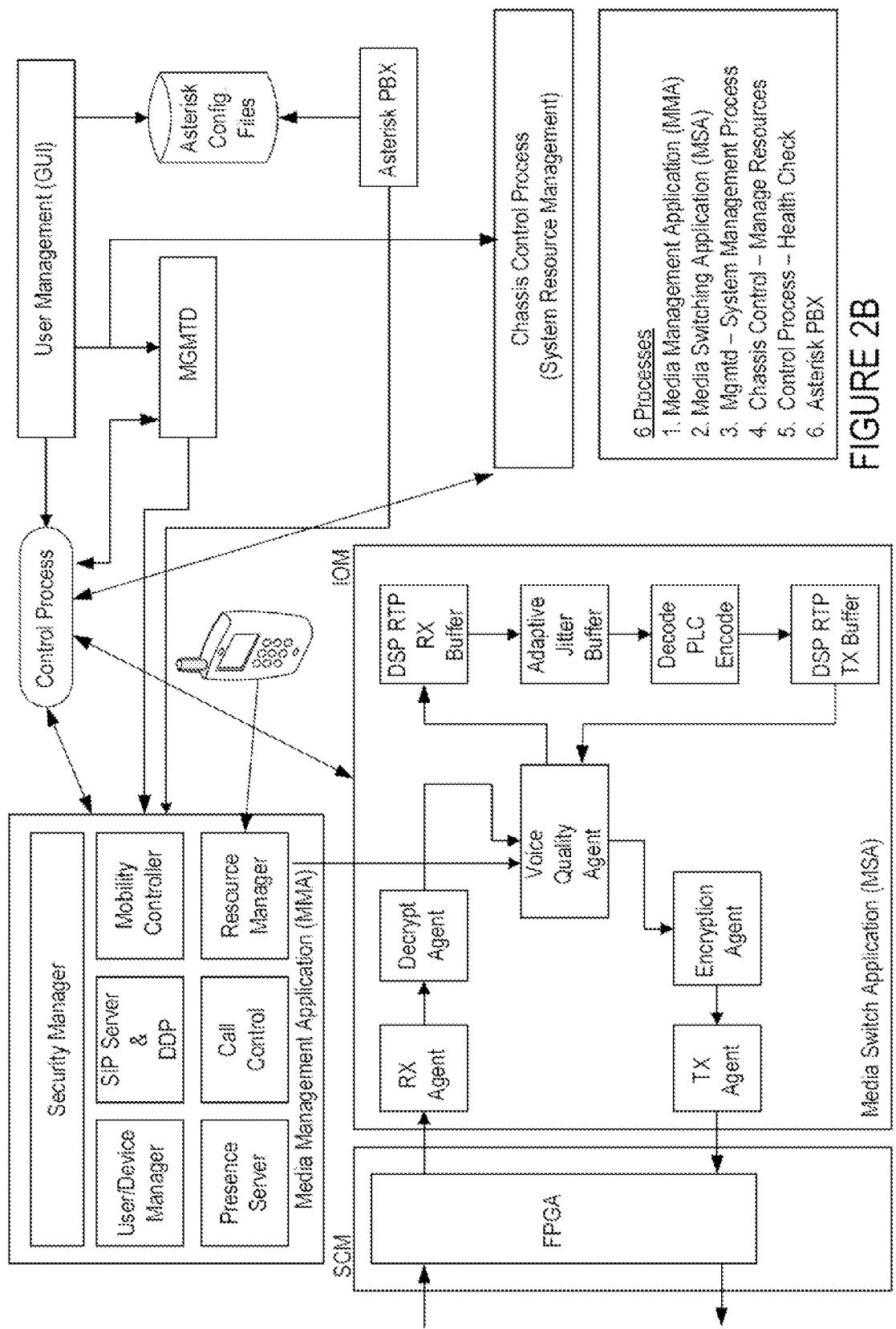
Figure 2C:
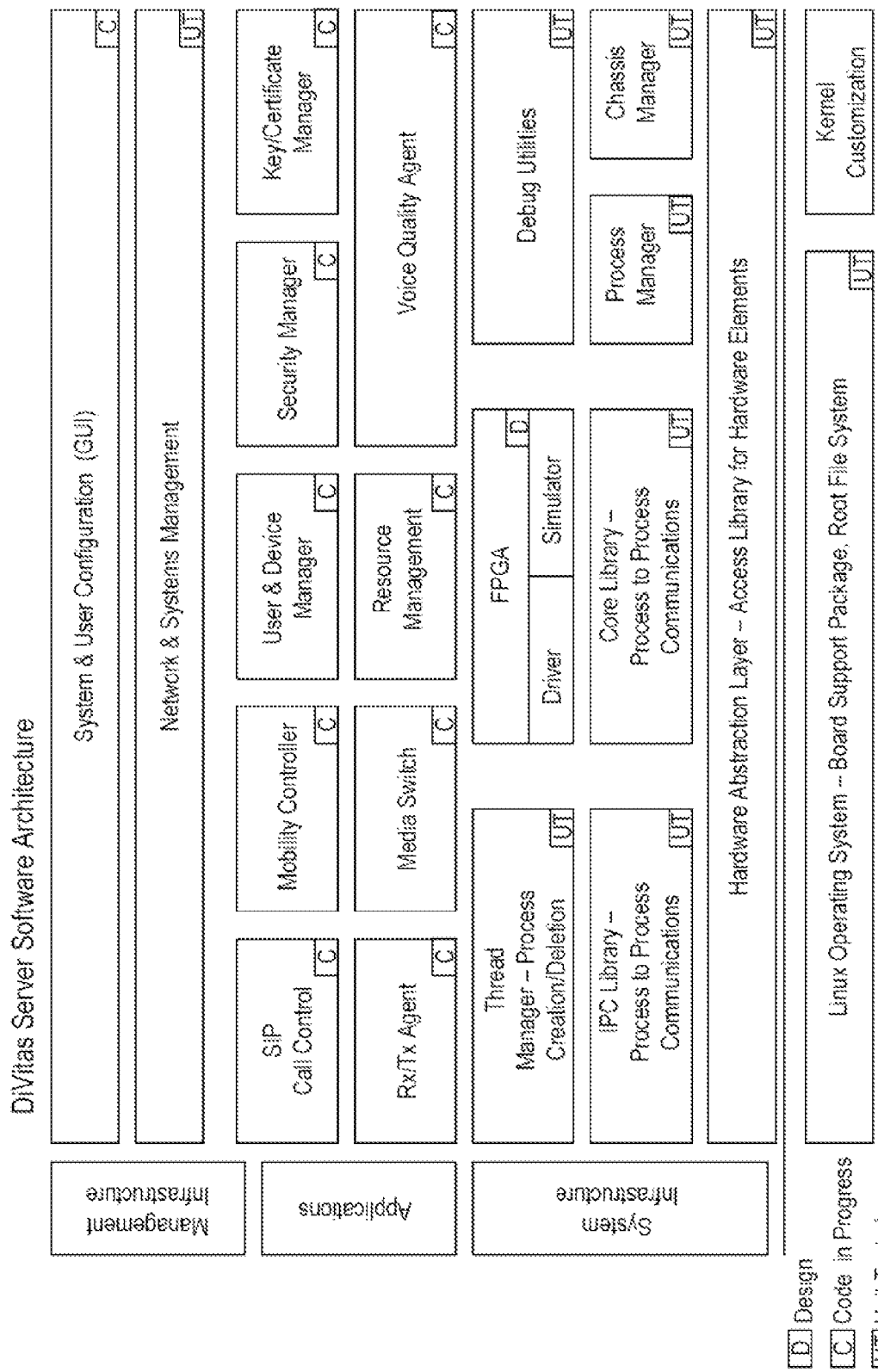

FIGS. 2A-C depict a mobility server according to an embodiment of the invention.

Security Manager—The definition of security when two or more entities are communicating involves the following aspects:
 1. Mutual Authentication of the communicating entities
 2. Privacy of the communication channel
 3. Integrity of messages exchanged
 4. Authentication of messages In mobility solution in accordance with one or more embodiments of the present invention, there are three distinct communicating entities: mobility client, mobility server and external VoIP GW. And there are two distinct types of paths between these entities: SIP signaling path and Media path.

As described in the Architecture Specification[1] the following mechanisms are used to achieve the above mentioned security aspects between client, server and external gateway for signaling and data paths:
 1. SIP TLS session between client and server.
 2. Client Authentication using SIP Notify after SIP TLS establishment
 3. Authentication of users with server
 4. SIP TLS session between server and external VoIP Gateway.
 5. Server authentication with external VoIP Gateway
 6. Secure media path
 7. Derived requirements User/Device Manager/Mobility Controller—The device and mobility Manager (hereby referred to as DMM) is a module that handles device configuration and status as well as the mobility aspects while there is an active call on a device. The following sections capture the functional and design specifications of the DMM along with the public interfaces that it supports.

Here is a summary of the roles and responsibilities of the DMM
 1. Device configuration controlled by the enterprise administrator.
 2. Report status of the device.
 3. Image management for the device
 4. Maintain and implement the mobility logic for handsets with an active call—i.e. handle Wi-Fi to Cell and vice-versa handoff.
 5. Handles device initialization and configuration requests from the client.

Control Plane/Call Control—Call control (CC) is the primary control plane module responsible for the following functions:
 1. Voice over IP call processing
 2. SIP proxy server and B2BUA
 3. PSTN Call management through PSTN GWs
 4. PBX feature management through Asterisk 5. Resource and Connection management Call control module resides on the DN media switch. It interfaces with the SIP stack and Asterisk (or any other) PBX module to provide the above mentioned functionality.

1. SIP stack (for UA, CCM, and Asterisk etc): SIP stack is mainly used as protocol message decode/encode engine. SIP stack also performs basic protocol specific tasks, like standards based message parsing and validation, retransmissions, proprietary message validation etc. For most of the proxy and B2BUA tasks, SIP stack relies on CC for decision making. Interactions between CC and Asterisk as well as CC and CCM are through standards based SIP messages.
2. Proxy Agent/Configuration Manager (PA/CM): Proxy agent acts as a configuration manager for all the applications. Call control related information is downloaded by PA at the time of provisioning or after the disk DB is read following a system bring up. CC stores the data in RAM for local/faster access. CC also updates PA of any dynamic information (e.g. call going active or down), or on demand information (e.g. SNMP GET).
3. Resource Manager (RM): Resource manager provides logical map of the physical/network resources. These resources include GE port, DSP resources, sockets, UDP/TCP ports etc and do not include system resources like memory, buffer pool, timers, queues etc. It also does not include sockets used for internal IPC communication. CC uses RM for resource CAC, resource reservation and commit. As part of the commit, RM talks to media switch to program hardware to enable media flow.

Media Switch Application (MSA)—The MSA will be designed to run partially on Linux and remaining on TMS320DM64x DSP processor. The application will perform the following functions:

RTP packet processing.
Switching.
Transcoding.
Conferencing.
Adaptive jitter buffer.
Packet loss concealment.
Post processing which includes VAD/CNG and AGC The MSA software needs to support encoding/decoding of different speech codecs. The type of algorithm and channel can change during run time i.e. a design to support multi-channel, multi-algorithm is needed. Each codec algorithm needs to be reentrant, and the program as well as data needs to be fully releasable. In order to support various codecs the following needs to taken into account:

a. Since the DSP has limited on chip data memory not all data can be placed on-chip all the time in multi-channel, multi-algorithm application. This requires all data (context and tables) in each algorithm to be relocatable (between on/off chip memory) during context switching. This requires a need to find out the memory, stack size as well as MIPS requirement for each supported codec.
b. A mechanism to exchange messaging between host and DSP process indicating channel number as well as codec type along with any other features. The channel configuration manager needs to open a channel on DSP indicating type of functionality required. Periodic message indicating the state of DSP needs to be implemented.

The DSP processor allows the external host to access the DSP external memory. The DSP has 16 Kbytes of first level program as well as data memory. The program as well as data memory share the second level memory of 256 Kbytes. The 16 Mbytes of external memory (SDRAM) is available. The shared memory between the two processors stores the incoming as well as outgoing RTP data. Since the DSP needs to support N number of channels, this memory will contain N receive as well as transmit buffers of length 320 bytes each (for video these buffers need to be of 1500 bytes). Data structure for messaging between host and DSP as well as information needed on per call basis needs to be defined. The following steps define the DSP functionality:

a. At boot up once the software is downloaded to DSP (the DSP will indicate the same by writing a predetermined value at a fixed memory location to indicate to host that the software is downloaded).
b. Upon successful download of software, the DSP will run an internal timer of 10 msec.
At this time the DSP is polling for channel state to change to process which is set by the host once the packet arrives.
c. A start call or open channel command from the host indicating codec type, data ready as well as call type (initially only voice) is sent for RX as well as TX direction.
d. Based on channel opened the DSP picks up the RTP data from the external buffers and performs the DSP related functionality on those.
e. On the TX side the DSP places encoded data on the external buffers to be picked up by the TX agent.

Figure 3:
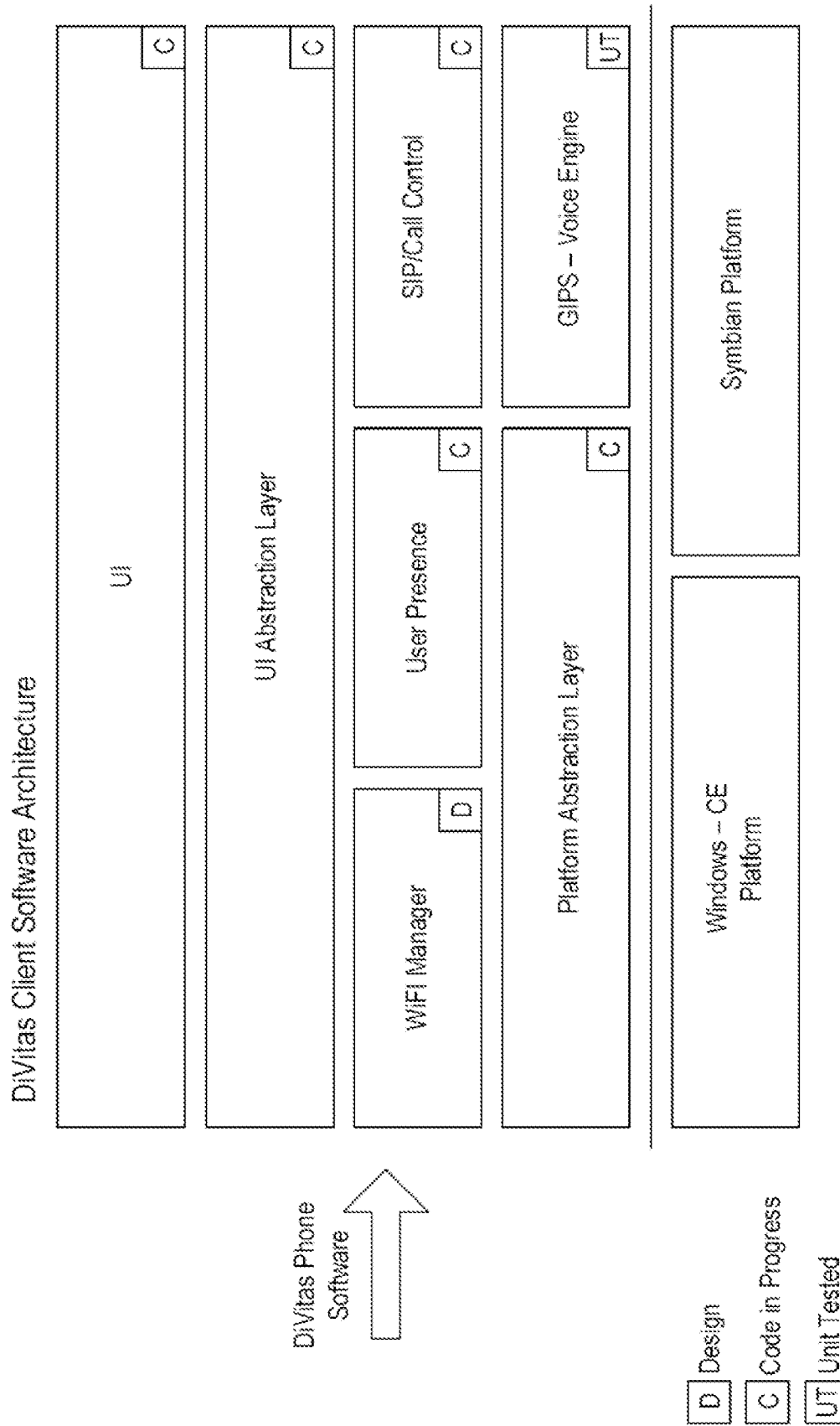
FIG. 3 depicts a mobility client according to an embodiment of the invention.
Figure 4A:
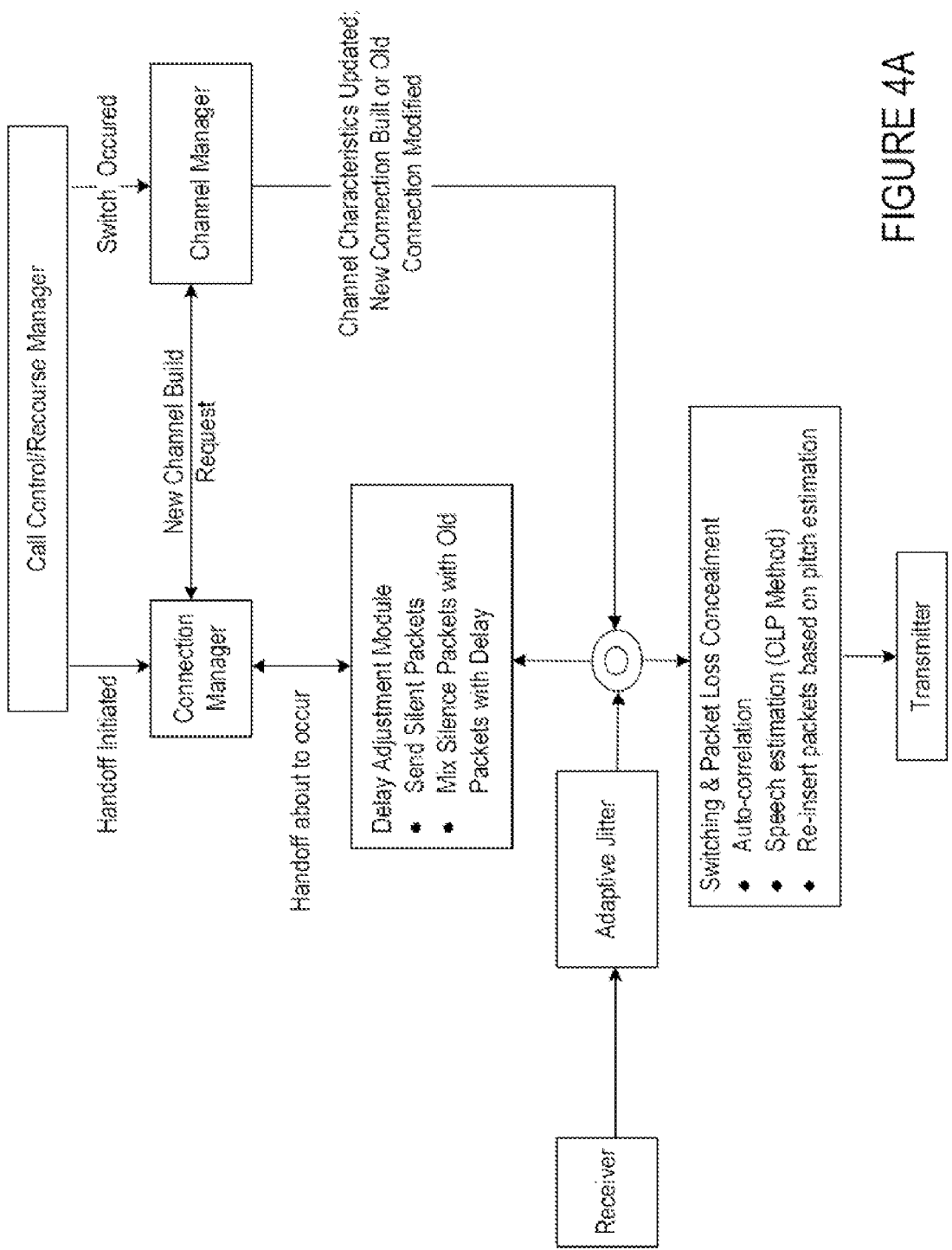
FIGS. 4A-E depict a structure and method for fast media handoff between Wi-Fi and cellular networks.
Figure 4B:
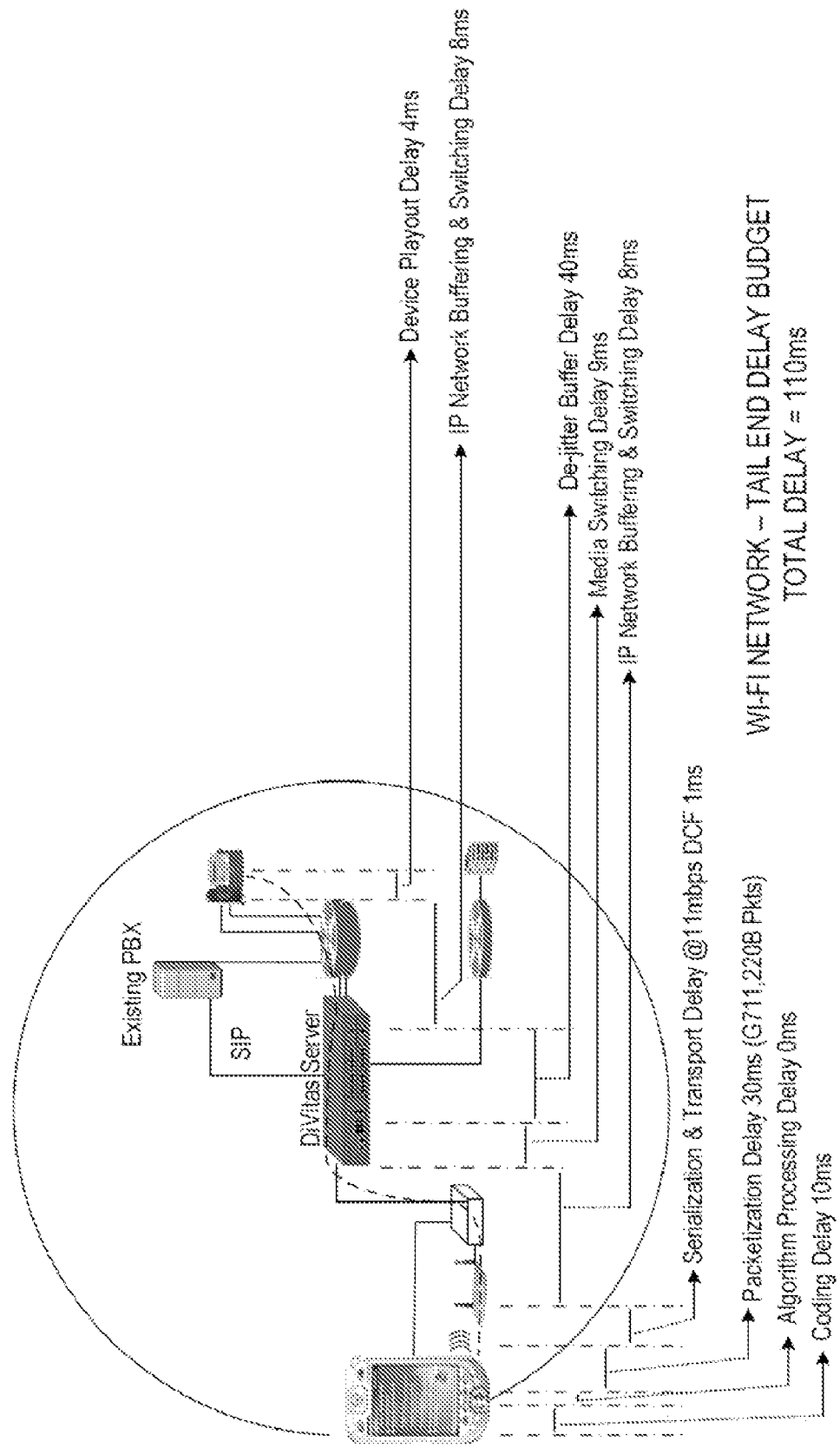
Figure 4C:
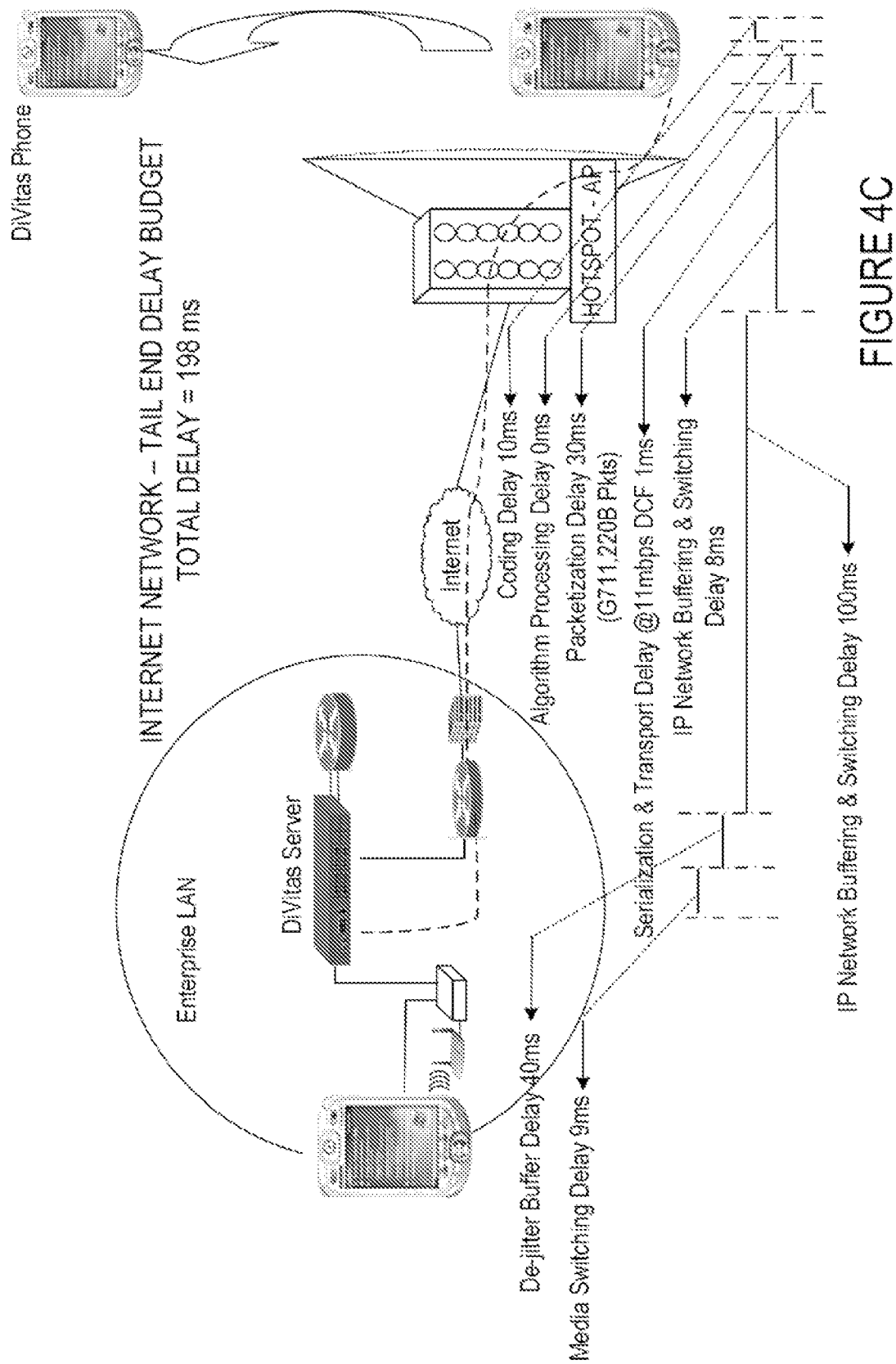
Figure 4D:
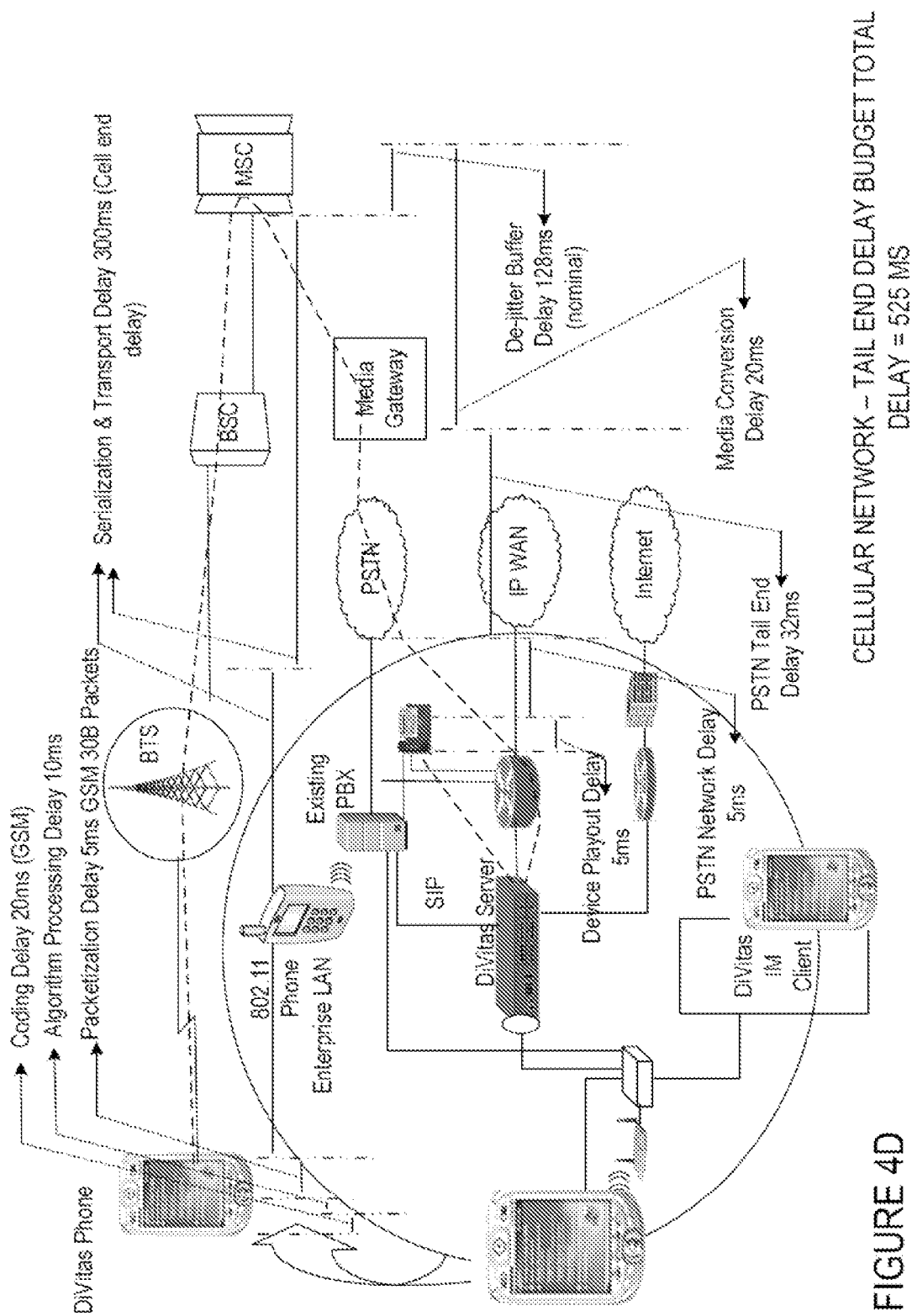
Figure 4E:
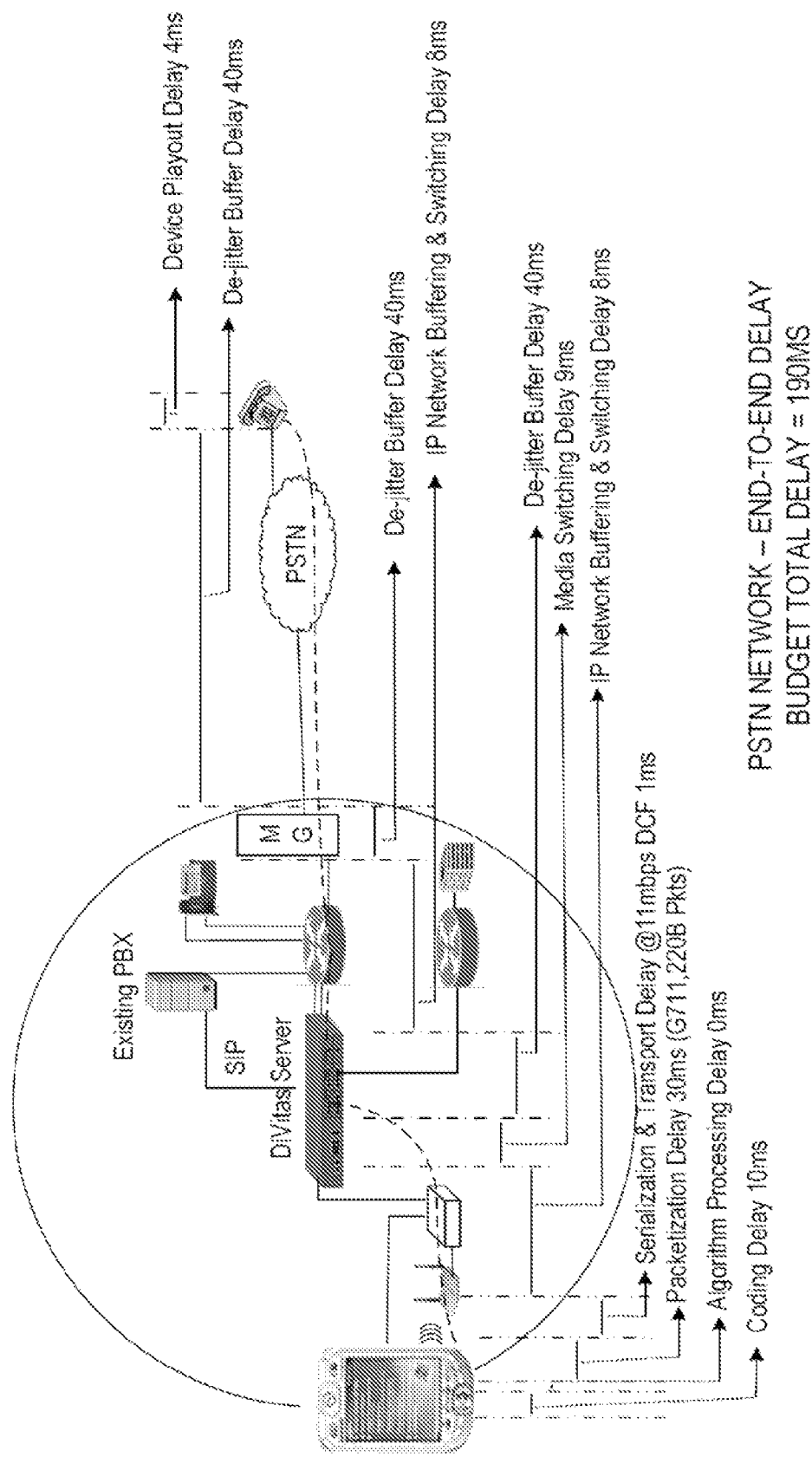

FIG. 3 depicts a mobile equipment client according to an embodiment of the invention.

The client software or handset software runs on the handsets that are compatible with the mobility server. Typically these are dual-mode handsets that have the capability to provide telephony connection on the cellular network (CDMA or GSM) as well as IP connection on the LAN network (wired LAN or wireless LAN).

The software can be also be compiled for a desktops/laptops or a PDAs which have a microphone and a speaker to function as a softphone.

User Interface

The client user-interface provides the following functionality:

Setup startup configuration—DNS IP addresses, mobility server URL, Startup user-state (INVISIBLE/AVAILABLE), security settings
Change user state (INVISIBLE/AVAILABLE)
Add enterprise "buddies" and get their presence information (INVISIBLE/AVAILABLE/CALL-IN-PROGRESS)
Display availability status of enterprise "buddies" and connect to them
User Interface to common enterprise telephony features
call making
call receiving
call waiting
call forwarding
call transfer
multi-party conferencing
voice-mail notification
missed calls notification
received calls notification
placed calls notification
number lookup and dial by name
Manual override to use cellular network instead of Wi-Fi network
Display version mismatch
Upgrade request/status
Disable/inhibit client software—ISP application is used to make/receive cellular calls Call-control and voice
    Call control for making VoIP calls on LAN interface
    Voice Engine for making VoIP calls on LAN interface—includes codecs, echo-cancellation, jitter control, error concealment
    Call handoff from cellular call to VoIP call
    Call handoff from VoIP call to cellular call
    802.11
    Determine which IP networks are available and their signal strength and communicate that information to the server
    AP client
    Power management of 802.11 miniport—whenever the signal strength of 802.11 is below acceptable threshold, hibernate and poll it at infrequent intervals to conserver power
    Package the signal strength and voice-quality info into RTCP packets if the call is in progress or in keepalives if the call is not in progress to communicate to the server. Whenever the signal strength drops below an acceptable threshold or the voice-quality deteriorates, the server will make a decision to switch the calls from VoIP to cellular network.
    Platforms Since there are a multitude of handset vendors in the market and a lot of them coming up with dual-mode handsets, it is a must to design the software in such a way that most of the code is shared across handsets. Therefore, the code has to be divided into platform dependent part and platform independent part. Most, in fact all of the Divitas core value should be in platform independent part of the software which should be easily portable from one platform to another. The platform dependent part should be only the functional adaptation layers (particularly Telephony, LAN, 802.11, Audio and Display adaptation layers). Whenever the code is ported to a new platform, only these adaptation layers need to be modified or rewritten, while providing a uniform API to the platform independent part.

The client software will run on multiple handset platforms. The most prevalent handset platforms are Windows® CE, Linux®, and Symbian®.

In addition to the dual-mode handsets, the client application is designed to work on 802.11 phones, PDAs or laptops/desktops which do not have a cellular telephony interface. On these platforms, a subset of features is available to the user. Basically, the call handoff from VoIP to cellular will not be possible.

Theory of Operations
    Startup and Security Operations

On startup, the client application looks for the available resources on the handset. It first checks for presence of wired network. If not present, then it checks for the presence of an 802.11 network. The wired or wireless medium authentication is done depending on the enterprise security policy. The handset client shall support the security mechanism employed in the enterprise. The most common security mechanism is WPA (Wi-Fi Protected Access). Once the authentication is done successfully, the wireless client gets the IP address for the IP interface using DHCP.

The application gets the mobility server URL and DNS IP addresses from persistent database and tries to register with a mobility server.

The client application could be running on a handset which is inside the enterprise network. In that case, the client can reach the mobility server without any other security blankets. In case the client is in a public network, say a coffee shop or an airport with Wi-Fi internet access, typically the user sets up a VPN connection to the enterprise. The client can reach the mobility server only after the VPN tunnel is setup.

The client application software authenticates the handset with the server by sending an encrypted certificate (installed by Enterprise IT) to the server. Once that is authenticated, the client gets the login/password from the user or stored in the handset, encrypts that and sends it to the server for user authentication. On successful authentication, the server replies by sending the enterprise phone number. In reply, the client sends the cellular phone number to the server. The server binds the two for all future handoff scenarios.

The signaling and media stream are secured using SIP/TLS for signaling and SRTP for media stream. However, if the user is on a VPN link, then client need not add another level of encryption. Adding another level of encryption to that may result in reduced voice quality. In that case, SIP is used for signaling and RTP/RTCP for media stream.

The above process is repeated whenever the client regains network connectivity with the server.

Steady State Operations

The user can choose to be INVISIBLE or AVAILABLE at startup by configuring on the GUI and saving that configuration in the persistent database. The client updates the user's presence information to the server.

The user can also enter frequently called buddies within the enterprise and save that configuration in the persistent database on the handset. The client gets the presence information (in bulk) of these buddies whether they are INVISIBLE, AVAILABLE or CALL-IN-PROGRESS. The server updates the presence information of these buddies to the clients as and when the event occurs.

Whenever a call is not in progress, the client and server exchange keepalives periodically.

The client sends the network status to the server periodically. If it is on an 802.11 wireless network, it sends the SSID, signal-strength and bandwidth of the associated access point (AP) to the server. If there is a call in progress, it sends it as part of in-band RTCP packets. If there is no call in progress, it sends it in out-of-band keepalive messages.

Whenever a network session is available from the client to the server, the preferred mode of making and receiving calls to the client is on the network interface. However, the user can choose to override it and make the outgoing calls on the cellular network. This selection is not communicated to the server and it doesn't affect the incoming calls. This selection is also not stored in persistent database. The user has to explicitly make the selection every time he makes an outgoing call.

Whenever a network session is not available from the client to the server, the only way of making and receiving calls is on the cellular interface. The user does not have access to all the enterprise features. The user can make and receive calls using the client software UI however the client software provides only a subset of the service provider features. To use all the features of the cellular service provider network, the user may have to terminate (or inhibit) the client software and use the cellular service providers dialer application. If the service provider application is being used to make and receive calls, then the handoff described below in section 3.4.2 will not be possible.

A user has access to all the enterprise features as long as the client has a session established to the server. The client GUI is used to provide access to these enterprise features to the user.

Voice

SIP signaling is used to establish voice calls between the client and the server. Voice from the audio receiver is encoded into one of the codecs supported by Voice Engine (VE), encapsulated into RTP packets, encrypted if needed, and sent on the IP interface to the server. Similarly RTP packets received from server is decrypted if needed, decoded using one of the codecs and played out. Speech decoding, jitter control and error concealment are done by VE on the receive side.

In addition to encryption/decryption, encoding/decoding of speech, Voice Engine performs error concealment, jitter control, adaptive packet buffering, Acoustic Echo Cancellation and Suppression, Noise Cancellation and Suppression, Automatic Gain Control, Voice Activity Detection, Comfort Noise Generation.

Roaming

A handset client is a mobile device, unlike the portable laptops.

Intra-WLAN Handoff

When a user is in an 802.11 network having a phone conversation and walks across the building, an AP handoff could occur viz. the user's handset is now associated with a different AP than the one it was previously associated with. The AP handoff could occur without IP address change if the handoff is within the same subnet or to another subnet, in which case the IP address of the handset changes. If the IP address changes, then the client needs to register with the server again. The established calls continue to flow in the meantime using the old flow information until the Voice-Engine (VE) is communicated of the new IP address. Voice-engine ensures that the RTP streams going out of the client will have the new IP address when it gets the event.

When a wireless client authenticates using 802.1X, there are a series of messages sent between the wireless client and the wireless access point (AP) to exchange credentials. This message exchange introduces a delay in the connection process. When a wireless client roams from one wireless AP to another, the delay to perform 802.1X authentication can cause noticeable interruptions in network connectivity, especially for time-dependent traffic such as voice or video-based data streams. To minimize the delay associated with roaming to another wireless AP, the wireless equipment can support PMK caching and pre-authentication.

PMK Caching

As a wireless client roams from one wireless AP to another, it must perform a full 802.1X authentication with each wireless AP. WPA allows the wireless client and the wireless AP to cache the results of a full 802.1X authentication so that if a client roams back to a wireless AP with which it has previously authenticated, the wireless client needs to perform only the 4-way handshake and determine new pairwise transient keys. In the Association Request frame, the wireless client includes a PMK identifier that was determined during the initial authentication and stored with both the wireless client and wireless AP's PMK cache entries. PMK cache entries are stored for a finite amount of time, as configured on the wireless client and the wireless AP.

To make the transition faster for wireless networking infrastructures that use a switch that acts as the 802.1X authenticator, the WPA/WPS IE Update calculates the PMK identifier value so that the PMK as determined by the 802.1X authentication with the switch can be reused when roaming between wireless APs that are attached to the same switch. This practice is known as opportunistic PMK caching.

Preauthentication

With preauthentication, a WPA wireless client can optionally perform 802.1X authentications with other wireless APs within its range, while connected to its current wireless AP. The wireless client sends preauthentication traffic to the additional wireless AP over its existing wireless connection. After preauthenticating with a wireless AP and storing the PMK and its associated information in the PMK cache, a wireless client that connects to a wireless AP with which it has preauthenticated needs to perform only the 4-way handshake.

WPA clients that support preauthentication can only pre-authenticate with wireless APs that advertise their preauthentication capability in Beacon and Probe Response frames.

Wi-Fi-Cellular Handoff

When the user in an 802.11 network having a phone conversation walks out of the building where there is no or insufficient 802.11 connectivity, the call is handed over to cellular network.

The decision to handoff the call is made by the client. The decision is based on 802.11 signal-strength, channel loading and voice-quality thresholds. Once the decision is made, it is communicated to the server which initiates a call to the client on the cellular network. The client checks the caller-id of the incoming call, compares to the 802.11 caller-id, and if there is a match, accepts the cellular call and drops the 802.11 call leg. On the server side, the server drops the 802.11 call leg to the client, patches the cellular call leg to the other talking party.

Cellular-Wi-Fi Handoff

When the user having a phone conversation on cellular network walks into an 802.11 network, and the handset/user can associate itself with a mobility server, then if the user is talking to another user in the 802.11 network, the call is handed over to the 802.11 network.

The decision to handoff the call is made by the client. The decision is based on availability of sufficient 802.11 signal-strength, channel loading and voice quality. Once the decision is made, it is communicated to the server which initiates a call to the client on the 802.11 network. The client checks the caller-id of the incoming call, compares to the cellular caller-id, and if there is a match, accepts the 802.11 call and drops the cellular call leg. The server drops the cellular call leg to the client, patches the 802.11 call leg to the other talking party.

Power Save

When the handset client is idle on the 802.11 network, the 802.11 miniport goes to sleep. Before going to sleep it tells the AP that it wishes to go to sleep by setting the power save bit in the 802.11 header of every frame. The AP receives the frame, notice the client's wish to enter power save mode. The AP begins buffering the packets for the client while the client's 802.11 miniport is asleep. The miniport consumes very little power while asleep. It wakes up periodically to receive regular beacon transmissions coming from the access point. The power-saving clients need to wake up at the right time when the beacons are transmitted to receive the beacons. TSF (Timing Synchronization Function) assures AP and power-save clients are synchronized. TSF timer keeps running when stations are sleeping. These beacons identify whether sleeping stations have packets buffered at the AP and waiting for delivery to their respective destinations.

When there are no incoming beacons for an extended period of time, the 802.11 miniport is put to sleep. It periodically wakes up, probes the air for APs, if there are none present, it goes back to sleep. In this case, it sleeps for longer duration than previous case.

Features and advantages of the present invention may be better understood with reference to the figures and elaborated discussions that follow.

Communication is an integral part of society that enables people to develop and nurture relationships. The desire to stay connected has led to the proliferation of a variety of telecommunication services (e.g., cellular service, Wi-Fi service, VoIP service, land line service, etc.) and devices (e.g., mobile telephones, multi-mode telephones, desk telephones, IP telephones, etc.). Generally, enterprises have implemented a combination of these telecommunication services and devices in order to provide theirs employees with the flexibility and mobility to promote business and to handle day-to-day activities.

In a typical enterprise, the employees may have desk telephones, which may be associated with extension numbers, connected to a public switched telephone network (PSTN) through a private branch exchange (PBX) of the enterprise. Also, some employees may also have cellular telephones that can perform voice and/or data communication through a cellular network, such as a GSM, CDMA, or UMTS network. Further, some employees may employ IP telephones that are able to connect to the Internet through a wireless local area network (e.g., wireless LAN based on one or more IEEE 802.11 standards) to perform voice and/or data communication. In addition, some employees may also have multi-mode telephones, which are capable of performing voice and/or data communication through two or more communication networks. In an example, multi-mode telephones may have the capability to connect through both a cellular network and the Internet (via a wireless access point).

Enterprises may implement such a multi-network arrangement in an attempt to increase accessibility to theirs employees, thus facilitating communication both internally and with third parties. Unfortunately, the differences and even incompatibilities between different networks and devices have introduced new problems for enterprises.

Consider the situation wherein, for example, an enterprise employee may be away from his desk telephone. Thus, the employee may be unreachable through his desk telephone extension number and incoming calls may be routed to his voicemail. Consequently, a caller may have the option of leaving a message on the employee's voicemail, redialing the telephone number at a later time, and/or attempting to reach the employee on an alternative number. The inability to make contact with the employee may cause significant inconvenience to the caller, resulting in an unsatisfactory telephone experience and may even result in loss of businesses to the enterprise.

In an attempt to address the inaccessibility issue, an enterprise may implement a multi-network arrangement. In an implementation of the multi-network arrangement, an employee with a desk telephone extension number may have the option of call forwarding incoming calls to a specific telephone number. Thus, even though the incoming calls may be call forwarded to a multi-mode telephone, which may be associated with multiple network services, the incoming call may only be call forwarded via a specific network as dictated by the specific telephone number provided. Such model does not scale for large deployment. In an example, if the specific telephone number is associated with a cellular telephone number, then the call forwarding will be performed through a cellular network even if a less expensive Wi-Fi network may be available. Similarly, if the specific telephone number is associated with a Wi-Fi telephone number, then the call forwarding will be performed through a Wi-Fi network. However, the employee may still be unreachable if a Wi-Fi network is not available or the employee is not currently connected to the Wi-Fi network. Thus, even though the more expansive cellular network may be available, incoming calls forwarded to a Wi-Fi telephone number are not able to take advantage of the cellular network.

Besides call forwarding, the enterprise may also incorporate next generation mobile communication standards that allow multi-mode telephone users to move between cellular and Wi-Fi networks. The standards include an Unlicensed Mobile Access (UMA) standard that specifies switching control schemes for the carriers of the cellular network to enable multi-mode telephone users to roam between the cellular and Wi-Fi networks.

Generally, the implementation of equipment (e.g., networking equipment and multi-mode telephones) based on the UMA standard may be significantly different by different vendors. Thus, a UMA server that is operated by a carrier may be compatible with a limited set of equipment brands and/or models. As a result, an enterprise that implements a UMA solution provided by a carrier may be faced with limited choices in selecting network equipments and multi-mode telephones. In addition, the flexibility to change carrier may now be dependent upon the enterprise's willingness to expend additional resources to purchase new equipments (e.g., network equipment and multi-mode telephones). The fact that the voice operation control is only within the carrier space it is not desirable for an enterprise.

Since a UMA solution is provided by a carrier, an enterprise may have to rely on the carrier of the cellular network to manage the cellular telephone usage and may have little or no direct control over related policy, service, usage, security, and/or privacy. In an example, the carrier controls the telephone calls and decides if and when switching between networks may occur. Thus, the enterprise may not be able to steer the usage from the more expensive cellular service to the less expensive Wi-Fi service, even if the user has access to the Wi-Fi network.

In accordance with embodiments of the present invention, there is provided a wireless communication system solution that may be implemented by an enterprise. In accordance with one aspect of the present invention, the inventors herein realized that although an enterprise's communication needs may be addressed by different solutions, there is not an integrated approach in which the enterprise retains control of its telecommunication solution. Embodiments of the invention enable the wireless communication system to provide an integrated solution by including a mobility server, which may be internally managed by the enterprise, and a mobility client, which may interact with the mobility server.

In this document, various implementations may be discussed using voice telecommunication requests/sessions as an example. This invention, however, is not limited to voice telecommunication requests/sessions and may be employed for telecommunication requests/sessions that may be related to real time media transfer. Examples, of real-time media may include, but are not limited to, telephone call, instant messaging, email, video transmission, and the like.

As discussed herein, a mobility server refers to a computer system that may manage and/or control both incoming and outgoing media traffic through the enterprise. In an embodiment of the invention, the mobility server may be connected with a plurality of networks. The plurality of networks may be implemented based on different communication standards and may include a wireless local area network (wireless LAN) managed by the enterprise. The plurality of networks may be further expanded to include one or more cellular networks operated by carriers and wireless LANs managed by third parties. In addition, the mobility server may be independent of hardware platforms implemented by the plurality of networks.

In an embodiment of the invention, the mobility server may interact with a mobility client, which may be configured to operate in the plurality of networks. As discussed herein, a mobility client refers to a telecommunication device that includes mobility client software. The telecommunication device (e.g., mobile telephones, multi-mode telephones, desk telephones, IP telephones, etc.) may be of different brand and/or models. In an embodiment, the mobility client may be a multi-mode telecommunication device capable of operating on a plurality of networks.

In an embodiment, the wireless communication system solution may also work with a single mode telecommunication device. For a single mode telecommunication device, the telecommunication device may have mobility client software downloaded onto the telecommunication device making the device a mobile-enabled telecommunication device capable of interacting with the mobility server. In other words, even though the single mode telecommunication device is incapable of roaming between networks, the single mode telecommunication may still benefit from the advantages offered by the wireless communication system solution, such as smoother transition between access points (if an IP telephone), a better voice quality experience, and call forwarding.

In an embodiment, the mobility client may be configured to be associated with a contact number such as, for example, an extension number of an enterprise's main telecommunication line. The mobility client may include client functional modules, which may interact with server functional modules. The client functional modules of the mobility client may be implemented on the application layer of the open systems interconnection (OSI) architecture. Accordingly, the client functional modules may be independent of the operating system of the mobility client. For example, the operating system of the mobility client may be Windows® CE, Windows® Mobile, Linux®, or Symbian®.

In an embodiment of the invention, the mobility server may include mobility server software, which may include a plurality of server functional modules, such as a mobility manager server module, a call control server module, a presence manager server module, a server management module, a database manager module, a policy manager module, a proxy protocol server module, a PBX interface module, a resource manager module, a data protocol/data transaction server module, a SIP stack module, a socket module, and a media manager module and voice quality engine module. In an embodiment of the invention, the mobility client may include mobility client software, which may include a plurality of client functional modules, such as a user interface module, a native application module, a mobility manager client module, a call control client module, a presence manager client module, a proxy protocol server module, a data protocol/data transaction client module, a voice engine module, and a wrapper module. The mobility server application may interact with the mobility client application to handle different telecommunication functions, such as managing telecommunication requests, validating user, performing handoff between the plurality of networks during roaming, modulating real-time media quality (e.g., voice quality, data transfer, etc.), and the like.

In an embodiment of the invention, the mobility server may be configured to store network connectivity information about the mobility client. By using the network connectivity of the mobility client, the mobility server may be configured to route incoming telecommunication requests to the mobility client. The mobility server may also be configured to establish outgoing telecommunication requests from the mobility client using the network connectivity information about the mobility client. The incoming and outgoing telecommunication requests may include voice and/or data requests.

By interacting with the mobility server, a mobility client may now seamlessly roam among the plurality of networks (e.g., cellular network, Wi-Fi networks, PSTN, etc.) with minimal interruptions (e.g., dropped calls, loss of voice quality, background noise, echo, etc.). Therefore, employees of the enterprise may be easily reached through mobility clients. Thus, the enterprise may resolve its accessibility issue without implementing a third party solution, such as a UMA server.

Since all incoming and outgoing telecommunication requests may now be routed through an internal mobility server, the enterprise may now take control of its telecommunication function. With control, the enterprise may be able to ensure secured and legitimate access to its data. Further, with control, the enterprise may be able to increase a user's experience by routing telecommunication sessions through one or more of the available plurality of networks to prevent a disrupted telecommunication session, to prevent data lost, and/or to minimize degradation of data quality. In addition, with control, the enterprise may manipulate its telecommunication usage cost by routing telecommunication sessions through less expensive available networks. Accordingly, the enterprise now can balance cost, quality, and security while providing a mobile communication system solution.

In an embodiment, a plurality of mobility servers may be deployed at a plurality of sites at the enterprise to reduce tromboning, or routing telecommunication request back and forth. The plurality of mobility servers may be connected through a virtual private network that is managed by the enterprise. The benefit of a plurality of mobility servers may include a reduction in unnecessary telecommunication session delays and inefficient use of network resource.

The features and advantages of the present invention may be better understood with reference to the figures and discussions that follow.

Figure 8:
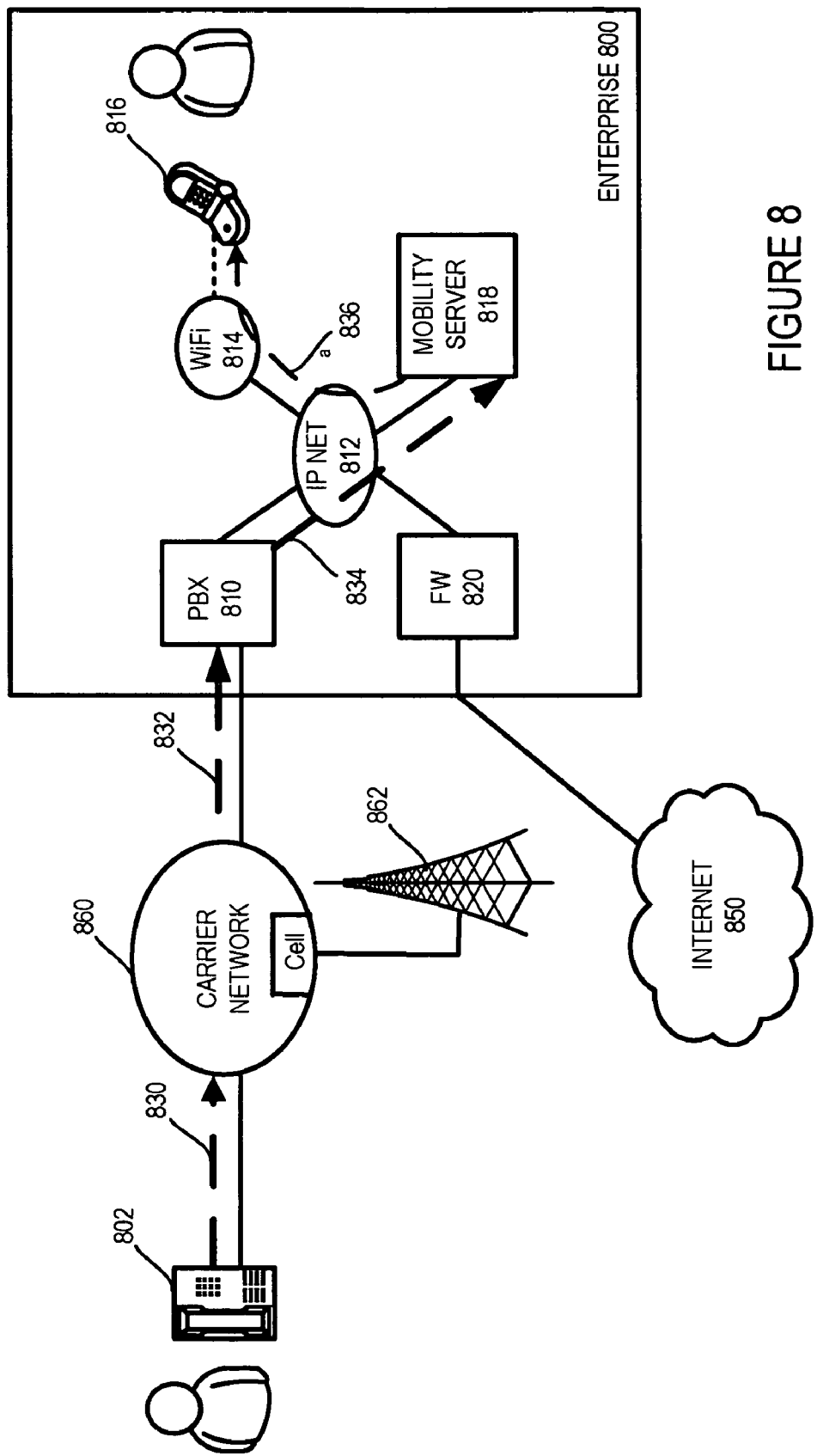
FIG. 8 shows, in an embodiment of the invention, a telecommunication session being established between an external telecommunication device and a mobility client, which is within an enterprise.

FIG. 8 shows, in an embodiment of the invention, a telecommunication session being established between an external telecommunication device and a mobility client, which is within an enterprise. As discussed herein, a telecommunication device refers to a device that may be employed to send media packets. Examples of telecommunication devices include, but are not limited to, cellular telephones, desk telephones, multi-mode telephones, IP telephones, and the like. As discussed herein, a mobility client refers to a telecommunication device that has installed mobility client application.

Consider the situation wherein, for example, an individual on an external telephone is trying to establish a telecommunication session with an individual on a mobility client. Unlike the prior art, the user of an outside telephone 802 does not have to know multiple telephone numbers in order to make contact with the intended receiving party of the telecommunication request. Instead, the user of outside telephone 802 now only needs access to a single telephone number. In an example, user of outside telephone 802 dials an enterprise 800's main line and an extension number to reach the intended receiving party.

The telecommunication request by the user of outside telephone 802 may traverse through a carrier network 860 (as illustrated by a leg 830) to connect with a user of a mobility client 816 within enterprise 800.

Enterprise 800 may have a wireless communication system, which may include at least a mobility server 818 and mobility client 816. Through an IP network 812, such as an intranet, mobility server 818 may be connected with a wireless local area network represented by Wi-Fi network 814 (or access point 814). Also, through IP network 812 and a private branch exchange 810 (PBX 810), mobility server 818 may be connected with carrier network 860 and/or a cellular network 862, which in turn may be connected with external telecommunication devices, such as outside telephone 802 that is outside a firewall 820 of enterprise 800. Further, through firewall 820, mobility server 818 may be connected with an Internet 850, which may be connected with various other networks. Mobility server 818, IP network 812, firewall 820, PBX 810, and Wi-Fi network 814 are managed by enterprise 800.

As mentioned above, the wireless communication system may further include mobility client 816 that may be utilized by an employee of enterprise 800. Mobility client 816 may be associated with a set of contact numbers (e.g., land line telephone number, IP address, extension number, cellular telephone number, etc.), which include at least one contact number. The method of associating mobility client 816 to a set of contact numbers may be performed by a number of methods, for example, a subscriber identity module (SIM), that is well known in the art.

In an embodiment, the telecommunication request may first be received internally within enterprise 800 by PBX 810 (as shown by a leg 832). PBX 810 may then route the telecommunication request through an internal IP network 812 (e.g., intranet) to mobility server 818 (as shown by a leg 834). In an embodiment, communication between PBX 810 and mobility server 818 may be packet-based communication.

In an embodiment, mobility client 816 may first register with mobility server 818 upon activation. In this scenario, since mobility client 816 is currently located within enterprise 800, mobility client 816 has registered with mobility server via Wi-Fi network 814. Once mobility server 818 has received the registration information from mobility client 816 and has verified that mobility client 816 is a valid and subscribed device, mobility server 816 may accept incoming and outgoing telecommunication request to and from mobility client 816.

Since mobility client 816 has already registered with mobility server 818 via Wi-Fi network 814, mobility server 818 knows to forward the incoming telecommunication request back through IP network 812 to reach mobility client 816 at Wi-Fi access point 814 (as shown by a leg 836).

Since the telecommunication request is routed through mobility server 818, enterprise 800 may be able to manage its telecommunication infrastructure. For example, enterprise 800 may be able to screen incoming telecommunication request, verify and validate user's access, monitor duration of the telecommunication session, and the like.

In an embodiment, mobility server 818 is a server that manages all incoming and outgoing telecommunication sessions. In other words, media traffic (e.g., media packets) may be routed to mobility server 818 before being forwarded to a final destination (e.g., mobility client 816 or outside telephone 802). Mobility server 818 may include mobility server application, which may include a plurality of server functional modules. With mobility server application, mobility server 818 may now manage the enterprise's telecommunication infrastructure.

Figure 9:
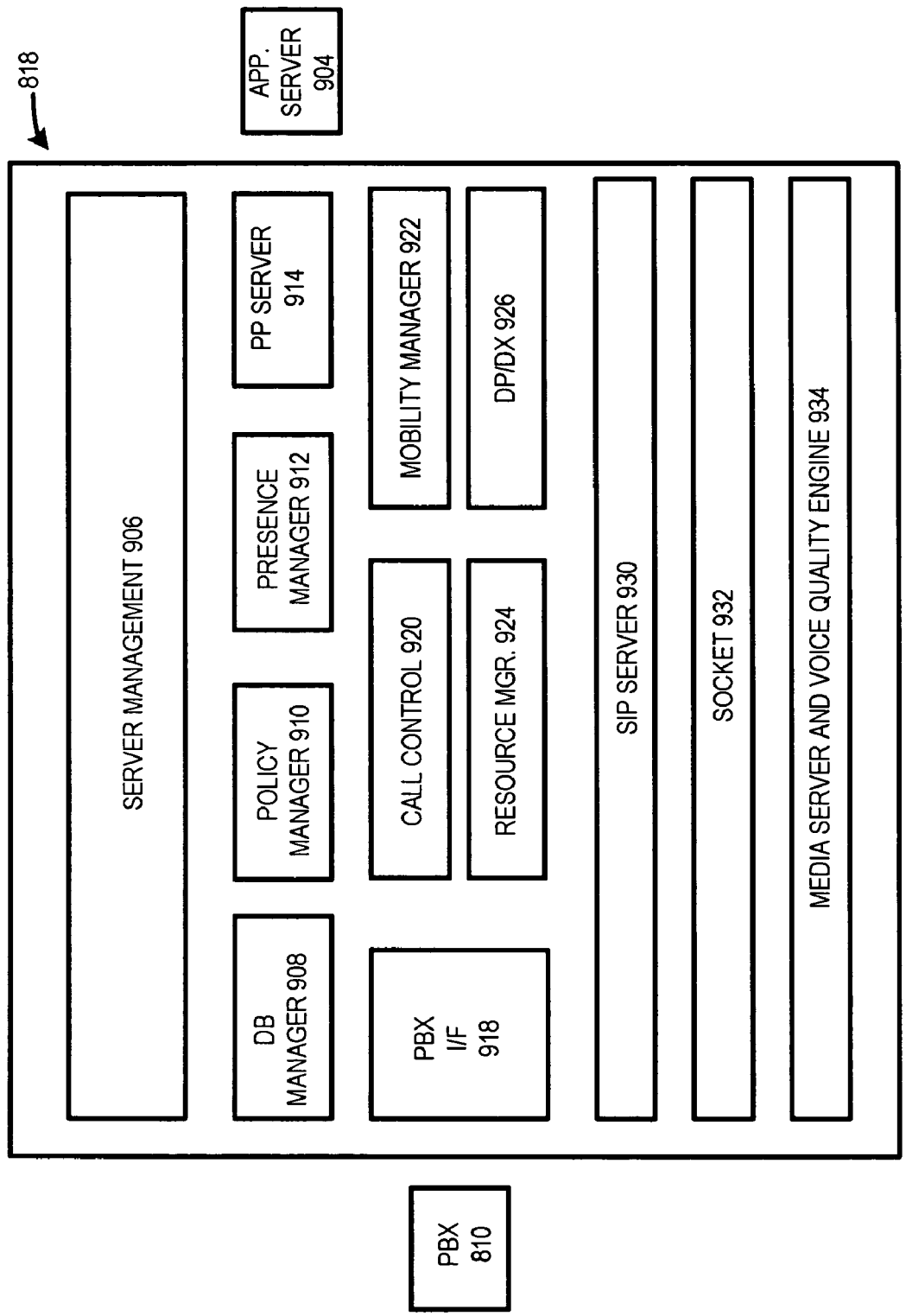
FIG. 9 illustrates, in accordance with one or more embodiments of the present invention, examples of server functional modules that may be implemented in a mobility server.

FIG. 9 illustrates, in accordance with one or more embodiments of the present invention, examples of server functional modules that may be implemented in mobility server 818 of FIG. 8. Server functional modules may include, but are not limited to, a server management module 906, a database manager module 908, a policy manager module 910, a presence manager server module 912, a PP server module 914, a PBX I/F module 918, a call control server module 920, a mobility manager server module 922, a resource manager module 924, a DP/DX server module 926, a SIP server module 930, a socket server module 932, and a media server and voice quality engine module 934.

Server management module 906 may be configured to provide a user interface for managing and/or monitoring communication media traffic, users, communication services, and telecommunication devices (such as mobility client 816 of FIG. 8). The user interface may include a web-based interface.

Database (DB) manager module 908 may be configured to manage one or more databases accessed by mobility server 818 while saving data and/or retrieving data. In an example, mobility server 818 may employ database 908 to compare a contact number in a telecommunication request against a list of contact numbers to determine which mobility client may be associated with the incoming contact number. Further, DB manager module 908 may perform other database management tasks such as, for example, data back-up, data recovery, and database update.

Policy manager module 910 may be configured to enforce policy defined by enterprise 800. The policy may include, but are not limited to, telecommunication session privileges, ability to roam, availability of communication service features, and the like.

Presence manager server module 912 may be configured to receive and store a user's presence state from a mobility client such as mobility client 816 of FIG. 8 and/or a mobility manager server module 922. Examples of a user's presence state may include, but are not limited to, online, idle, busy, offline, receiving, text only, voice only, voice message only, and the like. The user's presence state may be viewable by other parties. The user's presence state may be employed to establish willingness to participate in incoming telecommunication request. Thus, the user's presence state may be employed by call control server module 920 to determine whether or not to establish a telecommunication session between mobility client 816 of FIG. 8 and another telecommunication device.

PP server module 914 may represent a proxy protocol software for interacting with an application server 904 (which may be external to mobility server 818) and translating between generic data applications across difference platforms. Example of such generic data applications may include non-voice applications such as email and instant messaging.

PBX I/F module 918, or PBX interface module 918, may be configured to enable mobility server 818 to interface with PBX 810.

Call control server module 920 may be a control plane module responsible for functions pertaining data communication establishment (e.g., voice calls or audio/video/information streaming). The functions may include, but are not limited to, VoIP call processing, SIP (session initiation protocol) proxy server and back-to-back SIP user agent (B2BUA), PSTN call management through PSTN gateways, PBX feature management, and resource and connection management.

Mobility manager server module 922 may be configured to receive and store connectivity information from a mobility client such as mobility client 816 (shown in FIG. 8) when a telecommunication session is established. The connectivity information may include strength of signals received by the mobility client. The connectivity information may be employed to determine when and how to connect the mobility client. Mobility manager server module 922 may also maintain mobility logic for determining whether to let the mobility client perform a handoff.

Resource manager module 924 may be configured to communicate with media server and voice quality engine module 934 to determine if there is sufficient resource for establishing data communication (e.g., voice calls or audio/video/information streaming). Also, resource manager module 924 may forward to mobility manager server module 922 status data about the quality of the telecommunication session received from media server and voice quality engine module 934

DP/DX server module 926 may represent data protocol/data transaction function for secure communication between mobility server 818 and mobility client 816 of FIG. 8. For example, the secure communication may include transmission of the user's presence state and the network connectivity information from mobility client 816 of FIG. 8 to server presence manager server module 912 and mobility manager server module 922, respectively. The secure communication may also include transmission of the mobility client's registration information, communication status, handoff signals, etc.

SIP server module 930 may represent a protocol message decode/encode engine. SIP server module 930 may also performs basic protocol specific tasks such as, for example, standards based message parsing and validation, retransmissions, proprietary message validation, etc.

Socket server module 932 may provide an interface for communicating between various modules and is typically part of the operating systems on which mobility server 818 may run. In FIG. 9, server functional modules shown above socket server module 932 may be configured for signaling; the server functional module shown below server socket server module 932, i.e., media server and voice quality engine module 934 may be configured for managing voice and data traffic.

Media server and voice quality engine module 934 may be configured to monitor and handle IP packets (e.g., voice packets), decode and encode data (e.g., voice), and encryption and decryption of secure transmission of data. In an embodiment, media server and voice quality engine module 934 may be implemented on stand-alone hardware. In an embodiment, media server and voice quality engine module 934 may also be configured to detect imminent handoffs to a cellular network based on lack of arrival of a number of consecutive IP packets.

In an embodiment, media server and voice quality engine module 934 may include a transcoder. As discussed herein a transcoder refers to software that can encode and/or decode data packet into different media data formats (e.g., GSM, G.711, G.729, etc.). In the prior art, transcoding may be performed by either a carrier-managed gateway or a telecommunication device. If the transcoding is performed by the carrier-managed gateway, there may be inefficient use of network resource. In an example, cellular data packet (e.g., GSM) being sent to telecommunication device in an IP network (e.g., Wi-Fi) may first have to be converted into an IP-enabled format (e.g., G.711). Since G.711 format files are of low-compression, the G.711 format files may require a higher bandwidth. If the transcoding is performed by the telecommunication device, which needs to have transcoding capability, the user of the telecommunication device may be burdened with the configuration requirements.

However, by integrating a transcoder into media server and voice quality engine module 934, communication is not limited by media data format. Instead, mobility server may now accept different media data format and convert the data packets into format that may be acceptable by the telecommunication device. As a result, high compression data format may now be more extensively employed to promote efficient utilization of network resource. In addition, the burden of transcoding is no longer the responsibility of the telecommunication device.

Referring back to FIG. 8, mobility client 816 may include mobility client application, which may include a plurality of client functional modules, in an embodiment. Mobility client application may be downloaded onto mobility client 816 to enable mobility client 816 to manage its own telecommunication needs. The mobility client application may be downloaded to mobility client 816 by the user of mobility client 816 through well-known media such as, for example, the Internet or optical storage media. In addition, the mobility client application may enable mobility client 816 to interact with mobility server 818 in order to create an environment that will satisfy the telecommunication needs of user of mobility client 816

Figure 10:
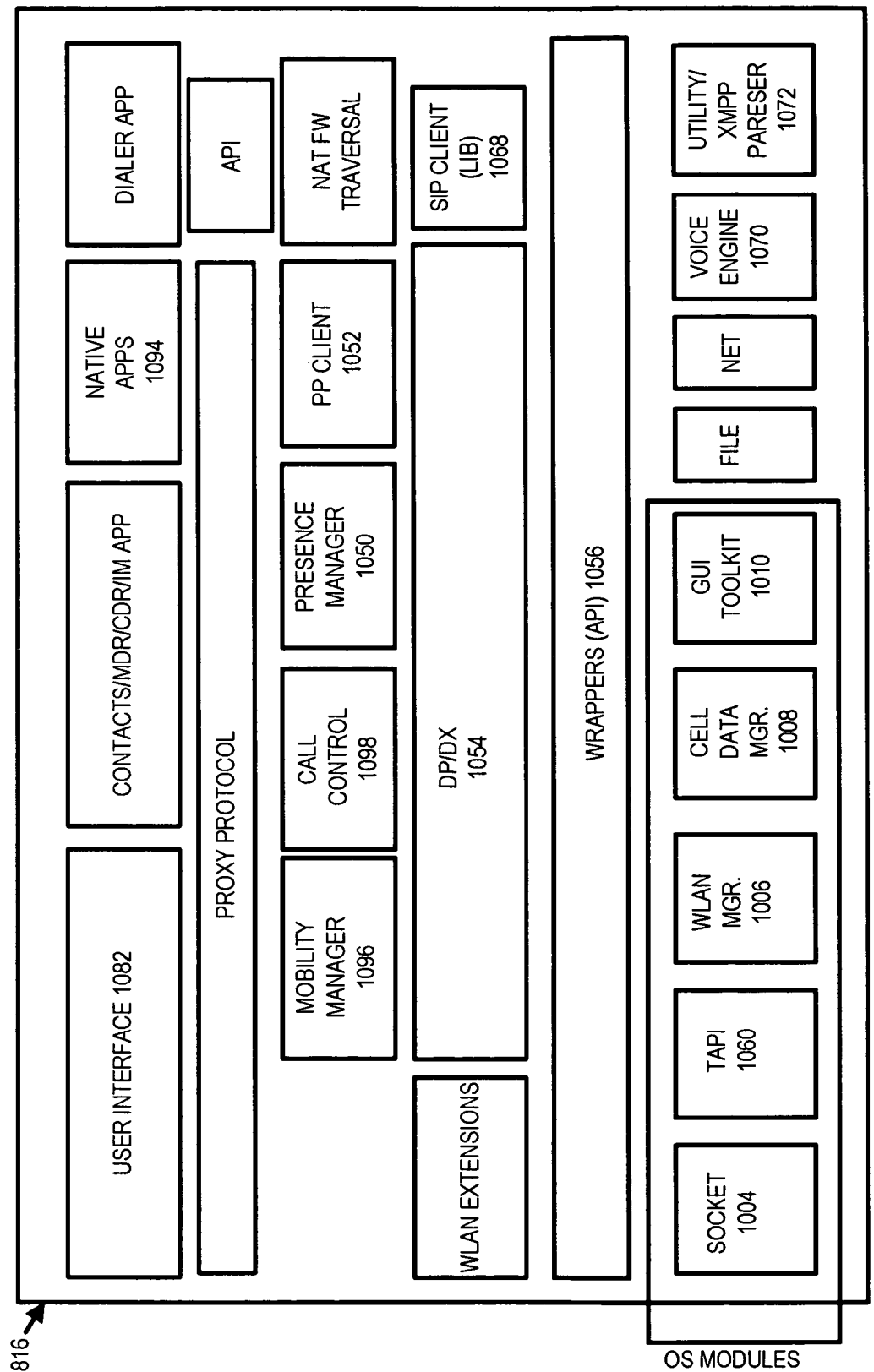
FIG. 10 illustrates, in accordance with one or more embodiments of the present invention, examples of client functional modules that may be part of mobility client application.

FIG. 10 illustrates, in accordance with one or more embodiments of the present invention, examples of client functional modules that may be part of mobility client application. Mobility client 816 may include both device specific modules and client functional modules. Device specific modules are operating system functional modules that may be provided by the operating system of the mobility client 816. Operating system functional modules may include a socket client module 1004, a TAPI (telephony application programming interface) module 1060, a WLAN (wireless local area network) manager module 1006, a cell data manager module 1008, and a GUI (graphical user interface) toolkit module 1010. Client functional modules may include, but are not limited to, a user interface module 1082, a native applications 1094, a mobility manager client module 1096, a call control client module 1098, a presence manager client module 1050, a PP client module 1052, a DP/DX client module 1054, a wrapper module 1056, a SIP client module 1068, a voice engine module 1070, and a XMPP (extensible messaging and presence protocol) parser module 1072.

User interface module 1082 may be configured to display features and configuration options to the user and to receive user input. User interface module 1082 may also be configured to interact with other client functional modules such as, for example, mobility manager client module 1096 and call control client module 1098.

Native applications module 1094 may include applications that can take advantage of connectivity but will need to be agnostic of the connectivity method used such as, for example, a CRM application or database client.

Mobility manager client module 1096 may be configured to receive and evaluate current state of connectivity with information such as signal strength data and other parameters to make handoff decisions. Criteria for the handoff decisions may be received and stored in mobility manager client module 1096 when mobility client 816 registers with mobility server 818 (shown in FIG. 8). The criteria may relate to signal strength, channel loading, voice quality, and/or data transmission quality.

Call control client module 1098 may be configured to interact with user interface module 1082 and to manage outgoing and incoming data (including outgoing and incoming voice calls) of mobility client 816. For outgoing data, user interface module 1082 may provide instructions to call control client module 1098, and then call control client module 1098 may manage other client functional modules to initiate the outgoing data. For incoming data, call control client module 1098 may instruct user interface module 1082 to inform the user of mobility client 816 of the incoming data. In response, through user interface 1082, the user may provide instructions to call control client module 1098 regarding the incoming data such as picking up or diverting an incoming call.

Presence manager client module 1050 may be configured to indicate the user's presence state, which presence manager server module 912 of mobility server 818 (shown in FIG. 8) may employ to manage incoming call. The user of mobility client 816 may configure the user's presence state using user interface module 1082. Examples of a user's presence state may include, but are not limited to, online, idle, busy, offline, receiving, text only, voice only, voice message only, and the like.

PP client module 1052 may represent proxy protocol for communicating with PP server module 914 of mobility server 818 (shown in FIG. 8).

DP/DX client module 1054 may represent data protocol/data transaction function for secure communication with DP/DX server module 926 of mobility server 818 (shown in FIG. 8).

Wrapper module 1056 may represent application programming interface (API) that may enable the above mentioned client functional modules of mobility client 816 to interact with operation system functional modules such as, for example, telephony application interface protocol 1060 (TAPI 1060) for telephony services. As mentioned above, operating system functional modules are device specific modules that may pre-exist in the operating system of mobility client 816. Wrapper module 1056 may enable the aforementioned client functional modules to be implemented independent of the operating system (e.g., Windows® CE, Windows® Mobile, Linux®, or Symbian®) of mobility client 816. Unlike the prior art, the client functional modules are not dependent upon the operating system since the client functional modules may be implemented on the application layer of the OSI architecture.

In one or more embodiments, the possible client functional modules may further include one or more of SIP client module 1068, voice engine module 1070, and XMPP parser module 1072.

SIP client module 1068 may be configured to interact with SIP server module 930 of mobility server 818 (shown in FIG. 8) for call signaling such as, for example, inviting, OK, and acknowledgement messages between mobility client 816 and mobility server 818 of FIG. 8.

Voice engine module 1070 may be configured to provide one or more of encoding, decoding, echo cancellation, jitter control, and error concealment.

XMPP parser module 1072 may be configured to enable messaging services.

Referring back to FIG. 8, a similar type of connection may be performed by mobility server 818 when the user of mobility client 816 initiates the telecommunication request. The telecommunication request may first be sent to mobility server 818 via Wi-Fi network 814 and IP network 812. Mobility server 818 may first verify the legitimacy of the user who is making the telecommunication request. If the user is not a registered user, mobility server 818 may terminate the request. If the user is a registered user, mobility server 818 may next verify the contact number. Upon identifying the contact number as an external number, mobility server 818 may forward the telecommunication request to PBX 810. Upon receiving the request, PBX 810 may dial the contact number to request carrier network 860 to make contact with the user at outside telephone 802.

Figure 11:
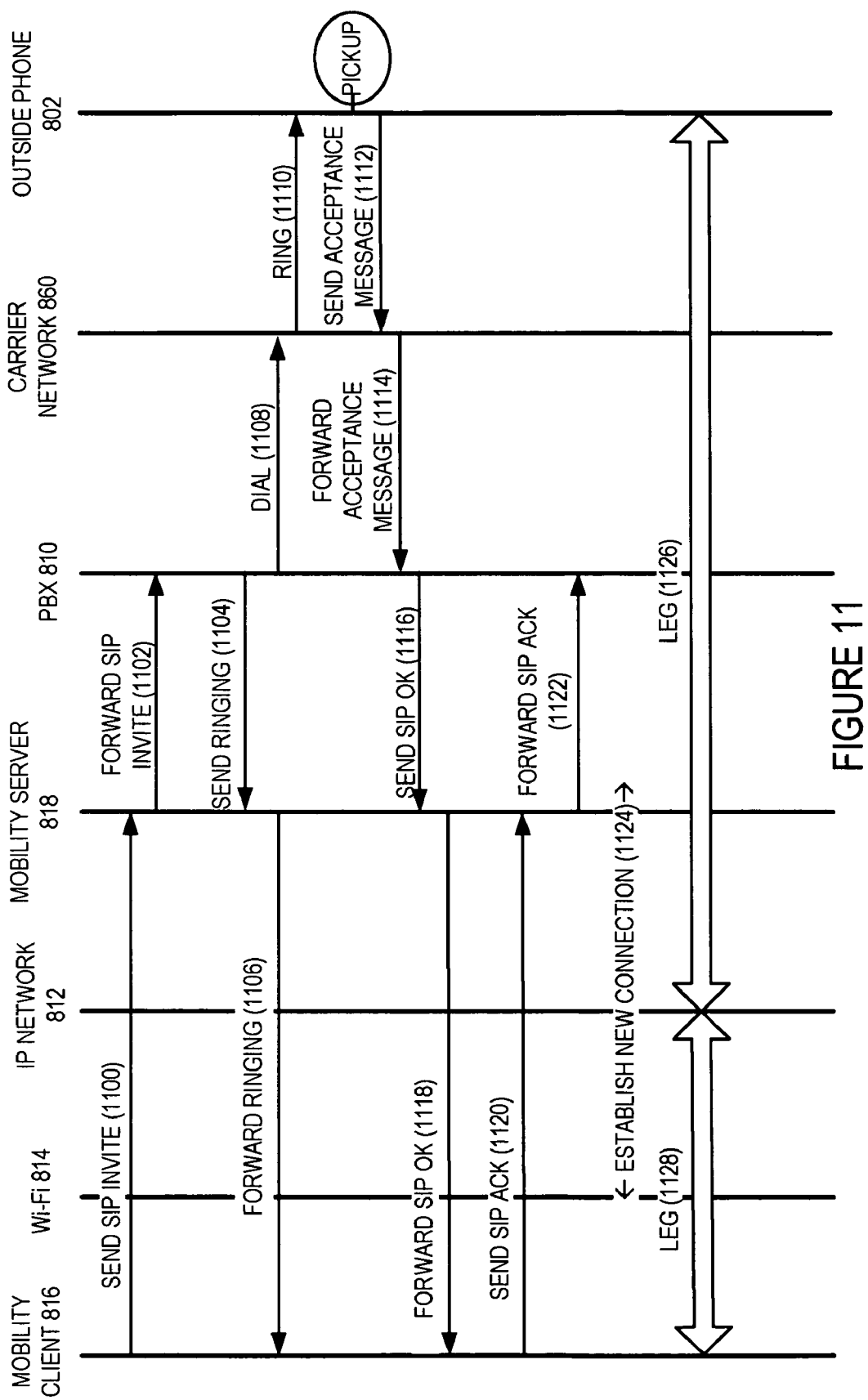
FIG. 11 shows, in an embodiment, a simple call flow showing an establishment of a telecommunication request initiated by a mobility client within an enterprise.

To better illustrate the scenario, FIG. 11 shows, in an embodiment, a simple call flow showing an establishment of a telecommunication request initiated by mobility client 816. FIG. 11 will be discussed in relation to FIGS. 8, 9, and 10.

At a first step 1100, the user of mobility client 816 may send a SIP invite to mobility server 818. In an embodiment, to send a SIP invite, user of mobility client 816 may employ a user interface module 1082 to enter in a contact number for outside telephone 802. Once the telecommunication request has been entered, call control client module 1098 may be initiated. Call control client module 1098 may interact with mobility manager client module 1096 to determine the best method for reaching mobility server 818. Mobility manager client module 1096 may check the user's connectivity status and determine the network through which connection may be made. In an example, since mobility client 816 has registered with mobility server 818 via Wi-Fi network 814, mobility manager client module 1096 may determine, based on registration information, that the user is currently on a Wi-Fi network and that call control client module 1098 may request for a Wi-Fi connection. Since call control client module 1098 is aware that a Wi-Fi connection may be made via SIP, call control client module 1098 may access SIP client (library) module 1068 via wrapper module 1056. SIP client module 1068 may send a SIP invite through socket client module 1004 to mobility server 818.

If mobility manager 1096 determines that the user of mobility client 816 has not yet registered, then the telecommunication request may be sent to TAPI module 1060 via wrapper module 1056. TAPI module 1060 may then forward the telecommunication request through cellular network 862 to reach PBX 810. PBX 810 may then forward the telecommunication request through IP network 812 to reach mobility server 818.

Note that if a user of mobility client 816 is within an enterprise environment, mobility client 816 may have already automatically registered with mobility server 818. The situation in which mobility client 816 is not registered may usually occur when a telecommunication session is requested while the user of mobility client 816 is outside of enterprise 800.

Upon receiving the SIP invite, mobility server 818 may verify the contact number. In order to perform the verification of the contact number, the SIP invite is forwarded to call control server module 920 via socket server module 932 and SIP server module 930. Upon receiving the contact number, call control server module 920 may interact with resource manager module 924 of mobility server 818 to confirm if there is enough network resource (e.g., radio frequency resource, traffic channel, etc.) for supporting the call.

In addition, call control server module 920 may then check with DB manager module 908 to determine how the contact number should be handled. The DB manager module 908 may determine that the contact number, which is associated with outside telephone 802, is not registered with mobility server 818.

Referring back to FIG. 11, at a next step 1102, call control server module 920 of mobility server 818 may send the SIP invite to PBX 810 through PBX interface module 918. In response, at a next step 1104, PBX 810 may send a ring back signal to mobility server 818, which in turn may forward the signal to mobility client 816 so it can ring back to the user, at a next step 1106.

In addition, at a next step 1108, PBX 810 may translate the SIP invite to a dialing request and dial the contact number associated with outside telephone 802 to reach carrier network 860. At a next step 1110, carrier network 860 may perform the switch to forward the telecommunication request to outside telephone 802.

Upon responding to the incoming telecommunication request, user of outside telephone 802 may pick up outside telephone 802. At a next step 1112, outside telephone 802 may send a message back to carrier network 860 indicating that outside telephone 802 has been picked up.

Once a connection has been established between the carrier network and outside telephone 802, at a next step 1114, carrier network 860 may send the message to PBX 810. PBX 810 may then translates the message to a SIP OK message and may send the SIP OK message through PBX interface module 918 to call control server module 920 of mobility server 818, at a next step 1116. Before forwarding the SIP OK message to mobility client 816, call control server module 920 may interact with resource manager module 924 to request for resource allocation. Resource manager module 924 may interact with media server and voice quality engine module 934 of mobility server 818 to determine the amount of resources that may need to be allocated. In an embodiment, resource allocation may depend upon the telecommunication session media requirements (e.g., text, voice, video, etc.).

At a next step 1118, mobility server 818 may forward the SIP OK message to mobility client 816. In an example, call control server module 920 may forward the SIP OK message to mobility client 816 through SIP server module 930 and socket server module 932. At mobility client 816, the received SIP OK message may flow from socket client module 1004 to SIP client module 1068 through wrappers module 1056 to call control client module 1098.

Upon receiving the SIP OK message, call control client module 1098 of mobility client 816, at a next step 1120, may send a SIP Acknowledge (SIP ACK) message to mobility server 818. The SIP ACK message may be sent along the similar path as the SIP invite message. At a next step 1122, call control server module 920 of mobility server 818 may send the SIP ACK message to PBX 810. At a final step 1124, a telecommunication session may be established between mobility client 816 and outside telephone 802. The telecommunication session includes two connections (i.e., leg 1126 and leg 1128). Leg 1126 may be between outside telephone 802 and mobility server 818 via carrier network 860, PBX 810, and IP network 812. Leg 1128 may be between mobility client 816 and mobility server 818 via IP network 812 and Wi-Fi network 814. With this method, all telecommunication traffic between mobility client 816 and outside telephone 802 are handled by mobility server 818.

Figure 12:
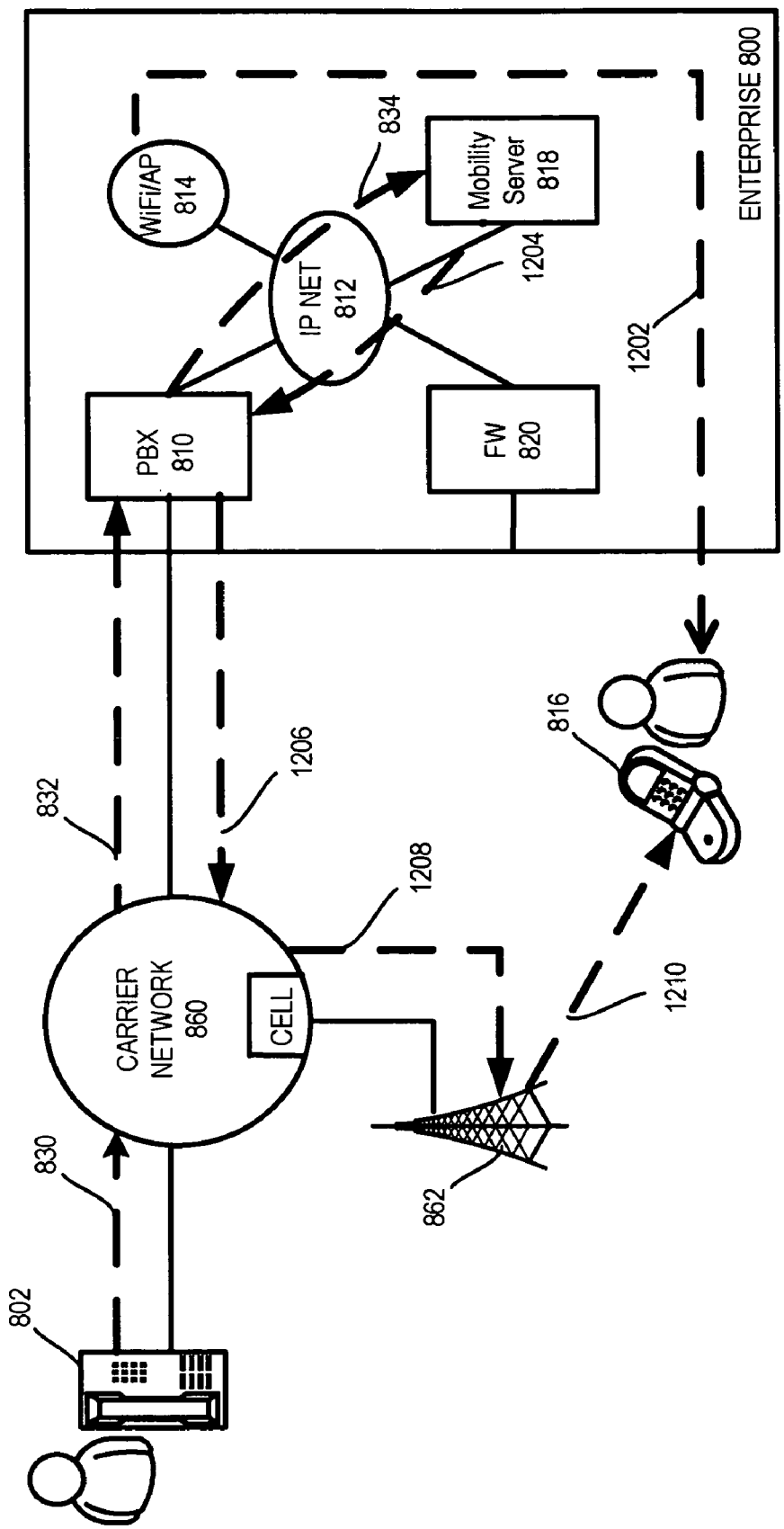
FIG. 12 illustrates, in accordance with one or more embodiments of the present invention, an example of a call roaming scenario in which a user of a mobility client roams from a Wi-Fi network to a cellular network.

Referring back to FIG. 8, a telecommunication session is active between the user of outside telephone 802 and the user of mobility client 816. FIG. 12 illustrates, in accordance with one or more embodiments of the present invention, an example of a roaming scenario in which the user of mobility client 816 roams from Wi-Fi network 814 to cellular network 862.

During the telecommunication session, the user of mobility client 816 may begin to move away from enterprise 800 (as indicated by a path 1202) and the signal level and voice quality may begin to degrade as user of mobility client 816 moves away from Wi-Fi network 814. Also, user of mobility client 816 may be roaming into an area that is supported by cellular network 862.

During the transition period, mobility server 818 and mobility client 816 may be monitoring the signal strength received from Wi-Fi network 814. In an embodiment, signal level quality may be monitored by mobility manager client module 1096 within mobility client 816. Mobility manager client module 1096 may continuously share the signal level data by sending data through DP/DX client module 1054 and DP/DX server module 926 to mobility manager server module 922 within mobility server 818. As the signal strength degrades, mobility manager server module 922 and mobility manager client module 1096 may inform call control server modules 920 and call control client modules 1098, respectively, to expect a new network connection. In an example, a new connection between mobility client 816 and cellular network 862 may be established. In an embodiment, the current connection between mobility client 816 and Wi-Fi network 814 may be maintained for a temporary period of time until a handoff has occurred.

Once the signal strength of Wi-Fi network 814 has degraded below a pre-defined threshold that may be established by enterprise 800, the connection with Wi-Fi network 814 may be dropped and cellular network 862 may replace Wi-Fi network 814 as the primary network. The media traffic may now flow from outside telephone 802 to carrier network 860 (leg 830) to PBX 810 (leg 832). PBX 810 may then forward the media traffic to mobility server 818 through IP network 812 (leg 834). Mobility server 818 may then forward the media traffic through IP network 812 to PBX 810 (a leg 1204) to carrier network 860 (a leg 1206). From carrier network 860, the media traffic may be forwarded to cellular network 862 (a leg 1208) to arrive at mobility client 816 (a leg 1210).

Figure 13:
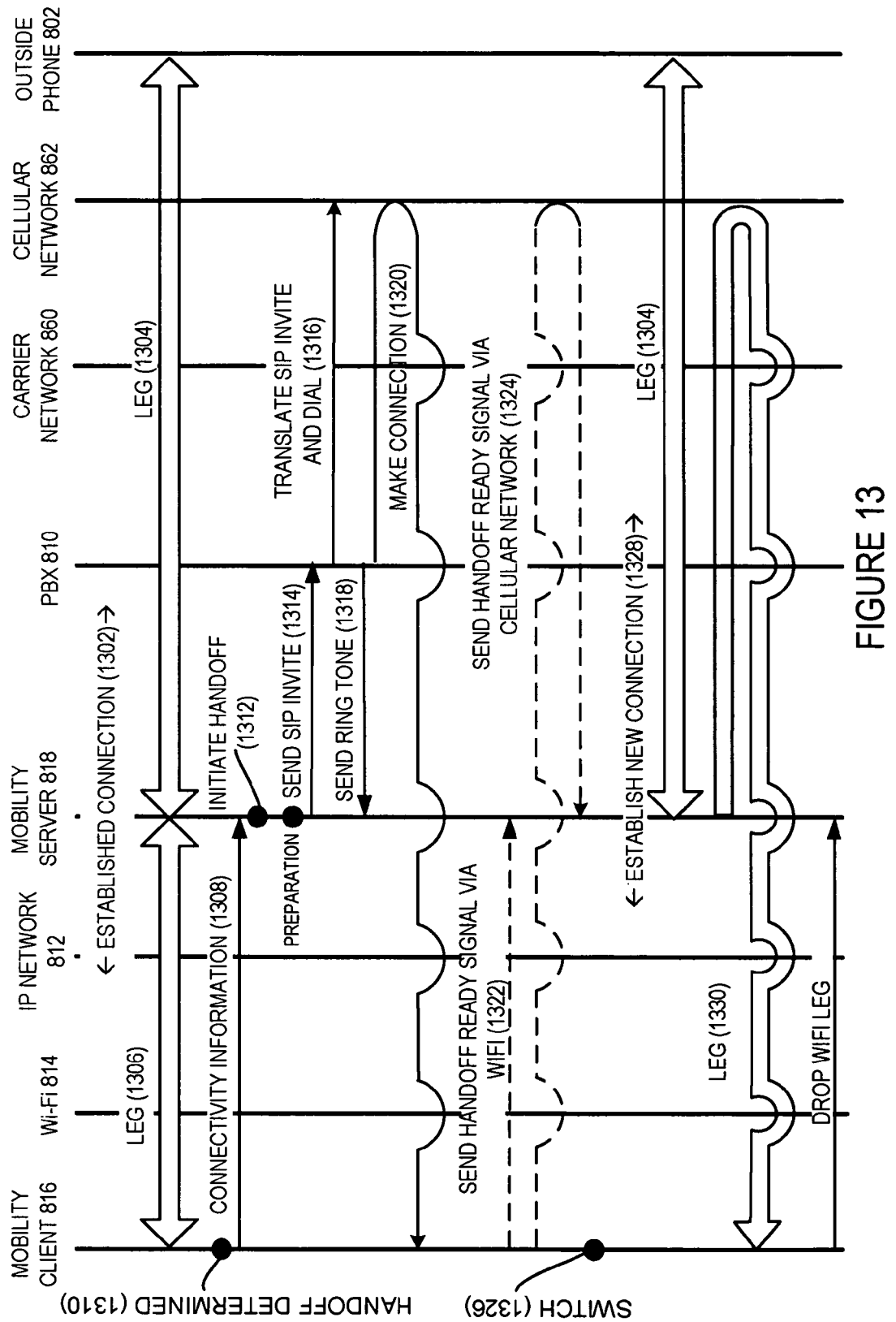
FIG. 13 illustrates, in an embodiment of the present invention, the call flows for the roaming scenario of FIG. 12.

FIG. 13 illustrates, in an embodiment of the present invention, a call flow for the roaming scenario of FIG. 12. An established connection 1302 between outside telephone 802 and mobility client 816 via mobility server 818 may exist. Established connection 1302 may include two legs 1304 and 1306. Leg 1304 is associated with the connection between outside telephone 802 and mobility server 818. In an example, outside telephone 802 may be connected to mobility server 818 via carrier network 860 and PBX 810. Leg 1306 may be associated with the connection between mobility client 816 and mobility server 818. In an example, mobility client 816 may be connected to mobility server 818 via Wi-Fi network 814.

At a next step 1308, data about the connectivity status of mobility client 816 may be continuously communicated to mobility server 818. As the user of mobility client 816 begins to roam away from Wi-Fi network 814, at a point 1310, one or more criteria for handoff are met, and at least one of mobility client 816 and mobility server 818 may determine that a handoff need to be perform. The one or more criteria may be configured by enterprise 800 and may be stored in mobility client 816 and/or mobility server 818. The criteria may include, but are not limited to, signal strength, channel loading, and/quality of communication.

At a next step 1312, mobility server 818 may initiate a handoff by setting up a connection with PBX 810. In preparation for the handoff, mobility server 818 may also begin buffering the incoming media packets from mobility client 816 and outside telephone 802. Buffering may occur in anticipation of packets not being received by either party. During the transition period, legs 1304 and 1306 of established connection 1302 are still being maintained and media packets are still being sent to the two parties (i.e., mobility client 816 and outside telephone 802).

At a next step 1314, mobility server 818 may send a SIP invite message to PBX 810. The SIP invite message includes a cellular number that is associated with mobility client 816. At a next step 1316, PBX 810 may translate the SIP invite message into a cellular call to cellular network 862. At a next step 1318, PBX 810 may send a ring tone back to mobility server 818.

At a next step 1320, cellular network may connect with mobility client 816. At this point, two connections have been established between mobility client 816 and mobility server 818. To notify mobility server 818 that a second connection has been established through cellular network 862, mobility client 816 may send a signal each through each network connection (i.e., cellular network and Wi-Fi network), in an embodiment. Two signals may be sent, in an embodiment, to ensure that mobility server 818 receives the request to switch in a timely manner. In an example, mobility client 816 may send a first signal (path 1322) through the Wi-Fi connection and a second signal through the cellular network to mobility server 818 (path 1324). In response, mobility server 818 may send mobility client 816 an acknowledgement through both network connections.

The switch to the new cellular connection may be performed by either mobility server 818 and/or mobility client 816, in an embodiment (point 1326). Accordingly, connection between mobility client 816 and outside telephone 802 is now through a cellular network instead of a Wi-Fi network. In an embodiment, a new connection 1328 between outside telephone 802 and mobility client 816 may be established. New connection 1328 may include existing leg 1304 and a newly created leg 1330 through cellular network 862. After new connection 1328 has been established, mobility server 818 may disconnect mobility client 816 from Wi-Fi network 814, in an embodiment. In another embodiment, mobility client 816 may be disconnected from Wi-Fi network 814 while new connection 1328 is being established.

FIGS. 12 and 13 show that a handoff from a Wi-Fi network to a cellular network may occur seamlessly to both the user of mobility client 816 and the user of outside telephone 802. Despite the complex steps that may be occurring to switch the user of mobility client 816 to a better connection, the user of mobility client 816 may only be aware of a network change when mobility client 816 displays a message on user interface module 1082 to notify the user that a new connection has being made. For all general purpose, the switch from the Wi-Fi network to the cellular network is a seamless transition that does not negatively impact the two calling parties' telecommunication experience.

Figure 14A:
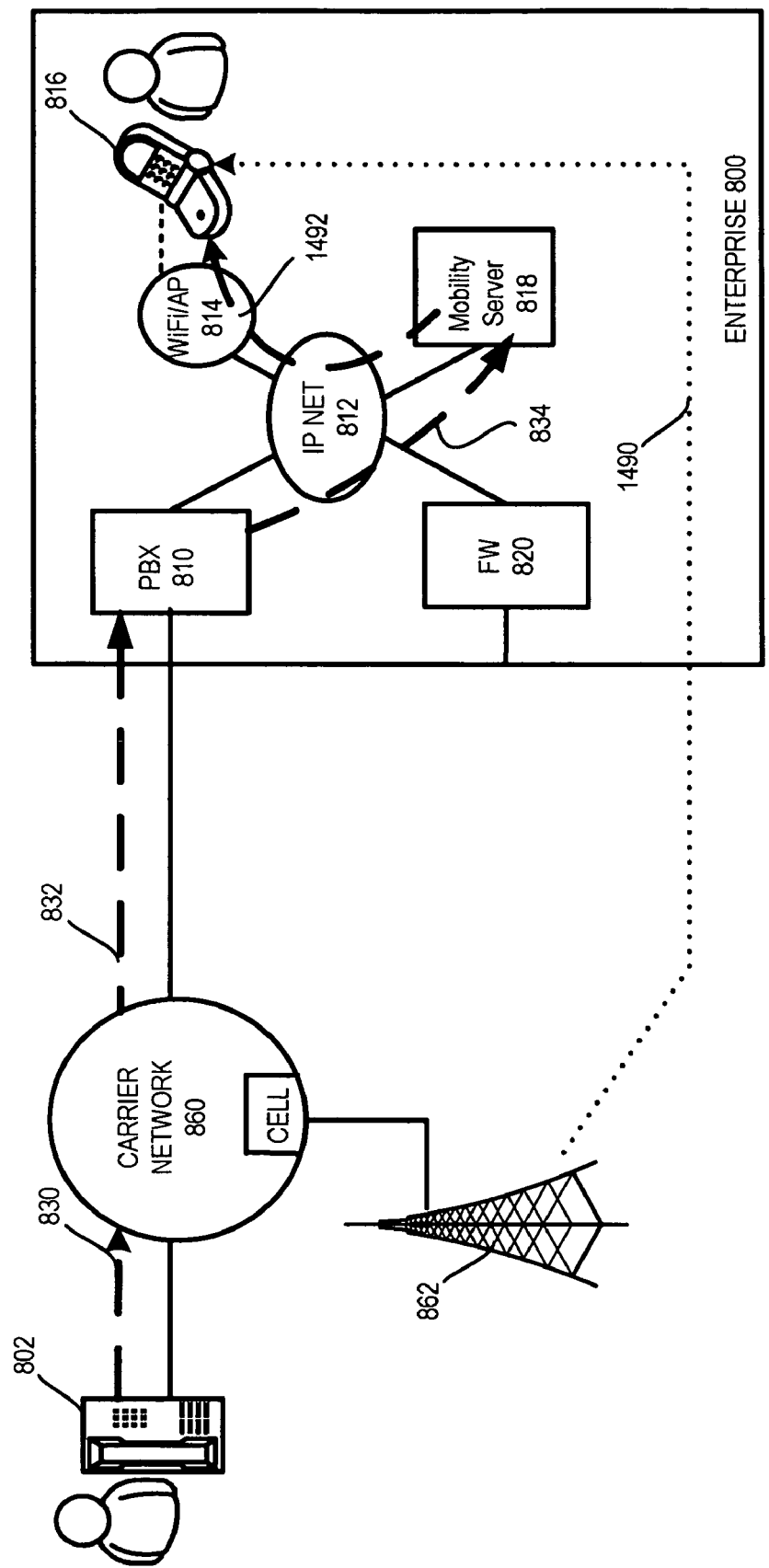
FIG. 14A illustrates, in accordance with one or more embodiments of the present invention, an example of a call roaming scenario in which a user of a mobility client roams from a cellular network back into a Wi-Fi network managed by an enterprise.
Figure 14B:
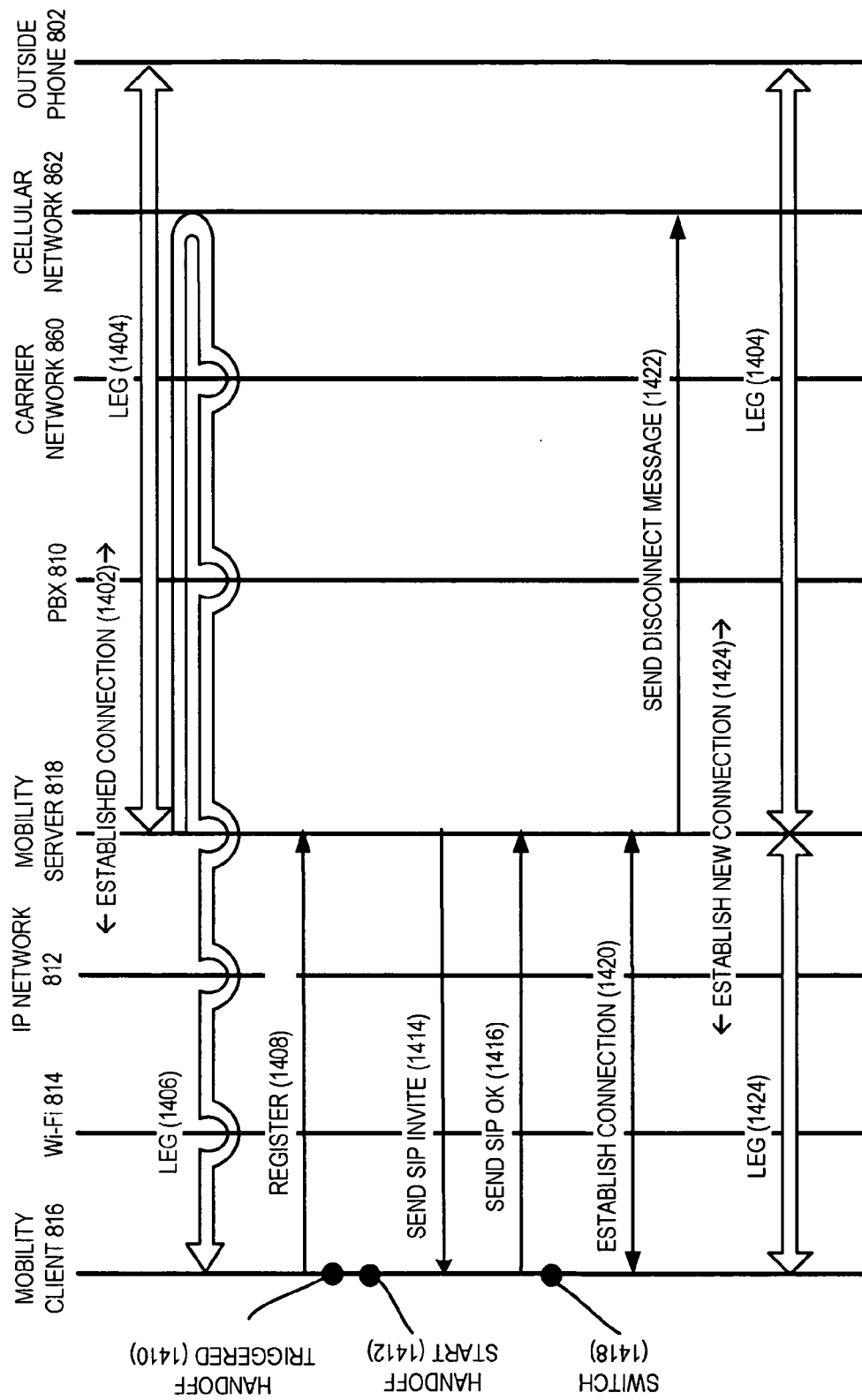
FIG. 14B illustrates, in an embodiment of the present invention, a call flow that provides the steps for the handoff that may occur.

Similarly, switching may occur when the user of mobility client 816 roams from a cellular network back into Wi-Fi environment 814 as shown in FIGS. 14A and 14B.

FIG. 14A illustrates, in accordance with one or more embodiments of the present invention, an example of a call roaming scenario in which the user of mobility client 816 roams from cellular network 862 back into Wi-Fi network 814. Consider the situation wherein, for example, mobility client 816 in FIG. 12, who is currently communicating with outside telephone 802 via cellular network 862 (through the PBX 810), has roamed back into enterprise's Wi-Fi network 814 (a path 1490). As mobility client 816 roams from cellular network 862 to Wi-Fi network 814, mobility client 816 may begin registering with mobility server 818 through Wi-Fi network 814. Registration packet may be sent from mobility client 816 via Wi-Fi network 814 through IP network 812 to reach mobility server 818.

Once registration has completed, and one or more criteria for handoff has been met (e.g., signal strength, channel loading, and/quality of communication), handoff may begin. Mobility client 816 may send two signals to mobility server 818 indicating his ready state. As mentioned above, a signal is sent over each available network to ensure that mobility server 818 receives the signal in a timely manner.

Upon receiving one of the signals, mobility server 818 may switch mobility client to Wi-Fi network 814. In another embodiment, mobility client 816 may perform the switch and then notify mobility server 818.

Once a connection has been established between mobility client 816 and mobility server 818 through Wi-Fi network 814, the cellular connection may be disconnected. In an embodiment, mobility server 818 may send a disconnect message to PBX 810. PBX 810 may then send a command to cellular network 862 to end the connection.

The media traffic may now flow from outside telephone 802 to carrier network 860 (leg 830) to PBX 810 (leg 832). PBX 810 may then forward the media traffic to mobility server 818 through IP network 812 (leg 834). Mobility server 818 may then forward the media traffic through IP network 812 to Wi-Fi network 814 to mobility client 816 (leg 1492).

FIG. 14B illustrates, in an embodiment of the present invention, a call flow that provides the steps for the handoff that may occur. An established connection 1402 between outside telephone 802 and mobility client 816 via mobility server 818 may exist. Established connection 1402 may include two legs 1404 and 1406. Leg 1404 is associated with the connection between outside telephone 802 and mobility server 818. In an example, outside telephone 802 may be connected to mobility server 818 via carrier network 860 and PBX 810. Leg 1406 may be associated with the connection between mobility client 816 and mobility server 818. In an example, mobility client 816 may be connected to mobility server 818 via cellular network 862 and PBX 810.

The user of mobility client 816 may roam from a cellular network back into a Wi-Fi network (e.g., Wi-Fi network 814) within enterprise 800. At a next step 1408, mobility client 816 may register with mobility server 818 through Wi-Fi network 814. During the registration process, authentication of mobility client 816 (including user identity) may be performed for security consideration. In addition, information for performing a handoff may be exchanged between mobility client 816 and mobility server 818.

At a next step 1410, one or more criteria for handoff are met, and at least one of mobility client 816 and mobility server 818 may determine that a handoff needs to be performed. As mentioned above, the on or more criteria (e.g., signal strength, channel loading, and/quality of communication) may be configured by enterprise 800 and may be stored in mobility client 816 and/or mobility server 818.

At a next step 1412, at least one of mobility server 818 and mobility client 816 may determine that the current telecommunication session between the user of mobility client 816 and outside telephone 802 may be best continue over the connection with Wi-Fi network 814 instead of over the connection with cellular network 862.

At a next step 1414, mobility server 818 may send a SIP invite message to mobility client 816. In response, at a next step 1416, mobility client 816 may send a SIP OK message back to mobility server 818.

At a next step 1418, at least one of mobility server 818 and mobility client 816 may execute the switch from cellular network 862 to Wi-Fi network 814 such that the handoff may be completed. Accordingly, a connection 1420 between mobility client 816 and mobility server 818 through Wi-Fi network 814 may be established.

At a next step 1422, mobility server 818 may send a disconnect message to cellular network 862 to drop the connection between cellular network 862 and mobility client 816. In an embodiment, mobility server 818 may send a disconnect message to PBX 810. PBX 810 may translate the disconnect message and send a command to cellular network 862 to discontinue cellular connection 1406.

After the roaming transition has been completed, a connection 1424 may be established between outside telephone 802 and mobility client 816. As can be seen, connection 1424 includes leg 1404 and a leg 1424. As aforementioned, leg 1404 is the leg between outside telephone 802 and mobility server 818. Despite the roaming that may have occurred, leg 1404 is not impacted. In regard to leg 1424, this leg replaces leg 1406 and represents the new connection between mobility client 816 and mobility server 818 through Wi-Fi network 814.

Figure 15A:
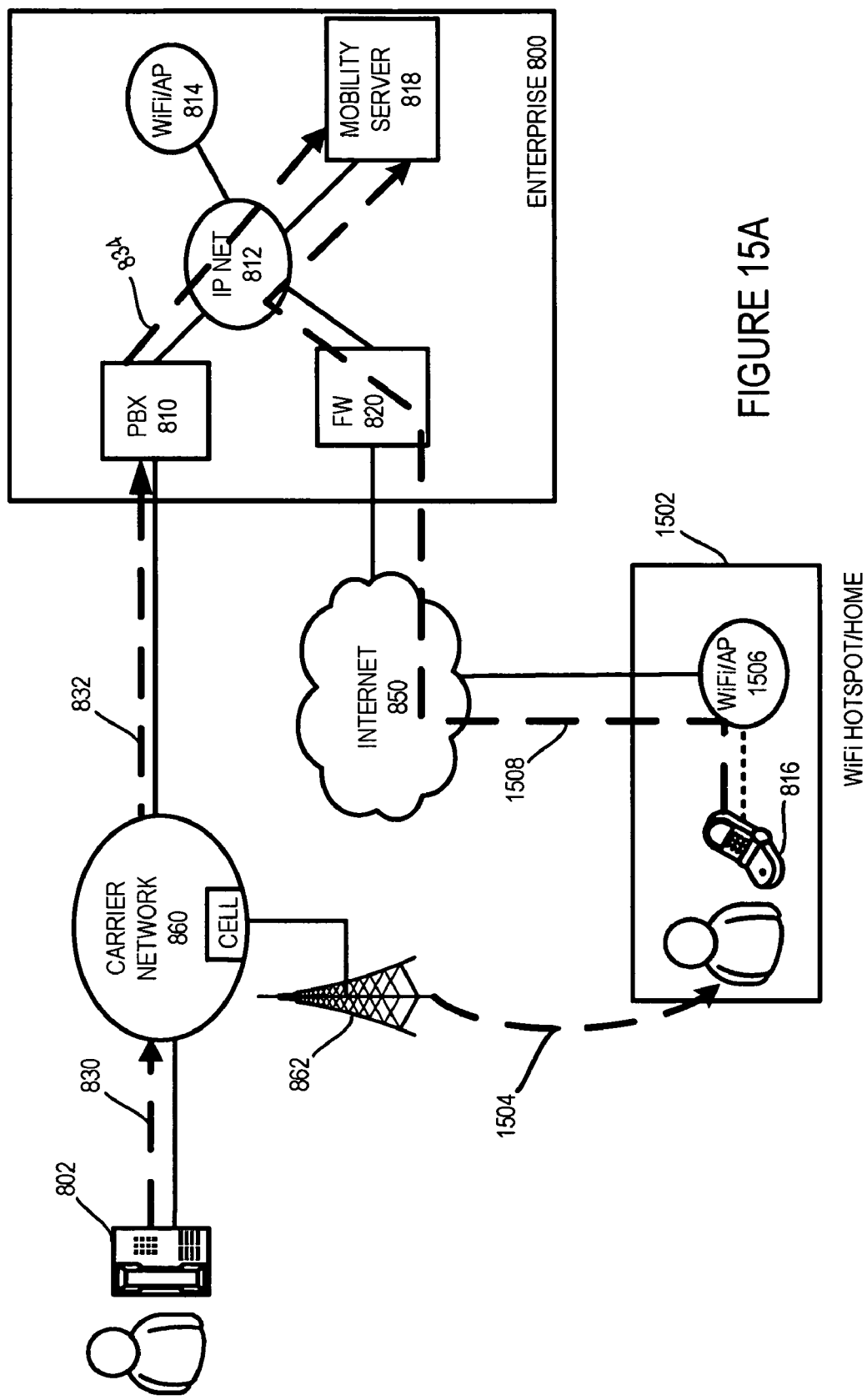
FIG. 15A illustrates, in accordance with one or more embodiments of the present invention, an example of a call roaming scenario in which a user of a mobility client roams from a cellular network into a third-party Wi-Fi network.
Figure 15B:
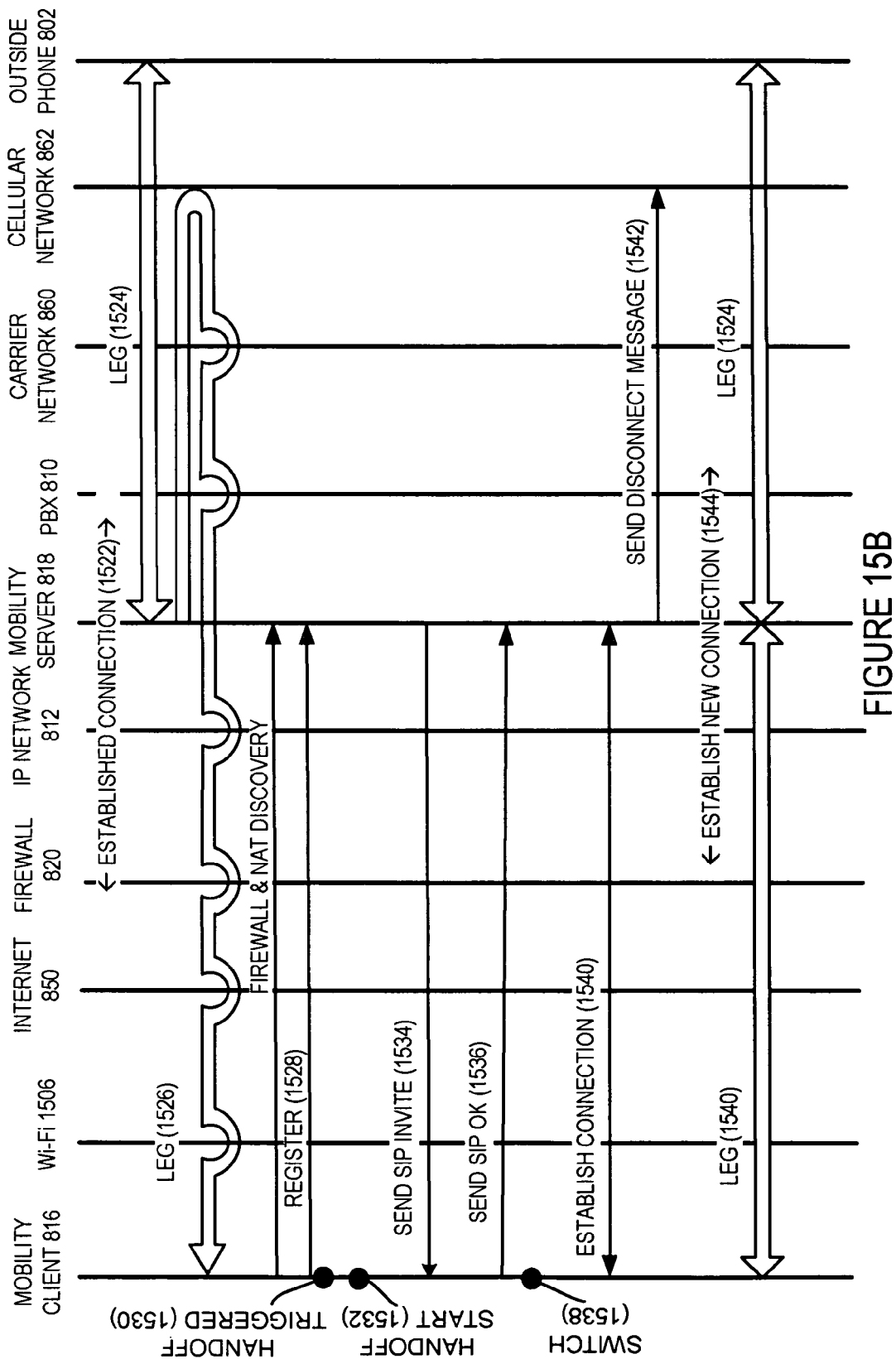
FIG. 15B illustrates, in an embodiment of the present invention, a call flow that provides the steps for the handoff that may occur.

Similarly, switching may occur when the user of mobility client 816 roams from a cellular network into a hotspot Wi-Fi environment (e.g., a coffee shop) as shown in FIGS. 15A and 15B.

FIG. 15A illustrates, in accordance with one or more embodiments of the present invention, an example of a call roaming scenario in which the user of mobility client 816 roams from cellular network 862 into a hotspot Wi-Fi network 1502.

Consider the situation wherein, for example, mobility client 816 in FIG. 12, who is currently communicating with outside telephone 802 via cellular network 862, has roamed into hotspot Wi-Fi hotspot 1502 (a path 1504). As mobility client 816 roams from cellular network 862 to a Wi-Fi network 1506, mobility client 816 may begin registering with mobility server 818 through Wi-Fi network 1506. Registration packet may be sent from mobility client 816 via Wi-Fi network 1506 through Internet 850, firewall 820, and IP network 812 to reach mobility server 818.

Once registration has completed and one or more criteria for handoff has been met (e.g., signal strength, channel loading, and/quality of communication), handoff may begin. Mobility client 816 may send two signals to mobility server 818 indicating his ready state. As mentioned above, a signal is sent over each available network to ensure that mobility server 818 receives the signal in a timely manner.

Upon receiving one of the signals, mobility server 818 may switch mobility client to Wi-Fi network 1506. In another embodiment, mobility client 816 may perform the switch and then notify mobility server 818.

Once a connection has been established between mobility client 816 and mobility server 818 through Wi-Fi network 1506, the cellular connection may be disconnected. In an embodiment, mobility server 818 may send a disconnect message to PBX 810. PBX 810 may send a command to cellular network 862 to end the connection.

The media traffic may now flow from outside telephone 802 to carrier network 860 (leg 830) to PBX 810 (leg 832). PBX 810 may then forward the media traffic to mobility server 818 through IP network 812 (leg 834). Mobility server 818 may then forward the media traffic through IP network 812, firewall 820, Internet 850 to Wi-Fi network 1506 to mobility client 816 (leg 1508).

FIG. 15B illustrates, in an embodiment of the present invention, a call flow that provides the steps for the handoff that may occur. Similar to FIG. 14B, an established connection 1522 may exist between outside telephone 802 and mobility client 816 via mobility server 818. Established connection 1522 may include two legs 1524 (i.e., the cellular connection between outside telephone 802 and mobility server 818) and 1526 (i.e., cellular connection between mobility client 816 and mobility server 818).

As the user of mobility client 816 roams into a Wi-Fi network 1506, at a next step 1528, mobility client 816 will identify if there is a FW (firewall) or a NAT (network address translation) device between its connection point and the mobility server 818, Once the connectivity method has been identified it may register with mobility server 818 through Wi-Fi 1506. After registration and authentication has been performed, at a next step 1530, one or more criteria (e.g., signal strength, channel loading, and/quality of communication) for handoff may be met and a handoff may be determined by mobility client 816 and/or mobility server 818. At a next step 1532, handoff may begin.

At a next step 1534, mobility server 818 may send a SIP invite message to mobility client 816 at Wi-Fi network 1506 via IP network 812, firewall 820, and Internet 850. In response, at a next step 1536, mobility client 816 at Wi-Fi network 1506 may send a SIP OK message back to mobility server 818 via Internet 850, firewall 820, and IP network 812.

At a next step 1538, a switch may be executed to move the media traffic from cellular network 862 to Wi-Fi network 1506 to complete the handoff and establish a connection 1540 between mobility client 816 and mobility server 818 through Wi-Fi network 1506.

At a next step 1542, mobility server 818 may send a disconnect message to PBX 810. PBX 810 may translate the disconnect message and send a command to cellular network 862 to discontinue cellular connection 1526.

After the roaming transition has been completed, a connection 1544 may be established between outside telephone 802 and mobility client 816. As can be seen, connection 1544 includes leg 1524 (i.e., leg between outside telephone 802 and mobility server 818) and leg 1540 (i.e., new leg between mobility client 816 and mobility server 818 through Wi-Fi 1506).

FIGS. 14A, 14B, 15A, and 15B show that with a wireless communication system solution, enterprise 800 may control when a handoff from a more expensive cellular network to a less expensive IP network (e.g., Wi-Fi) may occur. In the prior art, enterprise 800 may have been dependent upon a cellular network to make the decision for a switch. Enterprise 800 generally has little or no control over when the switch may happen. As a result, enterprise 800 may not have being given the chance to take advantage of the full cost saving benefits that may have occurred with a switch to a less expensive network.

Similar to a switch from a Wi-Fi network to a cellular network, a handoff that may occur from a cellular network to a Wi-Fi network may occur seamless to the user of mobility client 816 and the user of outside telephone 802. Neither parties may be aware of the steps being taken to switch the user of mobility client 816, whose connection may be degrading, to a network that may not only be cheaper but may also prevent disruption in the telecommunication session between user of mobility client 816 and outside telephone 802.

Figure 16A:
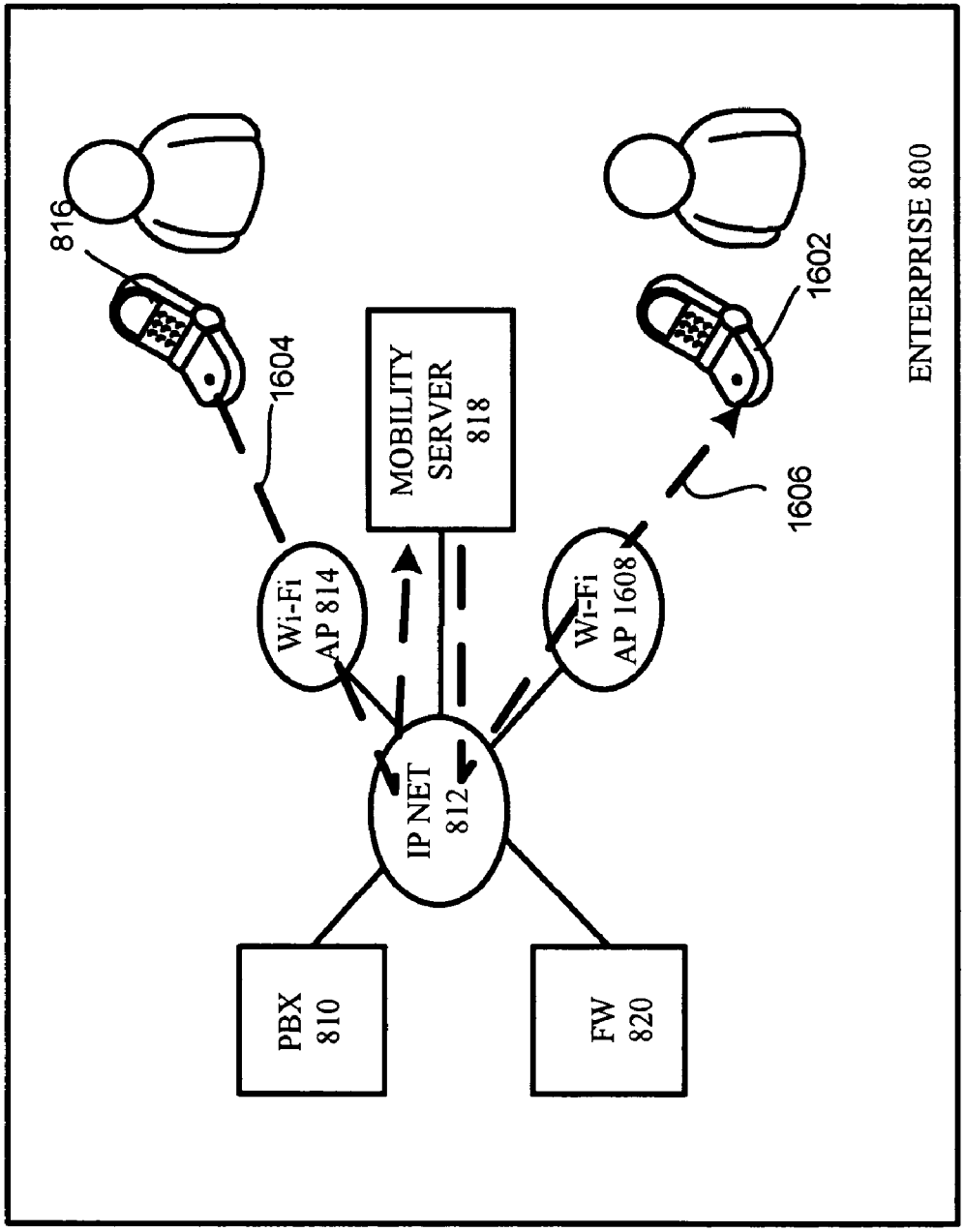
FIG. 16A illustrates, in accordance with one or more embodiments of the present invention, a call establishment between two mobility clients.

FIG. 16A illustrates, in accordance with one or more embodiments of the present invention, a call establishment between two mobility clients. Mobility client 816 may want to connect with a mobility client 1602. Both mobility clients 816 and 1602 are located within enterprise 800. The telecommunication request from mobility client 816 may be routed through Wi-Fi network 814 and IP network 812 to mobility server 818 (a leg 1604). After validating the mobility client 816, mobility server 818 may identify that the receiving party of the telecommunication request (mobility client 1602) is a registered device. Mobility server 818 may then route the telecommunication request to mobility client 1602 through IP network 812 and a Wi-Fi network 1608 (a leg 1606) to establish a telecommunication session between mobility client 816 and mobility client 1602.

Figure 16B:
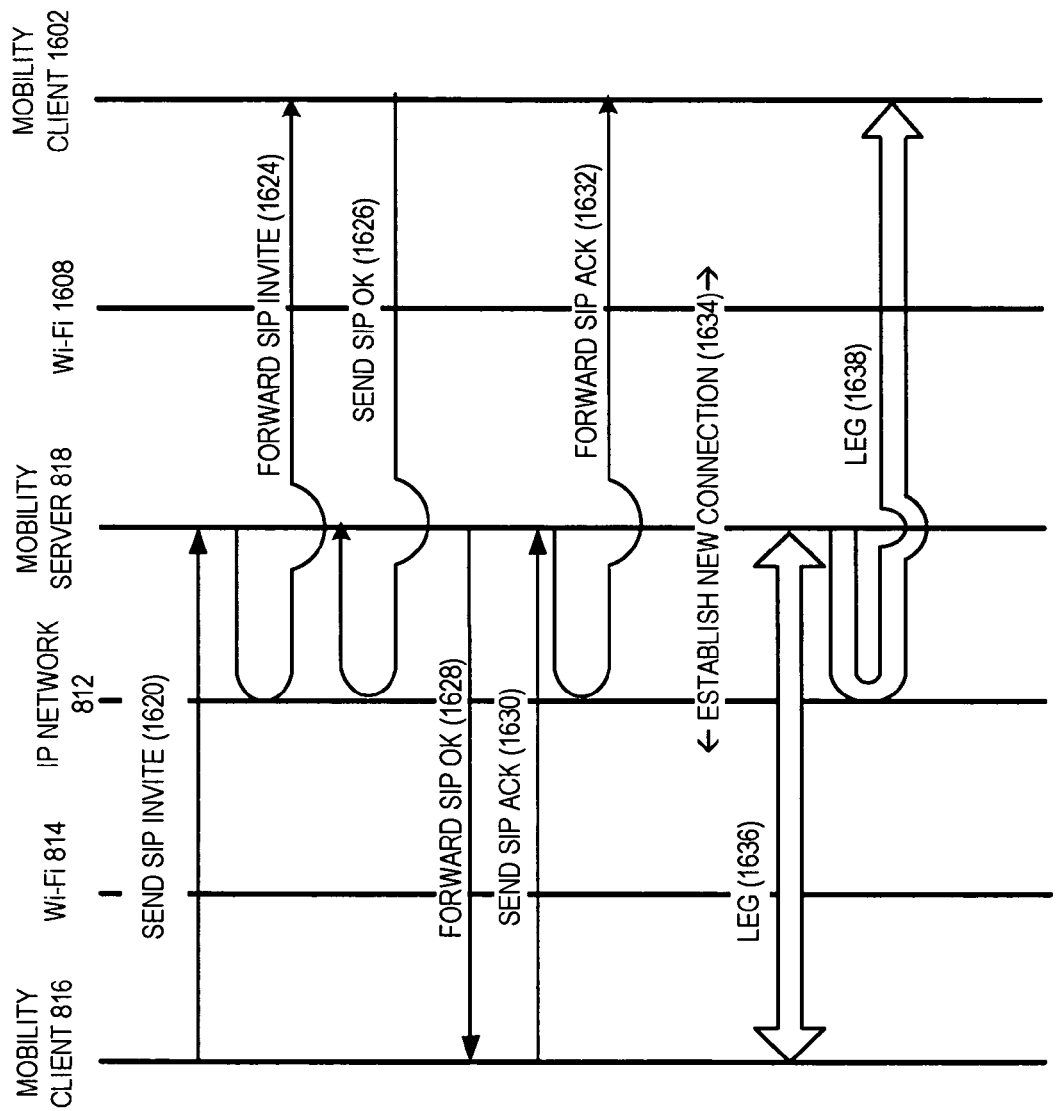
FIG. 16B illustrates, in an embodiment of the invention, the call flow for FIG. 16A.

FIG. 16B illustrates, in an embodiment of the invention, a call flow for FIG. 16A. At a first step 1622, mobility client 816 may send a SIP invite message to mobility server 818 via Wi-Fi network 814 and IP network 812.

In an embodiment, to send a SIP invite, user of mobility client 816 may employ a user interface module 1082 to enter in a contact number for mobility client 1602. Once the telecommunication request has been entered, call control client module 1098 may be initiated.

Since call control client module 1098 is aware that a Wi-Fi connection may be made via SIP, call control client module 1098 may access SIP client module 1068 via wrapper module 1056. SIP client module 1068 may send a SIP invite through socket client module 1004 to mobility server 818.

Upon receiving the SIP invite, mobility server 818 may verify the contact number. In order to perform the verification of the contact number, the SIP invite is forwarded to call control server module 920 via socket server module 932 and SIP server module 930. Upon receiving the SIP invite, call control server module 920 may interact with resource manager module 924 of mobility server 818 to confirm if sufficient network resource for supporting the telecommunication request is available. Since the receiving party is also a registered device, call control server module 930 may check with presence manager server module 912 to determine the status of mobility client 1602. By checking with presence manager module call control module 930 may be able to better direct the outgoing telecommunication request.

If the presence manager server module 912 indicates that the user of mobility client 1602 is accepting telecommunication request, then call control server module 930 may direct the call to mobility client via Wi-Fi network 1608 and IP network 812, at a next step 1624. In an example, mobility client 1602 may ring.

At mobility client 1602, the received SIP invite message may flow from socket client module 1004 to SIP client module 1068 through wrappers module 1056 to call control client module 1098.

Upon receiving the SIP invite message, call control client module 1098 of mobility client 816, at a next step 1626, may accept the telecommunication request (e.g., answer the telephone call) by sending a SIP OK message to mobility server 818 via Wi-Fi network 1608 and IP network 812. At mobility server 818, the received SIP OK message may flow from socket server module 932 to SIP server module 930 up to call control server module 920.

At a next step 1628, mobility server 818 may forward the SIP OK message to mobility client 816 via Wi-Fi network 814 and IP network 812. At mobility client 816, the received SIP OK message may flow from socket server module 932 to SIP server module 930 up to call control server module 920. In response, at a next step 1630, mobility client 816 via Wi-Fi network 814 and IP network 812 may send mobility server 818 a SIP acknowledge (SIP ACK) message to acknowledge receipt of the SIP OK message.

At a next step 1632, mobility server 818 may forward the SIP ACK message to mobility client 1602 via Wi-Fi network 1608 and IP network 812. Once SIP ACK has been received then mobility server 818 may connect a leg 1636 (i.e., connection between mobility client 816 and mobility server 818 via Wi-Fi network 814 and IP network 812) with a leg 1638 (i.e., connection between mobility client 1602 and mobility server 818 via Wi-Fi network 1608 and IP network 812) to form a new connection 1634.

Figure 17:
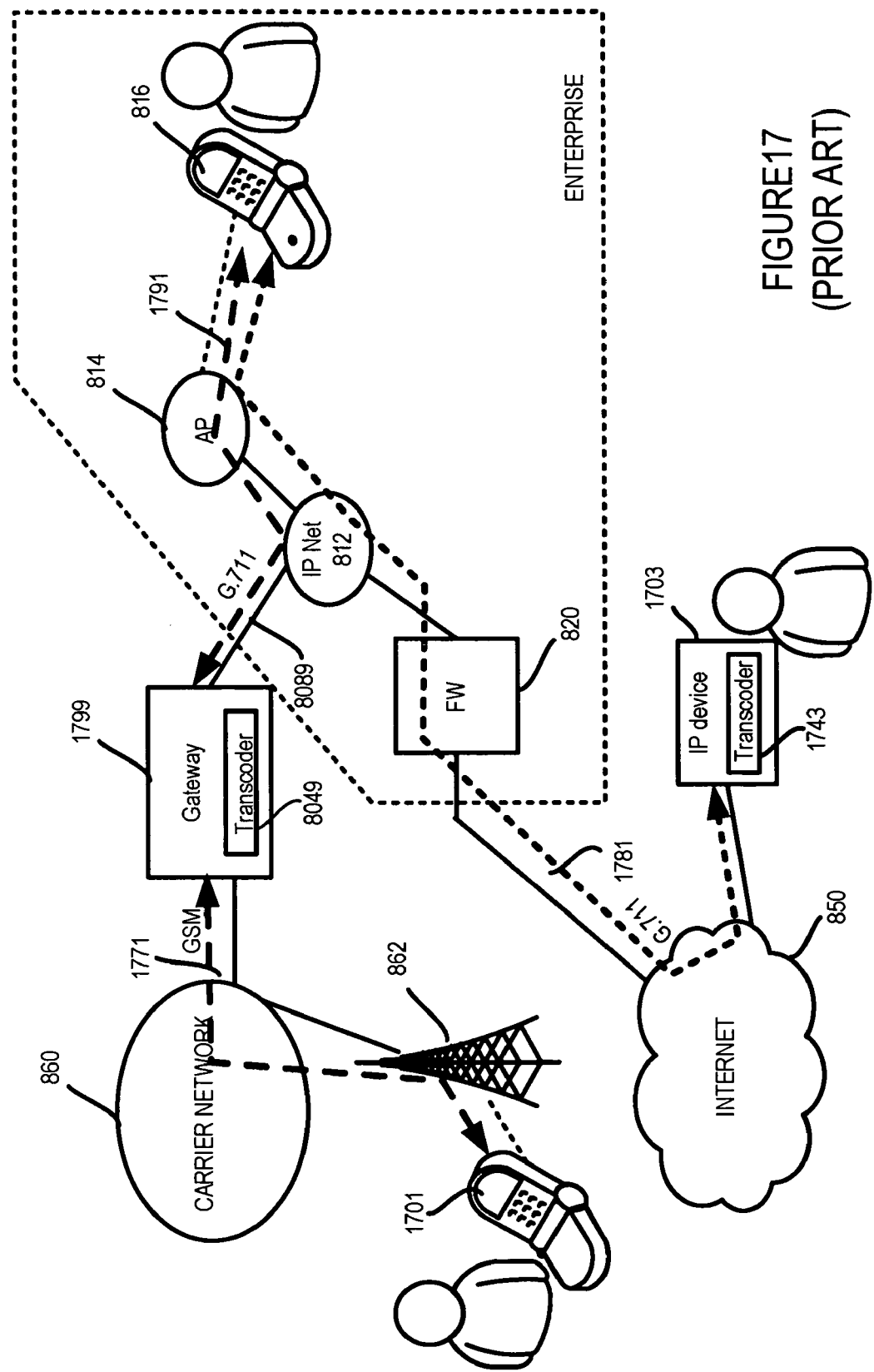
FIG. 17 shows a prior art block diagram of a transcoder within a carrier-managed gateway.

In an embodiment, to increase efficiency in moving media traffic, a transcoder may be integrated into a mobility server. In the prior art, the transcoder may be performed by either a carrier-managed gateway or by a telecommunication device. To facilitate discussion, FIG. 17 show a prior art block diagram of a transcoder within a carrier-managed gateway.

Consider the situation wherein, for example, a cellular telephone may be communicating with a mobility client. When a cellular telephone 1701 communicates with mobility client 116 through cellular network 162 and Wi-Fi network 114, the media data may be transcoded by a transcoder 1749 of a carrier-managed gateway 1799. Accordingly, cellular phone 1701 may transmit and receive media data in a cellular network standardized format (e.g., GSM on a leg 1771), and mobility client 116 may transmit and receive media data in a wireless LAN standardized format, (e.g., G.711 on a leg 1791), such that both of cellular phone 1701 and mobility client 116 may encode and/or decode media data correctly.

Carrier-managed gateway 1799 is generally located within the carrier premise (e.g., in the premise carrier network 160 or cellular network 162). Therefore, a link 1789 between carrier-managed gateway 1799 and IP network 112 may represent a substantial part of overall network resource. As such, efficient use of link 1789 may be important. However, G.711 is a low-compression (i.e., high data size) transcoding standard compared with GSM. With transcoding performed by carrier-managed gateway 1799 and the media data in G.711 format transmitted on link 1789, link 1789 may be inefficiently utilized.

Consider another the situation wherein, for example, an IP telecommunication device may be communicating with a mobility client. When an IP device 1703 communicates with mobility client 116 through Internet 150, IP network 112, and Wi-Fi network 114, IP device 1703 may have to use G.711 format with high bandwidth to communicate with wireless LAN mobility client 116 which generally utilizes G.711 format, even if the IP device 1703 has the capability to use G.729 format with low bandwidth. In other words, in order for an IP device to communicate with a mobile device, the media packets that are sent from the IP device must be in a standard (e.g., G.711) that is acceptable to the mobile device. Thus, even though the IP device is capable of transmitting media packets in a high compression format, the IP device is not able to take advantage of the capability since the mobile device is unable to receive the high compression file. As a result, more bandwidth may be required to transmit media packets between IP device 1703 and mobility client 116.

Further, the requirement for IP device 1703 to send media packets in a low compression format (e.g., G.711) may require the user of IP device 1703 to configure transcoder 1743 such that transcoder 1743 may perform the transcoding correctly. This may prove an inconvenience for the user, especially if the user is not "tech-savvy". Further, if IP device 1703 is unable to perform the transcoding, IP device 1703 may not be able to communicate with mobility client 116.

The prior art method of placing a transcoder within a carrier-managed gateway and/or a telecommunication device may limit the type of telecommunication device that may be purchased. In addition, the routing data packet in low-compression format may result in a burden to the network traffic, resulting in higher cost and even slower traffic.

Figure 18:
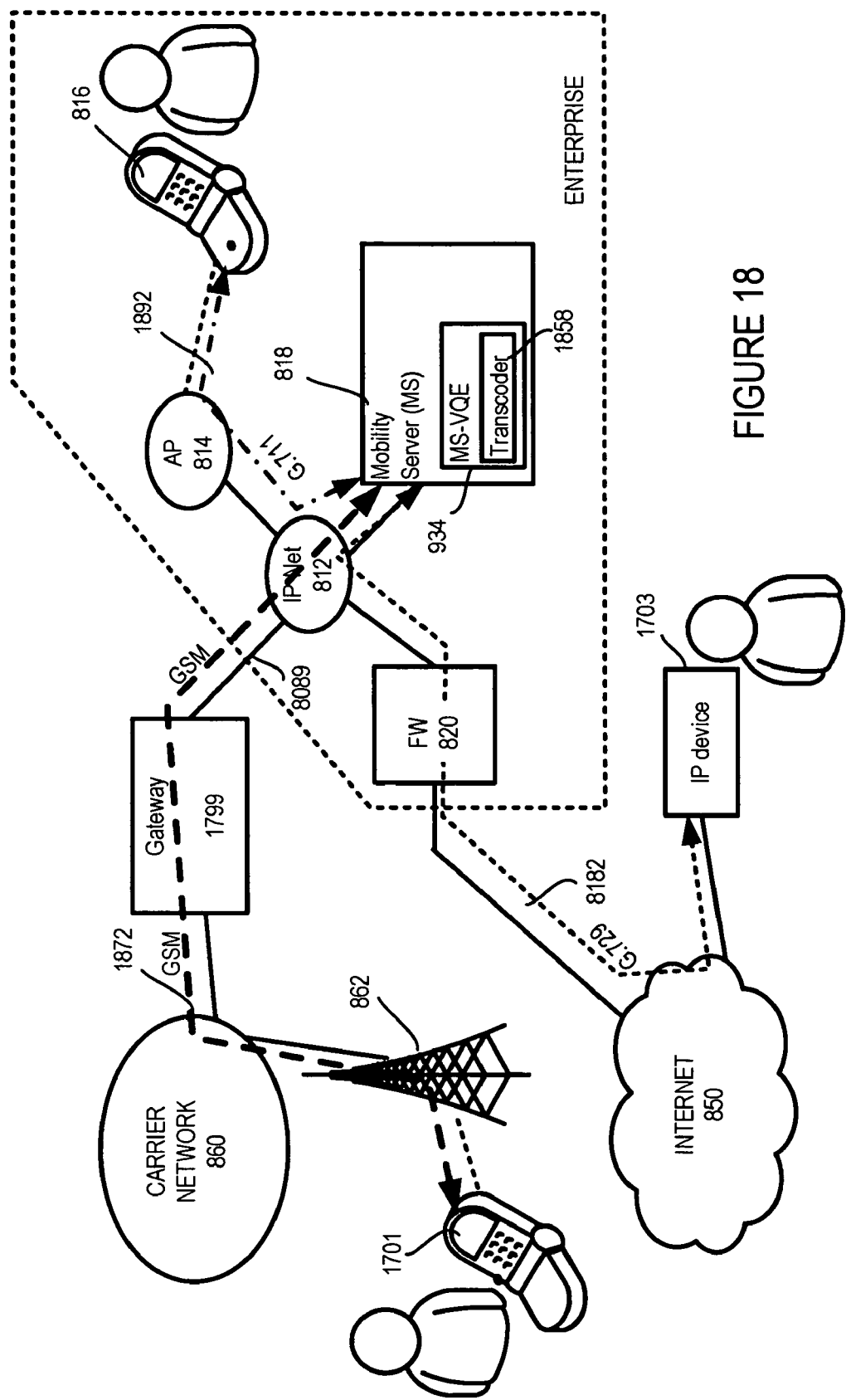
FIG. 18 shows, in an embodiment, a block diagram illustrating an arrangement for transcoding.

In an embodiment, a transcoder may be placed within the enterprise (e.g., mobility server) to handle multiple types of media data format. FIG. 18 shows, in an embodiment, a block diagram illustrating an arrangement for transcoding.

A transcoder 1858 may be implemented in media server and voice quality engine 934 of mobility server 118. Accordingly, communication between cellular phone 1701 and mobility client 116 may be represented by a leg 1872 in GSM format and a leg 1892 in G.711 format, with trancoding performed by transcoder 1858. As such, media data transmitted on link 1789 may now be in a high-compression format, such as GSM, instead of a low-compression format, such as G.711. As a result, network resource may be more efficiently used.

Further, communication between IP device 1703 and mobility client 116 may be represented by a leg 1882 in G.729 format and leg 1892 in G.711 format, with transcoding performed by transcoder 1858. As such, the user of IP device 1703 may now send high compression media packets, resulting in less costly bandwidth to be utilized. Thus, the user of IP device 1703 may no longer be required to configure his telecommunication device to perform transcoding. As a result, the type of telecommunication devices that may be purchased is no longer limited to only those telecommunication devices that have transcoding capability.

As can be appreciated from the forgoing, one or more embodiments of the present invention provide a wireless communication system that employs a multiple network arrangement that can be managed by an enterprise to satisfy its infrastructure need. Also, the wireless communication system gives an enterprise the flexibility to create, implement, manage, and enforce its own communication policy. Further, the wireless communication system reduces the cost associated with changes to equipments (e.g., network equipments and telecommunication devices) by being independent of operating system, brands, and/or models. Further cost saving is also available because with the wireless communication system, an enterprise may tailor the mobility server to take advantage of the lower cost networks when the lower cost networks are available.

One or more embodiments may enable seamless roaming and smooth handoff among the multiple mobile/wireless networks. Therefore, the enterprise's employees may have substantially ubiquitous connectivity and accessibility. As a result, the enterprise may improve customer satisfaction and avoid missed business opportunities.

One or more embodiments may provide mobility server software and client software that are implemented independent of operating systems and hardware. Therefore, costs of switching carriers and changing communication arrangements may be minimized.

Further, one or more embodiments may include multiple mobility servers connected through a virtual private network and deployed at multiple sites of the enterprise such as, for example, multiple international sites. Accordingly, use of network resource may be optimized, and cost of communication may be reduced.

B. Enhancing User Experience in Media Handoffs

FIGS. 4A-E depict a structure and method for fast media handoff between Wi-Fi and cellular networks 1. The invention provides a mechanism to seamlessly switch media connection between enterprise controlled indoor or outdoor Wi-Fi to operator controlled cellular network. The mechanism will compensate for differing loss characteristics on disparate networks and deliver cost savings to the subscribers.

2. VQE Design Considerations:

The criteria for successful voice handoffs within homogeneous and heterogeneous networks include: handoff times; and voice quality.

The performance of the voice handoff for acceptable user experience is determined by several factors such as codecs, the number of transcodings, jitter, stream switching impact as well as the end-to-end delay including cellular/Wi-Fi delay differential. Some of these parameters that pose unique challenges for heterogeneous handoffs and are discussed in detail below.

3. Codecs and Transcoding

The G.711, G.729, GSM, and new UMTS codecs are some of the common voice transuding standards. The overall performance is affected not only by the bandwidth requirement of the coding but also the transcoding delay on a given MAC layer as well as the number of transcodings in the end-to-end call.

4. End-to-End Delays and Echo The tail end delay for the cellular network can be 300-500 ms for the tail path which causes echoes. To account for acoustic echoes at the handset, carriers limit the volume level of the mobile user. Such reduction creates a scenario where the cellular subscribers may not be able to hear the PSTN-side of the call. Note that this effect is outside the control of the enterprise and volume differences can exist due to the way the cellular networks implement their voice networks.

Traditional echo cancellers are limited to 128 ms tail lengths, largely due to the cost. Processing delays in the tail circuit (between the MSC and the handset) of a mobile system will result in tail lengths approaching 300 ms. Because of the unpredictability of the handset's Acoustic echo return loss (AERL) capabilities and the variability of the caller environment, it is impractical to place a canceller in the circuit only when conditions require it. For delays in the enterprise Wi-Fi network to the PSTN, the following depicts the scenario and the delay budget which is approximately 125 ms.

5. Switching media stream connections

Switching both the codecs as well as the streams increases the delay more than just reconnecting the streams, but by using G.711 throughout, the codec changes are eliminated.

6. Using silence and old packets

To compensate for delay differential during handoff, it is recommended to use pre-stored silence packets. Auto-correlation of two streams together with silence packet insertion would help in smoother transition.

| Layer | Item | Duration |
| --- | --- | --- |
| L2 | 802.11 scan (active) | 40-300 ms |
| L2 | 802.11 associate/reassociate | 2 |
| L3 | DHCP V4 | |
| | Discover to offer | 10-20 ms |
| | Full (through ARP) | 1000 ms |
| L4/L7 | Address change pre-processing | 10-50 ms |
| | Media reassociation | 30-50 ms |

The above table shows a minimal set of procedures to address the handoffs. The majority of the handoff can be assigned to the scan of the available access points. The time may be longer if passive scanning is used. After the scanning is eliminated, then by issuing address allocation and pre-processing and then SIP messages at the offer instead of waiting for the full DHCP process to complete, reduces the DHCP impact to 10 ms. The address preprocessing must be issued first followed by the SIP requests to ensure that any change in the IP address and subsequent impact on the NAT and traffic flow. The use of address preprocessing for acquisition is needed if the handoff occurs behind a NAT and a new IP address is assigned. For example, this requires notification to the preprocessing server to re-allocate new address and ports for new session identification. Then the SIP based re-association can be issued to redirect the traffic. After these control messages, the traffic is redirected either by a proxy or by the end-device to the new IP address. This would require 30-35 ms from association to the completion.

Features and advantages of the present invention may be better understood with reference to the figures and discussions that follow.

An issue facing users in the prior art relates to user experience during handoffs in wireless communication. When a telecommunication device performs a handoff between transmitters, both transmitters may be simultaneously sending data streams. However, the media data streams may not be synchronized. In one example, a gap may exist. In another example, the media data stream may overlap. As a result, the two parties on the telecommunication session may experience silence, noises, glitches, and/or echoes (e.g., choppy speech in a voice call or interrupted viewing of streaming video).

Figure 43:
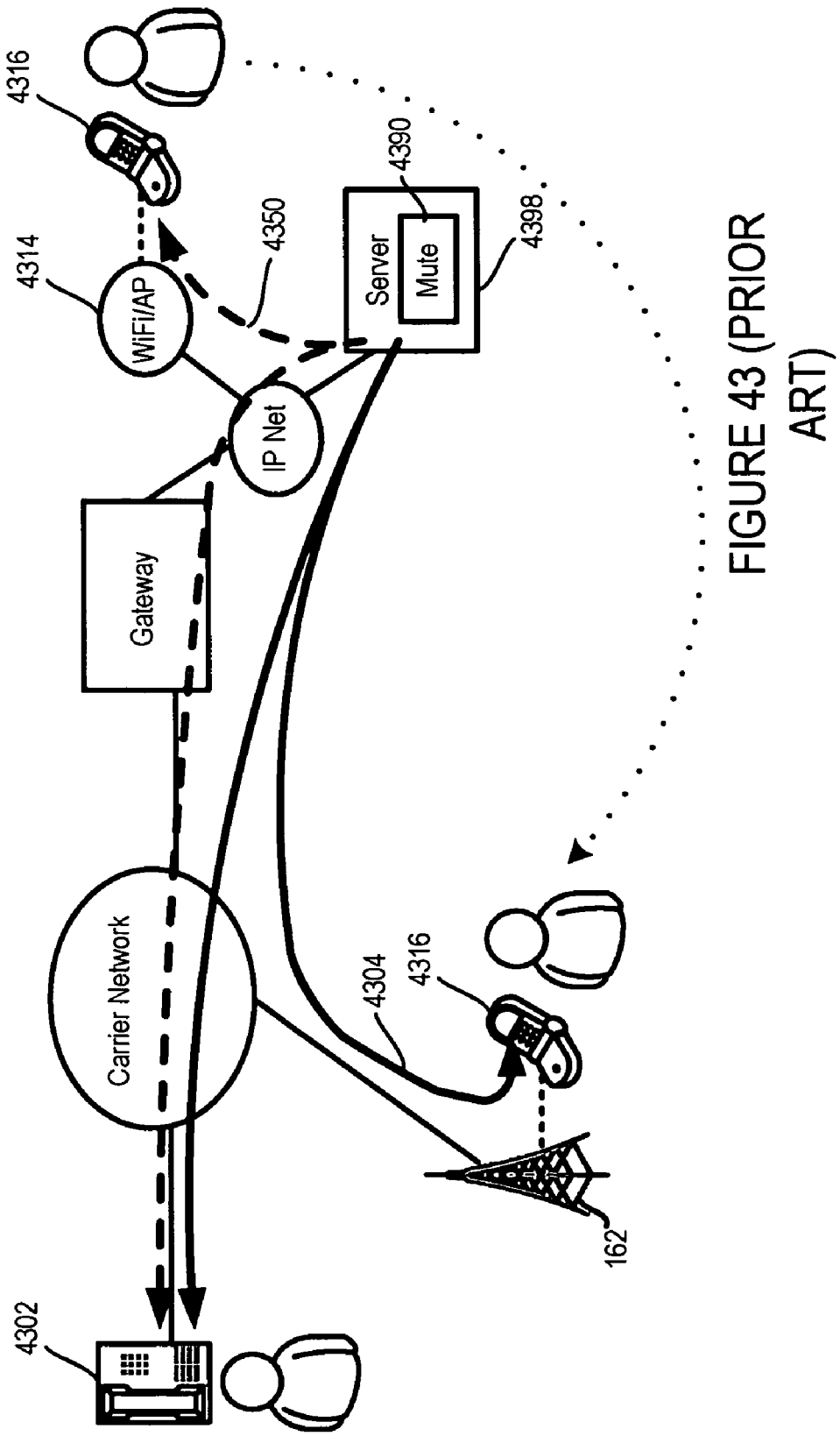
FIG. 43 illustrates an example prior art arrangement for processing media data during handoffs in wireless communication.

Prior art FIG. 43 illustrates an example of an arrangement for processing media data during handoffs in wireless communication. Consider the situation wherein, for example, a user of a mobile telecommunication device 4316 is conversing with a user of an outside telephone 4302. During the telecommunication session, the user of mobile telecommunication device 4316 may wander away from a Wi-Fi network 4314 toward a cellular network 4362, resulting in a handoff between the two networks. During the handoff, a server 4398 may be employed to process the media data streams that may be sent by the mobile telecommunication device. In an example, first media data stream 4350 may be transmitted from Wi-Fi network 4314 and second media data stream 4304 may be coming from cellular network 4362. In addition the server may include a mute module 4390 configured to mask noises and media data during the handoff.

Prior art FIGS. 44A and 44B illustrate a prior art example of methods for processing media data streams during handoffs in wireless communication. Prior art FIGS. 44A and 44B will be discussed in relation to prior art FIG. 43.

Prior art FIG. 44A illustrates a handoff scenario in which a gap may exist in the media data streams that are being sent by the two networks. A view 4400 includes a graphical view of media data streams 4302 and 4304. During a handoff period 4406, a gap 4410 may exist. Gap 4410 may represent a time interval in which neither first media data stream 4350 nor second media data stream 4304 is active. In an example, the signal level from Wi-Fi network 4314 may have become weak and may be unable to transmit first media data stream 4302. Also, the connectivity may still be weak with cellular network 4362, thus second media data stream 4304 may not be transmitted yet. As a result, the telecommunication session may appear as though the connectivity between the two parties may have been lost. In addition, random noises (e.g., static noise) may become annoyingly obvious to the parties in the telecommunication session.

A prior art solution that has been implemented to handle the gap is to employ mute module 4390. In an example, mute module 4390 may provide a mask 4408 to mask gap 4410 during handoff 4406 to mute the noises. Mask 4408 may include silence data packets that provide low, pre-recorded background noise such that the parties in the telecommunication session are aware that the telecommunication session has not been dropped. Further, mask 4408 may also shield the parties in the telecommunication session from the random noises. Unfortunately, the muting method still presents an obvious interruption in the telecommunication session. Further, the parties involved in the telecommunication session may be unsure about the length of the interruption. As a result, the muting method does not provide a seamless transition to the parties involved.

Prior art FIG. 44B illustrates a handoff scenario in which an overlap may exist between the media data streams that are being sent by the two networks. A view 4450 includes a graphical view of media data streams 4302 and 4304. During a handoff period 4416, an overlap 4420 may exist between first media data stream 4350 and second media data stream 4304. Overlap 4420 may represent a time interval in which both media data stream 4350 and media data stream 4304 are active.

In an example, the signal level from Wi-Fi network 4314 may still be strong enough to transmit media data stream 4302. At the same time, the signal strength from cellular network 4362 has also become strong resulting in media data stream 4304 being transmitted. During overlap 4420, because of cancellation and accumulation of signals, the parties in the telecommunication session may experience dissatisfactory communication quality such as silence, noises, glitches, and/or echoes.

In the prior art, the muting method may be employed to handle the overlap. In an example, mute module 4390 may be employed to provide a mask 4418 to mask overlap 4420 during handoff 4416 to mute the noises, glitches, and/or echoes. Again, the muting method presents an obvious interruption in the telecommunication session and the parties involved in the telecommunication session may be unsure about the length of the interruption. Thus, the muting method does not provide a smooth and seamless transition to the parties involved.

Another method that may be implemented in the prior art to handle overlap 4420 is to employ a mixer, such as those used in conference call. In other words, the mixer may mix the overlapped portions of first media data stream 4350 and of second media data stream 4304 during handoff 4416. Although the users of both telecommunication devices may receive data from both first media data 4302 and second media data 4304, the users may experience reverberation and glitches caused, for example, by transmission delay or acoustic delay. Further, noises may also be mixed with data from first media data 4302 and second media data 4304. As a result, the quality of the telecommunication session may deteriorate during handoff 4416.

Another user experience issue in the prior art pertains to an undesirable change in signal level during handoffs in wireless communication. The change in signal level may occur when a telecommunication device is being transferred from one network to another. In an example, in order to reduce echoes, cellular network 4362 may be configured to provide a voice signal gain that is lower than the voice signal gain typically implemented in a wireless LAN network. As illustrated in FIGS. 44A and 44B, the signal level of second media data stream 4304 (transmitted through cellular network 4362) is lower than the signal level of first media data stream 4350 (transmitted through Wi-Fi network 4314).

When mobile telecommunication device 4316 performs a handoff from Wi-Fi network 4314 to cellular network 4362, the user of mobile telecommunication device 4316 may experience a drop in voice volume. As a result, the user may miss a portion of the conversation and may have the inconvenience of re-adjusting the speaker of mobile telecommunication device 4316 during the telephone call.

On the other hand, when mobile telecommunication device 4316 performs a handoff from cellular network 4362 to Wi-Fi network 4314, the user may experience an increase in voice volume, resulting in an unexpected and even unpleasant experience. As a result, the user may not only experience discomfort but may also have the inconvenience of re-adjusting the speaker of the telecommunication device.

In accordance with embodiments of the present invention, there is provided a wireless communication system solution that may enhance the telecommunication experience of a user of a telecommunication device when a handoff occurs. Embodiments of the invention enable the wireless communication system to provide an integrated solution by including a mobility server. Embodiments of the invention enable the mobility server to include at least one of a buffer system, a cross-correlation module, a synthesizer module, an extension module, an overlap and add module, and a signal level control module.

In this document, various implementations may be discussed using examples of handoff occurring between networks. This invention, however, is not limited to a handoff between networks but may also include handoff within the same network. Also, in this document, various implementations may be discussed using examples of voice media. This invention, however, is not limited to voice media and may include different real-time media, such as video streaming, audio streaming, and the like. The discussions are meant as examples and the invention is not limited by the examples presented.

Consider the situation wherein, for example, a handoff is occurring between a Wi-Fi network and a cellular network. During the handoff, a user of a mobility client may be sending media streams through the two different connections. In an embodiment of the invention, the mobility server may include a buffer system, which may be configured to buffer the media data streams (e.g., audio or video data packets) that may be received by the mobility system during the handoff period. With the buffer system, the mobility server may be able to prevent incoming media data streams from being forwarded to the destination device until the mobility server has an opportunity to modulate the media data streams.

In an embodiment of the invention, the mobility server may also include a cross-correlation module. With the cross-correlation module, the mobility server may handle overlap of media data streams that may occur during a handoff. In an embodiment, with an overlap, the cross-correlation module may perform auto-correlation to determine a substantial match between the first media data set of packets and the second media data set of packets. Set of packets may include at least one or more packets.

Once the match has been determined, in an embodiment, the cross-correlation module may generate a cross-correlated media data set of packets by including a section of the first media data set of packets and the second set of media data packets. In an example, the end section of a first media data set of packets, which may be coming through a Wi-Fi network connection, and a head section of a second media data set of packets, which may be coming through a cellular network, may be combined to generate the cross-correlated media data set of packets.

By employing a cross-correlated module and an overlap and add module, the mobility server may create a transition media data set of packets that may provide the user of the destination device with a positive telecommunication experience by minimizing or removing the problems related to overlap of media streams, such as echo and noises.

In an embodiment, a mobility server may also include a synthesizer module, which may be employed to handle gap that may exist between two media data streams. With a synthesizer module, the mobility server may model a section of a buffered first media data set of packets to cover the gap that may exist between the first and second media data streams during a handoff. In an example, a gap (i.e., time interval) may exist between the receipt of the first media data set of packets from a Wi-Fi network and a second media data set of packets from a cellular network. In an embodiment, to handle the gap, the mobility server may employ a synthesizer module to synthesize a section of the first media data set of packets to generate a synthesized media data set of packets.

In an embodiment, a mobility server may also include an extension module, which may also be employed to handle gap that may exist between two media data streams. With an extension module, the mobility server may extend a section of a media data set of packets to create a new extended media data set of packets. In an embodiment, a silence set of packets may be (periodically) inserted between data packets of at least a section of the first media data set of packets.

In an embodiment, the extension module may be employed with the synthesizer module to handle the gap. In an example, the mobility server may first employ the synthesizer module to synthesize the first media data set of packets. However, if the gap is too large, then the mobility server may also employ the extension module to extend a section of the first media data set of packets.

In an embodiment of the invention, the mobility server may include an overlap and add module configured to generate a transition media data set of packet, which may include at least one of the cross-correlated media data set of packets, the synthesized media data set of data packets, and the extended media data set of packets to modify an overlap of media data or to fill a gap between media data in the handoff. The overlap and add module may also execute one or more well-known pattern matching algorithms to smooth the modification of the media data stream.

In an embodiment, the mobility system may also include a signal level control module configured to adjust the signal level of a transition media data set of packets. The transition media data set may include at least one of the cross-correlated media data set of packets, the synthesized media data set of packets, and the extended media data set of packets. The transition media data set of packets may further include data packets that the mobility system may receive through the new connection (e.g., cellular network) after the handoff. The signal level may be adjusted to approximate the signal level of the first media data set of packets. As a result, the unexpected and unpleasant change in voice volume may be substantially eliminated enabling the user of the mobile telecommunication device, such as a mobility client, for example, to continue to have the same telecommunication experience as before the handoff.

By employing a combination of the cross-correlation module, the synthesizer module, the extension module, the overlap and add module, and the signal control level module, the mobility server may generate an enhance media data that may provide the user of the destination device with a positive telecommunication experience by minimizing or removing the problems that has conventionally been encountered during a handoff. Thus, the user may now have a positive telecommunication experience with substantially no silence, noises, glitches, echoes, or reverberation.

Further features and advantages of the present invention may be better understood with reference to the figures and discussions that follow.

Figure 45:
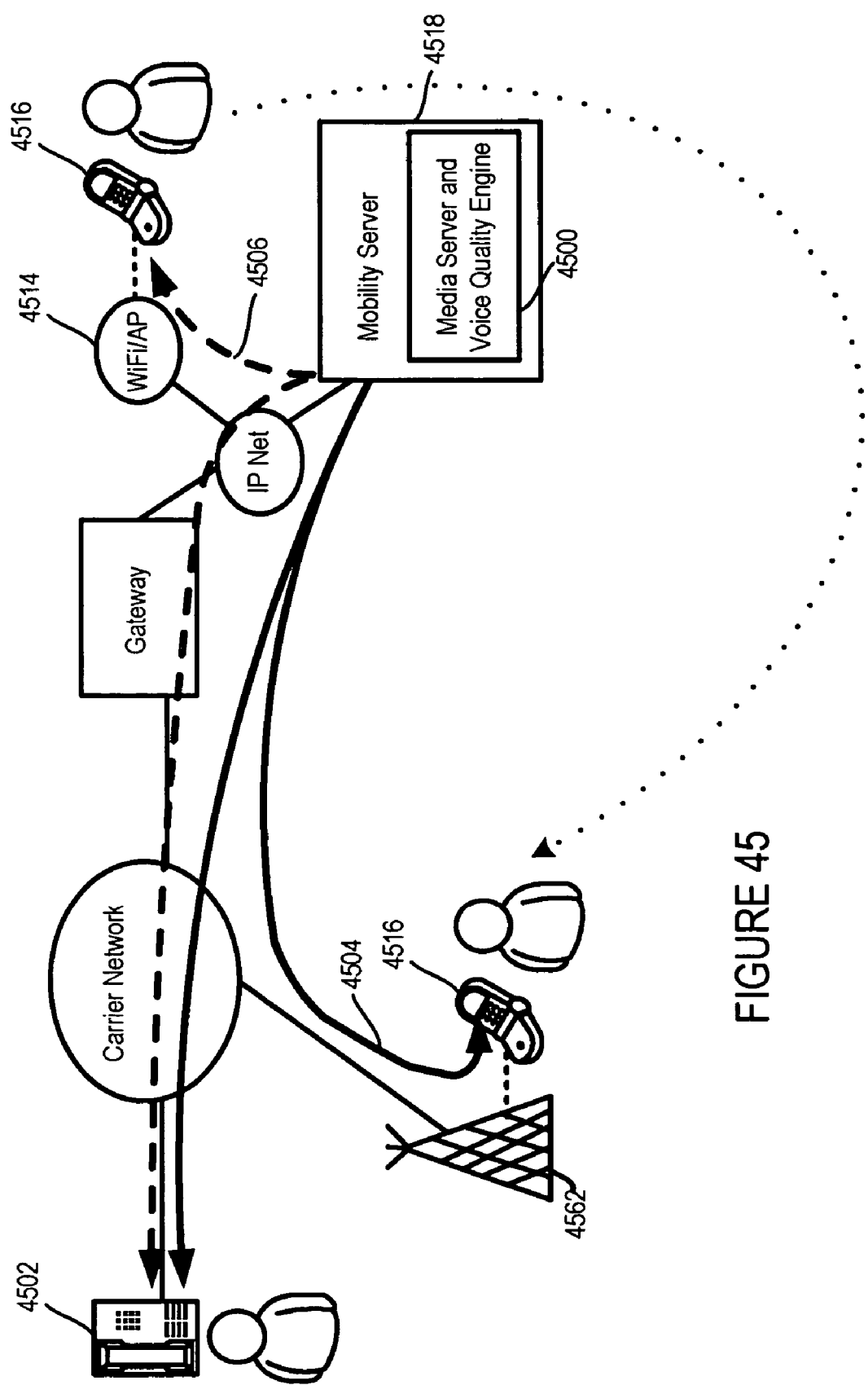
FIG. 45 illustrates, in accordance with one or more embodiments of the present invention, an arrangement for processing media data during a handoff in wireless communication.
Figure 46A:
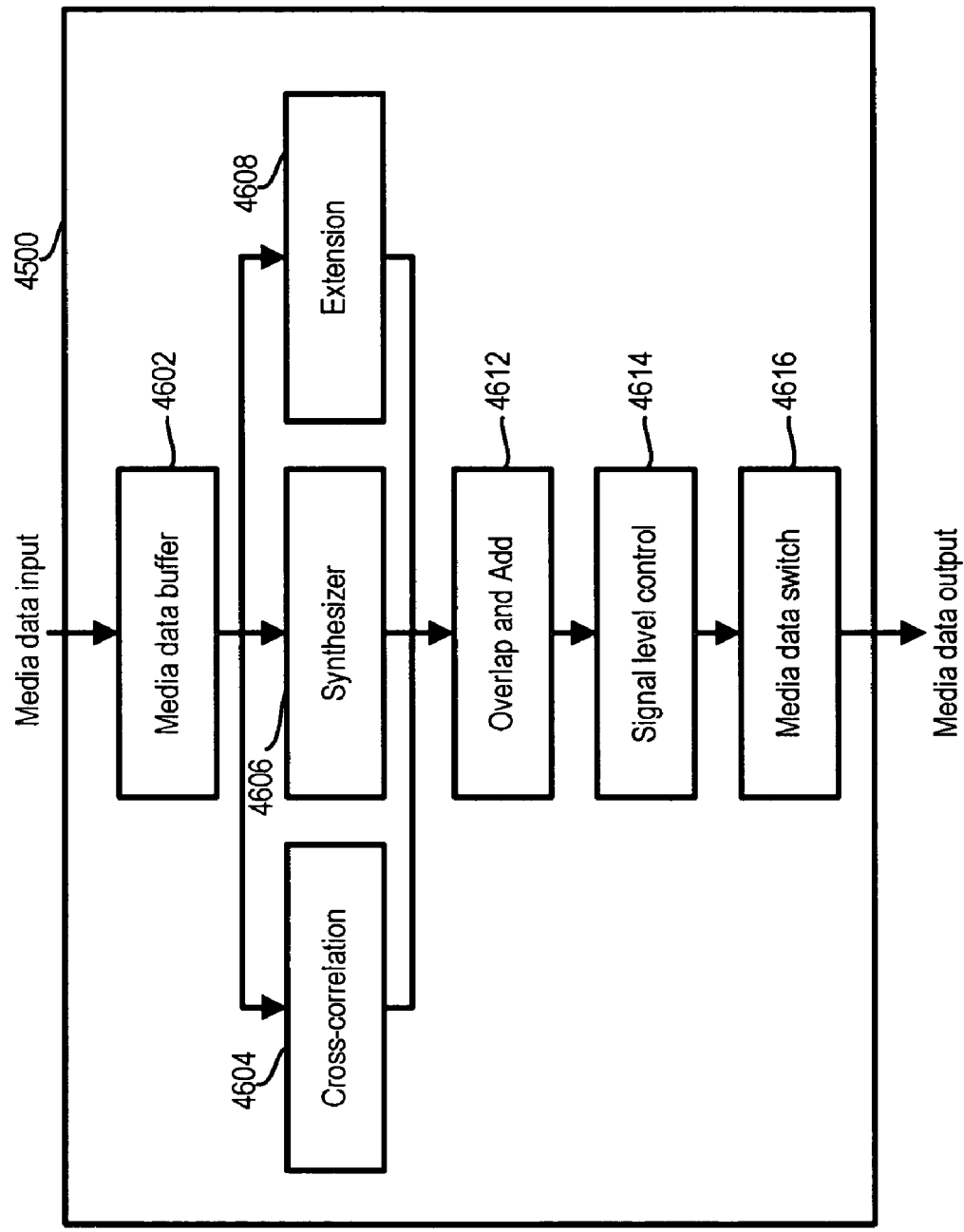
FIG. 46A shows, in accordance with one or more embodiments of the present invention, an architectural block diagram of a media server and voice quality engine module.

FIG. 45 illustrates, in accordance with one or more embodiments of the present invention, an arrangement for processing media data during a handoff in wireless communication. In the arrangement, both outgoing media data and incoming media data of a mobility client 4516 are routed through a mobility server 4518. During a telecommunication session with another party such as, for example, an outside telephone 4502 or a streaming media server, mobility client 4516 may perform a handoff, for example, from a Wi-Fi network 4514 to a cellular network 4562. Mobility server 4518 may include a media server and voice quality engine module 4500, which may be employed to modulate the media data streams (e.g., first media data 4506 transmitted through Wi-Fi 4514 and second media data 4504 transmitted through cellular network 4562) during a handoff FIG. 46A shows, in accordance with one or more embodiments of the present invention, an architectural block diagram of media server and voice quality engine module 4500. FIG. 46A will be discussed in relation to FIG. 45. Mobility server 4518 may employ media server and voice quality engine module 4500 to process media data during a handoff. When mobility client 4516 performs a handoff between networks, media server and voice quality engine module 4500 may process first media data 4506 received from Wi-Fi network 4514 and second media data 4504 received from cellular network 4562 to enhance the telecommunication experience of both parties.

Consider the situation wherein, for example, a first media data set of packets from first media data 4506 and a second media data set of packets from second media data 4504 have been received by media server and voice quality engine module 4500.

In an embodiment, media server and voice quality engine module 4500 may include a media data buffer 4602. During a handoff, media data buffer 4602 may be configured to receive and buffer media data input (e.g., first media data set of packets and second media data set of packets) for subsequent processing. Media data input may include a set of data packets. The data packets may include, but are not limited to, text, audio, image, and/or video signals.

In an embodiment, media server and voice quality engine module 4500 may include a cross-correlation module 4604. Cross-correlation module 4604 may perform cross-correlation if both the first media data set of packets and the second media set of packets are received during the handoff Cross-correlation module 4604 may perform cross-correlation to determine a substantial match between the first media data set of packets and the second media data set of packets.

In an example, the first media data set of packets may include 5 data packets and the second media data set of packets may include 1 data packet. By employing cross-correlation, cross-correlation module 4604 may determine that the packet in the second media data set of packet may match with the fifth data packet of first media data set of packets. Further, cross-correlation module 4604 may determine that the best match may be at a lag value of 50, assuming that the two packets are of 100 bytes.

Figure 46B:
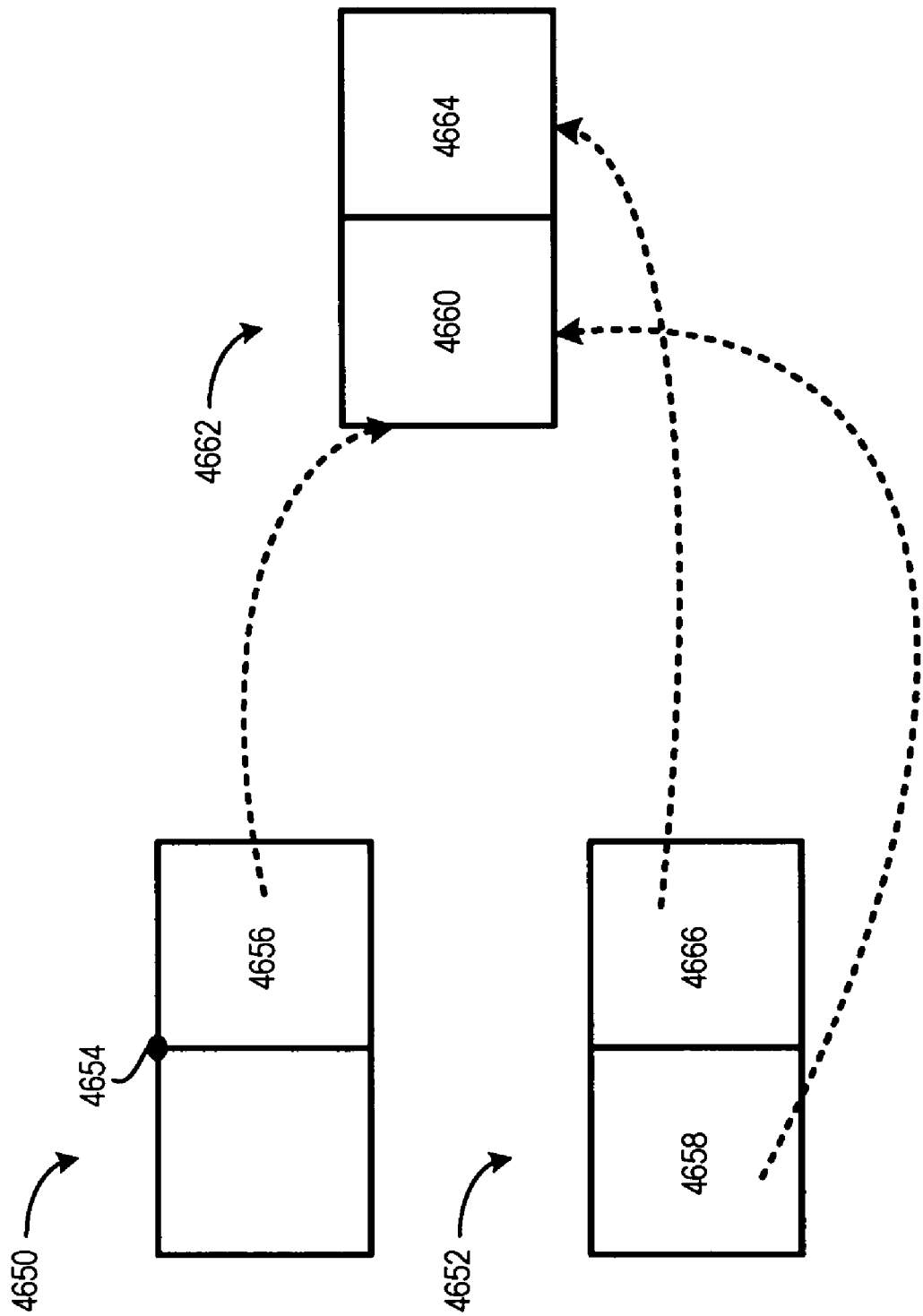
FIG. 46B shows, in an embodiment, a block diagram illustrating an example of a method for generating a cross-correlated media data set of packets.

With a match and the lag value, cross-correlation module 4604 may generate a cross-correlated media data set of packets. FIG. 46B shows, in an embodiment, a block diagram illustrating an example of a method for generating a cross-correlated media data set of packets. A first data packet 4650 represents the fifth data packet from the first media data set of packets. A second data packet 4652 represents the data packet from the second media data set of packets. By employing cross-correlation, cross-correlation module 4604 may have determined that second data packet 4652 and first data packet 4650 may be best matched at a point 4654, which may represent a lag value of 50. In other words, from point 4654 onward, the quality of data packet 4650 may be degrading while the quality of data packet 4652 may be improving. Thus, the last 50 bytes (assuming 100 bytes in each of the two data packets in this example), which is represented by a block 4656, of first data packet 4650 may be combined with the first 50 bytes, which is represented by a block 4658, of second data packet 4652 to form a block 4660 on a new data packet 4662. A second block 4664 of new data packet 4662 may be formed from a block 4666 of second data packet 4650. Thus, new data packet 4662 may now replace the fifth data packet of the buffered first media data set of packets that will be sent to the destination device.

Consider the situation wherein, for example, a gap exists between the receipt of a first media data set of packets and receipt of a second media data set of packets. In an embodiment, media server and voice quality engine module 4500 may include a synthesizer module 4606, which may be employed to handle the gap. Synthesizer module 4606 may be configured to synthesize a section of the first media data set of packets to generate a synthesized media data set of packets. In an embodiment, synthesized media data set of packets may generate if no media data is received from the new network (e.g., cellular network 4562) within a threshold. The threshold may represent a time limit or a maximum count of missing data packets beyond which the synthesized media data set may not effectively and/or sufficiently fill the gap to provide a satisfactory user experience. Media server and voice quality engine 4500 may include a timer and/or a data packet counter for determining whether the threshold has been met, in an embodiment.

In an embodiment, media server and voice quality engine module 4500 may include an extension module 4608, which may also be employed to handle the gap. Extension module 4608 may be configured to extend at least a portion of the first media data set of packets to generate an extended media data set. The extended media data set may contain data packets of at least a section of the first media data set of packets and silence data packets, in an embodiment. The extended media data set may be generated if no media data is received through the second network (e.g., cellular network 4562) within a threshold.

In an embodiment, extension module 4608 may be implemented in combination with synthesizer module 4606. In an example, the gap may be extensive. To handle the gap, mobility server 4518 may first employ synthesized module 4606 to generate one or more synthesized media set of packets to handle the gap. If the threshold for synthesized module 4606 has been met and the gap has not been sufficiently handled, then mobility server 4518 may employ extension module 4608 to create one or more extended media data set of packets to handle the gap.

In an embodiment, media server and voice quality engine module 4500 may include an overlap and add module 4612, which may be employed to generate a transition media data set of packets by including at least one of cross-correlated media data set, the synthesized media data set, and the extended media data set. In an embodiment, overlap and add module 4612 may generate the new transition media data set of packets by including the cross-correlated media data set with a section of the first media data set of packets. Referring back to FIG. 46B, the first 4 packets from the first media data set of packets and the newly created data packet 4662 may be combined to create the new transition media data set of packets.

In another embodiment, overlap and add module 4612 may also create the new transition data set of packets by including the synthesized media data set of packets and/or the extended media data set of packets.

In addition, overlap and add module 4612 may include one or more well-known smoothing algorithms such as linear ramping up and down that may be employed to smooth the new transition media data set of packets.

In an embodiment, media server and voice quality engine 4500 may include a signal level control module 4614, which may be configured to adjust the signal level of a transition media data set of packets to generate a scaled media data set.

Signal level control module 4614 may also be configured to adjust the signal level of the second media data stream. In one or more embodiments, signal level control module 4614 may execute a well known automatic gain control algorithm.

In an embodiment, media server and voice quality engine 4500 may also include a media data switch 4616 configured to output the scaled media data set of packets.

Figure 47:
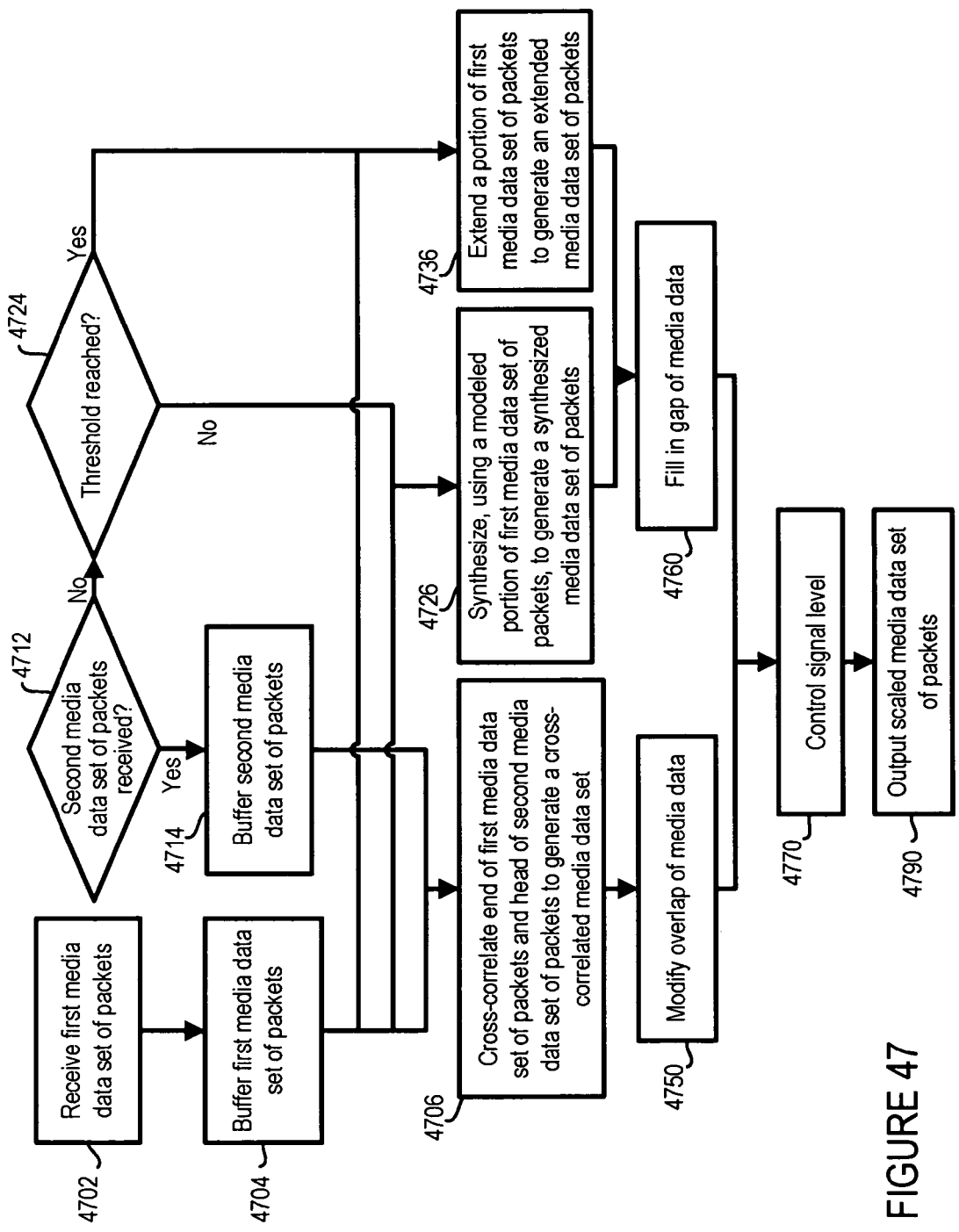
FIG. 47 shows, in accordance with one or more embodiments of the present invention, a flowchart of a method for processing media data during a handoff of a mobile telecommunication device between networks.

FIG. 47 shows, in accordance with one or more embodiments of the present invention, a flowchart of a method for processing media data during a handoff of a mobile telecommunication device between networks. FIG. 47 will be discussed in relation to FIGS. 45 and 46. Consider the situation wherein, for example, the user of mobility client 4516 may roam from a coverage area supported by Wi-Fi 4514 into a coverage area supported by cellular network 4562. The method may be performed by implementing a media server and voice quality engine 4500 (FIG. 45).

At a first step 4702, media server and voice quality engine 4500 may receive a first media data set of packets via Wi-Fi network 4514. At a next step 4704, media data buffer 4704 may buffer the first media data set of packets. In one or more embodiments, media server and voice quality engine 4500 may start buffering the first media data set upon imminence of the handoff. The imminence of the handoff may be detected by the mobile telecommunication device and/or a mobility server, in an embodiment. In one or more embodiments, media server and voice quality engine 4500 may start buffering the first media data set when the handoff starts.

Once the first media data set of packets have been received and buffered, media server and voice quality engine 4500 may begin a timer and/or counter in anticipation of receiving a second media data set of packets from cellular network 4562.

At a next step 4712, media server and voice quality engine 4500 may determine if the second media data set of packets have been received. The second media data set may include silence data packets as well as data packets that contain text, audio, and/or video signals. If a second media data set of packets has been received, then an overlap has occurred and the method may proceed to a next step 4714.

At next step 4714, media server and voice quality engine 4500 may buffer the second media data set of packets.

At next step 4706, cross-correlation module 4604 may be employed to cross-correlate the two media data set of packets to determine a match between the two media data set of packets. In an embodiment, cross-correlation module 4604 may perform auto-correlation to determine a match between the first and second media data set of packets. In an embodiment, an end portion of the first media data set of packets and a head portion of the second media data set of packets may be employed to generate a cross-correlated media data set. In an embodiment, the end portion of the first media data set and the head portion of the second media data set may be of the same bytes size, which may be determined based on the match between the first media data set and the second media data set. A lag value that defines the size may be determined using one or more well known methods such as pitch detection.

At a next step 4750, mobility server 4518 may employ overlap and add module 4612 to create a new transition media data packet by modifying the first media data set of packets to include the cross-correlated media data set of packets. In one or more embodiments, media server and voice quality engine 4500 may replace at least a portion of the overlap of media data with the cross-correlated media data set. In an embodiment, one or more well-known algorithm such as linear ramping up and down may be employed to smooth the modification.

At a next step 4770, the signal level of the transition media data set of packets may be adjusted to account for the signal level change that may occur during a handoff. In an example, signal level may decrease when a user on a mobile telecommunication device roams from a Wi-Fi network to a cellular network. By employing a signal level control module, the signal level from the new connection may be adjusted to substantially match the signal level prior to the handoff. Refers to FIG. 48 for the discussion about how signal level may be adjusted.

Once the signal level has been adjusted, a new scaled media data set of packets may be generated. At a next step 4790, the scaled media data set of packets may be forwarded to the destination device via a media switch.

Returning back to next step 4712, if a second media data set of packets is not received by mobility server 4518, at a next step 4724, media server and voice quality engine module 4500 may determine if a threshold has been reached. In an embodiment, the threshold may represent a time limit and/or a count of missing data packets.

If the threshold has not been reached, then at a next step 4726, media server and voice quality engine module 4500 may employ a modeled portion of the first media data set of packets to generate a synthesized media data set. The modeled portion may represent, in an embodiment, the last several data packets of the first media set of packets. The modeled portion may be selected based on the characteristics of the data packets in the first media data set of packets using one or more well known methods such as pitch detection. The synthesized media data set may be generated using one or more well-known methods such as linear predictive model.

Referring back to next step 4724, if the threshold has been reached, then at a next step 4736, media server and voice quality engine module 4500 may employ extension module 4608 to generate an extended media data set of packets. The extended media data set of packets may be generated using one or more well known methods such as, for example, periodically inserting one or more silence data packets into at least a portion of the first media data set of packets In an embodiment, the extension module may be employed when the gap is so large that one or more synthesized media data may not effectively and/or sufficiently fill the gap produced during the handoff to provide a satisfactory user experience.

At a next step 4760, overlap and add module 4612 may manage the gap during the handoff by utilizing at least one of the synthesized media data set and/or the extended media data set to create a new transition media data set of packets. Overlap and add module 4612 may execute one or more well-known smoothing schemes such as linear ramping up and down to smooth the modification. By employing the synthesized media data set of packets and/or the extended media data set of packets, one or more silence and noises caused by the gap may be substantially reduced or eliminated.

Again at next step 4770, signal level control 4614 may adjust the signal level of a transition media data set of packets to generate a scaled media data set. By adjusting the signal levels, the user may experience a substantially consistent signal level, (e.g., voice volume) during the handoff.

At a step 4790, media server and voice quality engine module 4500 may output the scaled media data set, which may be sent to the destination device.

Figure 48:
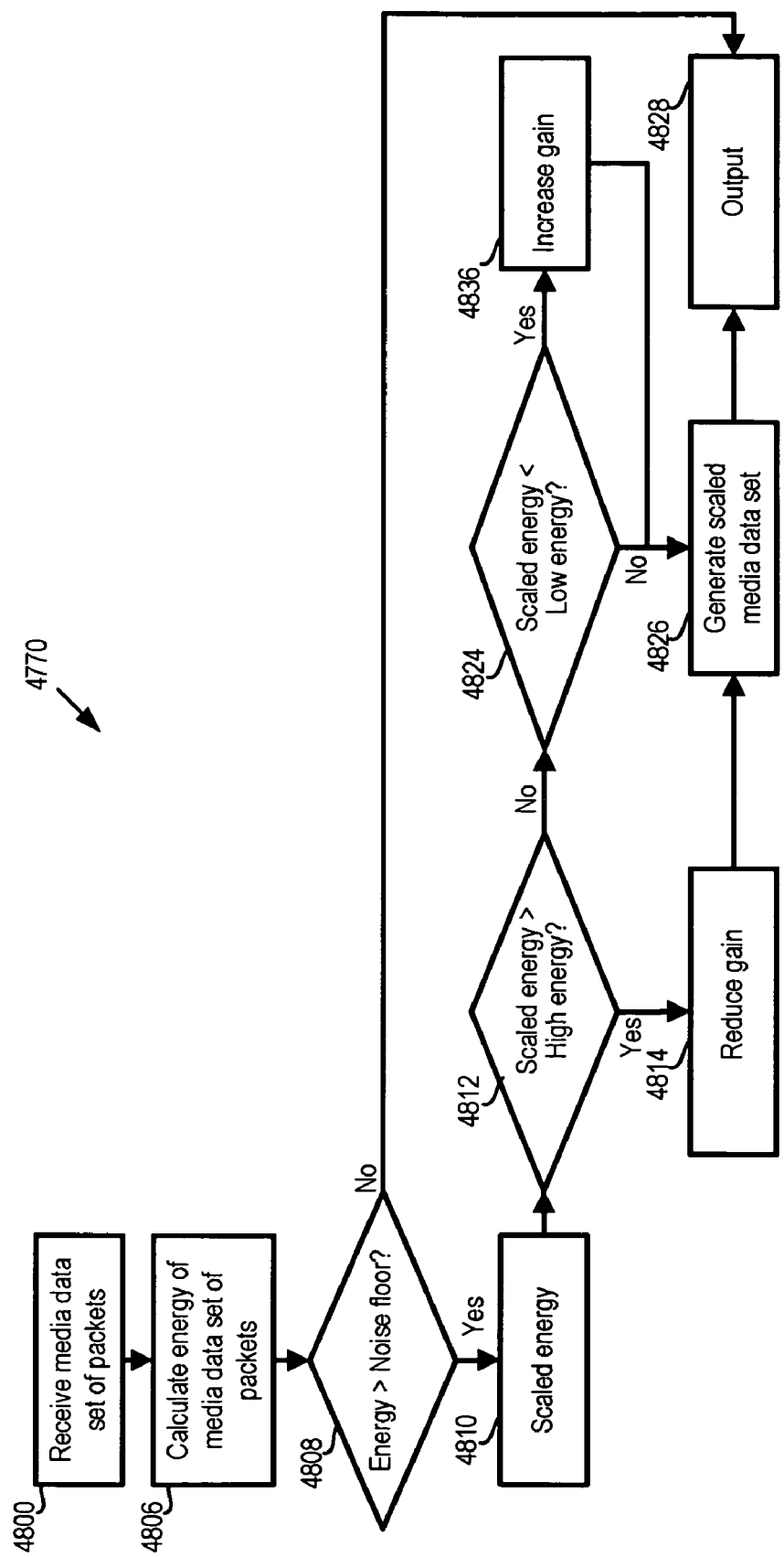
FIG. 48 shows, in accordance with one or more embodiments of the present invention, a flowchart of a method for controlling signal levels of a mobile telecommunication device during a handoff

FIG. 48 shows, in accordance with one or more embodiments of the present invention, a flowchart of a method for controlling signal levels of a mobile telecommunication device during a handoff. The method may represent step 4770 shown in FIG. 47 and may be performed by a signal level control module such as, for example, signal level control module 4614 shown in FIG. 46*a*.

At a first step 4800, signal level control module 4614 may receive a media data set of packets. In an embodiment, the media data set of packets may represent the transition media data set of packets generated by overlap and add module 4612. In another embodiment, the media data set of packets may represent the second media data set of packets from the second media data steam.

At a next step 4806, signal level control module 4614 may calculate the energy of the media data set, for example, by summing the absolute values of the signal amplitudes of the media data set. In an embodiment, the square values may be used in place of the absolute values.

At a next step 4808, signal level control module 4614 may determine whether or not the energy of the media data set is greater than the noise floor. If the energy is not greater than the noise floor, the media data set may be considered background noise, and control may be transferred to step 4828, in which the media data set is transmitted as an output of signal level control module 4614.

However, if the energy is greater than the noise floor, then at a next step 4810, signal level control module 4614 may scale the energy of the media data set. In an example, the energy may be scaled by averaging the energy signal levels in the media data set to generate a scaled energy.

At a next step 4812, signal level control module 4614 may determine whether the scaled energy is greater than a high energy. In an embodiment, the high energy may represent the upper limit of an energy range for the first media data set of packets. In an embodiment the energy range for each of the telecommunication device may be determined empirically.

If the scaled energy is greater than the high energy, then at a next step 4814, signal level control module 4614 may provide a reduced gain to decrease the energy of the media data set. In an example, the transition media data set of packet may be louder than the upper limit; thus, the volume of the transition media data set of packets may be reduced in order to eliminate the unexpected and unpleasant increase in volume the user at the destination device may experience upon receiving the media data.

If at next step 4812, the scaled energy was less than the high energy, then at a next step 4824, signal level control module 4614 may further determine whether the scaled energy is less than a low energy. In an embodiment, the low energy may represent the lower limit of the above mentioned energy range for the first media data set of packets. If the scaled energy is less than the low energy, then at a next step 4836, signal level control module 4614 may provide an increased gain to augment the energy of the media data set. In an example, the transition media data set of packet may be softer than the lowest limit, thus, the volume of the transition media data set of packets may be increased in order to eliminate the inconvenience of increasing the speaker volume the user at the destination device may have to perform to hear the incoming media data.

At a next step 4826, signal level control 4614 may generate a scaled media data set with a signal level that is comparable to the range of the first media data stream.

At next step 4828, signal level control 4614 may output the scaled media data set, for example, to media data switch 4616 (shown in FIG. 46A), which may then route the media data to the destination device.

As can be appreciated from the forgoing, one or more embodiments of the present invention provide a wireless communication system capable of handling the overlaps and gaps that may occur during a handoff. By implementing a variety of methods, such as cross-correlation, synthesizing, and extension, the wireless communication system enhances a user's telecommunication experience by substantially eliminating noises, glitches, echoes and the like. Further, the wireless communication system makes adjustment for the change in signal level that may happen when handoff occurs, thus substantially eliminating the unpleasant experience that may occur when signal level unexpectedly changes.

C. Automatically Setup of Point-to-Point and Point-to-Multipoint Multi-Media Conference Calls with Administrator and User Controlled Rules and Preferences (Rendezvous Calling)

Figure 5A:
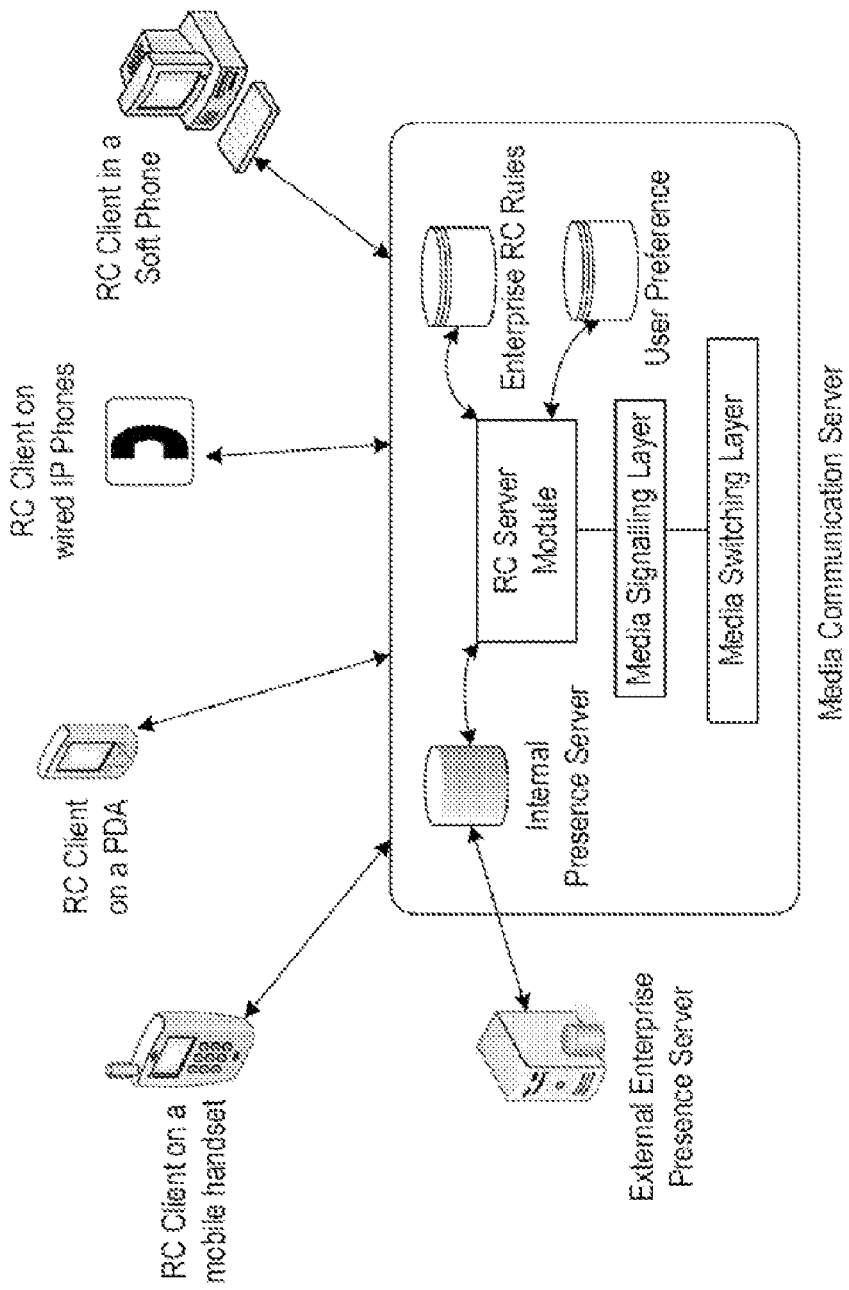
FIG. 5A depicts an overview of the rendezvous calling (RC) architecture.
Figure 5B:
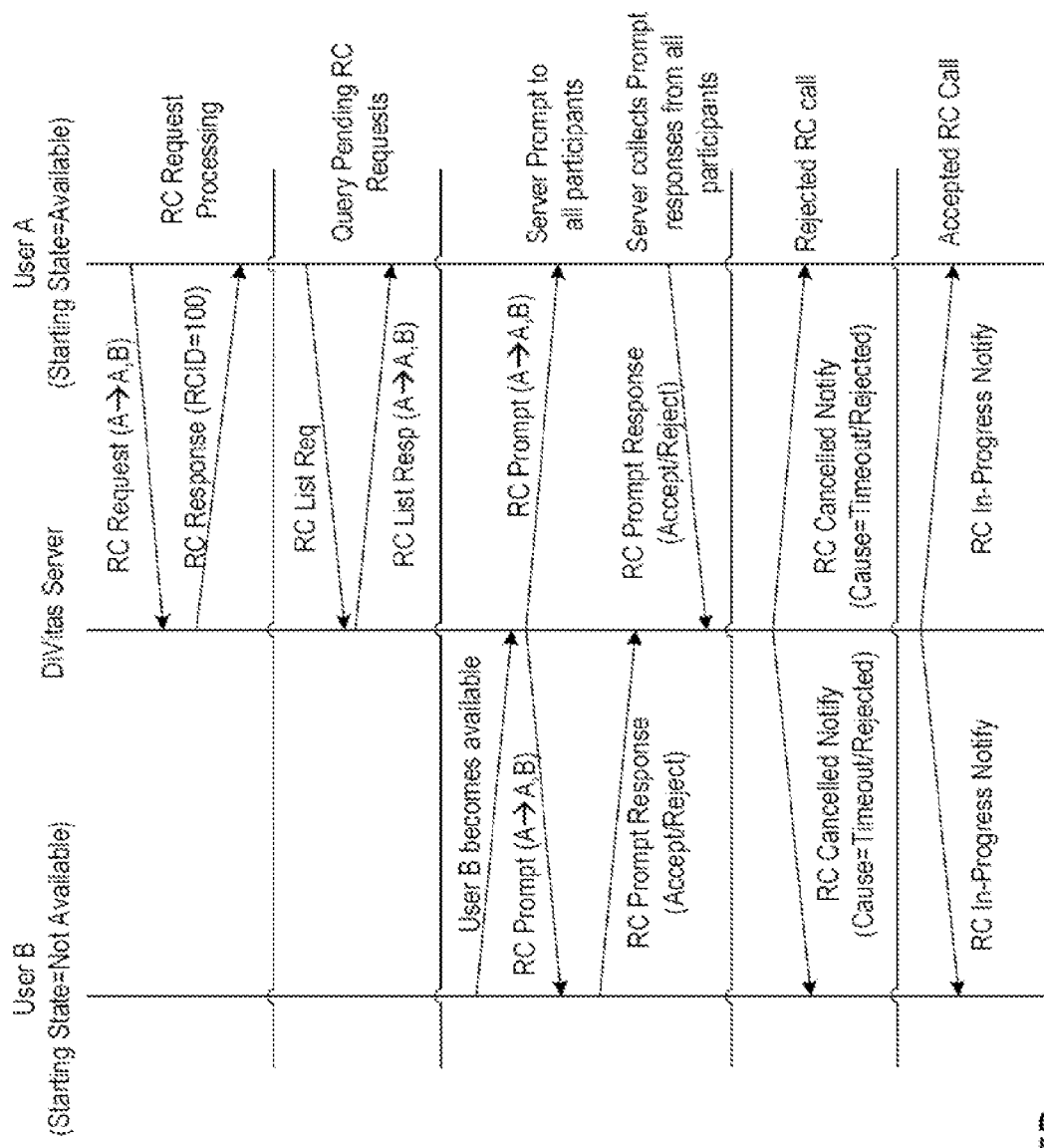
FIG. 5B depicts message exchanges between the RS Client and the RC capable Media Communication Server.

1. This invention is applicable to the field of point-to-point and point-to-multipoint multi-media conferencing using media communication servers. FIGS. 5A-B depict a method in the media communication server to automatically setup point-to-point and point-to-multipoint multi-media conference calls with administrator and user controlled rules and preferences.

2. The current mechanism for setting up PP or PMP media calls is not driven based on any user state or preference. If one or more of the participants is unavailable, the media server will allow the chairperson to leave a voice mail. The only course of action will be for the chairperson to keep trying until all the participants are available or to rely on one or more of the participants to call back and then attempt the conference at later point in time. This process is inefficient and takes up time and resources and is often difficult to manage. The only mechanism is to plan and schedule the conference ahead of time such that all the participants will be available—however there is no guarantee that they will be available at the time of the call. The above issues stem from the lack of coordination and information exchange between the presence servers and the media communication severs in an enterprise.

3. Rendezvous Calling (RC) enables a user to setup a point-to-point (PP) or a point-to-multipoint (PMP) media call (could be voice, video or multimedia) without having to specify the time—the media communications server determines the time of call establishment based on the availability (determined by a variety of factors including presence information, network availability etc.) of all the participants involved and prompts all the participants before setting up the requested call. The notion of availability can be greatly enhanced to take a number of user driven parameters into consideration, thereby enabling the media communications server to take a much more precise decision on when to place the call based on all the participant's preferences. Some of these additional preferences and rules include network administrator controlled rules, user preferences based on time, medium choice, call participants, call priorities etc.

4. Advantages of the invention include

Setup and establishment of PP and PMP conference calls that are automatically scheduled taking all the enterprise rules, participant preferences and availability into consideration.

Effective and efficient communication within the enterprise as a result of calls being established at the right moment instead of relying on voice mails for priority-based communications.

6. Overall Architecture

FIG. 5A gives a very high level overview of the RC architecture. The RC architecture has components in the media communication server as well as the RC client. The client in this case could be handsets, soft phones, PDAs etc. The RC client is responsible for managing the user interface to the user and to place a RC Request. It also allows the user to query and track his/her pending RC requests. The RC client will also allow the user to convert a normal PP or PMP call to a RC request if one or more of the participant(s) is deemed "unavailable". Similarly, when the server does setup a RC call, the client will prompt the user and respond accordingly based on the user feedback. On the server side, the RC logic involves collection and correlation of information from the presence server as well as enterprise applicable rules as configured by the administrator and the user's preferences as configured by the individual users.

When a user places a PP or PMP call from a client, the client software will check the availability of the participants and will prompt the user if one or more of the participants are unavailable as to whether they would like to make it a RC request. The user can also specify for how long he/she would like keep this request pending. The media communications server will track the RC request. When the server concludes that all the participants are available, it will prompt everyone whether they want to go ahead with the call or not. If all the participants acknowledge successfully, the call will be placed. If any of the participants rejects the request, the RC call will be failed and all the participants will be informed of the result. The users can also query the list of pending RC calls (ones they originated as well as the ones on which they are participants) and cancel any requests that they had originated. The server will also employ enterprise as well as user defined rules in determining the best time to go ahead with the call.

7. Administrator and participant rules and preferences for RC

Availability and RC setup decisions are based on a variety of user and administrator controlled rules and preferences.

The following rules and preferences can be used in deciding participant availability before a RC is placed.

Participant opt-out preference for any RC service. The participant can opt out completely or specify time periods when the participant does (or does not) wish to entertain RC calls.

Participant preferences—based on RC priority, RC owner, participant list, time of day, network preference (enterprise Wi-Fi, public Wi-Fi, Cellular etc.), Outlook calendar schedules etc.

Users personal "Allow" and "Block" user lists for limiting the RC calls they would like to participate in.

RC chairperson preference for a time window when the call should be placed.

Administrator controller enterprise rules—cellular privileges for RC, user's RC privileges etc.

8. Logic in the media communication server to schedule and place RC calls.

The logic employed in the media communication server to process and setup is controlled by a variety of factors.

Integration of the presence server in the media communication server with the enterprise and participant driven rules and preferences for determining participant availability and time to place RC.

Support for mandatory and optional participant list for RC.

Ability for participants to early-accept or early-reject a RC. A user can unconditionally accept or reject a RC request even before the RC is setup by the media communication server.

Integration with the Outlook program to use its calendar as an input for the availability decision logic as well as the participant's calendar to reflect the RC call status and any pending RC requests.

Ability to place the RC based on request priority in addition to availability and time of request.

Allow optional RC calls to be placed even when certain participants are busy—using call-waiting to inform and invite them to the RC.

When the server receives a RC Request, a validation check is done to make sure that all the participants involved have signed on for RC services. In addition, the server also checks to make sure no performance impacting thresholds have crossed. If a valid RC request, the server will queue it up and send a RC Response with the status as well as a RC Id associated with that request. If the RC request is found to be invalid or a request that cannot be accepted, the server will send a RC Response with the failure cause back to the originator.

In the event all the participants are available at that instance, the server will process this request like any other PP or PMP call—the media path will be established and a successful RC Response message with the status sent to the originator.

The RC server will periodically go through the list of outstanding RC requests to determine if any of them are ready for call setup. The flow chart in FIG. 2 captures the logic that is employed by the media communication server to select the RC Requests that are eligible for setup.

Once the list of RC requests that eligible for setup is determined the RC capable media communication server will begin the process of setting up the individual media paths. For all participants involved in the call, send a RC Prompt message. The RC prompt will contain the details about the chairperson, the list of participants, call summary etc. The server will collect the RC Prompt Responses that come back from the clients. It will also keep track of any messages that are sent by the participants. If any of the participants had rejected the RC prompt or there was timeout (lack of response from a client), the server will conclude it is a failed RC call attempt and will send a RC Cancelled Notify to all the participants who responded and the chairperson informing them about the cancelled call as well as the response from the users if any. In the event that all the participants accepted the call, the RC server will put together a PP/PMP request with all the information the media-switching layer requires and will forward this request to the media-switching layer to setup the call. It will also send a RC In-Progress Notification to all the participants about the call being setup 9. Conclusion The service provided by the RC media communication server will make the task of communicating within the enterprise more effective and will save time for employees who have to depend less on voice mail. This is especially true for employees who are mobile and not tied to a desk phone. The media communication server will take the mobility aspects into consideration while determining the optimum time for placing the conference call.

10. Advantages of the invention include

Efficient setup and establishment of PP and PMP conference calls that are automatically scheduled taking all the enterprise rules, participant preferences and availability into consideration.

Effective and efficient communication with in the enterprise because of calls being established at the right moment instead of relying on voice mails to get back and forth and constant calling to check availability. This is all the more true for a work force that is mobile and is not tethered to desk phones.

Capability in the client to provide an option to convert a simple PP or PMP call to a RC request if one or more participants are not available at that time in addition to the standard voice mail service.

Integration of the enterprise presence server in the media communication server with enterprise rules and user preferences.

Integration with Outlook and other calendar programs to let the media communication server manage the conference calls just like meetings.

11. The introduction of logic in the media communication servers to take users availability and preference while pacing a conference all will result in fewer failed call attempts and will also ensure that the calls placed meet their desired objective with all the participants present. This method allows the media communication server to correlate the presence information from the presence server with the administrator controlled enterprise rules and the user controlled user preferences in coming up with the optimum time to place a PP or PMP conference call. This logic in deciding the optimum time results in effective conferencing within the organization and will also save time and money spent in proving this service.

12. RC Client Technical Specifications

Figure 5C:
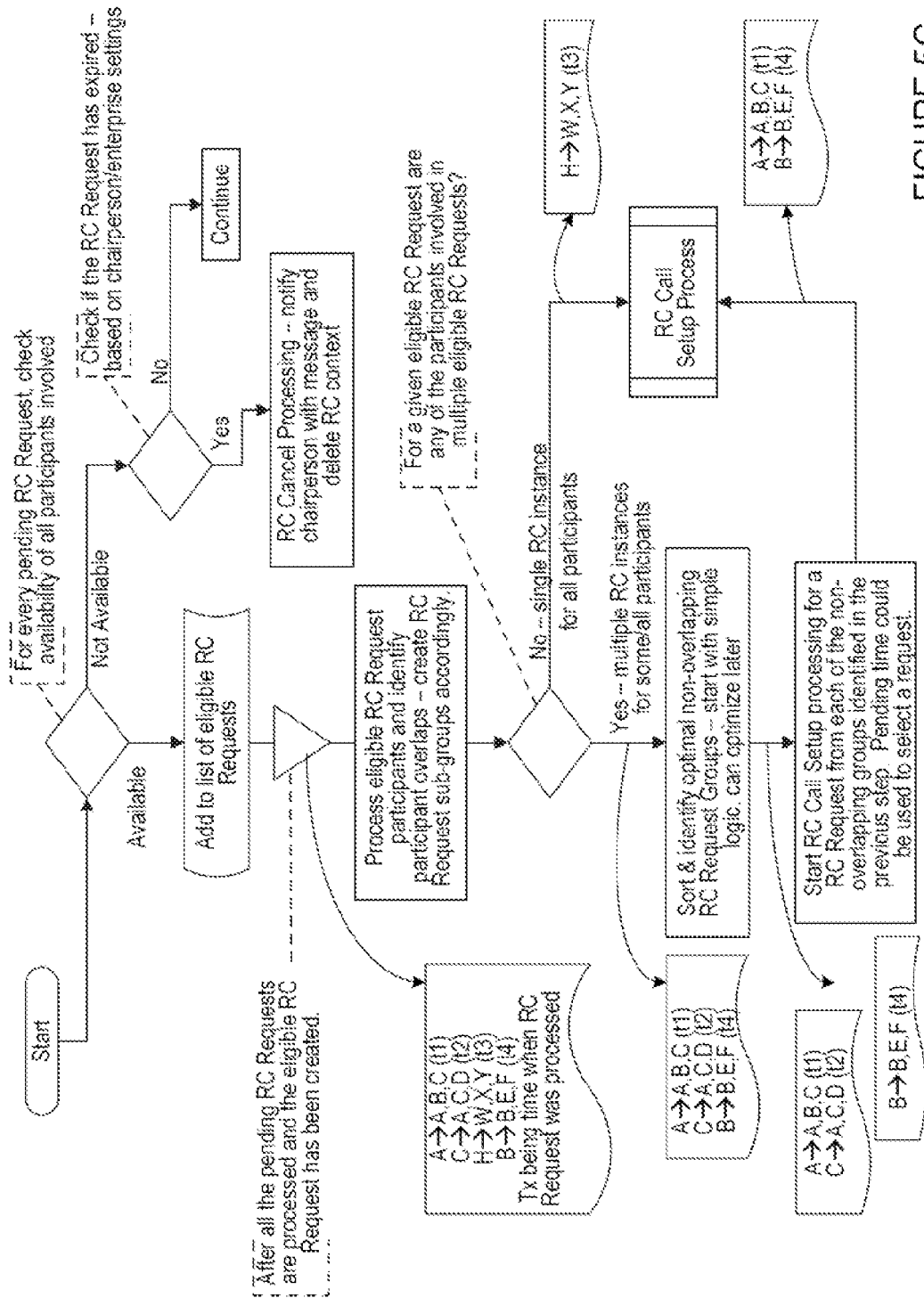
FIG. 5CA is a flowchart showing logic employed in the Media Communication Server for RC processing.

The diagram in FIG. 5B gives a very high-level time line for the message exchange between the clients and the media communication server during the course of setting up a RC request and the subsequent establishment of the RC. The following actions will be supported on the RC client for RC capability.

a. RC Request Processing
   b. RC Response Processing
   c. List and modify/cancel outstanding RC requests
   d. Early response (accept/Reject) for outstanding RC requests
   e. RC Prompt message processing
   f. RC In-Progress and RC-Cancel Notify message processing 13. RC Server Technical Specifications The diagram in FIG. 5C captures the core logic that is employed by the RC server to support this functionality.

a. RC Request processing
   b. Automatic conversion from standard PP and PMP call to RC Request based on participant unavailability and preference.
   c. Periodic RC Request processing—timers and selecting RC requests to setup based on all the criteria specified before.
   d. Presenting RC Prompt and collecting responses as part of RC call setup.
   e. RC media path setup.

To elaborate, embodiments of the invention relate to teleconferencing management. In the prior art, the setting up of a teleconference is a tedious, manual and time-consuming task, requiring the participation of a human being and a lot of patience. For example, if there are five participants, one of the participants or his/her assistant (referred to herein as "the facilitator") must take the initiative to set up the teleconference ahead via email or IM or another communication means such as telephone or in person with the participants to obtain an agreement pertaining to the teleconference time and method.

For example, the human facilitator may employ an email program to access the calendar of each participant if such a shared calendar is in fact available. Then the facilitator must set up an appointment for each of the participants and obtain their agreement as to the teleconference time and method. Once all parties consent, the facilitator would set up a teleconference facility, typically with the telephone service provider or by designating one of the participants to be the teleconference leader responsible for teleconferencing others in when the designated time to hold the teleconference arrives.

When the time to conduct the teleconference arrives, each participant is then responsible for calling in to the designated telephone number that the facilitator has set up so that he/she can participate in the teleconference. If the participant does not know how to call in and/or unfamiliar with the procedure to enter the requisite user id/password, more time is wasted to assist that participant in making the teleconference call. This is often the case when one of the participants is calling from another country and may require a special dialing sequence, for example. At the designated teleconference time, if one of the participants fails to show up and that participant is needed for the teleconference, it may be necessary to reschedule the teleconference so that all the required participants may be able to participate.

Furthermore, the prior art method of setting up the teleconference call does not take into account the preference of individual participants regarding their preferred communication mode or their time-dependence communication mode (e.g., cell phone from 7 a.m. to 10 a.m., IM from 12 p.m. to 1 p.m., and office phone the rest of the time). This type of accommodation needs to be handled manually and individually with each participant in the prior art when the human facilitator emails or calls around to try to set up the teleconference.

In accordance with embodiments of the present invention, there are provided computer-implemented methods and apparatus for automatically setting up a teleconference among a plurality of teleconferencing participants. Embodiments of the present invention automatically determine the availability and preference of each participant. If, at a given time within the permissible teleconference window, all participants are found to be available, embodiments of the invention employ a rendezvous call (RC) server to automatically confirm the availability of all participants using individual participants' preferred communication mode at the time the inquiry is made. If all required participants consent to conduct the conference, embodiments of the present invention then connect the bearer channels to each participant so that the teleconference may proceed.

As the term is employed herein, a rendezvous call refers to a conference call that is automatically setup and initiated based on parameters that have been entered in advance by a facilitator. The setup is automatic in part because the RC server monitors for presence status of the participants and employs the participants' preferences and preferred mode of communication for conducting the teleconference. Initiation is automatic in part because each participant is called by the RC server when the RC server determines that it is possible to conduct the teleconference given the parameters that have been furnished regarding the teleconference.

In an embodiment, enterprise-wide RC rules may be applied to modify the preferences settings that have been set by some users. For example, if a high level manager wishes to set up a rendezvous call at a given time, the enterprise RC rules may override a preference setting that has been set by a low-level employee to not hold the teleconference at that time. The enterprise RC rules may also be employed to enforce other RC policies, such as the level of authority given to each participant to invite, whether long distance teleconferencing is permissible, what to do in case of overlapping or conflicting teleconferences or unavailability on the part of certain participants. The enterprise RC rules may be as simple or as complex as required by a given enterprise.

Users can also indicate preferences regarding, for example, their general availability and preferred communication modes. In some cases, users may be able to block or permanently decline certain types of teleconference requests, for example. Users may also specify time-dependent communication preference so that if, for example, a RC were to occur in the morning, the user can be contacted at his desk phone whereby an evening RC should be routed to the user's cellular phone.

A presence server tracks the availability of users to determine whether all required users are available for the purpose of conducting the RC. Using the presence server, embodiments of the invention are able to track whether the participants have logged on and/or the location and/or communication method which a participant has specified. If everyone is available, and their availability coincides with the window that the facilitator has indicated to be a suitable window for conducting the RC, embodiments of the invention automatically inquire the participants and confirm their availability for the rendezvous call. If all parties confirm, embodiments of the invention create the bearer channel to each participant, connect the bearer channel together to create the RC, and the RC can proceed.

The features and advantages of the invention may be better understood with reference to the figures and the discussions that follow.

Figure 19:
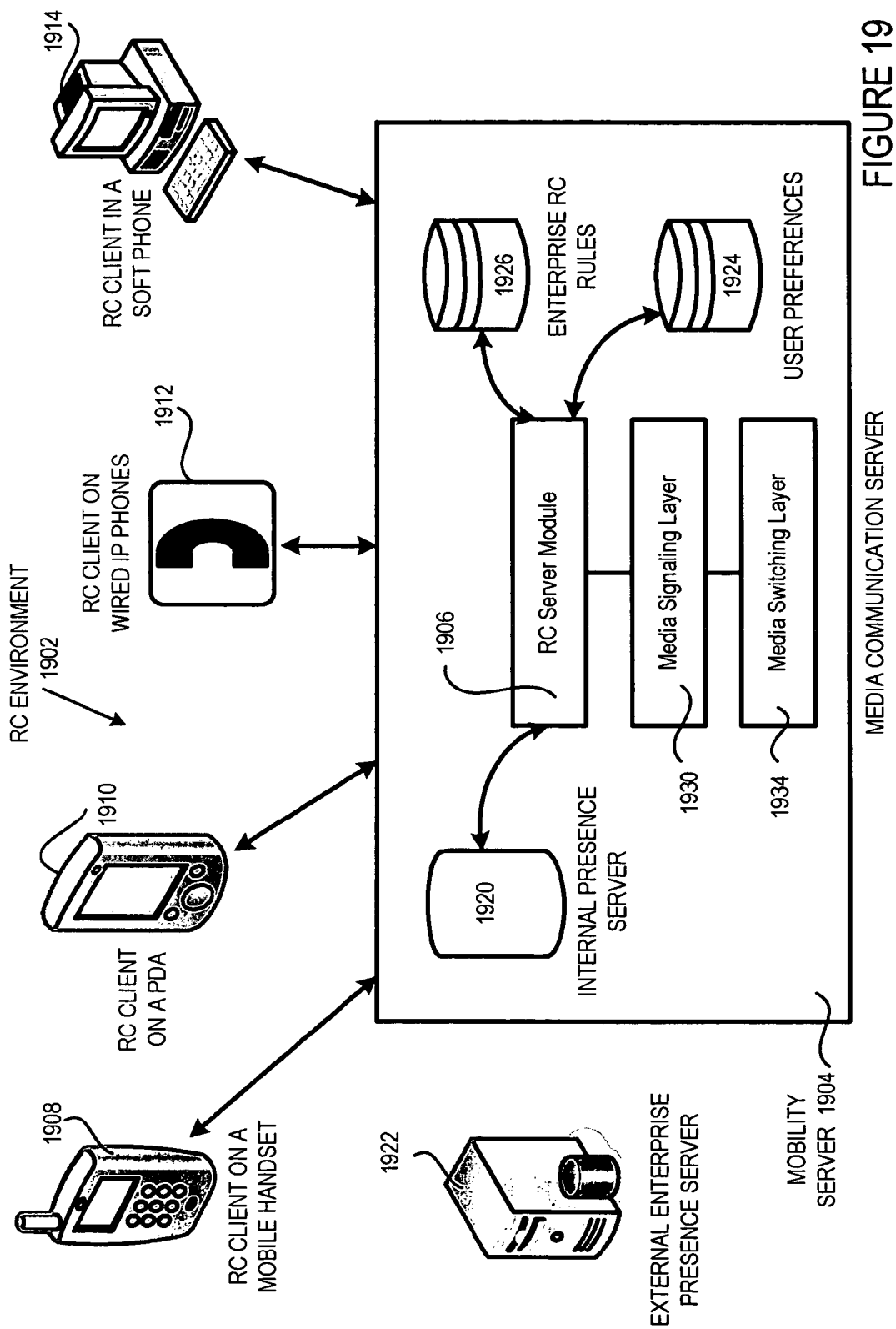
FIG. 19 illustrates, in accordance with an embodiment of the invention, a high level logic block diagram of an automated rendezvous calling environment.

FIG. 19 illustrates, in accordance with an embodiment of the invention, a high level logic block diagram of the automated rendezvous calling environment 1902. In FIG. 19, there is shown a mobility server 1904, representing the physical hardware in which the RC server module 1906 is implemented. One skilled in the art will appreciate that RC server module 1906 may also be implemented on a separate chassis, if desired.

A plurality of RC clients 1908, 1910, 1912, and 1914 are shown. Rendezvous call client 1908 represents a mobile handset; RC client 1910 represents a PDA; RC client 1912 represents a wired IP phone; and RC client 1914 represents a software client executing as a soft phone on a laptop or a desktop computer. Each of RC clients 1908, 1910, 1912, and 1914 executes the RC client software that can be employed to set up rendezvous calls with RC server module 1906, to indicate their preferences. The RC server module will process and/or forward this presence information to one or both of the internal presence server and external presence server as applicable. The preferences of the RC client are also set in the user preference data base 1924, by the RC server module.

A properly authorized user may also employ his RC client to set enterprise RC rules (in enterprise rules database 1926). One skilled in the art will appreciate that any computing device capable of executing the RC client software for interacting with RC server module 1906 can be employed. In addition, an enterprise administrator can also use the management interface provided by the RC server module to set the enterprise RC rules in the enterprise rules database 1926.

When a RC client 1908 wishes to set up a RC, RC client 1908 communicates with RC server module 1906 to indicate the block of time during which the teleconference may take place (e.g., from 8 a.m. to 12 p.m. on Thursday, Dec. 1, 2007), the duration of the teleconference (e.g., 30 minutes), the required participant(s), and optionally the topic of the RC. RC client 1908 may also specify the identity of the required participants and the optional participants, if desired. In an embodiment, the request by a RC client 1908 may be automatically communicated to all required participants so that such required participants may be made aware of the pending request. In another embodiment, the request may be automatically inserted into the electronic calendar (e.g., via an emailed or IM calendar event request) such that the requested RC may be posted to the participants' calendars, and the participants may be made aware of the pending request. If desired, the participants may be asked to comment or accept or reject the proposed RC.

At the start of the specified RC window (e.g., the aforementioned 8 a.m. to 12 p.m. on Dec. 1, 2007), RC server module 1906 inquires via one or both of internal presence server 1920 and external presence server 1922 whether all participants are available. A given participant's availability may be inferred from the participant's calendar and/or log-in activity or by the application of the enterprise conference call rules/user preference. If all participants are not available, RC server module 1906 continues to monitor one or both of the presence servers to detect when all participants are available.

When all participants are available, RC server module 1906, employing the rules and preferences set up in enterprise RC rules database 1926 and/or user preference database 1924, sends a notification to each of the participants (e.g., PDA 1910, wired IP phone 1912, and soft phone 1914) to confirm that the RC time has arrived and that the RC is about to begin. If all participants consent, RC server module 1906 then employs media signaling layer 1930 and media switching layer 1934 to accomplish the bearer channel connection among the participants. For example, RC server module 1906 may employ the switching module in mobility server 1904 to establish calls between each participant to the media server 1904 or to the enterprise PBX, wherein the individual bearer channels may be interconnected to create the RC. Thereafter, the RC may begin.

On the other hand, if one or more participants decline, RC server module 1906 may return to the monitoring state to continue to monitor for the next opportunity to set up the RC with the participants when all participants are found to be available. In an embodiment, RC server module 1906 may inquire the declining user as to the time that the declining participant wishes to conduct the RC, and may employ that time to set up the RC again. If a participant continues to decline, the human facilitator may optionally be notified to manually intervene if necessary to facilitate the initiation of the teleconference.

Figure 20:
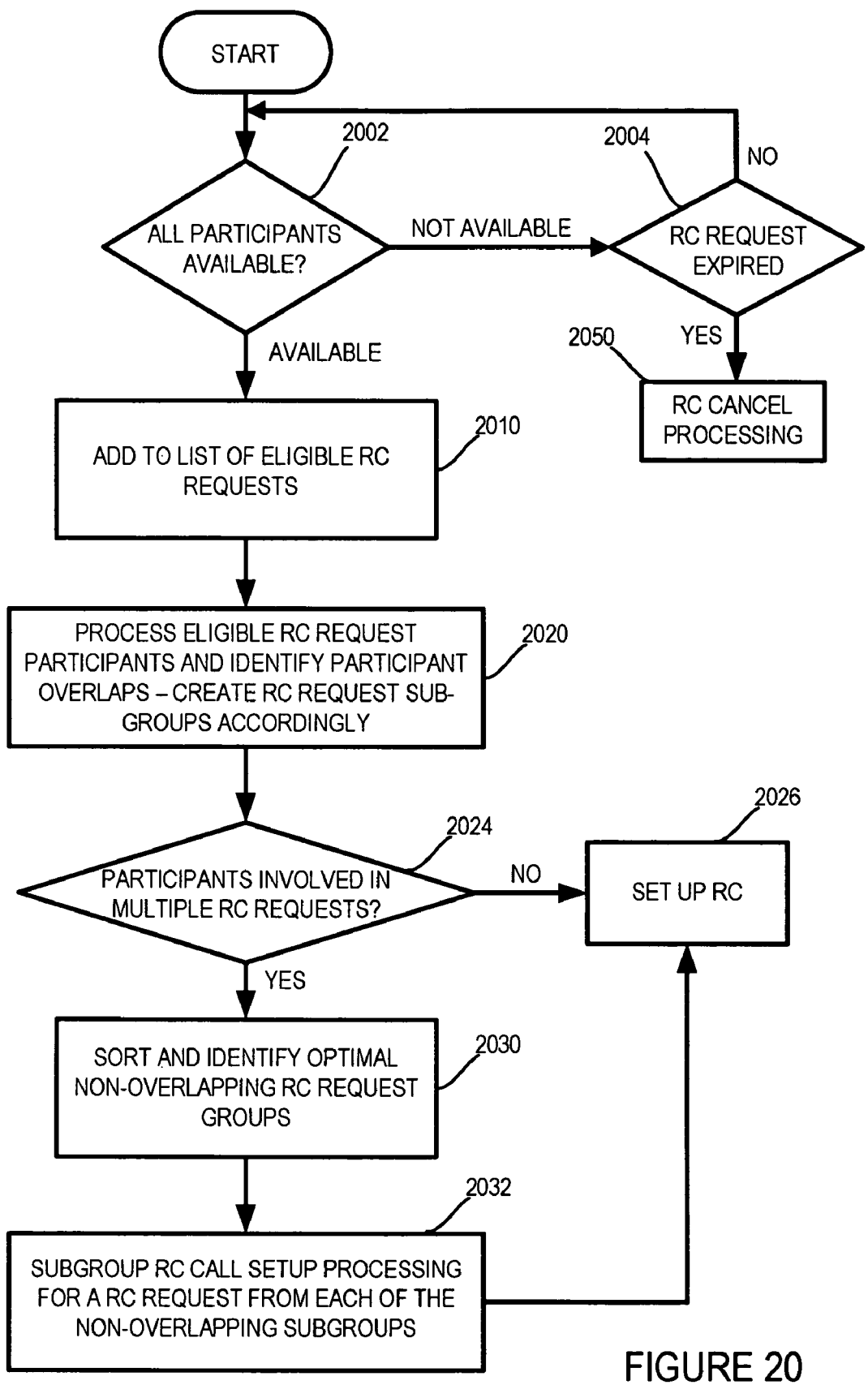
FIG. 20 shows, in accordance with an embodiment, the steps taken by a RC (rendezvous calling) server module in setting up a RC call.

FIG. 20 shows, in accordance with an embodiment, the steps taken by RC server module 1906 in setting up a RC call. In step 2002, RC server module 1906 inquires one or both of internal presence server 1920 and external enterprise presence server 1922 to ascertain whether all participants are available.

If all participants are not available (no branch of 2002), the method proceeds to step 2004 to inquire whether the RC period has expired. If the RC period has not expired, the method returns to step 2002 to continue to monitor whether all participants are available.

On the other hand, if the RC period has expired (the yes branch of 2004), RC cancel processing (2050) is initiated wherein the facilitator is notified that the RC request has expired and it was not possible to set up the RC due to unavailability of participants during the RC request period.

If all participants are available according to the presence server (the yes branch of step 2002, the method proceeds to step 2010 to add the current pending RC request to the list of eligible RC requests).

The difference between a pending RC request and an eligible RC request relates to the fact that a pending request is a request for which all participants have not been confirmed to be available whereas an eligible RC request is a request for which all participants have been confirmed to be available.

For each eligible RC request, the processing proceeds as follows. In step 2020, the participants associated with an eligible RC request are identified. The same determination is made for all eligible RC requests. Further, overlapped participants are identified. As the term is employed herein, an overlapped participant represents a participant having overlapping eligible RC requests. For example, if a given participant is involved in two different eligible RC requests, both of which have an overlapping RC request period, a potential conflict occurs since a given participant cannot be in two different RCs simultaneously. Thus, the overlapping participants are identified and the RC request sub-groups are created accordingly.

In an embodiment, each participant is assigned only to a single sub-group. That is, no single participant is assigned to two difference sub-groups. Accordingly, the RC associated with each sub-group can proceed independently of the other RCs associated with another sub-group. For example, suppose there are four eligible RC requests that are eligible to be set up as teleconferences (i.e., all participants have confirmed their availability). Suppose for RC 1, the participants are A, B, and C; for RC 2, the participants are A, C, and D; for RC 3, the participants are W, X, and Y; and for RC 4, the participants are D, E, and F.

In this case, two sub-groups can be created, with the first sub-group comprising RC 1, RC 2, and RC 4 (involving participants A, B, C, D, E, and F). The second sub-group comprises the third teleconference RC 3 (involving participants W, X, and Y).

In step 2024, it is ascertained whether, for each eligible RC request, any of the participants are involved in multiple eligible RC requests. If not, the method proceeds to block 2026 wherein the RC for those eligible requests, i.e., those RCs comprising participants that are not involved in any other eligible RC request, is set up. In this example, the third RC involving participants W, X, and Y can be set up in step 2026.

On the other hand, if the participants are involved in multiple RC requests (as in the case of RC 1, RC 2, and RC 4), the method proceeds to step 2030 to sort and identify optimal non-overlapping RC request sub-groups. For example, with reference to the example herein, since RC 1, RC 2, and RC 4 are identified to involve overlapping participants, an algorithm may be created to determine whether some RCs may have a higher priority than others, whether within a sub-group certain RCs do not have overlapping participants, and the like.

In this case, it is ascertained that RC 2 and RC 4 do not have overlapping participants. However, the 1st teleconference RC 1 (involving participants A, B, and C) has a conflicting participant with both the 2nd teleconference RC 2 (involving participants A, C, and D) and the 4th teleconference RC 4 (involving participants D, E, and F). An example algorithm may vote to suggest that, by conducting RC 2 and RC 4, the number of teleconferences that can be conducted simultaneously is maximized.

However, it is possible that another algorithm may determine that RC 1 involves a more pressing topic or a more important participant or group of participants and should take precedence. These different algorithms for resolving conflicts are only examples and may be as simple or as complicated as desired by a given enterprise.

Following the present example, the method proceeds to step 2032 where the RC call setup processing for the RC request from the non-overlapping sub-groups is executed. In this case, the RC call setup processing for RC 2 and RC 4 would be initiated, leading thereafter to the RC call setup process 2026 for these two teleconferences. The RCs that did not get set up may be returned to the list of pending RC requests or may stay as an eligible RC request if desired.

Figure 21:
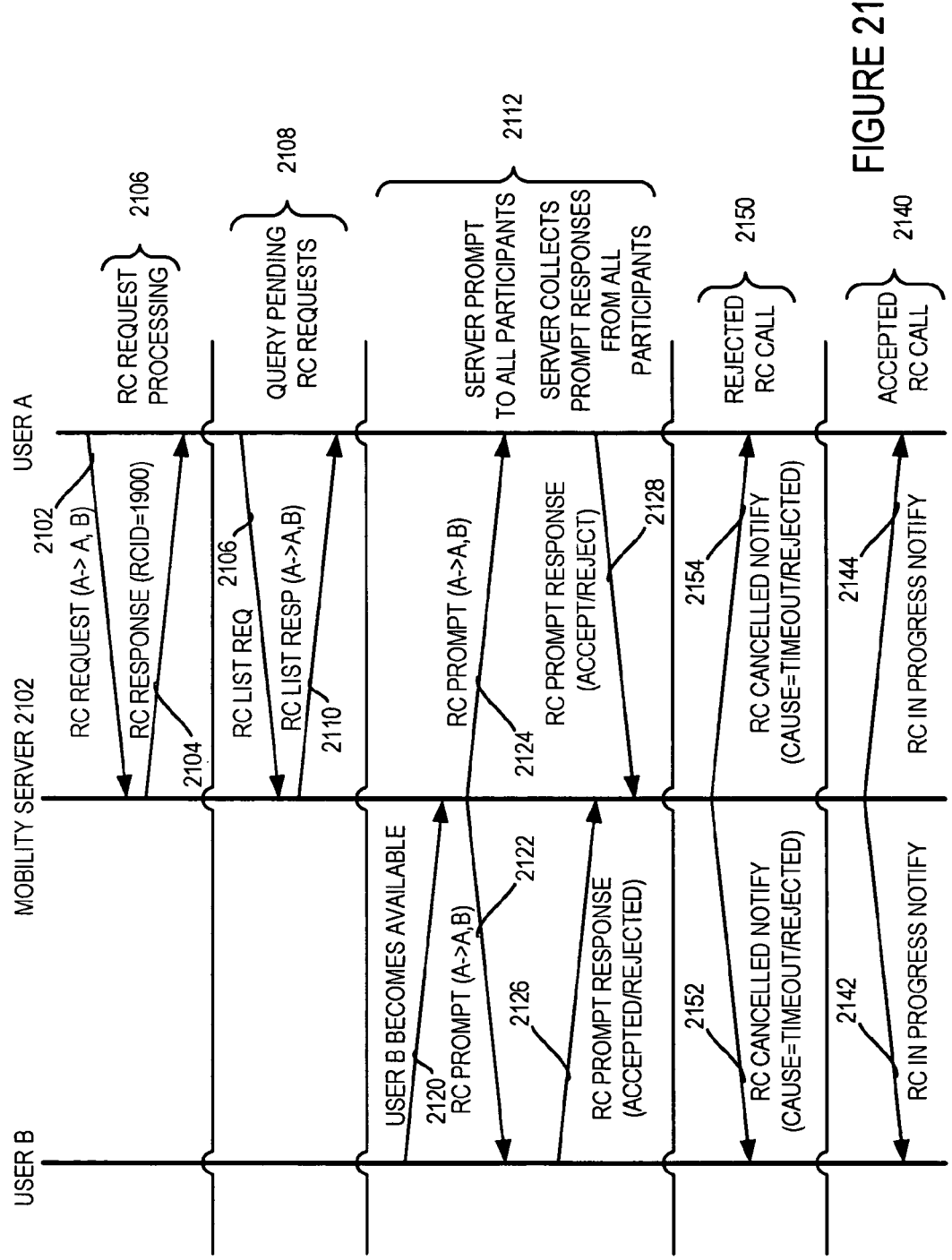
FIG. 21 shows, in accordance with an embodiment, a simple call flow involving two teleconference participants.

FIG. 21 shows, in accordance with an embodiment, a simple call flow involving two teleconference participants. In this example, user A and user B are requested to participate in an RC via a pending RC request and the RC request period has begun. Furthermore, for the purpose of the present example, user A's starting state is available whereas user B's starting state is not available. As shown in FIG. 21, user A makes an RC request to a mobility server for the RC (2102). Mobility server 2102 responds in 2104 with a rendezvous call ID (RCID) which is, for example, 1900 in this case.

Period 2106 pertains generally to RC request processing. Period 2108 pertains to the processing of pending RC requests. Thus, user A may inquire the list of pending RC requests in which user A has been specified to be a participant. Assuming that no other user has requested that user A participate in another RC, mobility server returns (2110) with the list of teleconferences in which user A is a requested participant. Period 2112 pertains to the confirmation period wherein the presence server has noted that the participants have become available and the RC server module is confirming whether the participants wish to conduct a teleconference. Thus, user B availability is updated with the presence server in mobility server (2120).

Noting the availability of both user A and user B, mobility server 2102 then sends the prompt that confirms whether the user A and user B wish to conduct a teleconference at this time. This is shown by reference numbers 2122 to user B and 2124 to user A, respectively. User B then responds (2126) and user A also responds (2128). If both users accept the teleconference request, processing proceeds according to the steps shown in period 2140. If one or both of the participants decline, processing proceeds according to the steps shown in period 2150. In period 2150, if one or both of user A and user B reject the request by the conference call server module (implemented within the mobility server in this example), mobility server then sends the cancel notify (2152/2154) to one or both of user A and user B indicating that the request is rejected. The notification may also be sent if the pending request has timed out, i.e., the RC request period has expired.

On the other hand, if both participants A and B agree to conduct a teleconference, mobility server 2102 then sends out the notification (2142 and 2144, respectively) to user B and user A to indicate that the teleconference is about to be set up.

Figure 22:
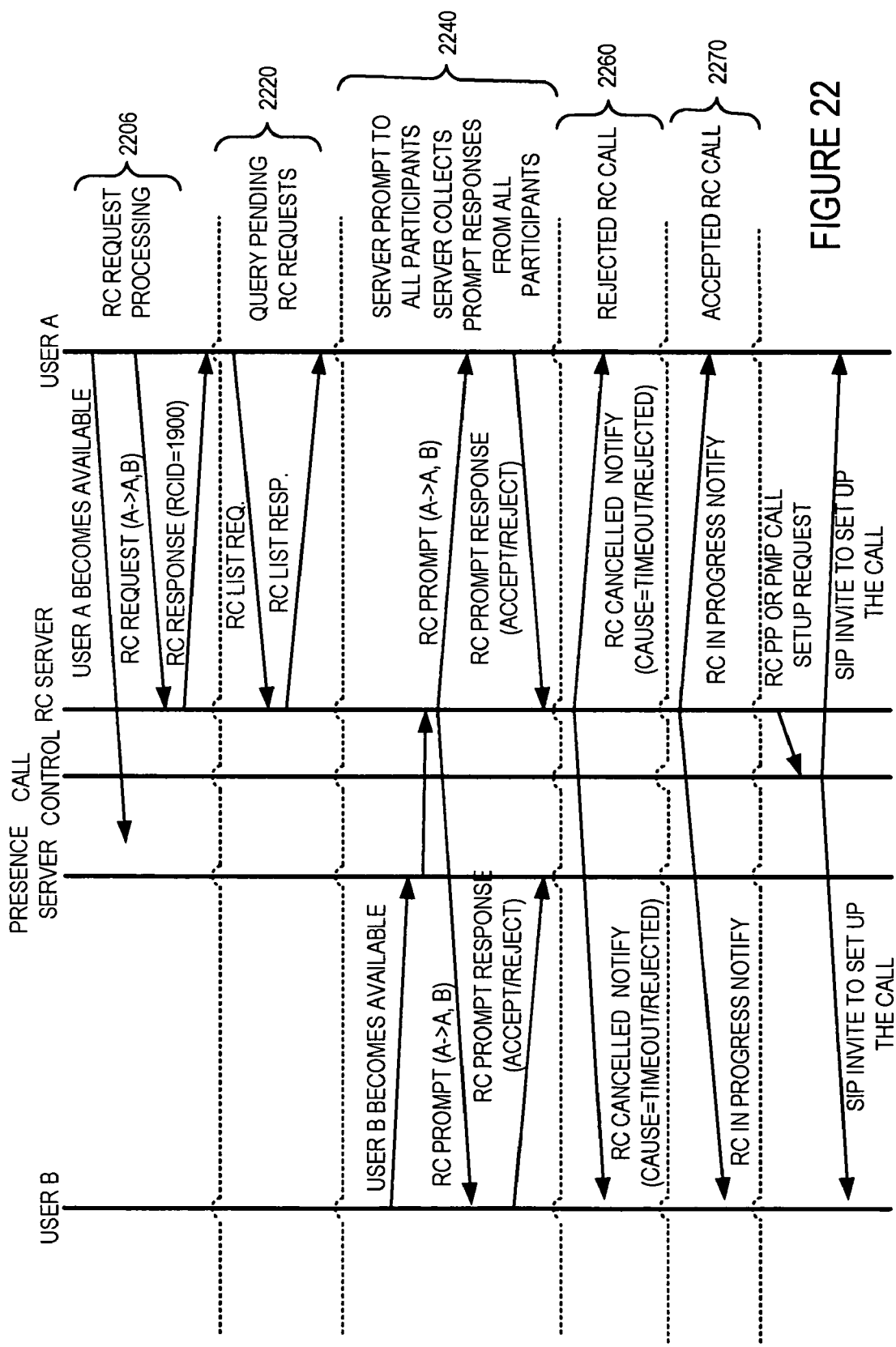
FIG. 22 shows, in accordance with an embodiment of the present invention, the call flow for setting up the teleconference using the parameters specified in the example of FIG. 21, except that the mobility server is now shown to include as constituent components presence server, call control, and RC server.

FIG. 22 shows, in accordance with an embodiment of the present invention, the call flow for setting up the teleconference using the parameters specified in the example of FIG. 21, except that the mobility server is now shown to include as constituent components presence server, call control, and RC server. Thus, in the RC request processing period 2206, user A indicates his availability status to the presence server and RC request and RC response are communicated between the RC server and user A. During the query pending RC request period 2220, the request for the pending RC list involving user A and the response with the RC list involving user A are communicated between user A and the RC server as shown. During the prompting period 2240 during which the RC server is attempting to confirm with all participants that the participants are now available and should be conducting the teleconference. Thus, the availability of user B is communicated between user B and the presence server, and the presence server communicates the present status of user B to RC server. The prompt to confirm the teleconference is communicated from the RC server to the users A and B, respectively, and the responses from each user is communicated back to the RC server respectively. In the responses, one or both users may accept or reject the requested teleconference. If one or both users reject the requested teleconference from the RC server, the RC server may send the cancel notification to the users respectively (if rejected).

On the other hand, if both participants accept, the RC server then sends the in progress notification to both participants respectively during accept RC call period 2270. Thereafter, the RC server communicates with call control via a call control message indicating that participants A and B should now be set up in a teleconference. Call control then employs, for example, the SIP invite message to participants to user A and user B rendezvous-enabled communication device to begin setting up the teleconference As can be appreciated from the foregoing, embodiments of the invention eliminate the manual and time-consuming steps involved in setting up the teleconference beforehand via one communication mode (e.g., Outlook, IM, in person, email in advance, or telephone in advance) in order to manually confirm with each participant regarding the time and availability for the teleconference. Embodiments of the invention also eliminate the need for a human facilitator to manually connect each participant or for the participant to call in manually, further eliminating the possibility for error or forgetfulness. By using a combination of the presence server, the enterprise RC rules, and the user preferences, the user can be communicated when the user is available within the RC request period using the communication mode preferred by the user and in accordance with the business rules set up by the enterprise. In this manner, teleconferences can be set up in an efficient and automated manner, eliminating reducing wasted time and confusion and/or frustration on the part of the facilitator and/or the participants of the teleconference.

D. Call Routing Via Recipient Authentication

1. More and more enterprises are allowing their employees to use their cellular phones for business purposes. Employees use their cellular phones to place calls into the enterprise to access enterprise voice features such as checking voicemails, setting call-forwarding number, etc. In these cases, the enterprise sever authenticates the caller over IVR (Interactive Voice Response). These are instances where employee specific data is pulled by an employee from the enterprise.

2. In the future, a lot of enterprise features will be pushed to the cellular phones, such as Personal Information Management (PIM) over voice, email voice over phone, etc. To push all these features to a cellular phone, the enterprise server needs to establish a connection to the employee's cellular phone by initiating a call from the enterprise. Such a connection assumes that the enterprise employee has his cellular phone. In case the enterprise employee does not have his cellular phone, or has started using another cellular phone (borrowed, loaner or replacement phone), the following issues arise for the mobility applications:

a. The enterprise risks loosing the proprietary/personal information to an unauthorized person. This information includes phone calls intended for the enterprise employee, emails over voice mail, PIM information etc.

b. Also, in case the employee does not answer the phone call initiated by the enterprise server, the cellular operator voice mail will answer the call and record the enterprise emails and voicemails in its mailbox.

This invention discusses a method by which the enterprise server can establish the authenticity of the person in possession of the cellular phone. It also ensures that the entity that answered the phone is really the enterprise employee and not operator voice mail system or some unauthorized person.

3. Method—This invention is implemented by devising a cellular handset application which authenticates the user. The authentication logic is outlined below a. Upon start of the application, it prompts the employee for the authentication information such as user name and password. This information may be stored in the application for limited time period as cache. The cache will expire after configured time period.

b. When the enterprise server calls the employee, the application will answer the call before the phone rings. If the user's login information has expired, the application gets the users attention (by ringing, for example) and asks the user to authenticate again. If the user's login information has not expired then his cached authentication information is used. The application transmits a sequence of numbers (Reversed Caller ID—RID) to the server using DTMF to authenticate the user who is using this cellular phone. This sequence is derived using the user name and password entered by the employee.

c. Server authenticates the employee by calculating RID using the same user name and password provisioned on the server.

d. If the RID matches, the server is assured that it is the authenticated employee using the cellular phone and it may commence the mobility application such as phones calls, phone call hand-overs, email voice over, voice mail etc.

e. If the server does not receive the RID within a predefined interval after the call is received (OFF—HOOK equivalent) or if the RID does not match, it may assume that it is not the authenticated user on the cellular phone. At this stage either the phone call may be terminated or may be routed to the voice mail system in case of single voice mail application.

4. Benefits—Using the above method for mobility applications the enterprise server may achieve the following benefits a. Enterprise information protection—The enterprise server can distinguish between an authorized employee using the cellular phone and un-authorized user or operator voice mail by making use of RID. For example— i. Transparent call routing—User possesses a dual mode (Wi-Fi and Cellular phone) with Voice over IP application. For incoming call routing if the server determines that user is not reachable over VoIP, it may choose to connect over cellular network. This method will ensure that it is reaching the authorized user.

ii. Voice over IP (VoIP) to cellular hand-off—this method ensures that it is the same employee who was connected over VoIP.

b. Single Voice Mail—If the employee chooses not to answer the incoming cellular call from enterprise server—this method ensures that the voice mail is not left with the cellular operator voice mail system. Since the server can determine that operator voice mail system has answered the call indicated by lack of the RID in the beginning of the connected call, the server may choose to hang-up the cellular call and route the call to the internal voice mail, thus enabling Single Voice Mail.

To elaborate, as discussed earlier, the mobility server has the capability to seamlessly connect, as one leg of a given call, from the mobility server to an employee's mobility client in the public cellular network despite the fact that the caller has placed a call to the employee's extension number in the enterprise instead of to the employee's mobility client. For example, if a call has been placed to the employee's extension in the enterprise and the employee has registered his mobility client (e.g., registered his public mobility client number) as a telephone to which calls to the employee's extension number in the enterprise can be forwarded, the call from the caller can be connected from the caller's handset to the mobility server as one leg of the call. As the other leg of the call, the mobility server can connect, using its own switch or the PBX's switching capability, back out to the public cellular telephone network and via the public cellular telephone network to the employee's mobility client. This is so even though the call was made to the employee's extension number in the enterprise.

As another example, the employee may possess a dual mode telephone and roam away from a Wi-Fi area, such as from within the premise of the enterprise out to an area not covered by Wi-Fi but instead covered by the public cellular telephone network. In this case, in the middle of the call, a hand-off may occur whereby the mobility server and/or the employee's dual mode telephone realize that the employee dual mode telephone has roamed outside of Wi-Fi coverage and that the call needs to continue via the public cellular telephone network to the employee's dual mode telephone (now operating in the cellular mode).

Although this capability represents a dramatic improvement in convenience and ease of manageability of the employee's telephones presence, some interesting challenges arise. One of the challenges pertains to the security implications of transmitting voice and/or data to a mobility client that may or may not be in the physical possession of the employee. For example, if the mobility client has been stolen or if the mobility client has been loaned to another person, such as the employee's friend or a relative, a security risk is created with respect to the voice and data transmitted to the mobility client. The risk is magnified since the caller may not realize that the call has ended up outside of the enterprise despite the fact that the caller has dialed the employee's enterprise extension number and has expected, based on past experience or conditioning, the call to terminate within the enterprise.

Another challenge relates to voicemail management. Since the caller makes the call to the employee's enterprise extension number, the typical expectation is that if the employee does not answer the telephone, the enterprise's voicemail system would pick up and be employed to store any voicemail that the caller wishes to leave. In some cases, the employee may not answer the call due to the fact that, for example, the telephone may not be turned on or there may be no connectivity to the cellular network or the employee may simply fail to hear the ring tone to answer the call. Yet, since the mobility server transparently and seamlessly passes, if the employee fails to answer the call or has roamed away, the call to the public mobility client number to terminate the call via the public cellular telephone network, the message may be picked up by the cellular voicemail box of the public cellular service provider instead.

In accordance with embodiments of the invention, there is provided a cellular recipient authentication (CRA) technique to authenticate the identity of the called party prior to the completion of the call between the mobility server and the mobility client operating in the public cellular network. In the context of this technique, the mobility client may refer either to a cellular-only telephone that runs the mobility software to enable the mobility client to be connected via the mobility server or may also refer to a dual Wi-Fi/cellular mode telephone that has roamed outside of Wi-Fi coverage.

In accordance with embodiments of the present invention, prior to completing the call leg between the mobility server (which may represent either the mobility server switching functionality or a combination of the mobility server and the enterprise PBX depending on implementation), the cellular recipient is authenticated. During the authentication period, the recipient is given a fixed amount of time to provide authentication information that is satisfactory to the mobility server.

If the authentication information provided by the recipient is unsatisfactory or if proper authentication does not arrive within the allotted authentication time, the mobility server does not create the bearer channel connection between itself and the mobility client via the public network. As such, even if the employee's mobility client is lost/stolen or if the employee loaned the mobility client to another person, the lack of proper authentication information would inhibit the bearer channel from being established between the mobility server and the mobility client. In this manner, voice/data security is assured.

Further, if the employee does not answer the cellular call, the authentication information would not be received by the mobility server within the allotted authentication period. In this case, the bearer channel is not established between the mobility server and the mobility client and thus the voice/data call will not be stored in the voicemail box of the public network. Instead, if the employee fails to answer the cellular call (i.e., fails to pick up the call), the mobility server logic would instead complete the bearer data connection to the employee enterprise voicemail box, thereby enabling the caller to leave the message in the enterprise voicemail box.

In an embodiment, the employee may have entered and cached the authentication information earlier (e.g., when the client application is activated for the first time). Thus, even though the employee may not have answer the cellular call, authentication information about the recipient of the call may still be sent to the mobility server. Thus, authentication may be performed and the mobility server may still establish a bearer channel to connect the voice/data call to the voicemail box of the public network.

In an embodiment, the cache authentication information may be set to expire periodically (e.g., every 24 hours, every hour, user configurable time). As such, even if the employee's mobility client is lost/stolen or if the employee loaned the mobility client to another person, the unauthorized third party is not able to establish a connection with the mobility server. In addition, once the cache has expired, the employee may have to reenter the authentication information the next time the employee may wish to establish a connection with the mobility server.

In an embodiment, the authentication is provided using an inline encoding technique from the mobility client to the mobility server. Such encoding techniques may include, for example, DTMF (Dual Tone Multi-Frequency) signaling. In an example, the employee may utilize the mobility client's keypad to enter in the required authentication information. In another embodiment, the user may verbally provide the authentication information so that the authentication information may be processed by voice recognition technologies. Other forms of encoding, such as those associated with GPRS (General Packet Radio Service), GSM (Global System for Mobile Communication), CDMA (Code Division Multiple Access), etc., may also be employed as long as the necessary authentication data is satisfactorily transmitted by the user via the mobility client and received by the mobility server within the allotted authentication period.

In an embodiment, both the software within the employee's mobility client and the software executing on the mobility server implement the same mathematical function to compute an authentication result. For example, the software on the employee's mobility client may compute the authentication result as a function of the user ID, password, and/or any other authentication data that the recipient has set up beforehand with the mobility server. The same mathematical function operating on the same parameters is also computed by the mobility server.

When the mobility server receives the authentication result computed by the mobility client software (which may be transmitted to the mobility server in an encrypted or unencrypted form), the mobility server would compare the received authentication result with the authentication result that the mobility server has internally calculated. If the two authentication results match, authentication is deemed to be successful and the bearer channel between the mobility server and the mobility client may be established.

In an embodiment, the mathematical function employed to calculate the authentication results may also employ a nonce value. For example, the mobility server may provide a nonce value to the mobility client as part of the authentication procedure. The use of the nonce value further strengthens data security since such use helps minimize the impact of replay attacks.

The above-discussed specific authentication techniques are only examples. It should be kept in mind, however, that authentication may be accomplished in any reasonable manner, and the use of a user ID, a password, and/or the aforementioned nonce value may not be required in all situations. What is important is that the identity of the cellular recipient (instead of or in addition to the identity of the mobility client) is confirmed by the mobility server before the mobility server establishes the bearer channel between itself and the mobility client via the public cellular telephone network.

Figure 23:
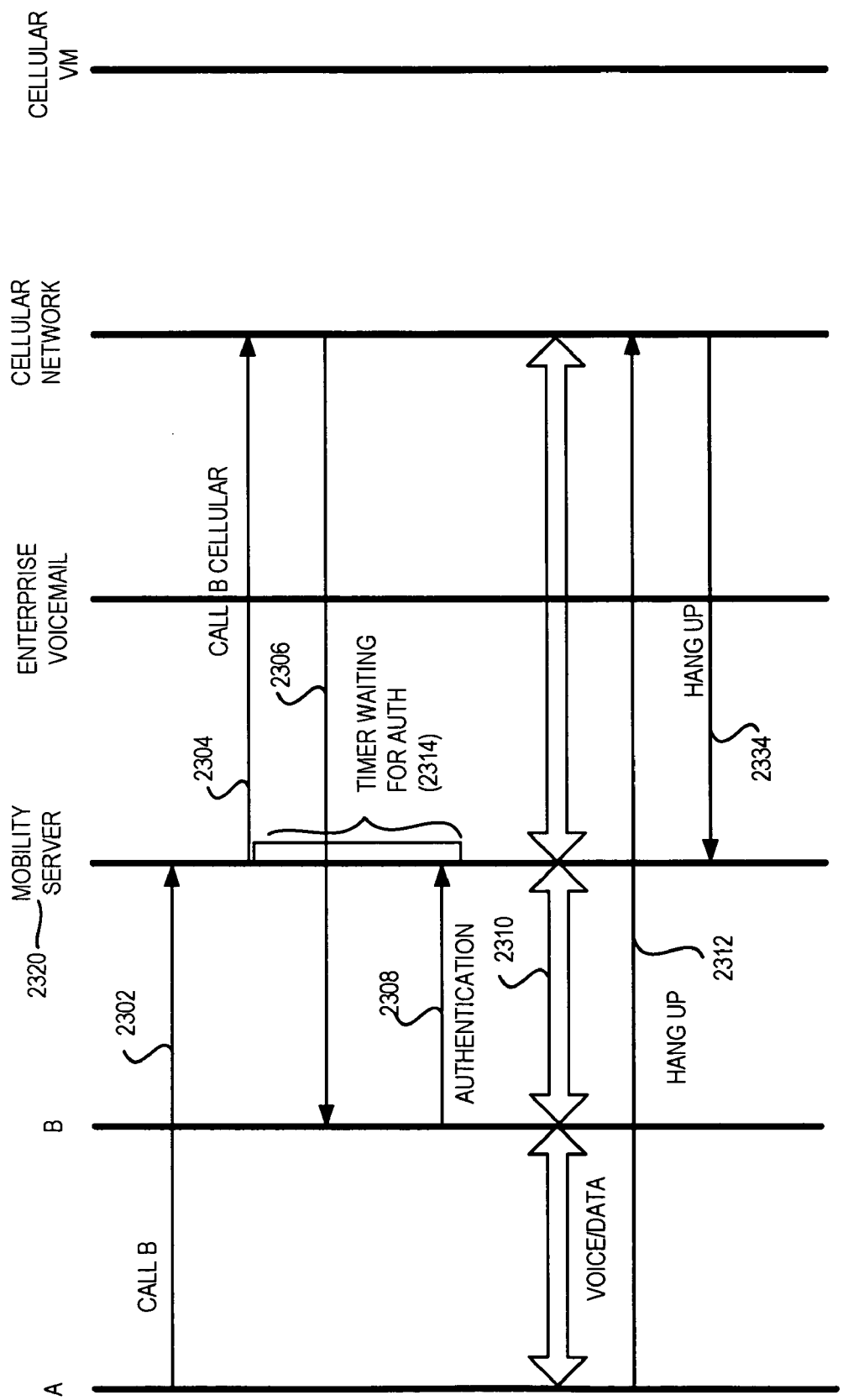
FIG. 23 shows, in accordance with an embodiment of the present invention, a call flow for a cellular recipient authentication procedure that takes place when a new telephone call is made by a caller to a recipient via the recipient's enterprise extension number.

The features and advantages of various embodiments of the invention may be better understood with reference to the figures and discussions that follow. FIG. 23 shows, in accordance with an embodiment of the present invention, a call flow for the cellular recipient authentication procedure that takes place when a new telephone call is made by a caller to a recipient via the recipient's enterprise extension number. In this example of FIG. 23, the recipient has roamed outside of Wi-Fi coverage (in the case of the dual mode Wi-Fi/cellular mobility client) or the recipient is not at his desk and has specified for the call to be forwarded to his mobility client.

With reference to FIG. 23, caller A employs a signaling protocol to inform mobility server 2320 that caller A wishes to connect with the telephone at the extension associated with recipient B. For example, caller A may call the telephone number 111-222-3333 that is associated with the enterprise, and has further entered the extension number (such as 4444) associated with the recipient. The signaling is shown in FIG. 23 by reference number 2302.

Mobility server 2320, realizing that the call needs to terminate via the public network, contacts the mobility client of recipient B via signaling paths 2304 and 2306 through the mobility client network to the mobility client of recipient B.

Furthermore, the attempt to establish contact with recipient B also starts the authentication period, shown in FIG. 23 by reference number 2314. If proper authentication 2308 is received within the allotted authentication period 2314, mobility server 2320 then establishes a bearer channel to recipient B's mobility client via the cellular network. In an embodiment, the authentication requires active participation by the user to provide confidential authentication data to the mobility server (via the mobility client). As such, the call is authenticated with the person, and not only with the handset.

The bearer channel is shown by reference number 2310 in FIG. 23, depicting the connection between mobility server 2320 to the public network and to recipient B's mobility client. The establishment of the bearer channel between mobility server 2320 and recipient B's mobility client completes the end-to-end bearer channel from caller A to recipient B.

When the call (which might be either a data call or voice call) is completed, either caller A or recipient B may provide the hang up signal (hang up signal 2312 is provided by caller A in the example of FIG. 23), resulting in the call being terminated (2314). Notice that, in this case, unless proper authentication 2308 is received within the allotted authentication period 2314, the bearer channel between caller A and recipient B is not completed. As part of the authentication procedure, a nonce value may be provided (e.g., as part of signaling 2306) if desired.

Figure 24:
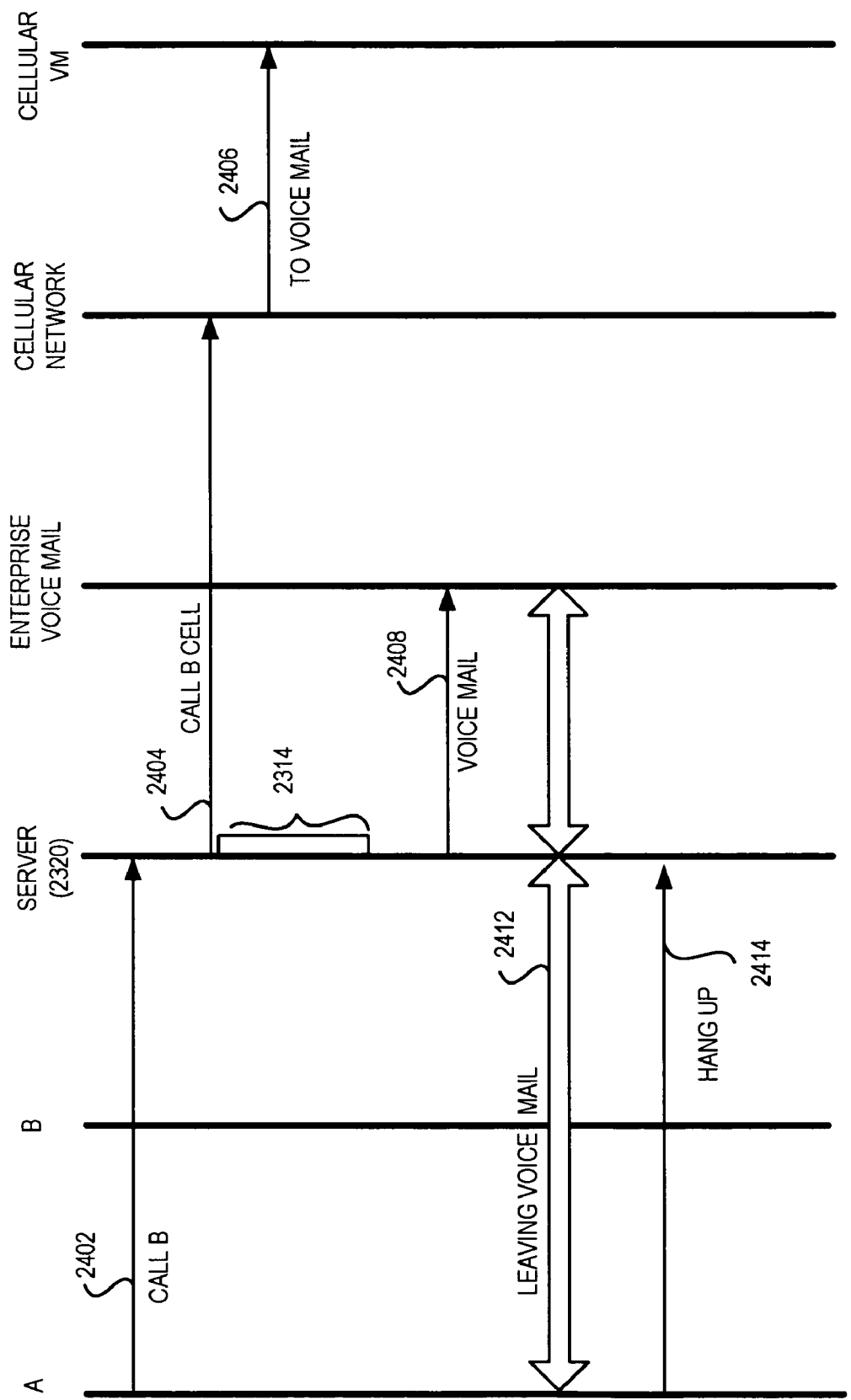
FIG. 24 shows, in accordance with an embodiment of the present invention, a call flow that occurs when the recipient does not answer the cellular call.

FIG. 24 shows, in accordance with an embodiment of the present invention, a call flow that occurs when the recipient does not answer the cellular call. This may occur when the cellular recipient has no coverage (either Wi-Fi or cellular) or if the mobility client is turned off or if the recipient simply fails to answer the call.

In this case, the voicemail message from caller A is left with the enterprise voicemail box instead of with the public cellular system's voicemail box, thereby simplifying voicemail management and reducing confusion for both the caller and the recipient. With reference to FIG. 24, caller A informs mobility server 2320 that it wishes to establish a call to recipient B by dialing the enterprise's telephone number, followed by the recipient's extension number. This is shown by reference number 2402 in FIG. 24.

Mobility server 2320 then realizes that it needs to complete the call to recipient B via the cellular network (for example, when mobility server 2320 knows that recipient B has roamed outside of Wi-Fi coverage). Mobility server 2320 then makes a call to the cellular network (2404) and since the recipient does not answer, the signaling portion of the call is established into the cellular network voicemail after some time, as shown by reference number 2406.

When mobility server 2320 attempts to contact the recipient, it also starts the authentication period 2314 and waits for the proper authentication from the recipient. During this time, caller A does not have an end-to-end bearer channel to the voicemail box of the public cellular telephone network and, therefore, does not even know that the public cellular network's voicemail is involved. During this authentication period, caller A may for example hear a pre-recorded message from mobility server 2320 asking caller A to wait while an attempt is made to find recipient B.

Since recipient B does not answer the call, proper authentication is not received by mobility server 2320 within authentication period 2314. Accordingly, mobility server 2320 does not complete the bearer channel leg between itself and the voicemail box in the public cellular network. Instead, mobility server 2320 completes the call by creating a bearer channel between itself and the recipient's enterprise voicemail box, resulting in an end-to-end bearer channel between caller A and the recipient's enterprise voicemail box. This is shown by reference 2412 in FIG. 24. The caller A may now begin to record a voicemail message in the enterprise voicemail box of recipient B.

At some point in time, caller A completes the call and indicates to mobility server 2320 that it hangs up (2414), resulting in mobility server 2320 terminating the call.

As can be appreciated from FIG. 24, in the case where the recipient does not answer the cellular call, a call to the recipient's enterprise extension will result in the voicemail message being left in the recipient's enterprise voicemail box even though mobility server 2320 had attempted to complete the call via the public network. From the user's perspective, the voicemail message is left in the proper voicemail box (i.e., the enterprise's voicemail box of recipient B) that is associated with the telephone number dialed (the recipient's enterprise extension in this case), thereby reducing confusion and simplifying voicemail management.

In some cases, the call to the recipient's mobility client may be initiated by the mobility server itself. The situation may occur, for example, if the recipient is a party to a conference call that was set up beforehand, and the mobility server is attempting to establish contact with all conference call participants when the time comes to establish the conference call. Again, if the cellular recipient cannot be authenticated, mobility server 2320 does not allow the bearer channel to be completed to the recipient's mobility client, thereby protecting the confidentiality of the information.

Figure 25:
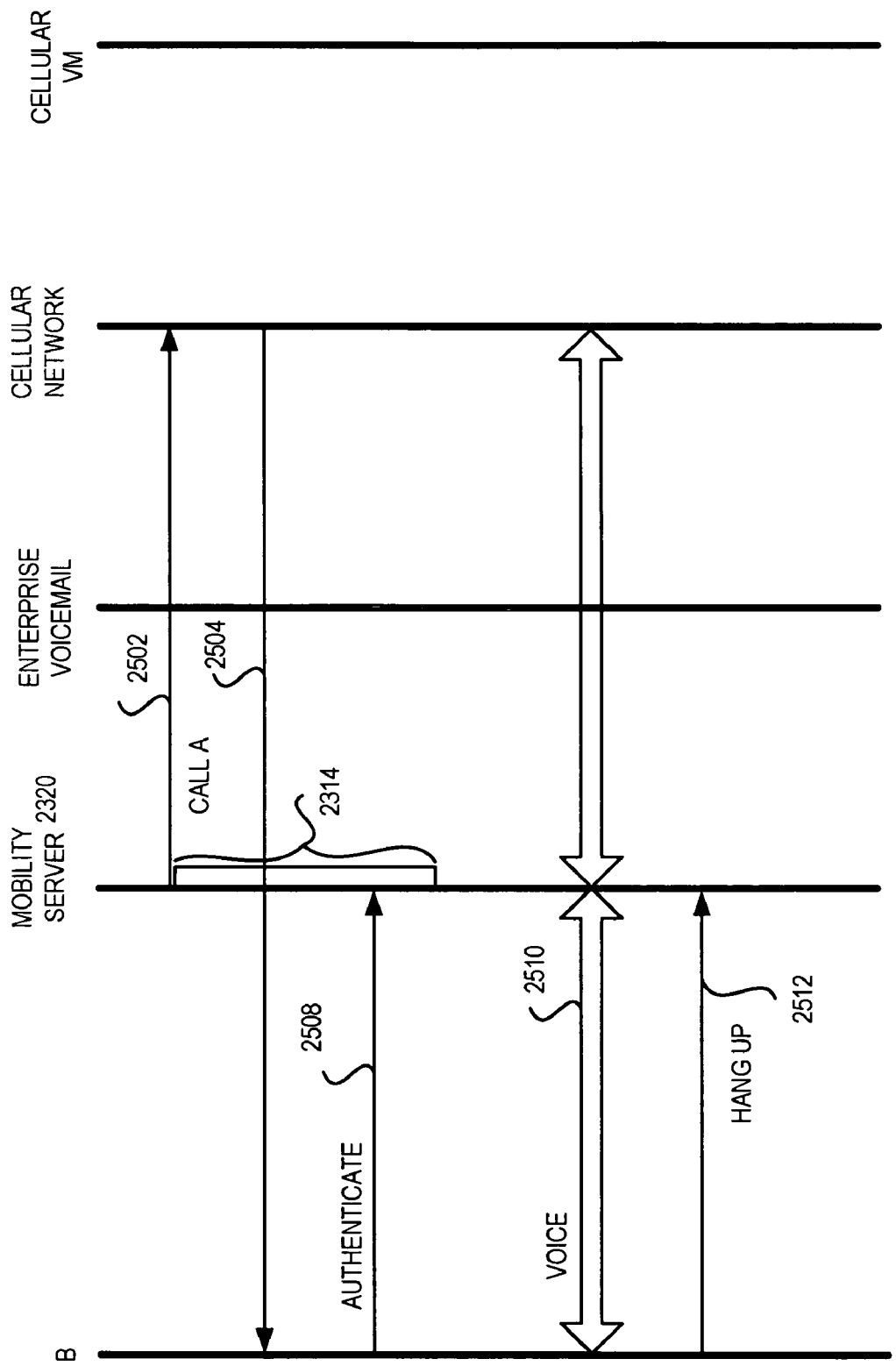
FIG. 25 shows, in accordance with an embodiment of the present invention, a call flow for a cellular recipient authentication procedure with an allotted authentication period.

With reference to FIG. 25, mobility server 2320 begins by calling (2502) the public cellular network to attempt to establish via the public cellular network a call to recipient B (2504). As part of the attempt to establish contact with recipient B, mobility server 2320 starts the countdown for the authentication. This is shown by reference number 2314 in FIG. 25.

If the recipient is successfully authenticated during the allotted authentication period 2314 (the recipient authentication is shown by reference number 2508), mobility server 2320 then establishes a bearer channel to recipient B via the cellular network. This bearer channel is shown in FIG. 25 by reference number 2510. Thereafter, the call (which may be voice or data) can proceed between mobility server 2320 and recipient B.

When the call is completed, either mobility server 2320 or recipient B may hang up, thereby terminating the call. This is shown by reference number 2512 in FIG. 25.

As can be appreciated from FIG. 25, if the recipient B fails to authenticate within the allotted authentication period 2314, the call to recipient B does not proceed, and data-voice security is protected. In an embodiment, if the authentication does not arrive within the authentication period 2314, mobility server 2320 may connect the bearer channel to the recipient's enterprise voicemail box. However, this is an implementation choice.

As can be appreciated from the foregoing, embodiments of the invention allow the mobility server to ascertain the identity of the cellular recipient prior to allowing the call to proceed to the recipient's mobility client. In so doing, the security of the voice call or the data call is assured even if the recipient's mobility client is lost or stolen, or loaned to another person. That is, unless the authentication is properly received from the recipient, the fact that an unauthorized third party physically answers the call does not automatically result in the receipt of confidential voice/data information.

Furthermore, the cellular recipient authentication procedure ensures that if the recipient does not answer his cellular call, the voicemail message is left in the proper voicemail box that is associated with the telephone number called by the caller. Thus, if the caller calls the recipient's enterprise extension number, the voicemail message is left with the recipient's enterprise voicemail box even if, as part of the attempt to complete the call, the mobility server 2320 contacts the recipient's mobility client via the public mobility client number voicemail box, voicemail management is improved and user confusion is reduced.

E. Reducing Data Loss in Media Handoffs

1. Background:

With the advent and rapid deployment of Wi-Fi networks, people are using their Wi-Fi enabled devices for data applications like email, internet usage, IM etc. Simultaneously, after years of trials and tribulations, VoIP is maturing as a viable alternative to the legacy telephony. Confluence of these two events is making VOWI-FI (or VOFI) a very exciting proposition. One of the key requirements for VOFI is seamless handoff when moving across WLAN similar to what is available in cellular networks. When the device is dual mode (cellular and Wi-Fi capable), then the handoff can happen between Wi-Fi and cellular networks.

2. Summary:

At present, there are no ratified standards for handoff between APs in Wi-Fi networks and no deployed products are providing the facility. Also, due to the fact that WLAN and cellular networks are managed by different entities, there is no mechanism to do a handoff between the two.

The invention provides mechanisms for roaming/handoff within Wi-Fi networks and handoff between cellular and Wi-Fi network for voice calls. It is assumed that calls on Wi-Fi networks are VoIP calls using SIP, though it doesn't preclude using any other control plane protocol. It is also assumed that in a typical VoIP network, there exists a SIP proxy server for call processing a voice/media switching engine for RTP packet processing. For simplicity, we assume that both the components reside within a single server box.

3. Detailed Description:

Following important criteria are used to making a handoff decision:

As far as possible, least expensive network should be used for making, sustaining and switching a voice call. In most of the cases, Wi-Fi network is preferred choice for this requirement.

When the handoff situation arrives, time taken for the handoff should be really very small. This requires very early detection for triggering handoff and very quick switching.

4. Handoff Scenarios:

a. Handoff within Wi-Fi network:

When a mobile user roams within a Wi-Fi network, it is attached to only one AP at a time. As it moves out of range of that AP, it attaches to another AP. If a voice call is active when the roaming occurs, there will be some packet loss because of the time it takes to attach. This is mainly due to the fact that the device gets a new IP address resulting in RTP packet loss. It also results in loss of SIP session maintained with a SIP proxy server. IEEE standard 802.11r specifies fast roaming mechanism which allows device preauthentication with all the APs detected in the neighborhood. However, this does not avoid allocation of new IP address.

In order to avoid the problem of losing RTP packet stream, the voice/media switching device is notified of the impending roaming situation. The voice/media switch can buffer a few RTP packets while the device attaches to the new AP. This notification also prepares the media switch to expect a change of source address for the RTP packets from the device. This source address can be stored for a brief period of time and used for sending RTP packets coming from the other device with which the call is active. In order to prevent any security breach due to address spoofing or DOS type of attack, the voice switch starts a timer of say 30 seconds. Within 30 seconds, the device needs to register the same IP address with the SIP server as part of the secure authentication. This IP address is sent to the voice/media switch. Voice/media switch then stops the timer and continues passing voice packets across till the call ends. It is assumed that after attaching to the new AP, the time taken to acquire new IP address is miniscule and is within the range where there is no noticeable glitch in the voice stream for the listening user.

There are two methods of notification/detection of AP to AP roaming:

If the device pre-authenticates with one or more APs, it sends the information of the APs along with their SSIDs, signal strengths and other information to the server. This will prepare the server for an impending handoff situation. Just before attaching to a new AP, the device can send a quick notification to the server.

If the device moves into a zone where signal strength suddenly drops to zero and does not allow the device to send any notification, the voice/media switch detects loss of periodic RTP traffic and initiates buffering the packets destined for the roaming device. When the device is detected again, then the buffered voice is played to it while the IP address validation continues as described above. This buffered voice can't be more than 150-200 ms and is discarded if the time it takes to acquire new IP address is huge.

Another mechanism for a seamless handoff when going from one AP to another is by first doing a handoff to PSTN network and then come back to Wi-Fi. This method assures that when the call leg comes back from PSTN to Wi-Fi, there is no potential glitch being caused just in case the device does not get IP address from the AP/WLAN switch or the router within a short period of time. The handoff mechanism between Wi-Fi network and PSTN network is described in the next section.

b. Handoff between Wi-Fi and cellular network:

The primary reason for a handoff from Wi-Fi to PSTN is performed when the device moves out of the Wi-Fi range while continuing to be in the cellular range. When the device comes back into Wi-Fi range and stays there for a good amount of time, the handoff happens from PSTN to Wi-Fi. To fulfill these requirements, the mobile device keeps on monitoring the Wi-Fi signal strength as well as keeping track of all the APs it can potentially attach to. When one or both of these set of data determines that there is no good Wi-Fi network to use for the voice call, device and server put together needs to initiate a handoff to the PSTN network. In certain cases, even if the Wi-Fi network is perfect, it is possible that L3 network (IP in this case) is in a bad shape and incapable of forwarding high priority/time and delay sensitive traffic like voice (RTP) properly. A period L3 QOS test performed between the device and server provides this data set. Based on the L2 and L3 capability, decision for a handoff is made.

There are two potential cases of Wi-Fi signal depletion and/or loss.

In one case, there is a steady degradation as the mobile user moves away from the access point, and in other the signal drops to zero because the user has moved to an unreachable area (e.g. an elevator).

In the second case, the signal can suddenly drop to zero or can do so very quickly.

In order for the server to detect the need for handoff, it needs to handle both the situations mentioned above. In the first case, when the device detects a slow degradation, it notifies the server once a low signal threshold is reached. This notification will go on the Wi-Fi network over the control plane being used by SIP. Once the server receives this notification, it initiates a handoff and creates a call leg through the PSTN and cellular network.

In the second case, when the signal strength just drops to zero, the device does not get a chance to send any notification for the server to initiate a handoff. In such situation, server relies on the data/media plane to determine loss of Wi-Fi. When the voice call is active, periodic RTP packets are received by the server. When there is no Wi-Fi signal, RTP packets would not be received by the server. Lack of arrival of a finite number of consecutive packets triggers the handoff initiation to PSTN leg. This holds true even in case of silence where a typical endpoint would send less, infrequent packets during persistent silence. In this proposal, silence suppression is not used but VAD/CNG packets are sent out with the same periodicity as regular voice packets.

When the mobile device roams back into a Wi-Fi network and attaches to an AP and obtains an IP address, it REGISTERS with the SIP server and starts sending periodic keep-alive (KA) messages. When the KA messages are received for a good amount of time (say 60 seconds), then a handoff from PSTN to Wi-Fi is initiated. This is done provided the information on L2 and L3 QOS is considered handoff-worthy.

Features and advantages of the present invention may be better understood with reference to the figures and discussions that follow.

As mentioned above, an issue facing users in the prior art relates to disruption that may occur during wireless communication. During a telecommunication session (e.g., voice communication, audio streaming, video streaming, and/or financial information streaming), undesirable interruptions may occur resulting in loss of data. Generally, when the telecommunication device being employed is stationary, there may be insignificant interruptions. However, when the telecommunication device is being moved from one coverage area to another, signal levels may deteriorate and cause the telecommunication session to be disrupted, resulting in a negative telecommunication experience.

Consider the situation wherein, for example, a user of a mobile telecommunication device is participating in a telecommunication session. During the telecommunication session, the user of the mobile telecommunication device may roam outside of a wireless coverage area (e.g., wireless access point).

Figure 26:
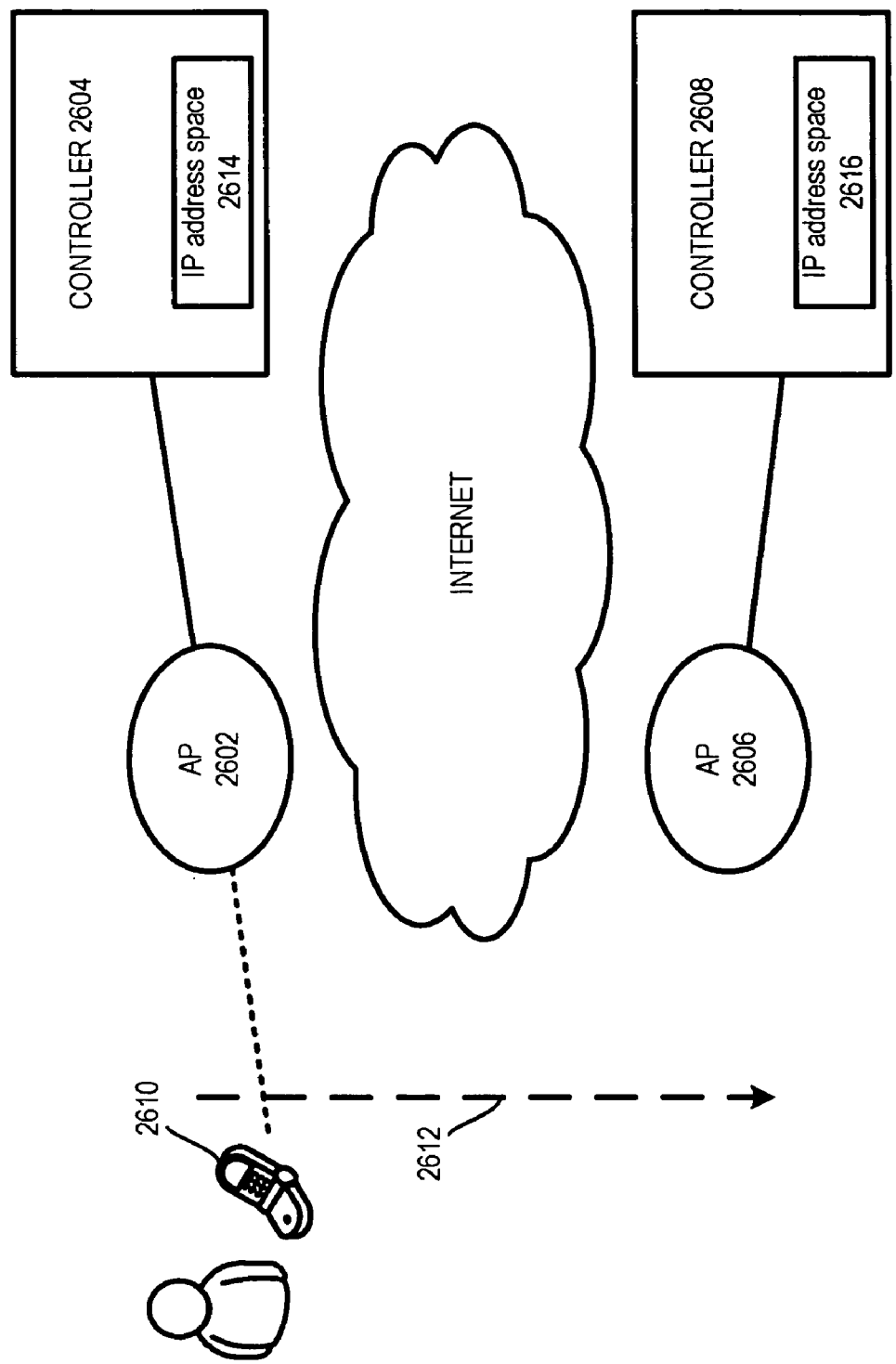
FIG. 26 shows a prior art simple block diagram of access points connected to different controllers.

To facilitate discussion, FIG. 26 show a prior art simple block diagram of access points connected to different controllers. In the prior art, each coverage area may be managed by an independent wireless LAN controller. In an example, a first access point 2602 may be connected to a controller 2604 and a second access point 106 may be connected to a different controller 2608. Controller 2604 and controller 2608 are independent of one another and are not configure to communicate with one another even though a mobile telecommunication 2610 device may be able to communicate with both access points (access point 2602 and access point 2606).

When the user of mobile telecommunication device 2610 moves from the coverage area supported by first access point 2602 to the coverage area supported by second access point 2606 (as shown by a path 2612), mobile telecommunication device 2610 may have to disconnect from first access point 2602 before creating a new connection with second access point 2606. In an example, the user of mobile telecommunication device 2610 may have to disconnect (e.g., hang up) from first access point 2602 (via an IP address from IP address space 2614) and may have to redial to be reconnected with the receiving party via second access point 2606 (via an IP address from IP address space 2616).

The inability for the two controllers of the two access points to communicate with one another to enable a seamless handoff may cause disruption to the telecommunication session and provide a negative telecommunication experience to both parties of the telecommunication session.

Figure 27:
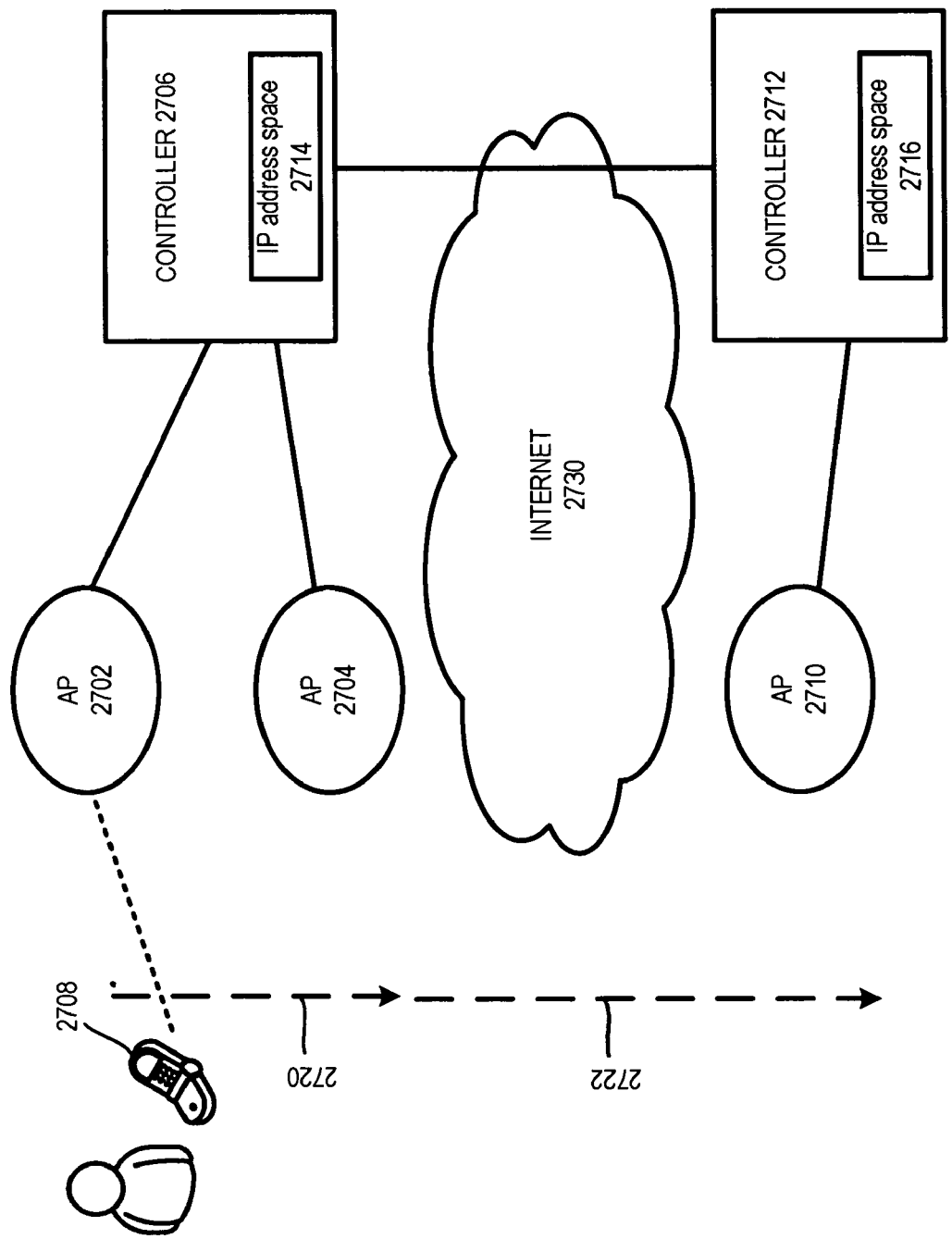
FIG. 27 shows a simple prior art block diagram of access points linked to an interconnected set of controllers.

FIG. 27 shows a simple prior art block diagram of access points linked to an interconnected set of controllers. A set of access points (2702 and 2704) is connected to a controller 2706. Even though the access points may be of different standards and may not communicate directly with one another, controller 2706 may have a transcoder that may enable the two access points (2702 and 2704) to communicate with one another. In an example, as a user of a mobile telecommunication device 2708 roams from access point 2702 to access point 2704 (as shown by a path 220), controller 2706 may be able to transfer mobile telecommunication device 2708 to access point 2704 without changing IP address.

Further, if mobile telecommunication device 2708 is only enabled with one transceiver, mobile telecommunication device 2708 may only be able to connect with one access point at a time. Therefore, telecommunication device 2708 may have to disconnect from access point 2702 before connecting to access point 2704, creating a gap in the telecommunication session. During the gap, IP packets that may have already been sent may be discarded since the destination (e.g., mobile telecommunication 2708) may be unavailable. As a result, mobile telecommunication device 2708 may not receive all incoming IP packets. Although the gap is usually not large during handoff between access points of the same controller, the loss of IP packets may cause some disruption in the telecommunication session. In an example, during a telephone conversation, the disruption may cause a "choppy" voice quality.

In a further example, if the user of mobile telecommunication device 2708 continues to roam (as shown by a path 2722) and enters the coverage area supported by access point 2710, which is managed by a controller 2712, controller 2706 may be able to perform a handoff to controller 2712. Although a handoff is possible between two interconnected controllers, a disruption may generally occur. In an example, controller 2706 may be associated with an IP address from IP address space 2714 and controller 2712 may be associated with an IP address from IP address space 2716. Thus, when handoff occurs, the connection with IP address from IP address space 2714 may be disconnected and another connection may be established with IP address from IP address space 2716 resulting in loss of IP packets (e.g., data loss).

Event if the set of controllers may be configured to perform handoff without creating a telecommunication session with a new IP address, the latency that may exist during the handoff between two access points on different controllers tends to be greater than the latency that may exist in a transfer between two access points on the same controller. One reason is that the transfer between two controllers tends to go through both controllers.

In an example, a user may be roaming while watching a boxing match on his Wi-Fi mobile telephone. While roaming, the user may be moving from one access point to another. Each time the user moves into a coverage area supported by an access point that is managed by a different controller, the user may have to reconnect with a new IP address. Although the handoff is possible, there is usually more latency that may occur since IP address is changing. Thus, each time the user loses connection, the user generally does not receive the missing IP packets that may have been sent while the user was disconnected. As a result, the telecommunication session may be unclear and/or distorted during the handoff.

Further, this method of interconnected controllers is generally implemented utilizing proprietary protocol. Accordingly, for the handoff to be performed, the mobile telecommunication devices, the access points, and even the controllers may need to be provided by the same supplier or collaborating suppliers. The hardware limitation may restrict the choices available to an enterprise that may want to deploy a wireless communication system with handoff capability. In addition, the cost associated with switching hardware may be a significant factor that may further limit the flexibility of the enterprise to update its telecommunication infrastructure.

In accordance with embodiments of the present invention, there is provided a wireless communication system solution that includes a seamless wireless handoff that may be implemented by an enterprise. In accordance with one aspect of the present invention, the inventors herein realized that data loss that may occur during a handoff between two wireless access points may be substantially eliminated by buffering the IP packets being transmitted during the handoff. Embodiments of the invention enable the wireless communication system to incorporate such a buffer system. Embodiments of the invention further include implementing the buffer system on a mobility client and a mobility server.

Consider the situation wherein, for example, the user of a mobility client is communicating with a user on an external telecommunication device via a wireless access point. During the telecommunication session, the user of the mobility client may roam.

In an embodiment of the invention, the mobility client may include a mobility manager client module capable of communicating with a mobility manager server module located on the mobility server. As the user of the mobility client roams, the mobility manager client module may detect (via a detecting mechanism) that the signal strength is deteriorating and that another access point is available, which may offer a stronger signal. In addition, the mobility manager client module may notify the mobility manager server module when a handoff is forthcoming.

In an embodiment, the wireless communication system may include a voice engine module and a media server and voice quality engine module capable of buffering outgoing IP packets. The purpose of the buffer system is to prepare for potential IP packets loss as the user roams from one access point to another.

In an embodiment, after a new connection has been established with an access point that does not require an IP address change, the voice engine module and the media server and voice quality engine module may remove the buffer system and begin forwarding and synchronizing the incoming IP packets. As a result, a seamless transition may occur with substantially no IP packets loss.

In another embodiment, the media server and voice quality engine module may buffer the incoming IP packets until the mobility client has completed the registration process, if an IP address change has occurred. In addition, the mobility server may activate an authentication timer. The authentication timer may be configured to provide a pre-defined time limit for the owner (mobility client) of the IP packets to register with the mobility server.

In an embodiment, if registration and authentication process occur in a timely manner (within the pre-defined time limit), the voice engine module and media server and voice quality engine module of the mobility server may synchronize the incoming IP packets and continue their functions of exchanging IP packets. If the registration and authentication process does not happen within the preset time limit, the mobility server may refuse the IP packets coming from the new access point. The additional registration and authentication process provide the wireless communication system with protection against potential attacks, such as spoofing.

In an embodiment, to prevent disruption to the telecommunication session when the registration and authentication process is not successful, a connection may be made to the mobility server through a cellular network.

The features and advantages of the present invention may be better understood with reference to the figures and discussions that follow.

Figure 28:
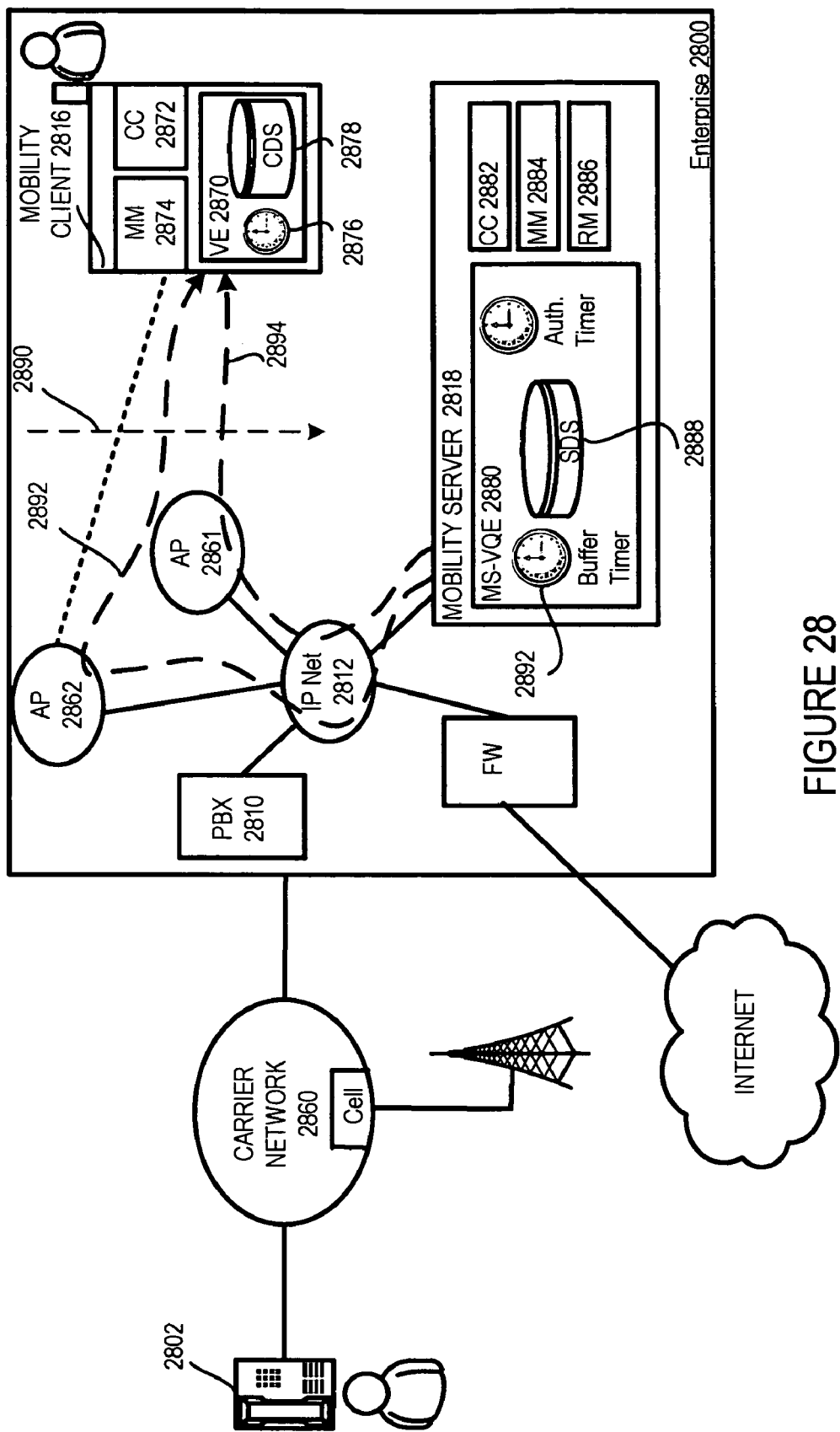
FIG. 28 shows, in an embodiment of the invention, a block diagram of a user on a mobility client roaming between two access points managed by a single controller.

FIG. 28 shows, in an embodiment of the invention, a block diagram of a user on a mobility client roaming between two access points managed by a single controller. Consider the situation wherein, for example, a user of a mobility client 2816 is conversing with a user of an outside telephone 2802. The IP packets (e.g., voice packets) may traverse through a carrier network 2860 to connect with a user on mobility client 2816 within an enterprise 2800. The IP packets may be first received by a PBX 2810. PBX 2810 may then route the IP packet through an internal IP network 2812 (e.g., intranet) to mobility server 2818. From mobility server 2818, the IP packets may be sent to mobility client 2816 via IP network 2812 and an access point 2862 (as shown by a path 2892).

During the telecommunication session, the user of mobility client 2816 may roam from access point 2862 to an access point 2861 (as shown by a path 2890). In this example, access point 2862 and access point 2861 may be managed by the same controller. Thus, both access points may share the same IP address space, not requiring a new IP address for the mobility client.

As the user of mobility client 2816 move toward access point 2861, a mobility manager client module 2874 in mobility client 2816 may be monitoring the signal levels and may be communicating the signal level changes to a mobility manager server module 2884 in mobility server 2818. In an embodiment, mobility manager client module 2874 may be configured to receive and evaluate current state of connectivity with information such as signal strength data and other parameters to detect imminence of handoffs and to make handoff decisions. In an embodiment of the invention, mobility manager server module 2884 of mobility server 2818 may be configured to receive and store connectivity information of mobility client 2816.

Since mobility manager client module 2874 is aware of the Wi-Fi infrastructure, mobility manager client module 2874 may realize that a handoff may be possible in order to receive better connectivity. In an example, the signal level provided by access point 2862 may be weakening while the signal level provided by access point 2861 may be getting stronger. As a result, both mobility client 2816 and mobility server 2818 may begin to prepare for a potential handoff.

To prepare for the handoff, mobility manager client module 2874 may inform call control client module 2872 that a handoff is possible. As aforementioned in FIG. 10, a call control client module 2872 may be configured to manage outgoing data and incoming data of mobility client 2816. Call control client module 2872 may notify a voice engine module 2870 to begin buffering the IP packets that may be sent out to mobility server 2818.

In an embodiment, to perform the buffering, voice engine module 2870 may include a client data storage 2878 and a client buffer timer 2876. Client data storage 2878 may be configured to buffer outgoing IP packets of mobility client 2816 when a handoff is imminent. Client buffer timer 2876 may be configured for the duration that client data storage 2878 has buffered the outgoing IP packets. If the duration exceeds a predetermined duration, client data storage 2878 may discard the outgoing IP packets that have been buffered, to prevent transmission of extensively delayed data, in an embodiment. The predetermined duration may depend upon the characteristics of the outgoing IP packets. In an example, if the outgoing IP packets are voice data, the length of the predetermined duration may be 200 ms or less.

Meanwhile, mobility manager server module 2884 may inform a call control server module 2882, which is configured to perform functions relating to establishing telecommunication session, that a handoff is possible. In an embodiment, call control server module 2882 may inform a media server and voice quality engine module 2880 through a resource manager module 2886 to begin buffering the IP packet that may be received from outside telephone 2802.

In an embodiment, media server and voice quality engine module 2880 may include a server data storage 2888 and a server buffer timer 2892. Server data storage 2888 may be configured to buffer outgoing IP packets to mobility client 2816 when a handoff is forthcoming. Server buffer timer 2892 may be configured for the duration that server data storage 2888 has buffered outgoing IP packets to mobility client 2816. If the duration reaches a predetermined duration, server data storage 2888 may discard the outgoing IP packets that have been buffered, to prevent transmission of extensively delayed data, in an embodiment.

Once one or more criteria (e.g., signal strength, channel loading, and/quality of communication) have been met, mobility client 2816 may disconnect from access point 2862 and establish a connection with access point 2861. Mobility server 2818 may now route the telecommunication session to mobility client 2816 through IP network 2812 and access point 2861 (as shown by a path 2894) to establish a telecommunication session between mobility client 2816 and outside telephone 2802

Mobility manager client module 2874, after recognizing that the handoff has completed, may notify mobility manager server module 2884. Upon receiving the notification, the mobility server 2818 may begin to send the buffered IP packets to mobility client 2816. At the same time, mobility client 2816 may begin to send its buffered IP packets also. Upon receiving the IP packets, both mobility server 2818 and mobility client 2816 may perform synchronization to determine which incoming IP packets have not been previously received.

Although an IP address change has not occurred during the handoff (since both access points 2861 and 2862 are managed by the same controller), a gap may exist while the handoff occurs. To address the gap issue, the synchronization of IP packets by both mobility server 2818 and mobility client 2816 may ensure that IP packets are not lost during the handoff. Thus, the transition may appear seamless to both parties.

Figure 29:
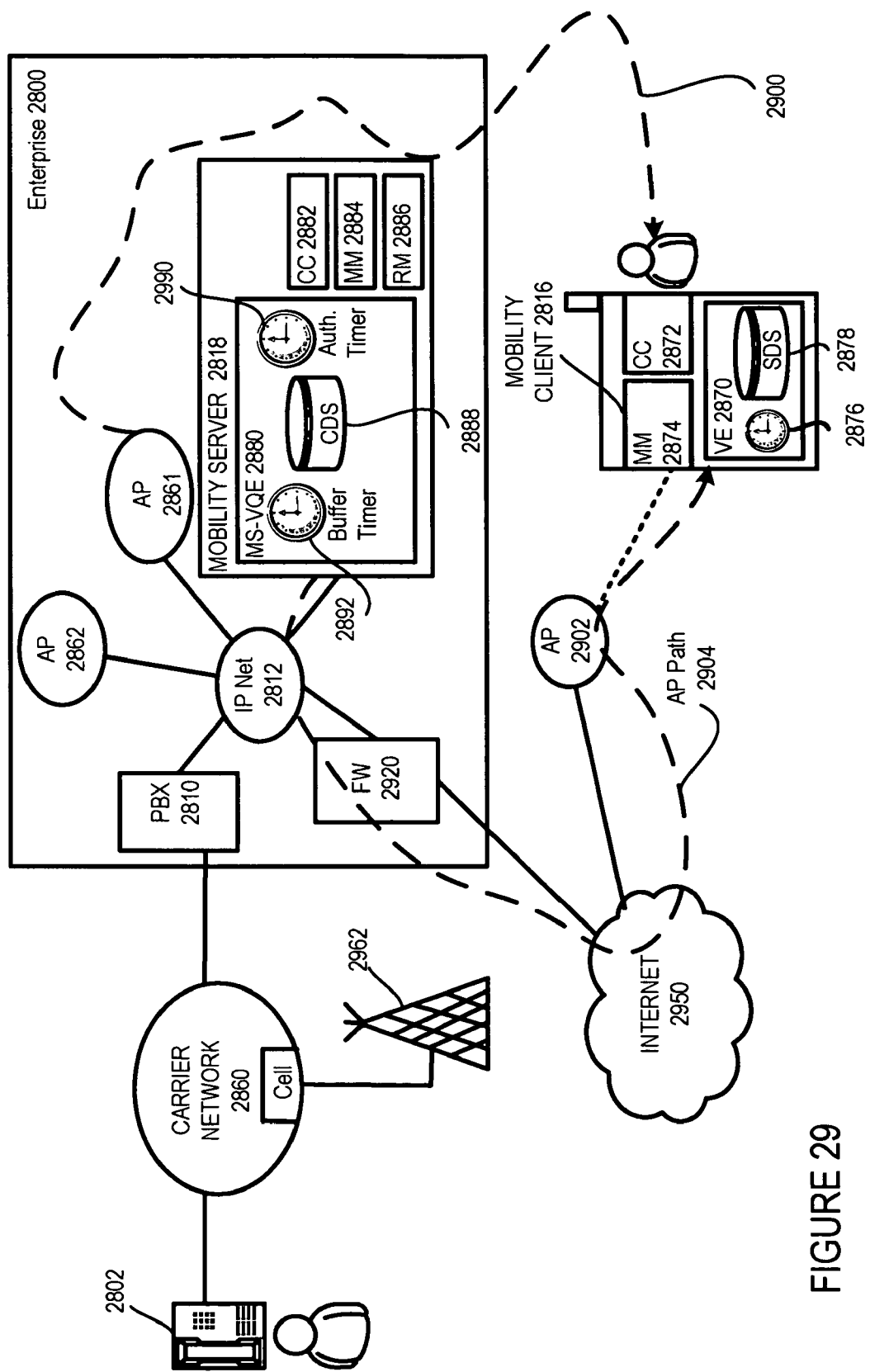
FIG. 29 shows, in an embodiment of the invention, a block diagram of a user on a mobility client roaming between two access points that may be managed by two different controllers.

FIG. 29 shows, in an embodiment of the invention, a block diagram of a user on a mobility client roaming between two access points that may be managed by two different controllers. The embodiment described in FIG. 29 is similar to the embodiment described in FIG. 28 except, a change of IP address may require the mobility client to register with the mobility server through the new access point.

Consider the situation wherein, for example, the user of mobility client 2816 connected to access point 2861 begins to roam outside of enterprise 2800 (as shown by a path 2900) toward an access point 2902. In this example, access point 2902 and access point 2861 may be managed by different controller. Thus, both access points do not share the same IP address space and the mobility client will be forced to change its IP address.

As aforementioned, mobility manager client module 2874 and mobility manager server client module 2884 may be sharing connectivity status data. As the user of mobility client 2816 roams away from access point 2861 and toward access point 2902, mobility manager client module 2874 may notify mobility manager server module 2884 of an imminent handoff. Thus, both mobility client 2816 and mobility server 2818 may begin to prepare for a potential handoff Once one or more criteria (e.g., signal strength, channel loading, and/quality of communication) have been met, both voice engine module 2870 and media server and voice quality engine module 2880 may begin buffering outgoing IP packets.

Once mobility client 2816 disconnects from access point 2861 and establish a connection with access point 2902. At this point, mobility manager client module 2874 may notify mobility manager server module 2884 that a connection has been created with access point 2884. In addition voice engine 2870 may end its buffer timer and begin sending the buffered IP packets to mobility server 2818.

In an embodiment, if a new connection with access point 2902 requires a new IP address, then mobility client 2816 may have to re-register with mobility server 2818 through the new access point. In an embodiment, the mobility server 318 may buffer the incoming IP packets from mobility client 2816 until the registration process has completed.

In an embodiment, media server and voice quality engine module 2880 of mobility server 2818 may include an authentication timer 2990. Authentication timer 2990 may be configured to measure the amount of time mobility client 2816 may take to register with mobility server 2818 when a change of IP address has occurred. If mobility client 2816 does not register within an allowed authentication time limit, mobility server 2818 may reject the handoff, to prevent potential security problems.

If the registration and authentication occur within the time limit, then mobility server 2818 may allow the buffered IP packets to flow to the designated party. In the prior art, a change in IP address generally result in a significant gap during which data loss may occur. To address the gap issue, the synchronization of IP packets by both mobility server 2818 and mobility client 2816 may ensure that IP packets are not lost during the handoff. Thus, the transition may appear seamless to both parties.

Mobility server 2818 may now route the telecommunication session to mobility client 2816 through IP network 2812, a firewall 2920, an Internet 2950 and access point 2902 (as shown by a path 2904) to establish a telecommunication session between mobility client 2816 and outside telephone 2802.

In an embodiment, if the user of mobility client 2816 is not able to authenticate within the pre-defined time limit, a cellular connection through a cellular network 2962 (as described in FIGS. 12 and 13) between mobility server 2818 and mobility client 2816 may be established to prevent disruption in the telecommunication session. The switch to a cellular connection may provide sufficient time for mobility client 2816 to attempt another authentication/registration.

Figure 30:
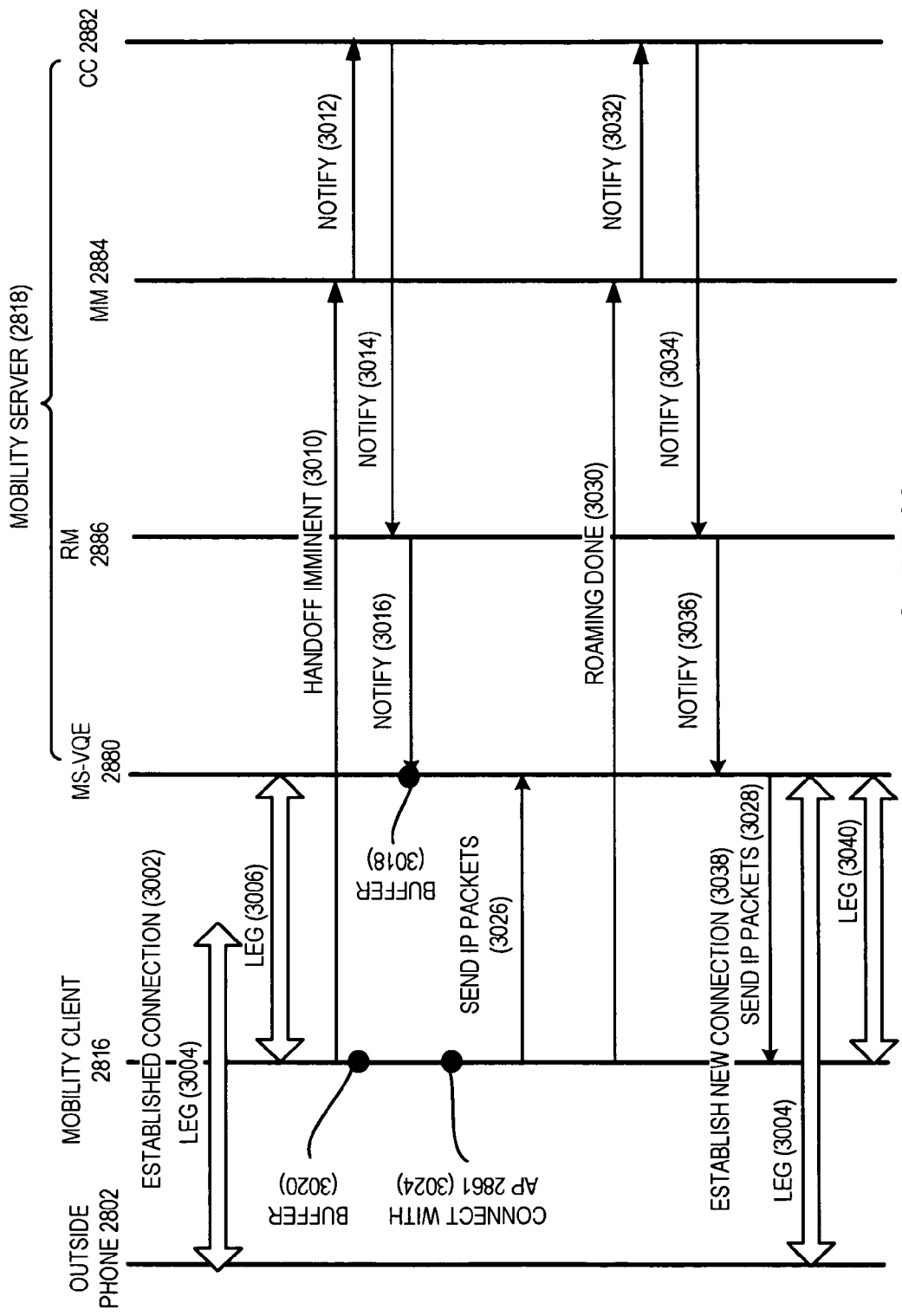
FIG. 30 shows, in accordance with one or more embodiments of the present invention, a call flow of a roaming scenario that does not involve an IP address change (as discussed in FIG. 28).

FIG. 30 shows, in accordance with one or more embodiments of the present invention, a call flow of a roaming scenario that does not involve an IP address change (as discussed in FIG. 28).

An establish connection 3002 between outside telephone 2802 and mobility client 2816 via mobility server 2818 may exist. Established connection 3002 may include two legs 3004 and 3006. Leg 3004 is associated with the connection between outside telephone 2802 and mobility server 2818. In an example, outside telephone 2802 may be connected to mobility server 2818 via carrier network 2860, PBX 2810, and IP network 2812. Leg 3006 may be associated with the connection between mobility client 2816 and mobility server 2818. In an example, mobility client 2816 may be connected to mobility server 2818 via IP network 2812 and access point 2862.

During the telecommunication session, data about the connectivity status of mobility client 2816 may be continuously communicated to mobility server 2818. As the user of mobility client 2816 roams from access point 2862 to another access point 2861, mobility manager client module 2874 may send a notification to mobility manager server module 2884 that a handoff may be possible (step 3010). At a next step 3012, mobility manager server module 2884 may forward the notification to call control server module 2882. Call control server module 2882 may forward the notification call to media server and voice quality engine module 2880 via resource manager 2886 (steps 3014 and 3016).

At a next step 3018, upon receiving the notification, media server and voice quality engine module 2880 may begin to buffer the incoming IP packets from outside telephone 2802. Meanwhile, mobility manager client module 2874 may notify voice engine module 2870 via call control client module 2872 to begin buffering the outgoing IP packets (step 3020). Throughout this transition, both voice engine module 2870 and media server and voice quality engine module 2880 may still be sending IP packets. However, to ensure that the weakening signal level does not inadvertently cause IP packets loss, IP packets may be buffered for later synchronization.

Once one or more criteria (e.g., signal strength, channel loading, and/quality of communication) have been met, call control client module 2872 will acknowledge the connection with access point 2861 (step 3024). At around the same time, call control client module 2872 may notify mobility manager client module 2874 that the roaming period has terminated. At a next step 3030 mobility manager client module 2874 may then forward the notification (i.e., that roaming has terminated) to mobility manager server module 2884. Upon receiving the notification mobility manager server module 2884 may notify call control server module 2882 that roaming has completed (step 3032). Upon receiving the notification, call control server module 2882 may notify media server and voice quality engine module 2880 via resource manager module 2886 that roaming has completed (steps 3034 and 3036). At a next step 3026, voice engine module 2870 of mobility client 2816 may begin sending the buffered IP packets to media server and voice quality engine module 2880 through the new access point 2861. Upon receiving the IP packets, media server and voice quality engine module 2880 may in turn send the buffered IP packets to voice engine module 2870 (3028). In an embodiment, both voice engine module 2870 and media server and voice quality engine module 2880 may first synchronize the incoming IP packets against the received IP packets to ensure that IP packets have not been lost.

The new connection 3038 may now include legs 3004 and 3040. Leg 3004 has not changed and still includes the media traffic from outside telephone 2802 to mobility server 2818 through carrier network 2860, PBX 2810, and IP network 2812. Leg 3040 has replaced leg 3006 and now includes media traffic flowing from mobility server 2818 to mobility client 2816 via IP network 2812 and access point 2861.

Figure 31:
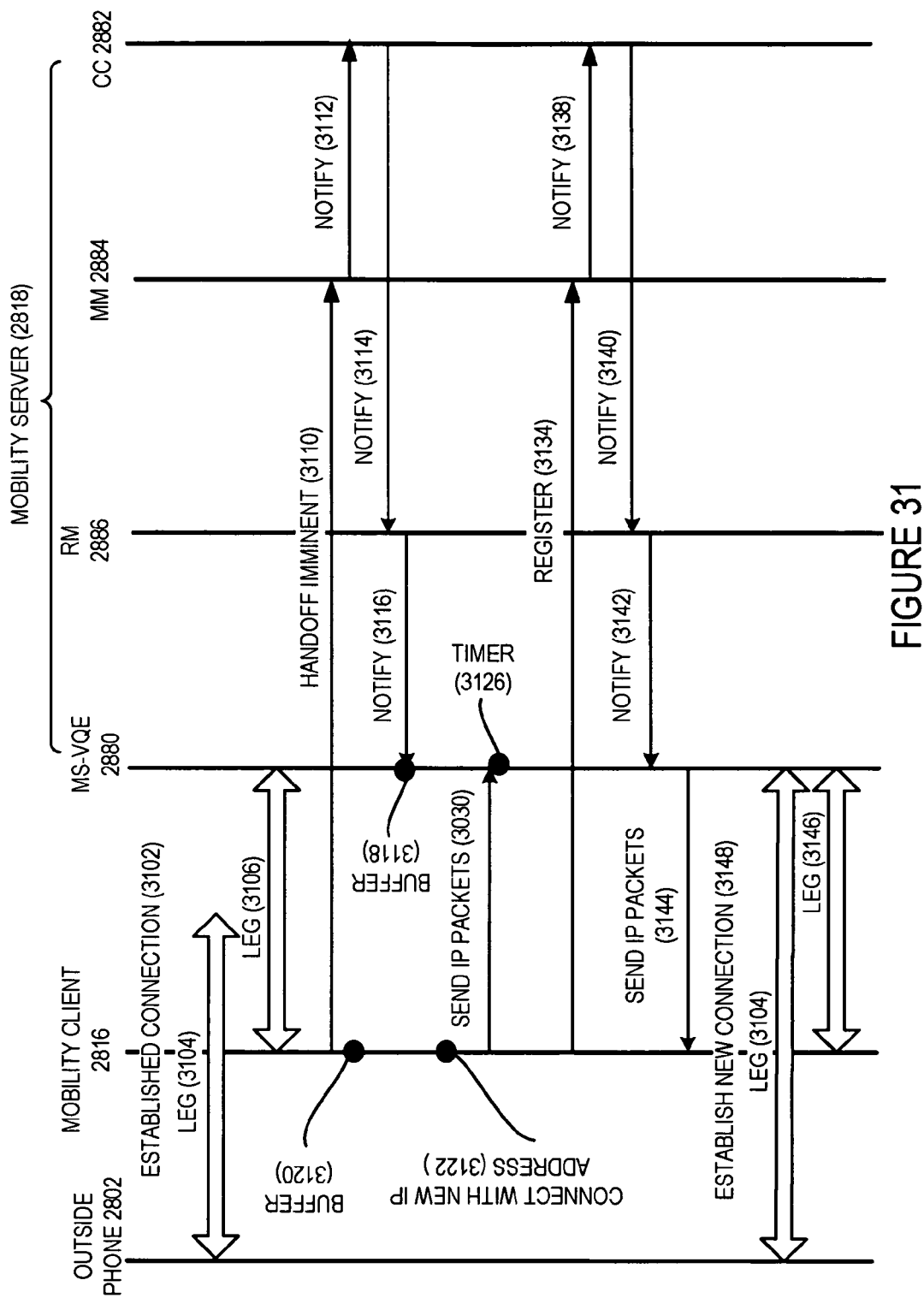
FIG. 31 shows, in accordance with one or more embodiments of the present invention, a call flow of a roaming scenario that involves IP address change.

FIG. 31 shows, in accordance with one or more embodiments of the present invention, a call flow of a roaming scenario that involves IP address change (as discussed in FIG. 29).

An establish connection 3102 between outside telephone 2802 and mobility client 2816 via mobility server 2818 may exist. Established connection 3102 may include two legs 3104 and 3106. Leg 3104 may be the same connection as leg 3004 and may be associated with the connection between outside telephone 2802 and mobility server 2818. Leg 3006 may be associated with the connection between mobility client 2816 and mobility server 2818 via access point 2861.

Step 3108 through step 3120 are similar to step 3008 through step 3020 of FIG. 30. In other words, mobility client 2816, which has been communicating its connectivity status with mobility server 2818, may notice that signal level coming from access point 2861 may be weakening and that signal level coming from access point 2902 may be getting stronger. Mobility client 2816 may notify mobility server 2818 to prepare for a handoff (steps 3110, 3112, 3114, and 3116). Both mobility client 2816 and mobility server 2818 may begin buffering outgoing IP packets (steps 3118 and 3120).

Once one or more criteria (e.g., signal strength, channel loading, and/quality of communication) have been met, call control client module 2872 will acknowledge the connection with access point 2902 (step 3122). Since access point 2861 and access point 2902 are associated with different controllers, the new connection may involve an IP address change.

At a next step 3124, voice engine module 2870 may begin sending the buffered IP packets to media server and voice quality engine module 2880 through the new access point 2902 via Internet 2950, firewall 2920, and IP network 2812. Upon receiving the IP packets, media server and voice quality engine module 2880 may begin an authentication timer and buffered the incoming IP packets from voice engine module 2870 (step 3126).

At around the same time, call control client module 2872 may notify mobility manager client module 2874 that the roaming period has terminated. Mobility manager client module 2874 may then forward the notification to mobility manager server module 2884.

Meanwhile, mobility manager client module 2874 may register with mobility manager server module 2884 through the new access point 2902, at a next step 3134. Upon receiving the registration, mobility manager server module 2884 may perform authentication. If the registration and authentication process does not complete in a timely manner (i.e., within the allowed authentication time limit), mobility server 2818 may reject the handoff.

However, if the registration and authentication process occur within the time limit, then mobility manager server module 2884 may notify call control server module 2882 that roaming has completed (step 3138). Upon receiving the notification, call control server module 2882 may notify media server and voice quality engine module 2880 via resource manager module 2886 that roaming has completed (steps 3140 and 3142). Upon receiving the notification, at a next step 3144, media server and voice quality engine module 2880 may synchronize the incoming IP packets from mobility client 2816 against the received IP packets before forwarding the IP packets to outside telephone 2802. Around the same time, voice engine 2870 may be performing similar synchronization for incoming IP packets from mobility server 2818

The new connection 3148 may now include legs 3104 and 3146. Leg 3104 has not changed and still includes the media traffic from outside telephone 2802 to mobility server 2818 through carrier network 2860, PBX 2810, and IP network 2812. Leg 3146 has replaced leg 3106 and now includes media traffic flowing from mobility server 2818 to mobility client 2816 via IP network 2812, firewall 2920, Internet 2950, and access point 2902.

Figure 32:
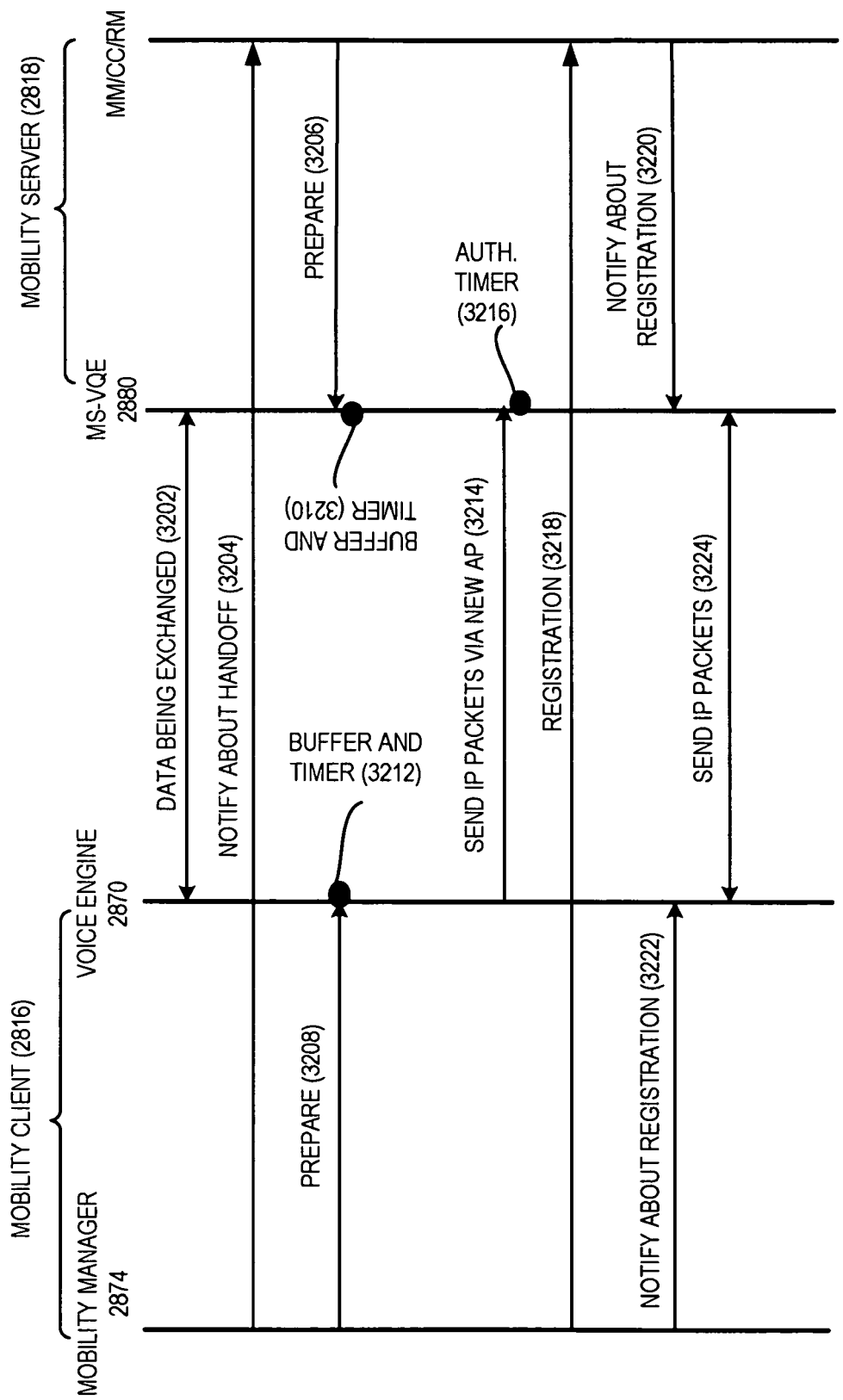
FIG. 32 shows, in accordance with one or more embodiments of the present invention, a buffer scheme.

FIG. 32 shows, in accordance with one or more embodiments of the present invention, a buffer scheme.

Consider the situation wherein, for example, a telecommunication session has been established between mobility client 2816 and another telecommunication device. The telecommunication session may include, but are not limited to, audio streaming, video stream, and data streaming. In an embodiment, mobility client 2816 may be connected to the telecommunication via mobility server 2818. During the telecommunication session, mobility client may be communicating its connectivity status with mobility server via a Wi-Fi access point.

At a first step 3202, voice engine module 2870 of mobility client 2816 is exchanging IP packets with media server and voice quality engine module 2880 of mobility server 2818.

During the telecommunication session, mobility manager client module 2874 may be communicating with mobility manager server module 2884. If one or more criteria (e.g., signal strength, channel loading, voice quality, and/or data transmission quality) are met and a handoff is forthcoming, then at a next step 3204, mobility manager client module 2874 of mobility client may inform the mobility manager server module 2884 of mobility server that a handoff is possible (e.g., another access point and/or a cellular network). Upon receiving the notification, mobility manager server module 2884 may inform media server and voice quality engine module 2880 (via call control server module 2882 and resource manager module 2886) to prepare for a handoff (step 3206). Meanwhile, mobility manager client module 2874 may inform voice engine module 2870 to prepare for a handoff (step 3208).

Upon receiving the notification, both voice engine module 2870 and media server and voice quality engine 2880 to buffer the outgoing IP packets (steps 3210 and 3212). In an embodiment, a buffer timer may be initiated to measure the duration of time for buffering the IP packets. In an embodiment, the mobility client and/or mobility server may not have to perform buffering if IP packets are only been sent in one direction. In an example, if the mobility client is receiving video transmission from the mobility server, then only the mobility server may have to perform buffering. In another example, if the mobility client is sending data transmission (e.g., email), then the mobility server may not have to perform buffering.

In an embodiment, the buffer timer may expire if a predetermined period of time has expired. In an example, if the incoming data is associated with a voice call, the length of the predetermined duration may be 200 ms or less. If the buffer timer has expired, then the buffered IP packets may be discarded to prevent transmission of extensively delayed data that may potentially cause confusion.

Meanwhile, if the handoff is imminent, mobility client 2816 may disconnect from first access point 2861 and make a new connection with the new access point 2902. At a next step 3214, voice engine 2870 of mobility client 2816 may begin sending the IP buffered packet via access point 2902 to media server and voice quality engine 2880 of mobility server 2818.

However, if the method determines that the incoming IP packets are being sent by an unregistered mobility, media server and voice quality engine 2880 may buffer the incoming IP packets until registration has completed. In addition, the media server and voice quality engine 2880 may begin an authentication timer, which may be configured to measure the time mobility manager client module 2874 takes to register, in an embodiment (step 3216).

At around the same time, at a next step 3218, mobility manager client module 2874 may register with the mobility manager server module 2884 of mobility server 2818. Upon receiving the registration, mobility manager server module 2884 may perform authentication. If the registration completes within a pre-defined time limit, then at a next step 3220, mobility manager server module 2884 may inform media server and voice quality engine 2880 that registration has completed. Upon receiving the notification, media server and voice quality engine 2880 may begin to accept the incoming IP packets from voice engine module 2870.

At around the same time, at a next step 3222, mobility manager client module 2816 may inform voice engine module 2870 that registration has completed successfully.

At a next step 3224, the IP packets are exchanged and synchronized and the telecommunication session between the mobility client and the other telecommunication device may continue.

Referring back to step 3216, if the registration and authentication does not complete in a timely manner (e.g., predetermined time), then the authentication timer may expired and mobility server 2818 may reject the handoff, to prevent security problems such as, for example, address spoofing.

The method described in FIGS. 26-32 is not limited to only a Wi-Fi to Wi-Fi handoff. Instead, the discussions are meant as examples and the invention is not limited by the specific application presented. In an embodiment of the invention, the method may also be applied in other handoff scenarios, including, but are not limited to, from a Wi-Fi network to a cellular network, from a cellular network to a Wi-Fi network, and from one cellular network to another.

As can be appreciated from the forgoing, one or more embodiments of the present invention provide a wireless communication system that employs a multiple network arrangement that can be managed by an enterprise to provide a seamless transition between wireless access points. Also, the wireless communication system includes a mobility client and mobility server capable of interacting with one another to determine when a handoff is possible, enabling both the mobility server and mobility client to prepare for the transition. Further, the wireless communication system enables the implementation of a buffering system that may prevent the loss of IP packets during a handoff, thus resulting in an uninterrupted telecommunication session. In addition, the wireless communication system reduces the cost associated with changes to equipments (e.g., network equipments and telecommunication devices) by being independent of operating system, brands, and/or models. Moreover, the wireless communication system further enables a smooth transition between networks when a handoff between two wireless access points is not possible.

F. Selecting Network Stack Functions in Hardware for a Media Stream Processing Distributed System 1. Background Conventionally, a distributed system includes a software network stack for processing all received and transmitted packets on a network interface. Receive packets must be classified by inspection of header fields, and processed according to any rules associated with the classification. Transmit packets must be processed to ensure packet header fields are set correctly. These functions are performed at more than one layer in the network stack. Processing a classified packet involves application of filter rules to drop or accept the packet, perform accounting, and application of destination or forwarding rules to dispatch the packet to a processing engine via an internal message bus. Network stack functions must be fully implemented to handle both control and media packets.

When using a general purpose processor or specialized network processor to perform network stack functions for a distributed system, problems with performance and cost are common. When designing with a general purpose processor, a high speed processor is required meet performance requirements and still, typically, can not reach line-rate performance. When designing with a network processor, performance requirements are achieved but a small-scale distributed system, one with most media processing engines not present, is burdened by a high initial cost. The cost problem is compounded when the system requires redundant interfaces. Additionally, system network access is not transparent to the application software, requiring proprietary network access interfaces. This adds significant complexity (i.e. cost) to the software, and limits portability.

A better network interface solution is one capable of transparently performing select network stack functions in low-cost hardware for the specific purpose of classifying, filtering and dispatching received Ethernet packets to processing engines, and final manipulation of select header fields in transmitted Ethernet packets. Packets not classified by the hardware are forwarded to a control processing engine utilized to perform non-time critical network stack processing. Using an Ethernet packet interface between the hardware and processing engines, this solution is transparent to software, allowing applications to utilize common POSIX standard network and maintain portability to other systems. The system network stack is logically running some performance-critical functions in the network interface hardware for media streams, and all other network stack functions, for the small percentage of packets which are not media packets, are running in software on a general purpose processor.

2. Summary

A distributed multi-processor system design using low-cost hardware to implement select IP stack functions can achieve high levels of system performance and scalability at minimal cost and hardware complexity. The method provides for packet identification based on UDP or TCP transport type and port number, filtering and discarding undesirable packets, and forwarding of required packets to one of several processing engines. Classification information, written into the packet by the hardware classifier, is used to explicitly associate a received packet with a registered application on the processing engine; this allows the processing engine to avoid invoking IP stack functions already performed in hardware.

Special purpose network interface hardware is required for optimal design of a distributed system dedicated to media stream processing. This hardware offloads receive and transmit packet processing from the control processing engines, media processing engines and digital signal processors (DSP), such that cost effective processor and DSP devices may be selected. The purpose of the hardware is to classify media stream packets for direct delivery to media processing engines, and delivery all other control traffic to a control processor. For transmit packets, the hardware performs final packet header processing, setting system values in select header fields. Logically, the system network stack functions are distributed, or split, between the hardware, the control processors, and the media processing engines. The hardware is sufficiently flexible to additionally perform specialized, detailed, filtering to effectively provide a hardware firewall.

Advantages of the invention include low cost, high performance, and maintenance of POSIX standard interfaces for application programming. These advantages enable a distributed system design to meet cost-of-goods (COGs) goals, system performance and scalability requirements. By using POSIX standard network interfaces, initial and continuing engineering cost and resource requirements are not increased. Given the high complexity and cost of software development, and the high cost to provide a quality, defect free software release, this invention provides a significant advantage over far more complex alternatives.

3. Overall Architecture

The network interface hardware design for a distributed system in a cost-conscious marketplace presents significant challenges. The foremost challenge is cost. It is widely recognized that a functionally complete system, even one with exceptional flexibility or performance characteristics, is not viable if cost results in sales price significantly higher than market demand. Cost is multiplied by the requirement for redundancy, whether using 802.1D/w Spanning Tree Protocol or 802.3ad Multi-Link Trunking, as two network interfaces are required.

Use of an FPGA-based design meets the low-cost requirements, provides flexibility sufficient to implement selected IP functions per the system design, allows for future requirements, and provides line-rate performance. Once the FPGA hardware has classified a packet and performed the defined IP functions, the decision information is provided with the classified packet when it is dispatched, or distributed, to the specified processing engine. When this action is necessary, the Ethernet type field is set to indicate the IP functions which have been performed, and those IP functions required to be performed next. The processing engine, upon receiving the classified packet, skips IP classification functions, including filter actions, already performed inserts the packet into the network stack at the indicated point.

The system architecture consists of several blocks, each with one or more internal blocks. The system network interface hardware requires one or two Ethernet interfaces, depending on the redundancy requirement. The packet dispatch hardware interconnects all control and media processing engines and the system network interface(s). Control processing engines are designed to provide system management and control service access points. Media processing engines are designed to provide low-latency, high-capacity media processing, and may include several DSPs or security co-processors as required to meet performance specifications.

4. Receive Media Packet Processing

Received packet header processing is performed by the system network interface hardware as packet data starts to enter the system. The destination MAC is inspected to verify the packet is destined to this system. Since the system operates in cut-through mode, the MAC frame CRC is not checked next. The MAC checksum is assumed to be a valid checksum as the packet data is received and additional network stack functions are invoked. The Ethernet type is inspected, and non-IP packets are handled by control packet processing.

For IP packets, processing is performed to differentiate media packets from control packets. First, the destination IP address is inspected to verify the packet is destined for local delivery. IP packets not destined to this system, or which match a drop filter entry, are counted and discarded. The IP transport protocol type is checked to be either TCP or UDP. After compensating for length variations due to IP header options, and TCP header options if necessary, the transport protocol destination port information is initially used for stream demultiplexing. The port is used as an index, or key, to a media stream table. This media stream table contains only media stream port definitions for the sole purpose of separating media packets from control packets. If a packet is not classified as a media packet, it is forwarded to a control processor for the remainder of the network stack processing. Media packets, if not requiring further demultiplexing, are processed per the media stream table match rules. These rules indicate count and drop, forward to media processing engine, or demultiplex per Media Service Access Point (MSAP) service rules.

MSAP media streams are demultiplexed using the synchronization source (SSRC) field in the Real Time Transport (RTP) or Secure Real Time Transport (SRTP) header. When the network interface hardware classifies a media packet by a match with the MSAP port number, the hardware further identifies a selected sub-field within the RTP/SRTP SSRC. This SSRC sub-field is used as an index, or key, to the media stream table. As for non-MSAP media streams, these rules indicate count and drop or forward to media processing engine.

Final processing of media streams modifies the packet for delivery to destination and provides information describing which network functions were performed. This requires changing select fields, including the MAC destination and MAC Ethernet type fields.

5. Receive Control Packet Processing

Any packet not matched by the hardware media stream classifier is directed to the system control processor. The control processor, by definition, handles only management and control traffic, no media traffic.

Features and advantages of the present invention may be better understood with reference to the figures and discussions that follow.

Figure 33:
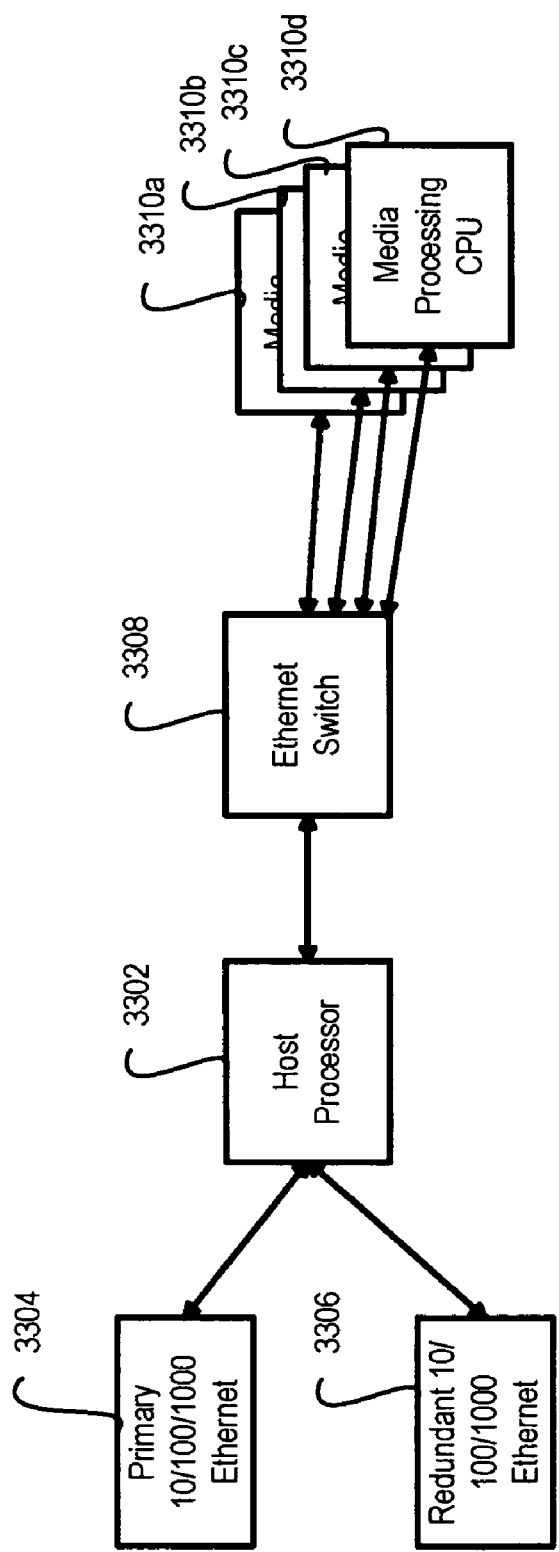
FIG. 33 shows a prior art logic block diagram in which a host processor is employed not only to perform the classification and packet forwarding tasks, but also to perform other host processing tasks.

FIG. 33 is a prior art logic block diagram in which host processor 3302 is employed not only to perform the classification and packet forwarding tasks, but also to perform other host processing tasks, for example, to set up the media stream, to service file transfer protocol (FTP), to secure shell request, and to manage the hardware box itself. Host processor 3302 receives packets from one or both physical interfaces 3304 and 3306. Based on the header information in a received packet, host processor 3302 performs the classification task by, for example, determining the destination MAC address via a table lookup and then by modifying the packet to update the destination MAC address so that the received packet can be forwarded to its destination.

Once updated, host processor 3302 forwards the packet to Ethernet switch 3308 to enable the packet to be forwarded to one of media processing CPUs 3310*a*, 3310*b*, 3310*c*, and 3310*d*. Generally speaking, media processing CPUs 3310*a*-3310*d* perform the digital signaling processing (DSP) functions pertaining to the media stream. Media processing functions may include, for example, encoding, decoding, mixing, echo cancellation, and the like.

Host processor 3302, in addition to performing the aforementioned classification and packet forwarding tasks for the media stream packets, also handles the control packets that are received, for example, to set up and tear down calls. Furthermore, host processor 3302 also handles other processing tasks typically expected of a host processor. Accordingly, only a portion of the processing power of host processor 3302 is available for performing the classification and packet forwarding tasks.

For media stream packets, which tend to be highly sensitive to delays, the inability of host processor 3302 to handle the media stream packets at high speed is an impediment. For example, for streaming audio, streaming video, or for internet telephony or videoconferencing applications, the media stream packets are highly delay sensitive and need to be forwarded in a timely manner. In order to achieve the high performance required by the media stream packets, designers have to resort to high powered host processors. As is known, these high powered host processors tend to be expensive and tend to drive up the cost of the overall system.

Figure 34:
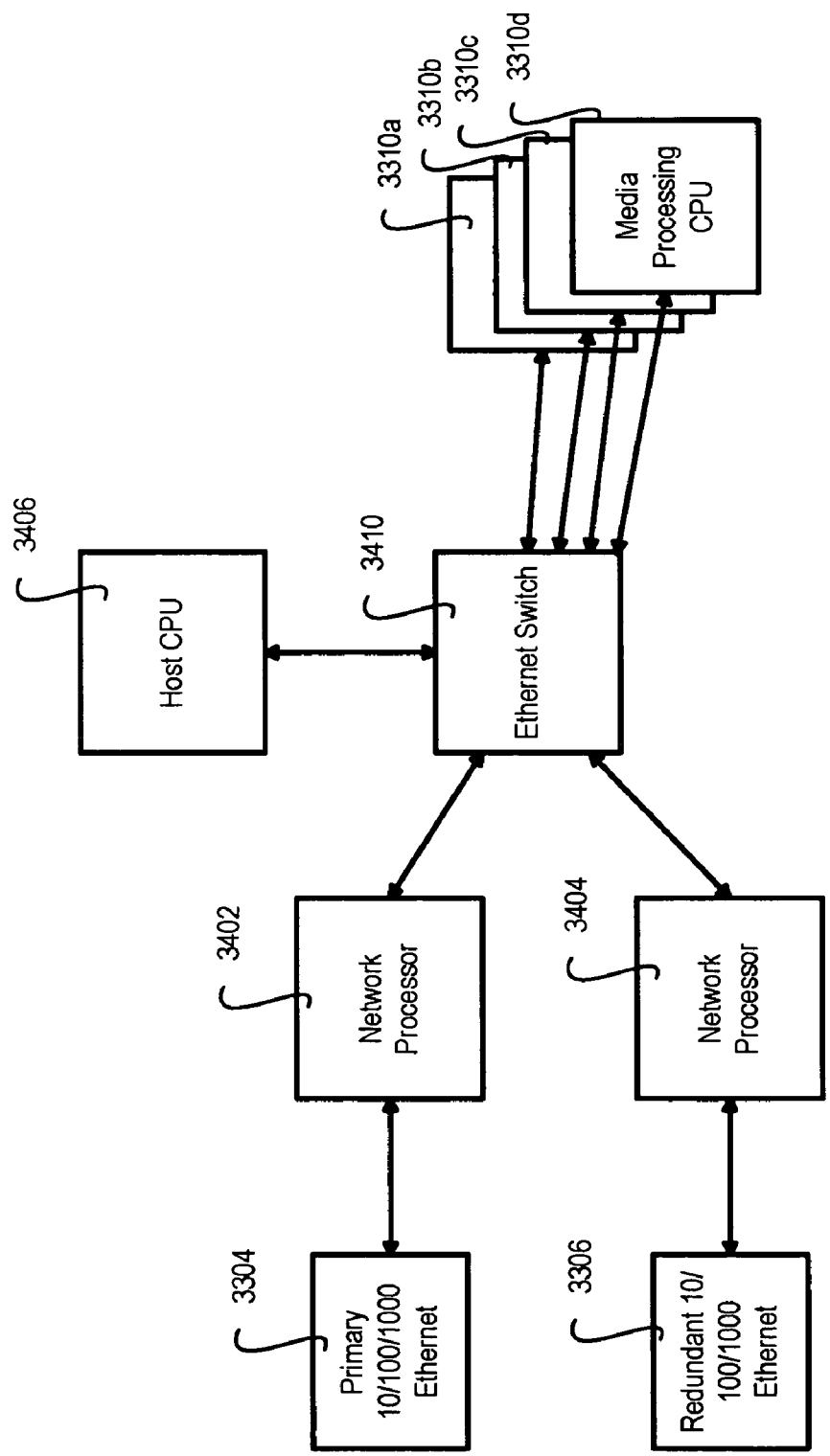
FIG. 34 shows a simplified logic block diagram of a prior art implementation in which network processors are employed to offload some of the tasks formerly performed by the host processor of FIG. 33.

FIG. 34 shows a simplified logic block diagram of a prior art implementation in which network processors are employed to offload some of the tasks formerly performed by host processor 3302 of prior art FIG. 33. Generally speaking, network processors 3402 and 3404 are provided by network processor vendors, who design their network processors to handle a wide range of packets that may be encountered by a router, for example. Accordingly, network processors 3402 and 3404 tend to be ASIC (application specific integrated circuit) chips designed to run at very high speed.

In a typical network processor, in addition to classification tasks, multiple additional tasks are also provided and enabled. For a general-purpose router, the use of a network processor is an improvement over the host-processor-only approach of prior art FIG. 33. However, the network processor approach of prior art FIG. 34 comes at a complexity and cost penalty.

Network processors 3402 and 3404, being general network processors, tend to include functionalities that are highly sophisticated, which enable network processors 3402 and 3404 to handle the needs of a general-purpose router that handles a wide range of traffic in addition to the media traffic. Furthermore, network processors 3402 and 3404 typically also handle Layer 3 traffic, adding to the complexity of the network processor and the cost as well. Due to the redundancy requirement, two or more network processors 3402 and 3404 are typically employed as shown.

For media stream packets, network processors 3402 and 3404 perform the classification task, updating the MAC address, as required, to the (new) destination MAC address, and forwarding the media stream packets to one of the media processing units 3310a, 3310b, 3310c, and 3310d. For packets that require the host CPU's attention, at least one of network processors 3402 and 3404 will forward these packets through Ethernet Switch 3410 to host CPU 3406 for processing. Examples of packets that may be handled by host CPU 3406 include, for example, control packets for setting up and tearing calls, status update messages from clients, and the like.

Not only is a network processor expensive but there is also a certain amount of configuration overhead that is required to set up network processors 3402 and 3404 upon power up. Configuration requirements for network processors, which tend to be complex circuits, add a finite delay to the configuration time required before the system of prior art FIG. 34 can become operational. When multiple network processors are required to satisfy the redundancy requirement of some Ethernet applications, the cost is multiplied accordingly.

In accordance with one aspect of the present invention, the inventors herein realized that for VoIP (voice over internet protocol) applications, the vast majority of the packets handled by the classification engine will be media stream packets. A router or another device may be disposed, in an embodiment, in front of the VoIP gateway to ensure that most or all of the traffic received by the VoIP gateway is related to VoIP traffic.

A small percentage of the packets received by the VoIP gateway may be control packets and/or other packets related to the management of VoIP. However, these non-media packets tend to constitute a smaller percentage of the packets received and processed by the VoIP gateway. Accordingly, the inventors herein realized that a classification engine may be implemented on a low-cost FPGA, if many functions that are not related to VoIP processing can be eliminated from the FPGA's set of functionalities. Furthermore, the inventors herein realized that for non-media packets, the host processor is still available to handle the processing of those packets using software-based applications. Therefore, it is realized that processing packets at line rate speed may be now possible at low cost for media stream packets if a low cost FPGA is configured to process the bare minimum set of functions required to handle the majority of the media stream packets.

Generally speaking, media stream packets are of the UDP type. Each packet received by the VoIP gateway must be inspected to determine what action the FPGA should take with the packet. As a packet is received in the FPGA, the IP header is examined and the UDP port number is used to perform a lookup in the FPGA's internal table, which is setup by the host processor as calls are being setup and torn down. The FPGA's internal table contains a list of ports that are currently configured for media stream packets. For each port that is in the table, the fields that are programmed include the destination MAC address for one of the media processing CPUs, a flag indicating whether the packet should be discarded by the FPGA, and a counter that can be used to determine if packets are still being dropped. If a match between the incoming media stream packet's port and a port within the FPGA's internal table is made, the packet is either updated to include the MAC address of the destination media processing CPU and forwarded for DSP processing (e.g. echo cancellation, encoding, decoding, and the like), or if the discard flag for that port is set, the packet is dropped and the discard counter is incremented.

After the media stream packet is processed by the appropriate media processing CPU, the media stream packet is then sent back to the switch to be sent out to the appropriate Ethernet physical interface onto the next leg of the journey.

Figure 35:
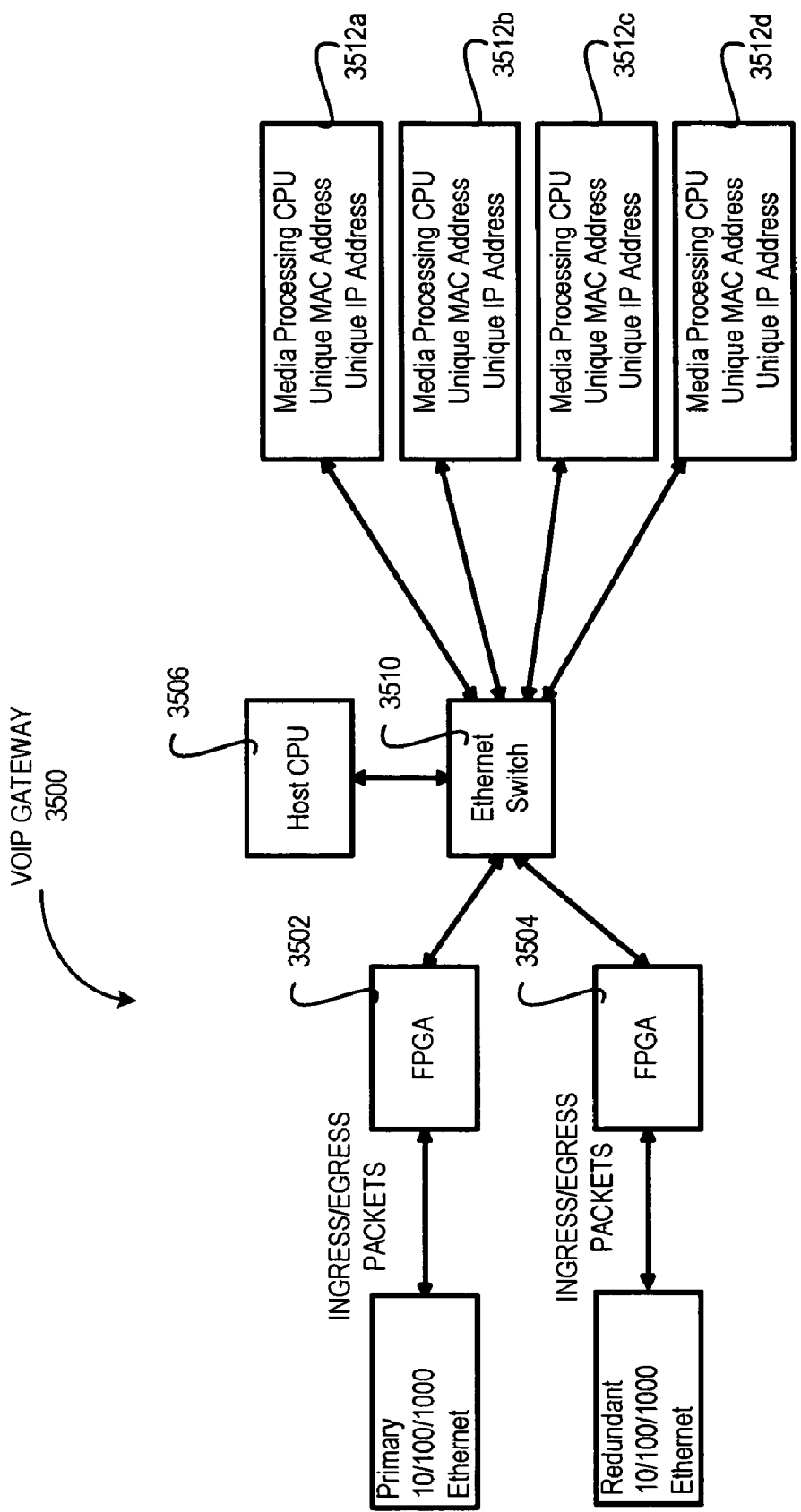
FIG. 35 shows, in accordance of an embodiment of the invention, a high level logic block diagram of a VoIP gateway, which employs FPGAs to provide redundant Ethernet processing paths through the VoIP gateway.

FIG. 35 shows, in accordance of an embodiment of the invention, a high level logic block diagram of a VoIP gateway 3500, which employs FPGAs 3502 and 3504 to provide redundant Ethernet processing paths through VoIP gateway 3500. Unlike the implementation of prior art FIG. 34, the realization that the vast majority of packets processed by VoIP gateway 3500 pertains to media stream packets, which requires a small, finite set of processing functions to service and need to be handled with high priority and minimal delays, leads to the implementation of a vastly simplified set of functionality within each of FPGAs 3502 and 3504 (which essentially are redundant of one another for the purpose of satisfying the redundancy requirement of certain Ethernet applications).

For example, FPGA 3502 is designed to look only for UDP media stream packets and to handle only UDP media stream packets. For all other types of packets, FPGA 3502 passes those packets to host CPU 3506 for handling. Furthermore, for UDP media stream data packets, FPGA 3502 performs a fast lookup using its internal UDP port table to determine whether the packet matches one of the entries of the UDP port table. Each entry in the UDP port table reflects a media stream that has already been set up by host CPU 3506. If there is a match, FPGA 3502 quickly performs a determination whether or not the packet should be discarded.

If it is discarded, no further action needs to be taken. If the packet is not to be discarded, FPGA 3502 then obtains the corresponding media processing CPU module ID from the table from which it can use to formulate a new MAC destination address for the received packets.

Looking up the media processing CPU module ID employs the use of a portion of the UDP destination port number that is obtained from the header of the incoming packet. The incoming packet employs a portion of the UDP destination port number as an index into the UDP port table. If there is a matching entry in the UDP port table, a destination media processing CPU module ID is obtained and the destination MAC address is formulated and updated in the packet header.

Thereafter, FPGA 3502 sends the packet to Ethernet switch 3510 to be sent to one of the media processing CPUs 3512a, 3512b, 3512c, and 3512d. After an appropriate media processing CPU (e.g., 3512a, 3512b, 3512c, 3512d, etc.) performs the media processing (e.g., the aforementioned encoding, decoding, echo cancellation, etc.), the packet is converted into a transmit packet and sent back to Ethernet 3510 to be sent out via one of the FPGAs (which act as a pass through) onto the next leg of the journey.

Note that the aforementioned processing for media stream packets represents the type of processing that needs to be performed for the vast majority of packets that pass through VoIP gateway 3500. Accordingly, by simplifying the set of functions that FPGAs 3502 and 3504 need to perform for a large number of media stream packets traversing VoIP gateway 3500, it is possible to achieve line rate performance using a low cost, simplified FPGA to lower overall system cost while maintaining the required performance.

Figure 36:
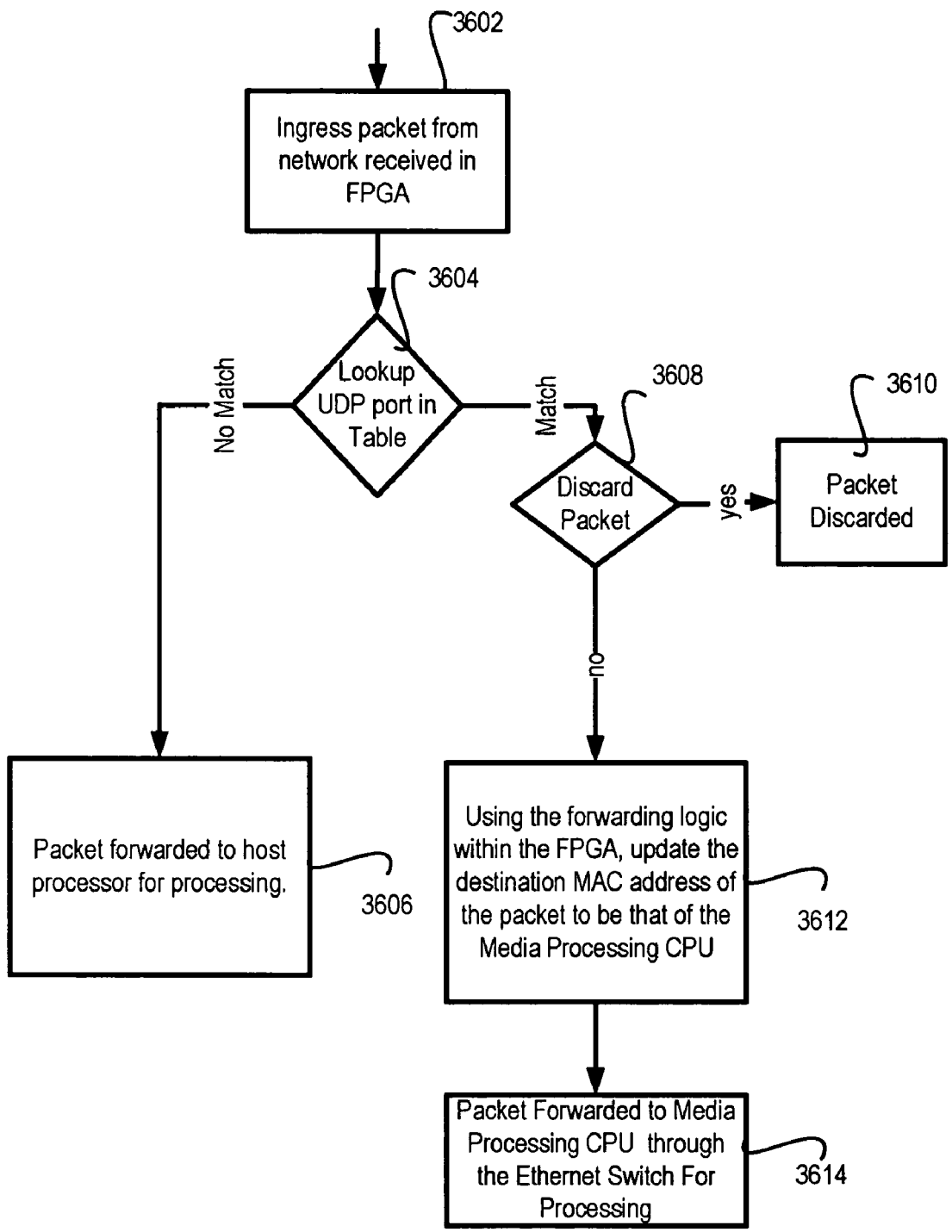
FIG. 36, shows in accordance with an embodiment of the present invention, the steps taken by the VoIP gateway of FIG. 35 in processing a packet received.

FIG. 36, shows in accordance with an embodiment of the present invention, the steps taken by the VoIP gateway 3500 in processing a packet received. A packet is received by block 3602 and processed in block 3604 by looking up the UDP port in the UDP port table.

The UDP port information may be obtained by inspecting the packet header. Note that for all packets other than UDP packets, no lookup action is necessary and control is passed to block 3606, wherein the packet is forwarded to host CPU 3506 for processing. For example, if the packet pertains to a call set up message and the call is ready to be connected, the host CPU will update the FPGA's UDP port table with the UDP port such that the RTP (Real time transfer protocol) stream will use and program the designated media processing CPU that the packet should be forwarded to. Besides control packets, other packets which can not be matched in the UDP port table are also forwarded to the host CPU for processing. On the other hand, if the lookup of the UDP port in the UDP port table results in a match, control is passed to block 3608 to first ascertain whether or not the packet is to be discarded. If the packet has been marked by the host processor to be discarded, no further processing is needed and the packet can be discarded at block 3610.

On the other hand, if the packet is not to be discarded, control passes to block 3612, wherein the forwarding logic within the FPGA obtains the media processing CPU module ID and formulates a MAC address based on the obtained media processing CPU module ID (which is obtained from the UDP port table, which is discussed in FIG. 5). The destination MAC address of the received packet is updated to that of the media processing CPU block 3612. In block 3614, the media stream packet is then forwarded to the media processing CPU through the Ethernet switch for processing as mentioned earlier.

Figure 37:
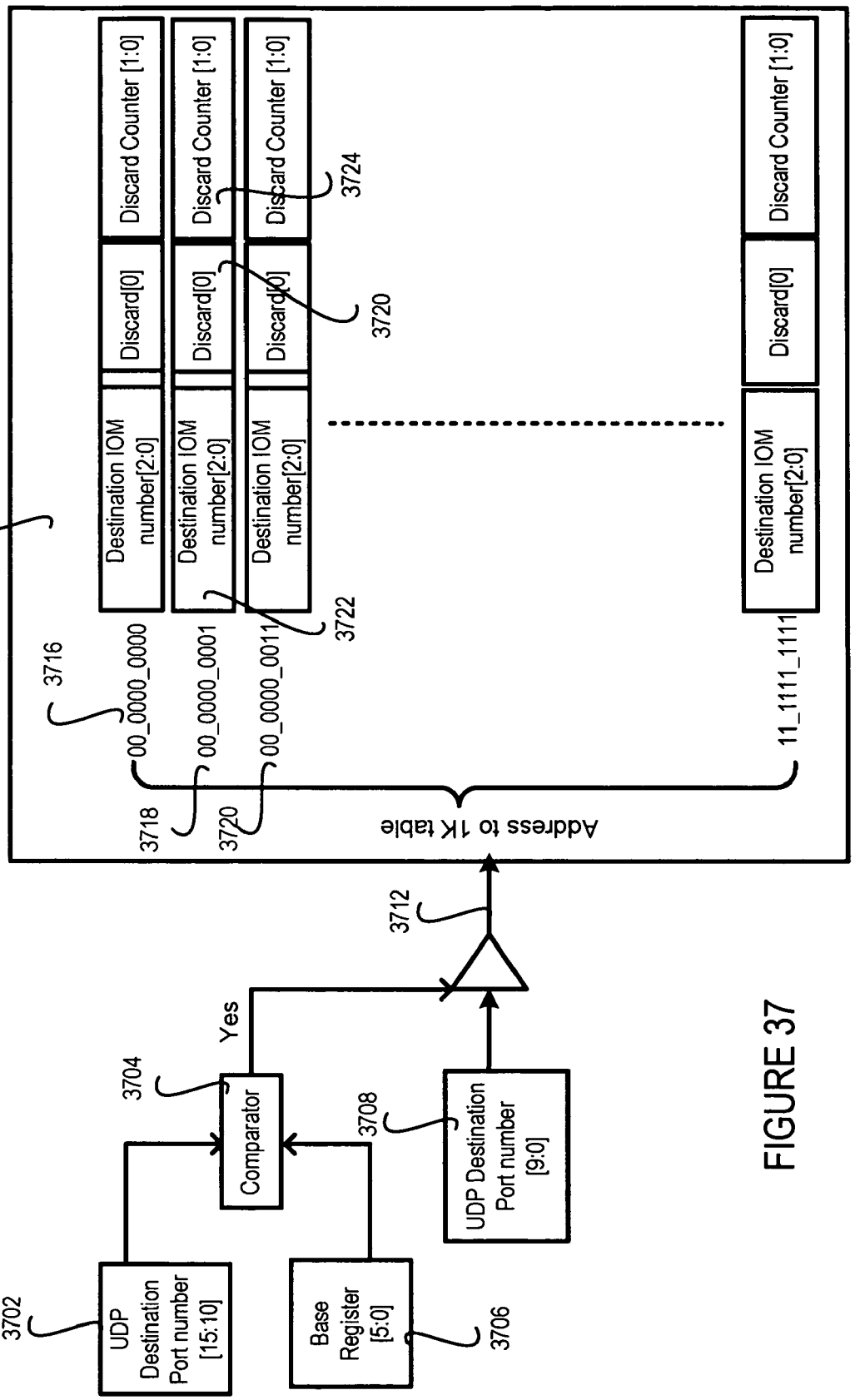
FIG. 37 show, in accordance to an embodiment of the present invention, an example of an UDP port lookup step of FIG. 36.

FIG. 37 show, in accordance to an embodiment of the present invention, an example of the UDP port lookup step 3604 of FIG. 36. In an embodiment of the invention, lookup has been simplified to the tasks of obtaining the media processing CPU module ID and formulating a destination MAC address to ensure that the received packet can be forwarded to the appropriate media processing CPU (e.g., one of media processing CPUs 3512a-3512d of FIG. 35).

As discussed earlier, each received media stream packet has the UDP destination port in its header (which is 16 bits). The first 6 bits of the UDP destination port number (3702) is input into a comparator 3704 for comparison purposes. The UDP port base of the valid UDP port range is loaded into the base register 3706 to be used for comparison. Since the number of media streams supported is a finite number, the entire range of valid UDP ports does not need to be checked. If a UDP port, when compared to the base register, does not match, the packet is forwarded to the host CPU for processing since it would not exist in the FPGA's internal UDP port table. However, if the result of the comparator 3704 is positive (i.e., there is a match between the first 6 bits of the UDP destination port number obtained from the header of the received media stream packet and the UDP port base), the next ten bits (3708) of the UDP destination port is employed as an index into the UDP port table 514 in order to obtain the information pertaining to the destination the packets should be forwarded to, as well as whether or not packets associated with this media stream should be discarded. In addition, the destination media processing CPU module ID is obtained to provide the destination for the packet if the packet is not discarded. If the destination media processing CPU module ID has not been initialized (i.e. it is still set to 0×0), the packet will not be modified and will be forwarded to the host CPU for processing. Thus, as seen in FIG. 37, a positive determination out of comparator 3704 will enable the next 10 bits of the UDP destination port number to be employed (3712) as an index into UDP port table 3714. The ten bits pattern 3708 will match one of entries 3716, 3718, and 3720 in UDP port table 3714.

With respect to matching, the method first inspects the discard bit to determine whether or not the host CPU 3506 has marked the bit so that the packet associated with this media stream should be discarded. With reference to FIG. 37, suppose that the 10 bits UDP destination port number that is employed as the index into UDP port table 3714 is 00-0000-0001 (entry 3718). In this case, the method looks at the bit in field 3720 to determine if the discard bit has been set. If the discard bit has been set by host CPU 3506, processing by the FPGA is done and the packet is simply discarded.

If the discard bit 3720 is not set, the FPGA then obtains the destination media processing CPU module ID 3722, which the FPGA then employs to formulate the destination MAC address and to update the destination MAC address in the received UDP media stream packet in order to enable the received UDP media stream packet to be forwarded to the appropriate media processing CPU.

Field 3724 is a two-bit field that shows the discard status and may include up to four different values to indicate the various discarded statuses (e.g. discarded, has never been discarded, etc.). Once the received UDP media stream packet is updated with the destination MAC address associated with one of the media processing CPUs, the FPGA passes the received packet to Ethernet switch 3510 (See FIG. 35) so that Ethernet switch 3510 can switch the received UDP media stream packet to the media processing CPU for processing, as mentioned earlier.

In an embodiment, the media processing CPUs are required to be implemented in the same chassis as the FPGAs, thereby vastly simplifying the control portion necessary to perform forwarding of the UDP media stream packets from the FPGA to an appropriate media processing CPU. If the media processing CPUs had been implemented outside of the chassis, the forwarding task would have been more complex, rendering the FPGA more complex and reducing its performance, which would be detrimental for processing line rate media stream packets.

As can be appreciated from the foregoing, from the realization for a VoIP gateway, the vast majority of the functions offered by a typical off-the-shelf network processing unit are not necessary and the inclusion of these additional functions do impact the overall system negatively from a cost standpoint and from a complexity standpoint, the inventors are able to identify the minimal set of functions that are required to be performed for the vast majority of UDP media stream packets in a typical VoIP gateway.

By distilling the functions that are typically provided in a typical network processor to a set of minimum functions to be implemented in a FPGA, with these minimal functions being designed to satisfy the requirements for the vast majority of the packets received and handled by a VoIP gateway, it is now possible to employ a small and inexpensive FPGA to perform classification functions and to handle the UDP media stream packets, which constitute a large percentage of the packets that are handled by the VoIP gateway.

Note that this approach would not have been an option or appear sensible for a general purpose router or gateway since such devices need to handle a wide variety of packets, and the FPGA would have been unable to cope with high line speed when burdened also with complex processing tasks required to handle a variety of packet types. Since the gateway herein is configured to receive only VoIP traffic or mostly VoIP traffic, the approach enables the simplification of the classification function and enabling the implementation via FPGAs while still achieving high performance.

Embodiments of the invention vastly simplify VoIP gateway design and reduce cost of VoIP gateways. Even if multiple FPGAs are required to satisfy redundant Ethernet requirements, the use of two inexpensive FPGAs still typically undercuts the cost of a single network processor. By eliminating the network processor, the overall cost of VoIP can be drastically reduced, thereby enabling wider market penetration and market acceptance of VoIP solutions.

Beyond the financial considerations, the use of FPGAs to implement these simple classification functions also provides the system designer great flexibility to handle additional media types that might come up in the future. Since network processors tend to be ASIC-based and therefore rather inflexible, new media packet types may render some network processors incapable of handling these new media packet types, necessitating VoIP gateway replacement.

FPGAs, by their nature, are inherently more flexible due to their ready re-programmability, allowing the system designer the flexibility to modify the FPGA programs to handle new or changing media packet types. Furthermore, by requiring the FPGA to perform relatively simple lookup functions only, it is easy to re-program the FPGAs to handle future changes, thereby eliminating the need for expensive hardware upgrades and/or minimizing network down time.

Although VoIP applications are described as illustrative examples, methods, servers, and/or systems in accordance with one or more embodiments of the present invention may be applied to communication of text, image, video, and/or other audio data. For example, the above description of pertaining to VoIP gateways, such as VoIP gateway 3500 (shown in FIG. 35), may also be applicable to a media gateway for processing text, image, video and/or other audio data.

6. Conclusion

By utilizing network interface hardware to perform select network stack software functions, a distributed system dedicated to media processing can realize not only significant cost and performance advantages, but also significant technical advantages including higher system availability. Specifically, the network interface hardware exhibits performance equal to a network processor with less latency given the cut-through operation. System availability is often dominated by software failures. Since this distributed system uses hardware to handle media streams to and from a single processing engine, less network interface software is required resulting in higher system availability.

G. Secure Media Communication Across Enterprise Gateway (NAT/Firewall)

With the advent fixed-mobile convergence, people are using their Wi-Fi enabled devices from internet for data connectivity and voice. One of the key requirements for voice is that it be transported over secure network packets. The mechanism described in this section provides secure communication and easy traversal through any type of NAT/Firewall gateway At present, there are no ratified standards for traversing enterprise VoIP over the internet securely over NATs and Firewalls. Also, due to the fact that phones and call managers do not provide a capability where this VoIP access is controlled at a single media service access point (MSAP) to ease provisioning and monitoring, there is no mechanism to allow an enterprise VoIP user "roam" from internet to cellular networks.

Figure 7:
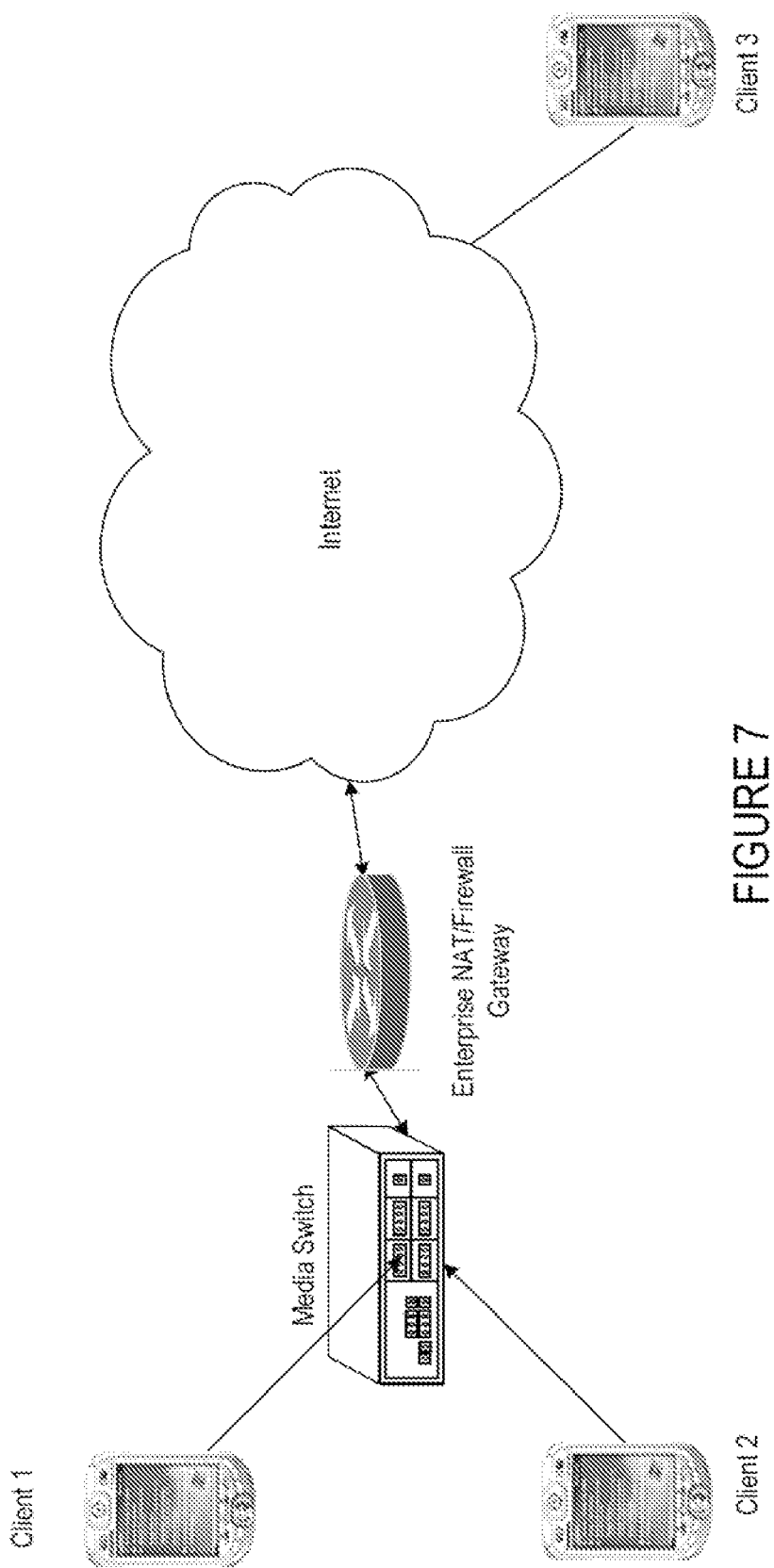
FIG. 7 depicts an overview of the secure VoIP deployment for enterprise communication.

The invention provides mechanisms for securely transporting voice and associated signaling end-to-end as illustrated in FIG. 7.

Challenges posed in designing an enterprise VoIP network has exponentially increased with convergence {data & voice}. With convergence, the VoIP network is being exposed to both traditional VoIP threats and Data traffic threats. Challenges involved in building a good VoIP network which can communicate across enterprise gateway, to internet, can be classified into four and are discussed in detail below.

a) Securing voice traffic
b) NAT Traversal (Both within enterprise and remote client on Internet)
c) Firewall Traversal (Enterprise Firewall)
d) Securing or hardening the handset and media switch Securing the Voice Traffic Voice traffic when they travel through internet is practically visible or usable by any hacker on the network. Any hacker in the middle can listen to the conversation being made, which is the least of the threat. In the enterprise application, these calls (at least one end) are initiated/destined from/to the enterprise. In which case, enterprise network or devices in the network can come under various attacks like Replay-attack, DoS attacks.

By making the voice secure, the advantages are
a) Privacy of the call is maintained
b) For the clients, if the access to the network is wireless, securing the voice traffic is more relevant even inside the enterprise.
c) Possibility of exposing the enterprise network to various attacks are drastically reduced (though not eliminated) thus making the network more secure There are multiple ways to secure data traffic. Most or all of them are applicable to voice traffic also. But due to the time sensitivity of the voice traffic, it is desired to have a mechanism which is not very processor intensive which can easily fit in into even small VoIP handsets. Voice traffic uses RTP (over UDP) for communicating from end to end which is currently insecure. SRTP (Secure RTP) is an alternative to make the voice traffic completely secure, from end-to-end.

With SRTP, since the voice is encrypted at the source client, anyone in the middle (even from within the network) without the knowledge of the appropriate keys, cannot make out anything from the voice packets and hence a secure communication is established. This mechanism will be less processor intensive than VPN solution.

NAT Traversal

NAT, in enterprise gateway, does IP address translation, from local IP domain to global IP domain, for clients residing in internal enterprise networks. Existence of NAT in the traffic path will affect the functionality of some protocols, which communicates its IP address to its peers over the payload (since the payload will carry the un-translated IP address instead of translated one, this creates a disconnect). SIP is one of the protocols whose functionality gets affected by an intermediate NAT gateway.

These NAT translations are of four types
a) Full Cone
b) Restricted Cone
c) Port Restricted Cone
d) Symmetric NAT There are standard implementations to over come all these types of NATs. Of these, symmetric NAT is the most difficult one to traverse through. TURN (Traversal using Relay NAT) is the standard solution used for traversing through symmetric NAT. STUN (Simple traversal of UDP through NAT) is another solution which helps traverse through rest of the NATs. For a solution, to be not affected by any NAT in their path, both STUN and TURN has to be implemented. But these solutions mandate introduction of a server out in the internet. Having another new server in the solution adds up one more device and hence complexity to the solution. Introduction of more devices is not desirable for the obvious reasons like manageability, security . . . .

With an effective design of the enterprise network and positioning of media gateway, any type NAT can be traversed through effectively without introducing any new entities to the voice solution.

Solution is designed such that any voice traffic between two clients is always through the media switch in the middle. A mechanism to inform remote clients of their translation information is embedded into the Media switch, which resides inside the enterprise network. This ensures that end clients always know their translation information and can be effectively used in the signaling protocol. Also, a forwarding rule for a global IP address and port (Media Service Access Point—MSAP) is configured at the Enterprise firewall, which will forward the traffic received for that MSAP to media switch. This makes the media switch accessible from any external IP network. Since media switch, which helps in NAT traversal, is also the other end for any client, any type of NAT (including symmetric NAT) can be traversed with this design.

Firewall Traversal

Firewalls can reside on both (Enterprise and remote) ends of the voice communication. For a VoIP call, at the minimum two ports (1 for RTP and one for RTCP) need to be opened up firewall. So, for n calls to happen simultaneously, 2*n ports need to be opened up. Opening up more ports poses increased security threats to the network and hence not desirable for enterprise firewall.

Traversing the firewall at the remote end is made possible by designing the solution to initiate the first UDP communication by remote client to media switch. By initiating the first communication from the remote end, firewalls at the remote end open up the corresponding ports by default.

Traversing the firewall at the enterprise end is a challenge. MSAP provides global accessibility to media switch from any external IP network. This MSAP is well utilized for NAT traversal. By effectively using the MSAP, enterprise firewalls can also be traversed through with no new ports opened up for voice communication.

All remote clients are designed to communicate with the media switch through the same MSAP. Thus all voice traffic from remote clients ends up at the same port (MSAP) in the media switch. A mechanism is built in such that the call identification is embedded within each and every voice Packet. When a packet is received at the MSAP in media switch, packets are switched appropriately based on the call ID embedded in the voice packet. This ensures that switching of voice traffic happens properly though all the voice traffic from external world was destined to the same port (MSAP).

Securing Media Switch

Current design forces the media switch to receive all media traffic from remote clients and so is exposed to all kinds of attacks from external network. By current design, media traffic uses Secure RTP (SRTP) with encryption always. By making the media traffic encrypted and secure, as discussed, above, the solution is more robust and secure. SRTP protocol, by itself, provides authenticity of the remote caller, provides confidentiality through encryption, ensures integrity of the packet and protects from replay attacks.

Over and beyond this, an extensive Access filter is also implemented in Media switch to screen incoming packets.

Features and advantages of the invention may be better understood with reference to the figures and discussions that follow.

Figure 38:
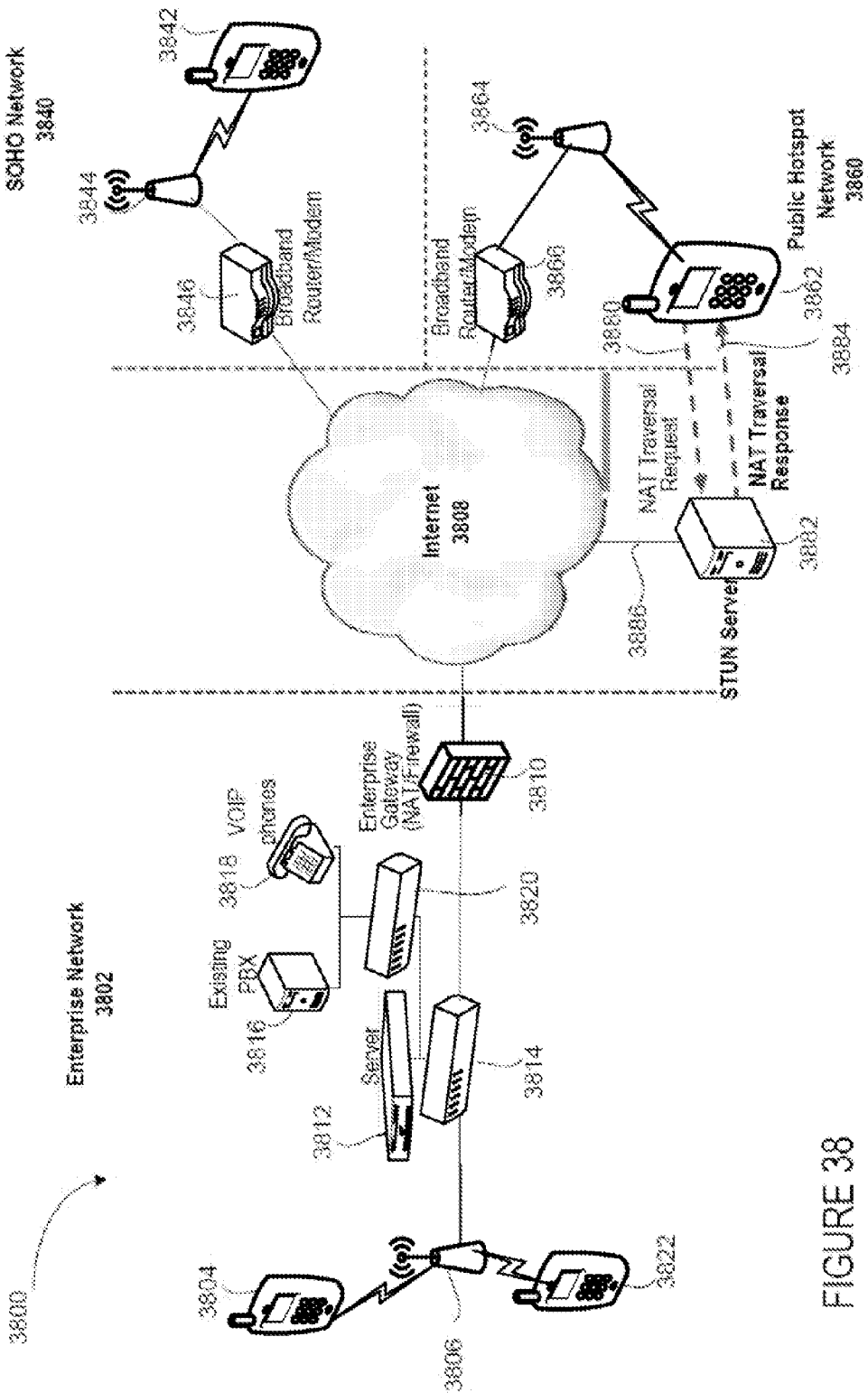
FIG. 38 is a prior art representation of a Voice-Over-IP (VoIP) environment in which a STUN (Simple Traversal of UDP through NAT) server is employed to facilitate NAT (Network Address Translation) traversal.

FIG. 38 is a prior art representation of a Voice-Over-IP (VoIP) environment in which a STUN server is employed to facilitate NAT (Network Address Translation) traversal. As discussed, network address translation (NAT) is necessary in order to enable a large number of devices associated with a private network to communicate with the outside world using fewer numbers of publicly routable IP addresses.

This is because publicly routable IP addresses are a precious resource and are quite expensive to acquire. Accordingly, most ISPs typically provide only a few publicly routable IP addresses to a given enterprise to be shared among many internal users. Thus, each internal user is supplied with an internally routable IP address that is known only internally within the enterprise. In order for the internal devices to be made globally accessible, a NAT device should be present in the internal network to do the translation from internal IP address-port pair to a globally routable IP address-port pair and vice versa.

NAT traversal is employed because certain protocols employed for Voice Over IP or other types of media applications are sensitive to the effect of NAT. For example, SIP (Session Initiation Protocol) is one of the protocols whose functionality may be affected by an intermediate NAT gateway. Traversal allows the internal client device to obtain the translation scheme performed by the NAT gateway and to communicate the translation scheme to the destination application server so that the application server can resolve the disconnect between the untranslated internal IP address and the translated IP address.

Generally speaking, NAT traversal involves the communication between the client device to a NAT traversal server in which the client device sends a sample packet to the NAT traversal server. The NAT traversal server then responds and, by way of responding, informs the client device of the publicly routable IP address that has been employed by packets originating from the client device. This publicly routable IP address represents the IP address that has been translated using the NAT gateway.

With the knowledge of its own internal IP address and the publicly routable IP address obtained from the response by the NAT traversal server, the internal client device can then forward the NAT translation scheme to the application server so that the application server can make use of the knowledge pertaining to the NAT translation scheme in order to resolve the difference between the internal routable IP address and the external routable IP address of any particular received packet.

However, as mentioned, there are four types of NAT translations: full cone, restricted cone, port restricted cone, and symmetric NAT. In symmetric NAT, the translation scheme may depend on the destination port and the destination IP address. For example, for the communication between the client device and the NAT traversal server the IP address-port pair of the internal client device may be translated as one global IP address-port pair, while the translation for the same internal client device for communicating with the application server may be a different global IP address-port pair. Accordingly, obtaining information regarding the translation scheme between the client device and the NAT traversal server may not furnish useful information to the application server regarding the translation scheme between the client device and the application server itself.

For a NAT traversal solution to address all four types of NAT translations, the generic NAT solution needs to be provided. In the prior art, TURN (Traversal Using Relay NAT) and STUN (Simple Traversal of UDP through NAT) are standard solutions to traverse both symmetric NAT and other types of NAT translations. To resolve all possible NAT schemes, both STUN and TURN have to be implemented.

FIG. 38 is a schematic diagram of a network environment 3800 wherein a prior art STUN NAT traversal server is implemented to handle some of the NAT translation schemes (e.g., full cone, restricted cone, and port restricted cone). It should be noted that FIG. 38 is employed to illustrate the operation of a prior art STUN NAT traversal server and not all components and/or arrangements in FIG. 38 are considered by the inventors to be prior art since at least certain aspects of mobility server 3812 (server 3812) and some of the method steps by which server 3812 facilitates VoIP are considered inventive. It should be apparent to those skilled in the art that many other figures herein are to be construed similarly irrespective whether they are labeled as prior art since some of the inventive components and/or arrangements may be included along with prior art components and/or arrangements to provide context and to facilitate meaningful discussion.

As shown in FIG. 38, there is shown an enterprise network 3802 which is coupled to the Internet 3808 and an enterprise gateway/firewall 3810. Enterprise network 3802 includes a plurality of Wi-Fi clients 3804 and 3822, which are coupled to an Access Point (AP) 3806. Mobility server 3812 (server 3812), representing the media application server, is also coupled to Internet 3808 via a switch 3814.

There are also shown existing PBX 3816 and existing Voice-Over-IP (VoIP) system 3818, both of which are connected to switch 3814 via an intermediate switch 3820. Through AP 3806, switch 114, and switch 3820, internal communication within enterprise network 3802 is enabled among the Wi-Fi clients 3804 and 3822, server 3812, existing PBX 3816 and existing Voice Over IP system 3818. To communicate to devices outside of enterprise network 3802, the packets traverse an enterprise gateway/firewall 3810 to Internet 3808.

FIG. 38 also shows an example SOHO network 3840, which includes an example external client device 3842, representing a VoIP-enabled phone. External client device 3842 communicates with Internet 3808 via an Access Point (AP) 3844 and a broadband router/modem 3846. There is also shown in FIG. 38 an example public hot spot network 3860, which includes an external client device 3862, representing another VoIP enabled phone. External client device 3862 communicates with an Access Point (AP) 3864 to access Internet 3808 through a broadband router/modem 3866.

To enable VoIP calls between external client device 3862 and devices managed by enterprise network 3802 such as Wi-Fi client 3804 (or external client device 3842 if external client device 3842 is a VoIP phone registered with server 3812 to be associated with an internal extension managed by existing PBX 3816), a VoIP call control protocol needs to be employed to set up and manage the media stream between client external device 3862 and the client device on the other end of the call.

For illustration purposes, assume that external client device 3862 is attempting to establish communication with Wi-Fi client 3804. Since the VoIP protocol may be sensitive to the NAT translation scheme implemented by broadband router/modem 3866, external client device 3862 needs to first obtain information regarding the NAT translation implemented by broadband router/modem 3866. In the STUN case, the STUN solution can be applied to traverse NAT translation of the full cone, restricted cone, and port restricted cone types. In this case, client external device 3862 first sends a NAT traversal request 3880 to a STUN server 3882. The STUN server 3882 then responds with a NAT traversal response 3884. The NAT traversal response 3884 informs external client device 3862 of the particular NAT translation scheme implemented by broadband router/modem 3866. This information may be communicated to external client device 3862 by, for example, including the publicly routable IP address in the payload of the response packet(s) sent to external client device 3862. For simplicity of illustration, NAT traversal request 3880 and NAT traversal response 3884 are shown by the dotted lines directly between external client device 3862 and STUN server 3882. In reality, these communications take place through AP 3864, broadband router/modem 3866, Internet 3808, and communication path 3886.

External client device 3862 obtains the NAT translation scheme implemented by broadband router/modem 3866 via the information provided in NAT traversal response 3884. External client device 3862 then sends the NAT translation scheme information to server 3812 via AP 3864, broadband router/modem 3866, Internet 3808, enterprise gateway/firewall 3810, and switch 3814. With knowledge of the NAT translation scheme implemented by broadband router/modem 3866, server 3812 can then setup the VoIP call with external client device 3862 between Wi-Fi client 3804 and external client device 3862. Any disconnect regarding the internally routable IP address employed by external client device 3862 within hotspot network 3860 and the publicly routable IP address employed to transmit information between broadband router/modem 3866 and enterprise gateway/firewall 3810 via Internet 3808 can be resolved by server 3812 using the knowledge obtained regarding the NAT translation scheme, which has been forwarded beforehand by external client device 3862.

As discussed, this type of STUN NAT traversal solution works well for at least three types of NAT translations: full cone, restricted cone, and port restricted cone. For symmetric NAT, the NAT translation scheme implemented by broadband router/modem 3866 for the communication between external client device 3862 and STUN server 3882 may differ from the NAT translation scheme employed to communicate between external client device 3862 and server 3812. Accordingly, knowledge pertaining to the NAT translation scheme implemented between STUN server 3882 and external client device 3862 may be inapplicable to resolve NAT translation issues experienced by server 3812 when external client device 3862 subsequently communicates with server 3812.

Figure 39:
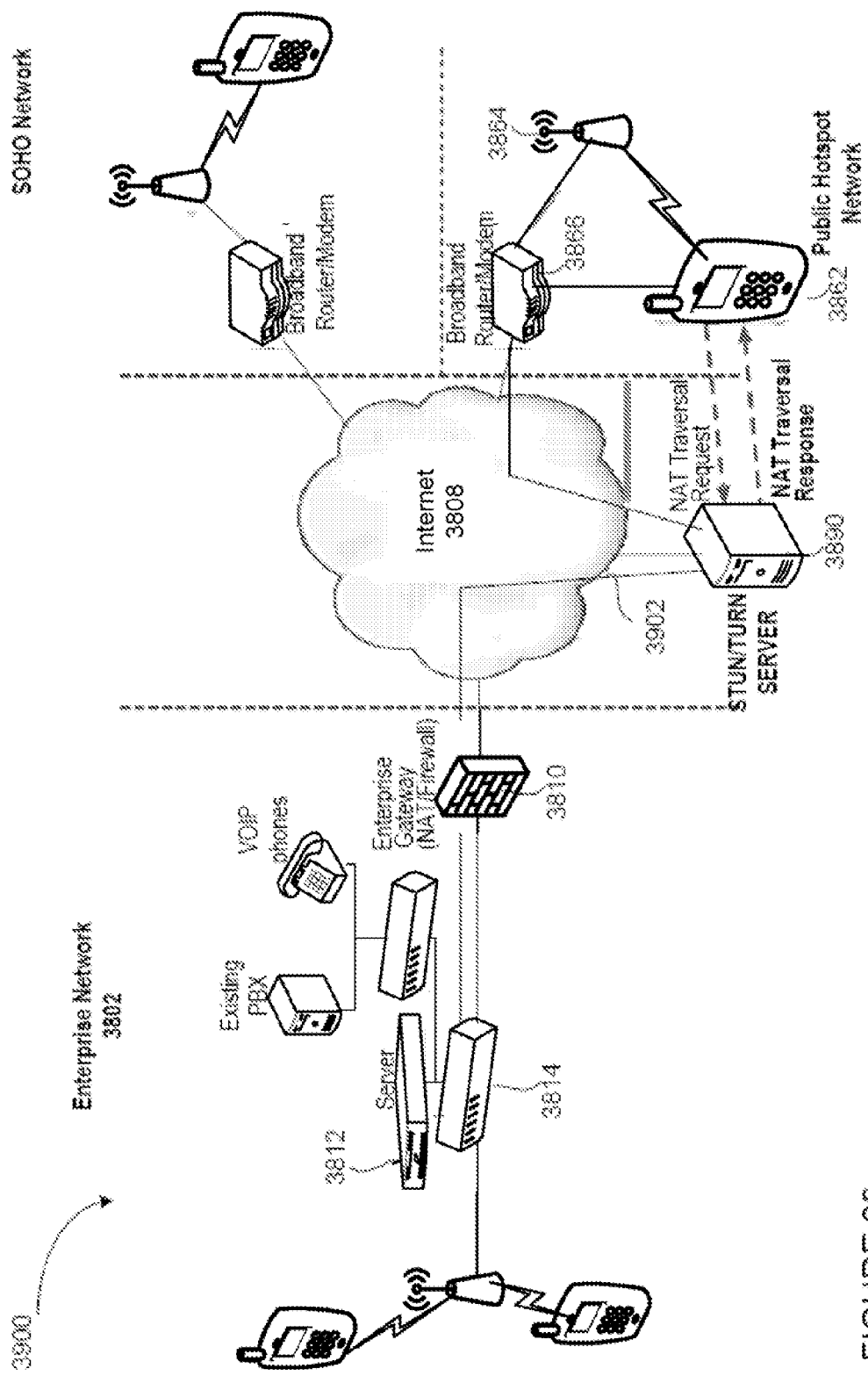
FIG. 39 shows a prior art implementation of a STUN/TURN (Simple Traversal of UDP through NAT/Traversal Using Relayed NAT) NAT traversal implementation, in which a secured tunnel is implemented between a STUN/TURN server and a media server.

FIG. 39 shows a prior art implementation of STUN/TURN (Simple Traversal of UDP through NAT/Traversal Using Relayed NAT) NAT traversal implementation 3900, in which a secured tunnel is implemented between a STUN/TURN server 3890 and server 3812. As shown in FIG. 39, secured tunnel 3902 is employed to facilitate communication between external client device 3862 and server 3812, at least for the portion of the journey between STUN/TURN server 3890 and server 3812. Accordingly, VoIP media packets (such as voice packets) are transmitted from external client device 3862 through AP 3864, broadband router/modem 3866, Internet 3808, TURN server 3890, back to Internet 3808 through enterprise gateway/firewall 3810, switch 3814, and arriving at server 3812. In other words, STUN/TURN server 3890 not only furnishes information regarding the NAT translation to external client device 3862 but also acts as a relay station to facilitate transmission of actual VoIP packet carrying the voice information between external client device 3862 and server 3812. Since the same communication path between external client device 3862 and STUN/TURN server 3890 is employed for NAT traversal and for the actual media packets transfer, the same NAT translation is performed for the communication between external client device 3862 and STUN/TURN server 3890 during the NAT traversal request/NAT traversal response session, and for the subsequent communication between external client device 3862 and server 3812 during which STUN/TURN server 3890 acts as an intermediate relay station.

However, it is realized by the inventors that the inclusion of STUN/TURN server 3890, as necessary as such may be to handle the symmetric NAT situation, involves several disadvantages. For example, STUN/TURN server 3890 needs to be managed by the enterprise IT staff, adding to the complexity of the VoIP implementation and maintenance. Further, STUN/TURN server 3890 needs to be implemented outside of the enterprise gateway/firewall 3810 and the associated firewall, opening STUN/TURN server 3890 to security risks. The introduction of another entity in the communication path for media packets between external client device 3862 and server 3812 also introduces reliability risks as well as additional delays. For delay-sensitive applications, such as real time voice conversations, such delays may be noticeable to some users and intolerable to others. Additionally, STUN/TURN server 3890 acts as the intermediate relay point for all external client devices that communicate with client devices in enterprise network 3802. Accordingly, STUN/TURN server 3890 suffers from scalability issues as the number of client VoIP devices handled by server 3812 increases.

Figure 40:
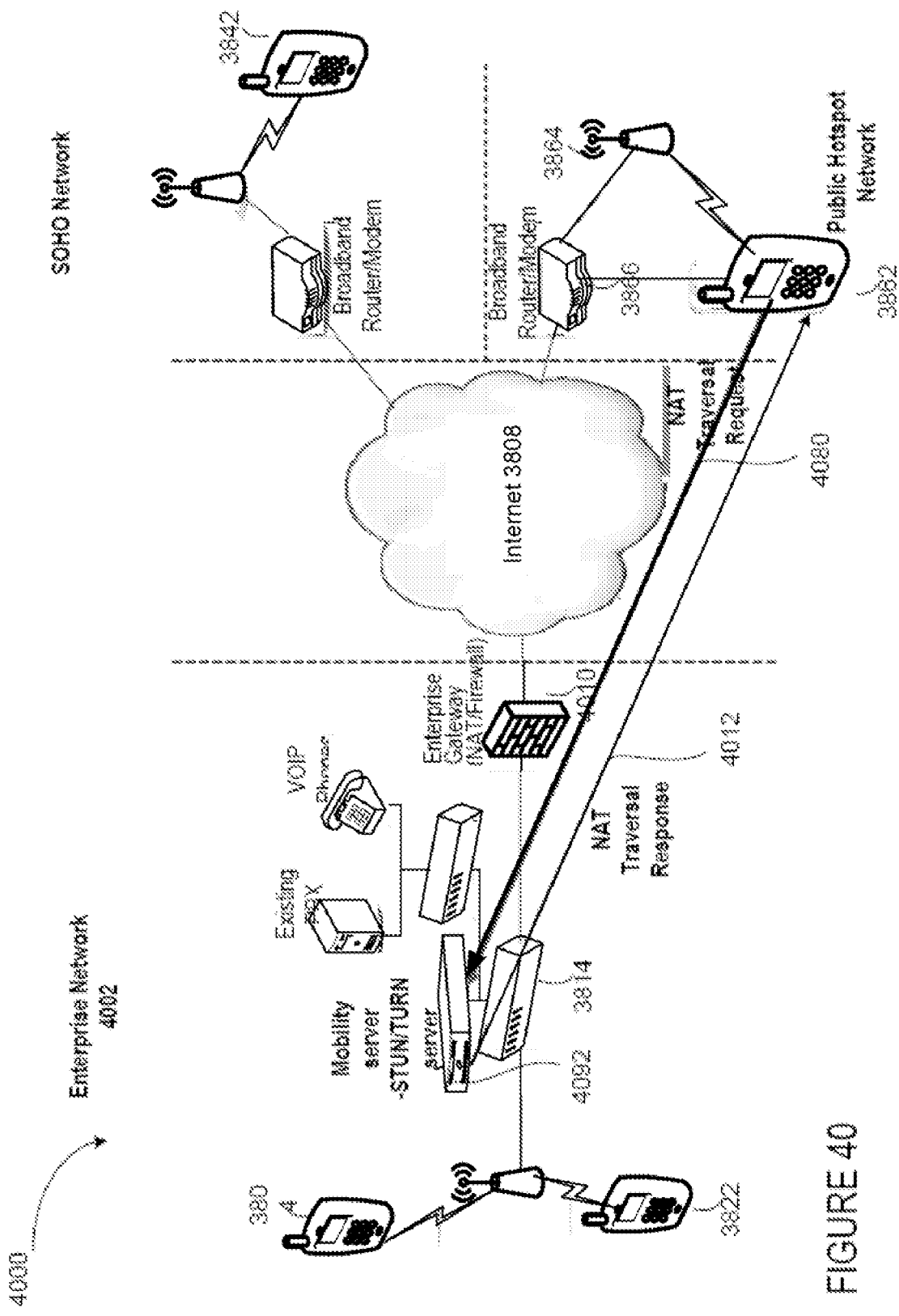
FIG. 40 shows, in accordance with an embodiment of the present invention, a generalized NAT traversal arrangement in which all four types of NAT translations can be traversed while eliminating the requirement that an external NAT traversal server be maintained outside of the enterprise firewall.

FIG. 40 shows, in accordance with an embodiment of the present invention, a generalized NAT traversal arrangement 4000 in which all four types of NAT translations can be traversed while eliminating the requirement that an external NAT traversal server (such as TURN server 3890 or STUN server 3882 of prior art FIG. 39 and FIG. 38 respectively) be maintained outside of the enterprise firewall. In FIG. 40, the STUN/TURN server functionality is implemented in the same chassis as a mobility server, as represented by a mobility server-STUN/TURN server 4092 (server 4092).

Furthermore, since NAT traversal requires the STUN/TURN server to be accessible from an external client device for the purpose of accomplishing the NAT traversal, embodiments of the invention employs a technique known as Port Forwarding in which the enterprise gateway 4010 is provisioned such that any traffic destined to itself with port number as the SIP port or the MSAP (Media Service Access Point) port, should be forwarded directly to server 4092, thereby rendering server 4092 accessible to the external world through a combination of the publicly addressable IP address associated with enterprise network 4002 (and the specific port number, such as the MSAP port number or the SIP port number).

Note that embodiments of the invention require that Server 4092 or a mobility server and a STUN like server be implemented internally as well as the use of port forwarding to ensure that the STUN/TURN server or the STUN like server be accessible by an external client device for the purpose of NAT traversal. When external client device 3862 wishes to communicate with one of the devices managed by enterprise network 4002, such as Wi-Fi client 3804 or Wi-Fi client 3822 (or external client device 3842, if external client device 3842 is registered to be managed by Server 4092), external client device 3862 first performs the NAT traversal by sending a NAT traversal request 4080 to Server 4092 and receiving a NAT traversal response 4012. As in before, the NAT traversal request and NAT traversal response actually traverse AP 3864, broadband router/modem 3866, Internet 3808, enterprise gateway 4010, switch 3814, and Server 4092. Since the STUN/TURN server application in Server 4092 communicates with Internet 3808 via the mechanism of port forwarding, Server 4092 appears to external client device 3862 to be an externally accessible device and thus external client device 3862 can directly address the STUN application in Server 4092 using a combination of the publicly routable IP address of enterprise network 4002 and the desired port number on server 4092.

Knowledge regarding the NAT translation scheme implemented by broadband router/modem 3866 is then communicated to Server 4092 to facilitate the subsequent call setup (e.g., via the SIP protocol in an embodiment) and the actual bi-directional transmission of media packets between external client device 3862 and Server 4092 (e.g., via the MSAP port of Server 4092). That is, Server 4092 can subsequently use a signaling protocol such as SIP to establish call path between external client device 3862 and Wi-Fi client 3804 via Server 4092. Further, media packet communication between external client device 3862 and Wi-Fi client 3804 are exchanged along a communication path in which Server 4092 is disposed in between.

Note that since the actual media switch of the server 4092 is also implemented in the same chassis as the STUN server, any type of NAT (including symmetric NAT) traversal can be accomplished with the implementation of FIG. 40 since the same translation would be employed to communicate between external client device 3862 and server 4092 for both the NAT traversal session, the call setup session, and the actual transmission of media VoIP packets.

As can be appreciated from the foregoing, embodiments of the invention eliminate the requirement of an external STUN/TURN server (such as STUN/TURN server 3890 or STUN server 3882 of prior art FIGS. 39 and 38, respectively). This elimination eliminates the security risk associated with maintaining a server outside of the enterprise firewall. With the elimination of an intermediate relay point, the delay associated with transmitting media packets between an external client device and a client device managed by enterprise network 4002 through a secure tunnel is reduced.

Figure 41:
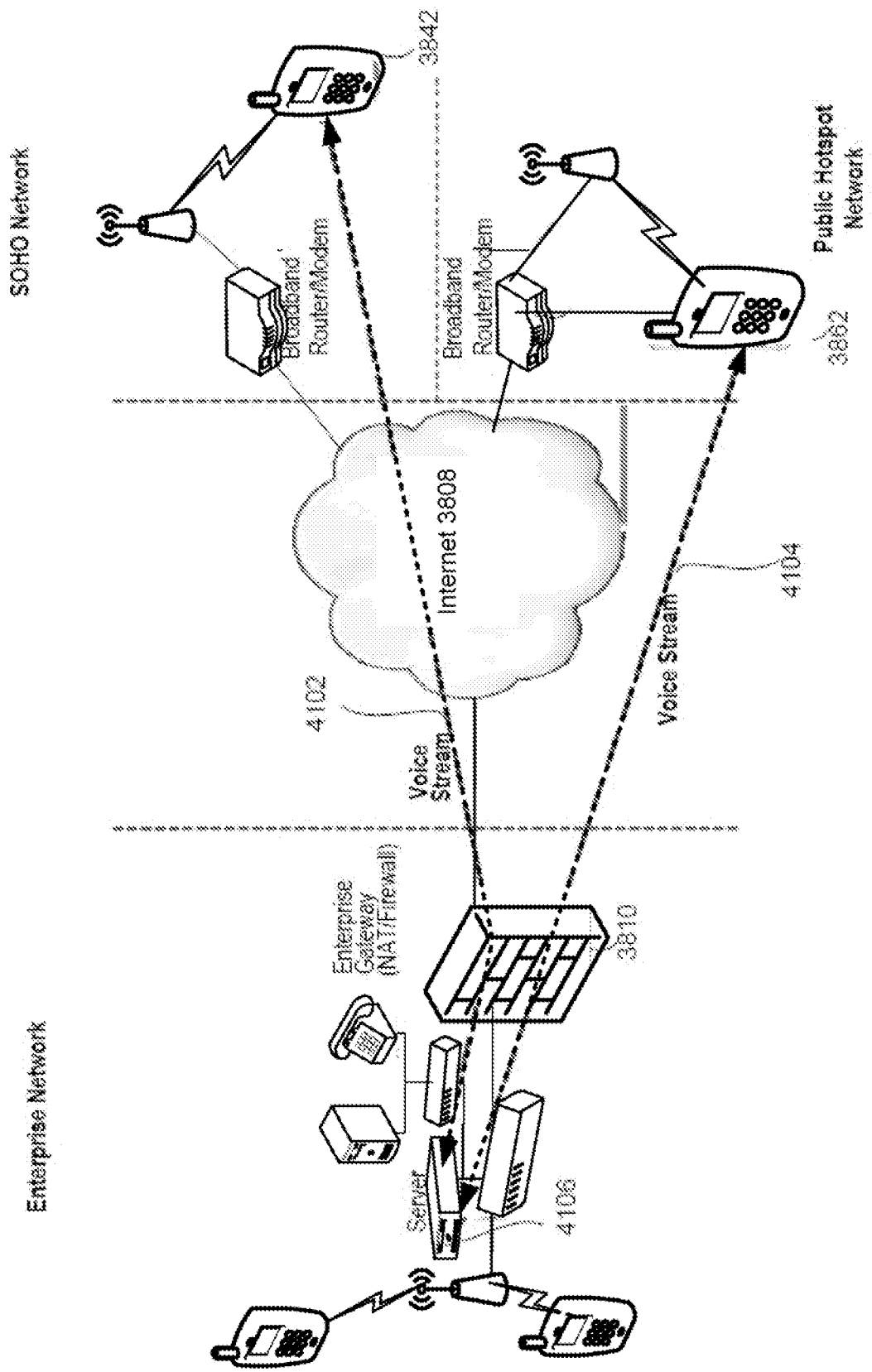
FIG. 41 shows, in accordance with an embodiment of the present invention, a NAT traversal arrangement in which two ports on a media server is employed to service media streams to and from two external client devices.

It is observed by the inventors herein that the MSAP port, which is employed for NAT traversal, may also be used to reduce the number of ports opened per communication session between any N client devices. With respect to FIG. 41, for example, without the use of the MSAP port, a media stream between external client device 3862 and external client device 3842 requires two ports for servicing the two legs 4102 and 4104 of the communication path. This is because the traditional VoIP setup opens two ports at server 4106 and through enterprise gateway/firewall 3810, with a bi-directional stream from each of client devices 3842 and 3862 using one port.

In accordance with an embodiment of the present invention, the MSAP port is employed to service media streams for the client devices irrespective of the number of legs per call.

Figure 42:
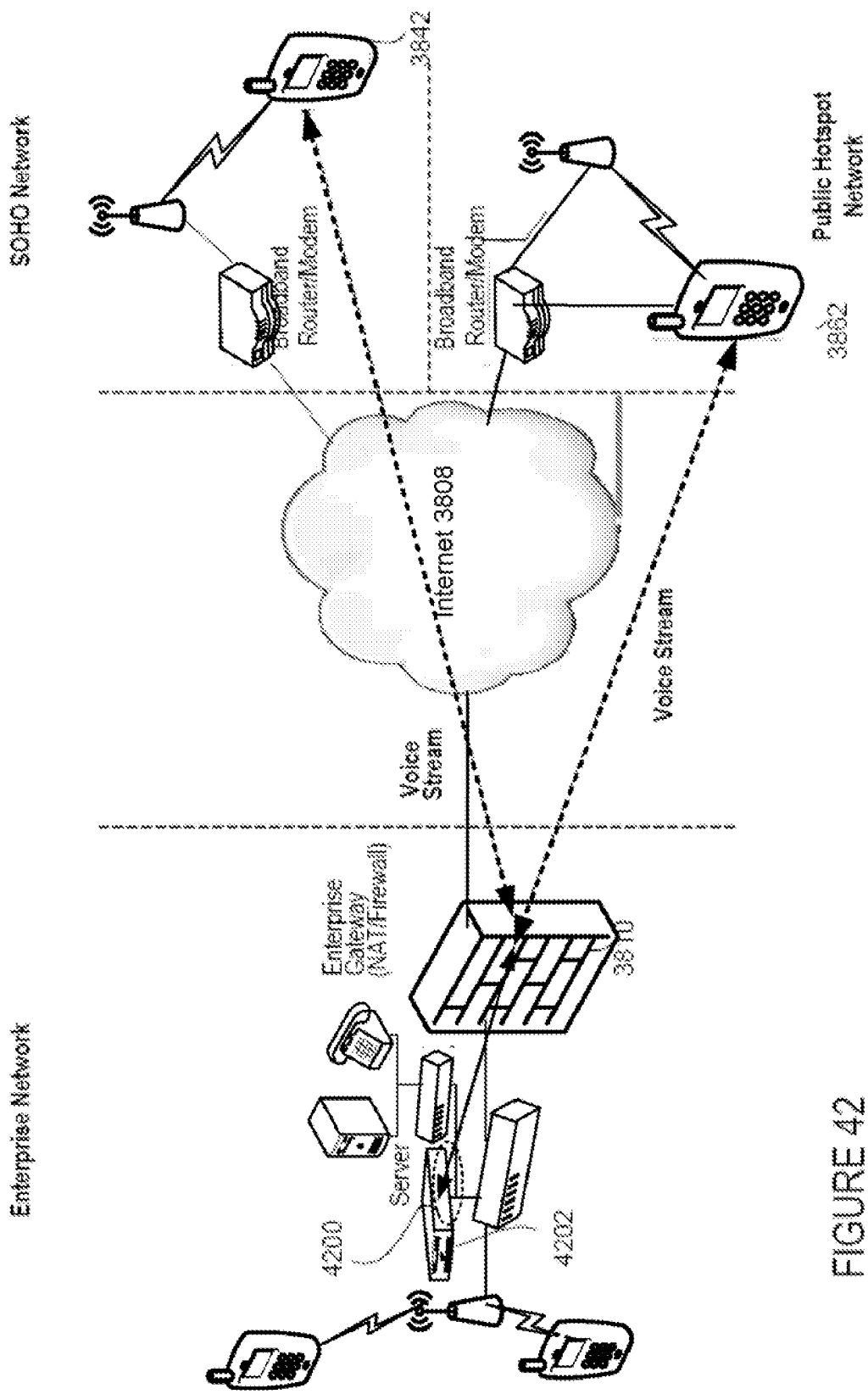
FIG. 42 shows, in accordance with an embodiment of the present invention, a NAT traversal arrangement in which a single MSAP port on a media server is employed to service media streams to and from two external client devices.

With respect to FIG. 42, for example, a single MSAP port 4200 on server 4202 is employed to service the media streams to and from both external client device 3862 and external client device 3842. By using a single MSAP port for both legs of the call, the number of ports opened at enterprise gateway/firewall 3810 is reduced, which in turn reduces the management overhead and the security risks associated with having multiple ports opening simultaneously.

Recalling from the discussion in connection with port forwarding that VoIP packets are routed using a combination of IP address and port numbers on the part of server 4202, another mechanism must now be employed to associate voice packets with their conversations since only a single MSAP port exists for all media streams to and from client devices. In accordance with an embodiment of the present invention, the solution involves not only using a single MSAP port on server 4202 for all media communication streams to and from the client devices, but also involves associating media stream packets with conversations for routing purposes based on information other than the port number (since there is only one MSAP port for all media streams with the approach of FIG. 42). In an embodiment, each packet is inspected for its media stream ID, and the media stream ID is then employed to associate packets with media streams in order to ascertain the destination device to which a particular media (such as voice) packet needs to be forwarded.

In an embodiment of the present invention, the association between a packet and its media stream for the purpose of packet routing involves employing server 4202 to take a quick peek into the header of the voice packet in order to ascertain the media stream ID. Since deep analysis or data manipulation is not involved, the delay associated with the acquiring the media stream ID and associating the media stream ID with a particular conversation is vastly reduced.

Once the media stream ID is ascertained, the packet can be associated with a particular media stream and a particular destination client device (the information for which may be kept in a call table in RAM, for example) and the packet can be appropriately routed to the destination client device. In this manner, the MSAP port is leveraged not only for NAT traversal but also for firewall traversal in a manner such that the number of ports open through enterprise gateway/firewall 3810 of FIG. 42 is substantially reduced.

It can be appreciated from the foregoing, embodiments of the invention accomplish firewall traversal for VoIP calls while reducing the number of open ports in the enterprise firewall through the use of a single MSAP port to service all media streams to and from the client devices. The reduction in the number of ports in turn reduces the security risks for the enterprise, rendering the internal network more secure against an attack that originates externally.

Although VoIP applications are described as illustrative examples, methods, servers, and/or systems in accordance with one or more embodiments of the present invention may be applied to communication of text, image, video, and/or other audio data.

H. Conclusion

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A method for performing a handoff for a mobile device from a first radio station to a second radio station, the method comprising:
   buffering a first media data set, the first media data set being received through the first radio station;
   if a second media data set is received through the second radio station, cross-correlating a tail portion of the first media data set and a head portion of the second media data set to generate a cross-correlated media data set and outputting the correlated media data set;
   if no media data is received through the second radio station within a threshold, synthesizing a synthesized media data set and outputting the synthesized media data set, the threshold including at least one of a time threshold and a data amount threshold, the synthesizing including using a modeled portion of the first media data set; and
   if no media data is received through the second radio station at the threshold, extending at least a portion of the first media data set to generate an extended media data set and outputting the extended media data set.

2. The method of claim 1 wherein the step of buffering the first media data set is initiated upon imminence of the handoff, the imminence of the handoff being detected by at least one of the mobile device and a mobility server that contains information of the mobile device.

3. The method of claim 1 wherein the step of buffering the first media data set is initiated when the handoff starts.

4. The method of claim 1 wherein the first media data set contains at least one of silence, text, audio, and video signal data.

5. The method of claim 1 further comprising buffering the second media data set if the second media data set is received.

6. The method of claim 1 wherein the data amount threshold represents a predetermined number of missing data packets expected to be received from the second radio station.

7. The method of claim 1 wherein the extending includes inserting at least one silence packet into the at least a portion of the first media data set.

8. The method of claim 1 further comprising generating a transition media data set using at least one of the cross-correlated media data set, the synthesized media data set, and the extended media data set to perform at least one of modifying an overlap of media data in the handoff and filling a gap of media data in the handoff, the overlap of media data representing coexistence of the first media data set and the second media data set, the gap of media data representing a gap between an end of the first data set and a beginning of media data received through the second radio station.

9. The method of claim 8 further comprising adjusting a signal level of the transition media data set.

10. The method of claim 9 wherein the signal level of the transition media data set is adjusted to approximate a signal level of the first media data set.

11. The method of claim 1 further comprising adjusting a signal level of media data received through the second radio station to approximate a signal level of the first media data set.

12. A system for performing a handoff for a mobile device from a first radio station to a second radio station, the system comprising:
   a buffer for buffering a first media data set, the first media data set being received through the first radio station;

a cross-correlation module for cross-correlating a tail portion of the first media data set and a head portion of a second media data set to generate a cross-correlated media data set, the cross-correlation being activated if the second media data set is received through the second radio station;

a synthesizer module for using a modeled portion of the first media data set to synthesize a synthesized media data set, the synthesizer module being activated if no media data is received through the second radio station within a threshold, the threshold including at least one of a time threshold and a data amount threshold; and an extension module for extending at least a portion of the first media data to generate an extended media data set, the extension module being activated if no media data is received through the second radio station at the threshold.

13. The system of claim 12 further comprising an adder module configured to generate a transition media data set using at least one of the cross-correlated media data set, the synthesized media data set, and the extended media data set to perform at least one of modifying an overlap of media data in the handoff and filling a gap of media data in the handoff, the overlap of media data representing coexistence of the first media data set and the second media data set, the gap of media data representing a gap between an end of the first data set and a beginning of media data received through the second radio station.

14. The system of claim 13 further comprising a signal level control module configured to adjust a signal level of the transition media data set.

15. The system of claim 12 further comprising a signal level control module configured to adjust a signal level of a transition media data set, the transition media data set including at least one media data packet that the system receives through the second radio station.

16. The system of claim 15 wherein the transition media data set further includes a function of at least one of the cross-correlated media data set, the synthesized media data set, and the extended media data set.

17. The system of claim 15 wherein the signal level of the transition media data set is adjusted to approximate a signal level of the fist media data set.

18. The system of claim 12 wherein the buffer is further configured to buffer the second media data set if the system receives the second media data set 19. The system of claim 12 further comprising at least one of a timer and a counter configured to measure at least one of a time duration and a missing data packet count between an end of the first media data set and a beginning of media data received through the second radio station, the at least one of the time duration and the missing data packet count to be compared against the threshold.

20. The system of claim 12 wherein the extension module is configured insert at least one silence packet into the at least a portion of the first media data.

21. The system of claim 12 wherein the extension module is configured periodically insert silence packets into the at least a portion of the first media data.

* * * * *